United States Patent
Conrad et al.

(10) Patent No.: US 12,096,884 B2
(45) Date of Patent: Sep. 24, 2024

(54) FOOD COOKING APPARATUS AND HEAT STORAGE MEMBER

(71) Applicant: Omachron Intellectual Property Inc., Hampton (CA)

(72) Inventors: Wayne Ernest Conrad, Hampton (CA); Dave Petersen, Bowmanville (CA); Nina Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 18/302,343

(22) Filed: Apr. 18, 2023

(65) Prior Publication Data

US 2023/0248179 A1    Aug. 10, 2023

Related U.S. Application Data

(63) Continuation of application No. 16/754,114, filed as application No. PCT/CA2018/051252 on Oct. 4, 2018.

(Continued)

(51) Int. Cl.
*A47J 37/06* (2006.01)
*A21B 1/26* (2006.01)
(Continued)

(52) U.S. Cl.
CPC .............. *A47J 37/0641* (2013.01); *A21B 1/26* (2013.01); *F24C 7/08* (2013.01); *F24C 15/327* (2013.01); *A47J 37/0754* (2013.01)

(58) Field of Classification Search
CPC ...... F24C 15/18; F24C 15/162; F24C 15/007; F24C 15/325; F24C 15/327
See application file for complete search history.

(56) References Cited

U.S. PATENT DOCUMENTS 3,343,477 A    9/1967 Ekstam
3,490,823 A    1/1970 Neu et al.
(Continued)

FOREIGN PATENT DOCUMENTS

CN    206080273 U    4/2017
EP    1368595 B1    9/2006
(Continued)

OTHER PUBLICATIONS

International Search Report and Written Opinion received in connection to International Patent Application No. PCT/CA2018/051252, mailed on Jan. 8, 2019.

(Continued)

*Primary Examiner* — Nathaniel E Wiehe
*Assistant Examiner* — Spencer H. Kirkwood
(74) *Attorney, Agent, or Firm* — Philip C. Mendes da Costa; BERESKIN & PARR LLP/ S.E.N.C.R.L., s.r.l.

(57) ABSTRACT

An air fryer comprises an air flow passage provided between an inner shell and an outer shell; a first cooking chamber having a first cooking fan in air flow communication with the first cooking chamber and a first heating element in thermal communication with the first cooking chamber. A cooling fan, when actuated, circulates air within the airflow passage. A common motor is drivingly connected to each of the cooking fan and the cooling fan, wherein a first axle portion drivingly connects the common motor to the cooking fan, a second axle portion drivingly connects the common motor to the cooling fan and, when the air fryer is positioned with the bottom on a horizontal surface, the first axle portion extends upwardly from an upper side of the common motor and the second axle portion extends downwardly from a lower side of the common motor.

20 Claims, 83 Drawing Sheets

Related U.S. Application Data

(60) Provisional application No. 62/569,057, filed on Oct. 6, 2017.

(51) Int. Cl.
  *A47J 37/07* (2006.01)
  *F24C 7/08* (2006.01)
  *F24C 15/32* (2006.01)

(56) References Cited

U.S. PATENT DOCUMENTS

| | | | |
|---|---|---|---|
| 4,254,695 | A | 3/1981 | Landry |
| 4,629,865 | A | 12/1986 | Freedman et al. |
| 4,716,820 | A | 1/1988 | Stuck |
| 4,889,042 | A | 12/1989 | Hantz et al. |
| 5,485,780 | A | 1/1996 | Koether et al. |
| 5,695,668 | A | 12/1997 | Boddy |
| 6,870,136 | B1 | 3/2005 | Majordy |
| 7,193,184 | B1 | 3/2007 | Manning |
| 8,516,953 | B2 | 8/2013 | Fiori |
| 10,383,182 | B2 | 8/2019 | Vainionp |
| 10,624,497 | B1 | 4/2020 | Bumgarner et al. |
| 2001/0046377 | A1 | 11/2001 | Yagi et al. |
| 2004/0035845 | A1 | 2/2004 | Moon et al. |
| 2006/0289530 | A1 | 12/2006 | Cordae |
| 2008/0023462 | A1* | 1/2008 | Shei ............. F24C 7/087 219/394 |
| 2008/0257171 | A1 | 10/2008 | Wang |
| 2009/0126580 | A1* | 5/2009 | Hartfelder ......... A47J 39/006 99/483 |
| 2012/0272832 | A1 | 11/2012 | Kwon et al. |
| 2013/0302483 | A1 | 11/2013 | Riefenstein |
| 2014/0366746 | A1 | 12/2014 | Tsai |
| 2015/0147441 | A1 | 5/2015 | Lagerlf |
| 2017/0231430 | A1 | 8/2017 | Moon et al. |
| 2017/0351278 | A1 | 12/2017 | Raghavan et al. |
| 2018/0230640 | A1 | 8/2018 | Bilionis et al. |
| 2018/0255971 | A1 | 9/2018 | Moon et al. |
| 2018/0301900 | A1 | 10/2018 | Geng et al. |
| 2019/0086143 | A1* | 3/2019 | Liss ............. A47J 27/17 |
| 2020/0200393 | A1 | 6/2020 | Goldberg et al. |

FOREIGN PATENT DOCUMENTS

| | | | |
|---|---|---|---|
| GB | 1488907 A | | 10/1977 |
| GB | 2523365 A | | 8/2015 |
| KR | 1020130089449 A | * | 10/2013 |
| WO | 2009129209 A1 | | 10/2009 |
| WO | 2016062513 A1 | | 4/2016 |

OTHER PUBLICATIONS

International Preliminary Report on Patentability, received in connection to International Patent Application No. PCT/CA2018/051252, mailed on Apr. 16, 2020.

English machine translation of EP1368595B1, published on Sep. 27, 2006.

English machine translation of CN206080273, published on Apr. 12, 2017.

Office Action received in connection to Canadian Patent Application No. 3076938, mailed on Nov. 10, 2021.

* cited by examiner

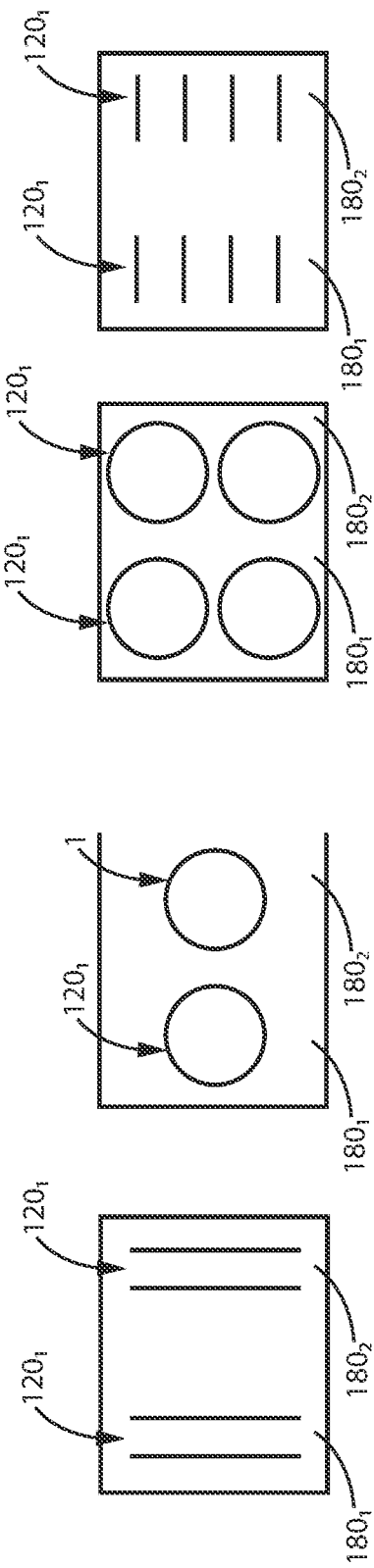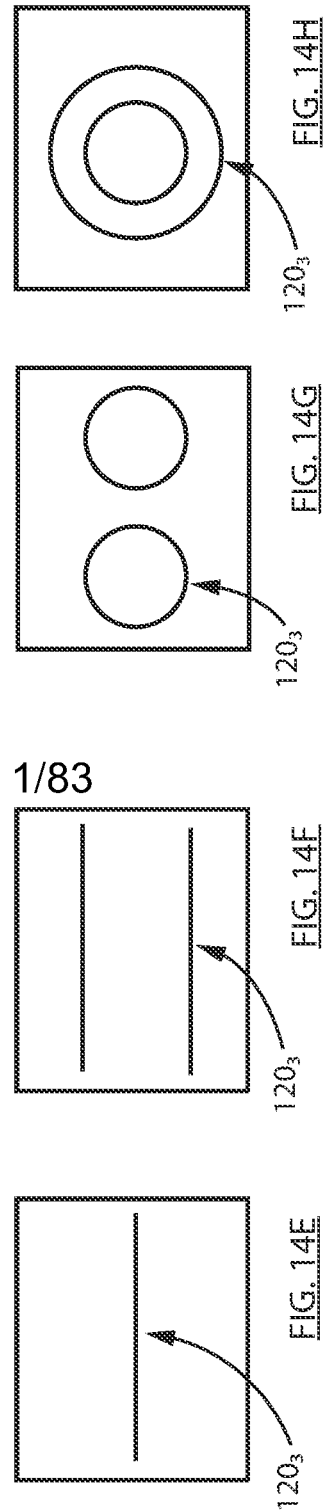

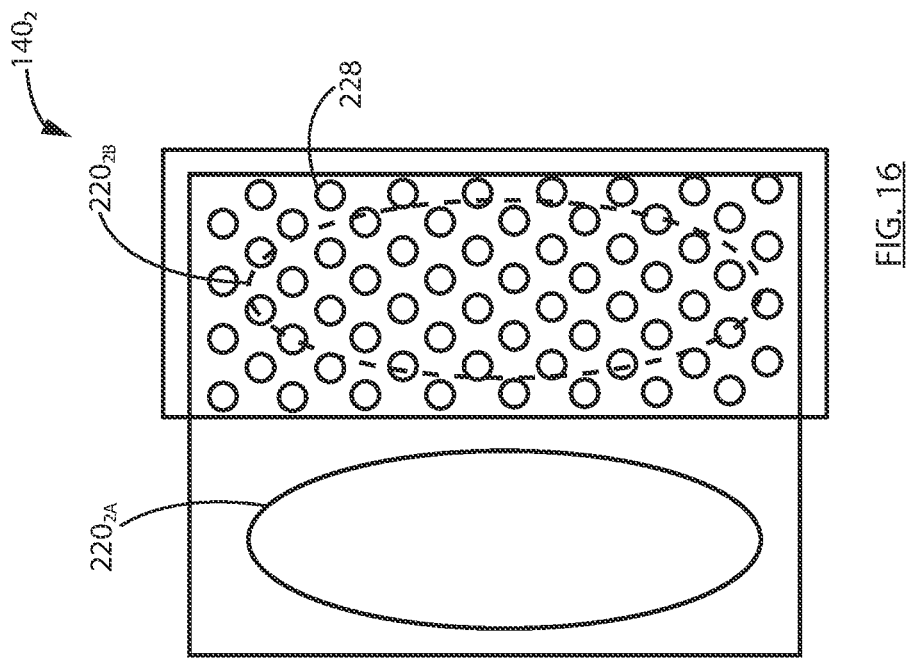
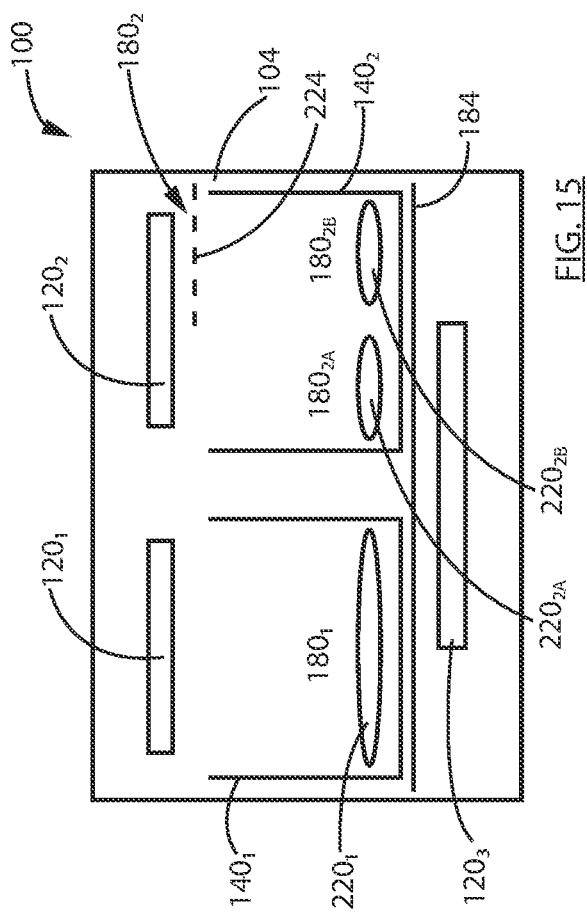
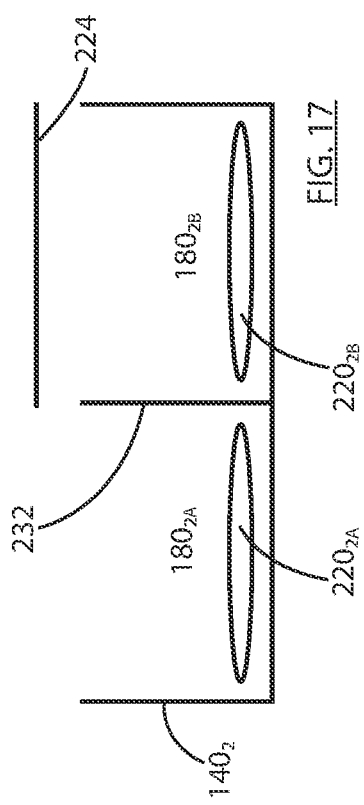

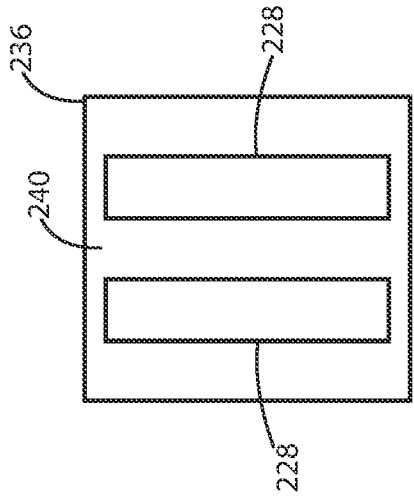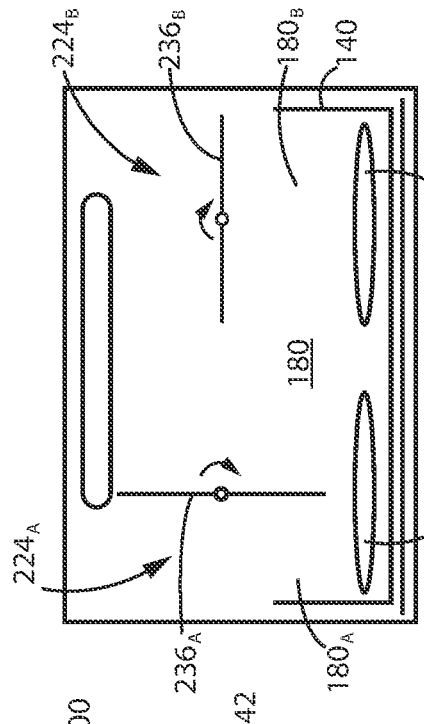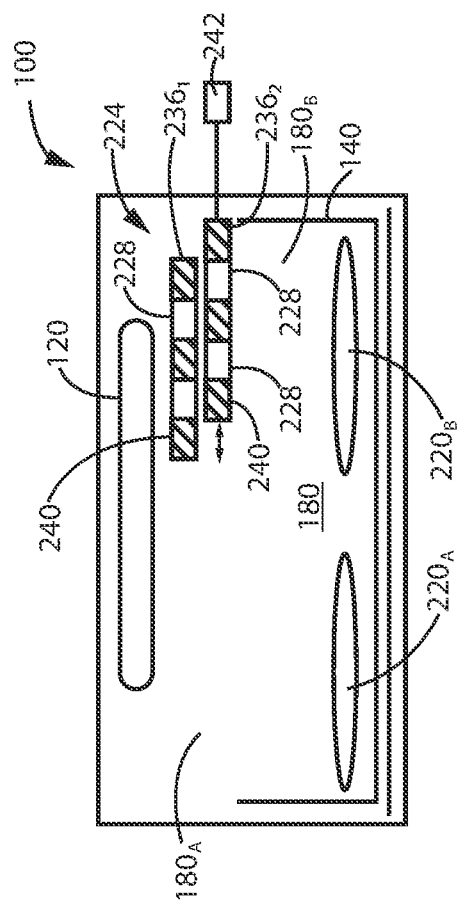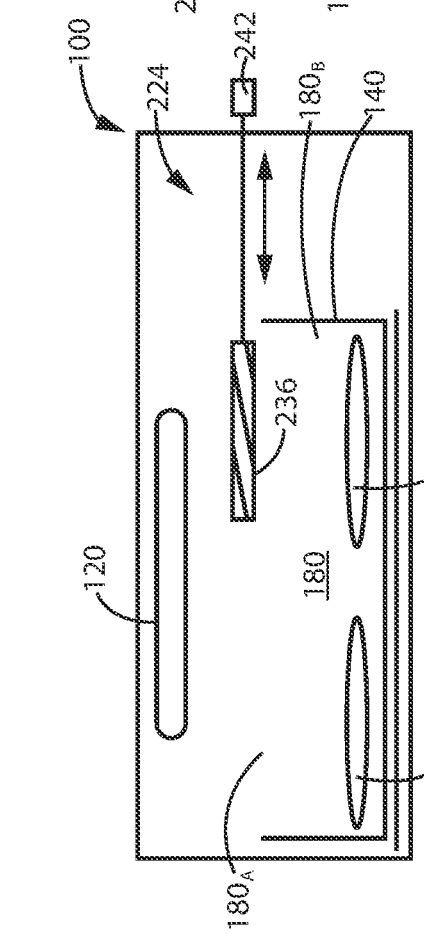

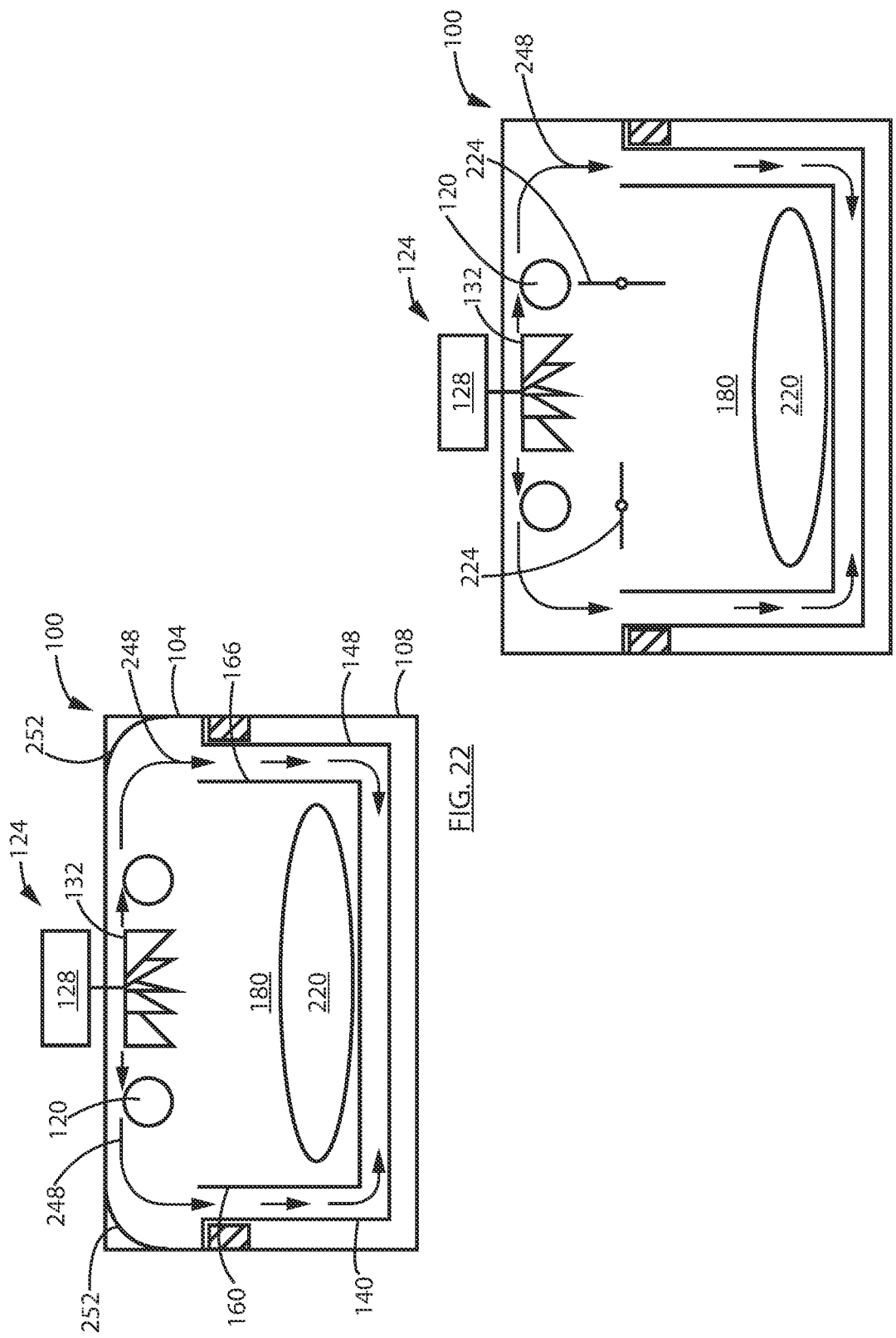

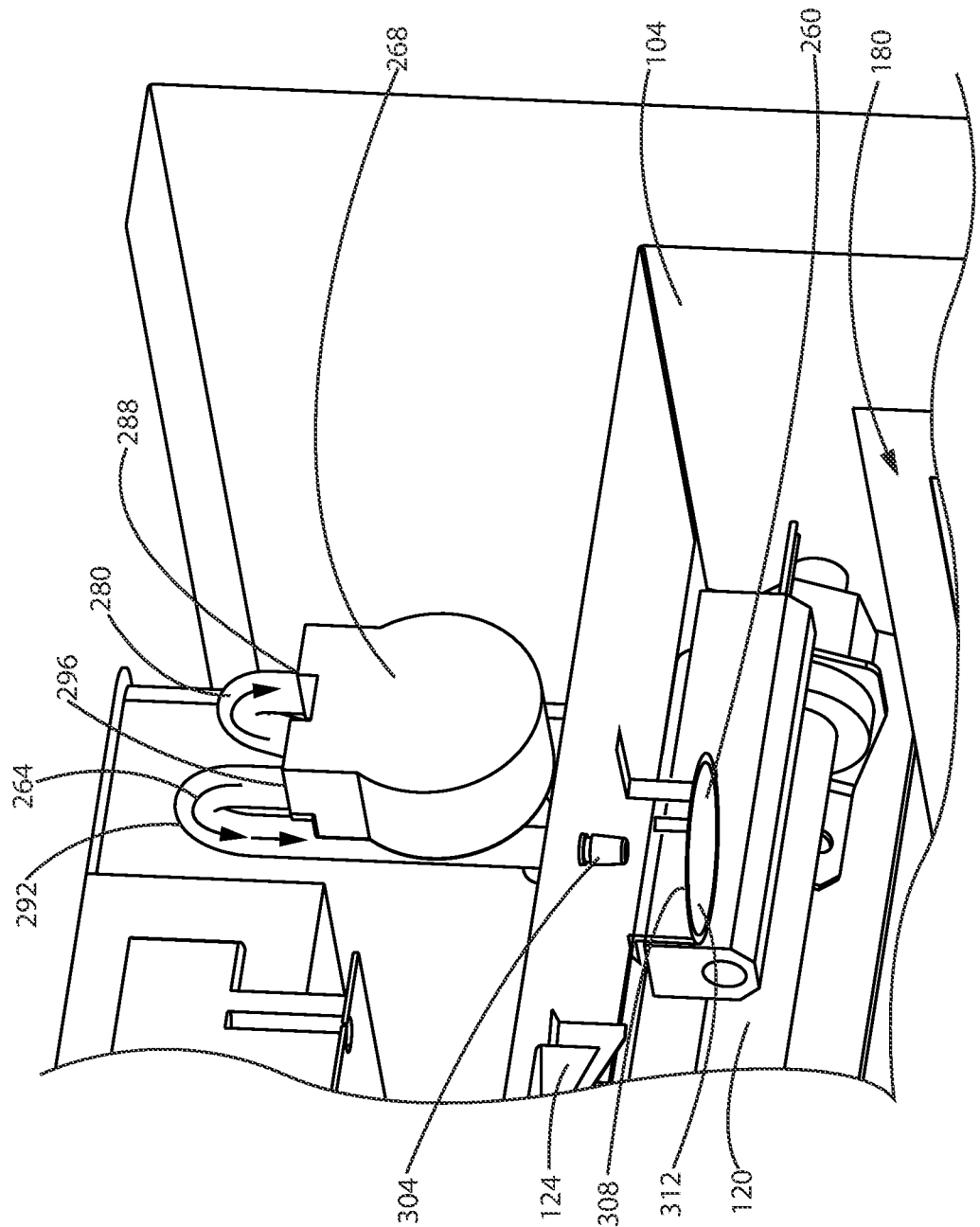

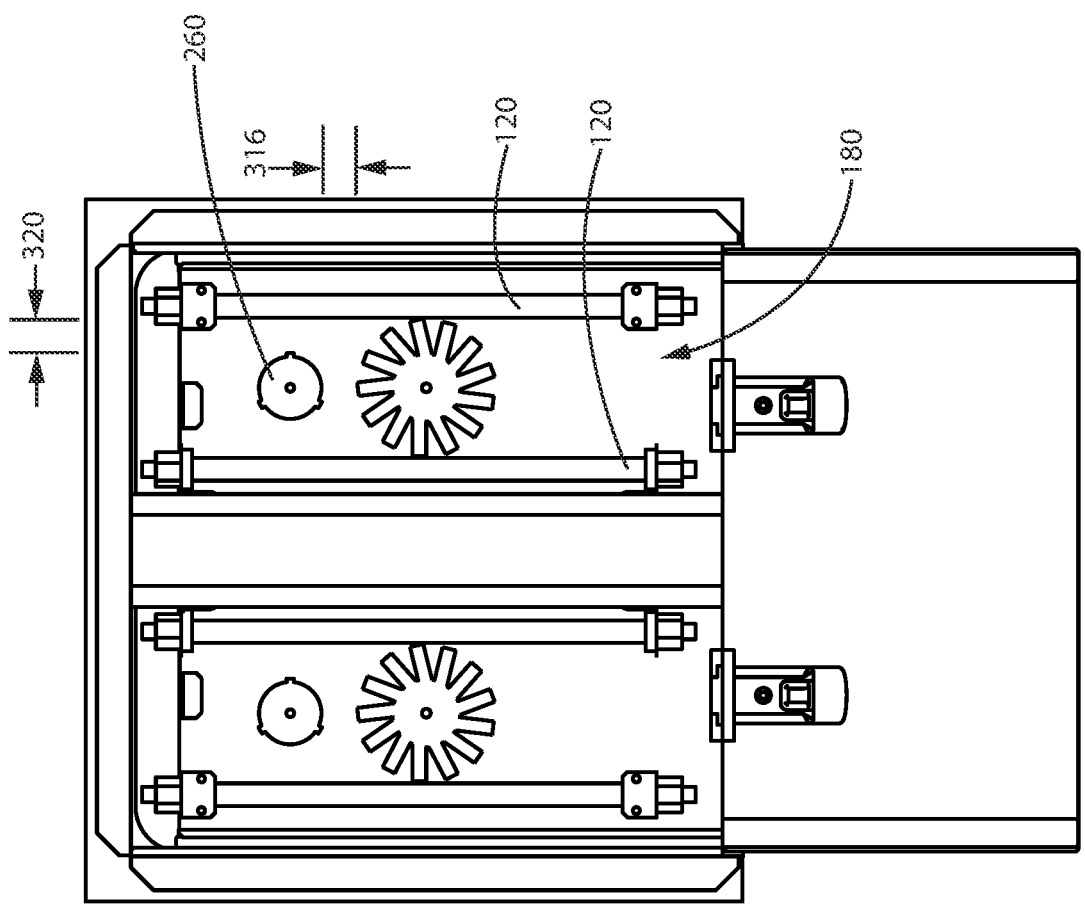

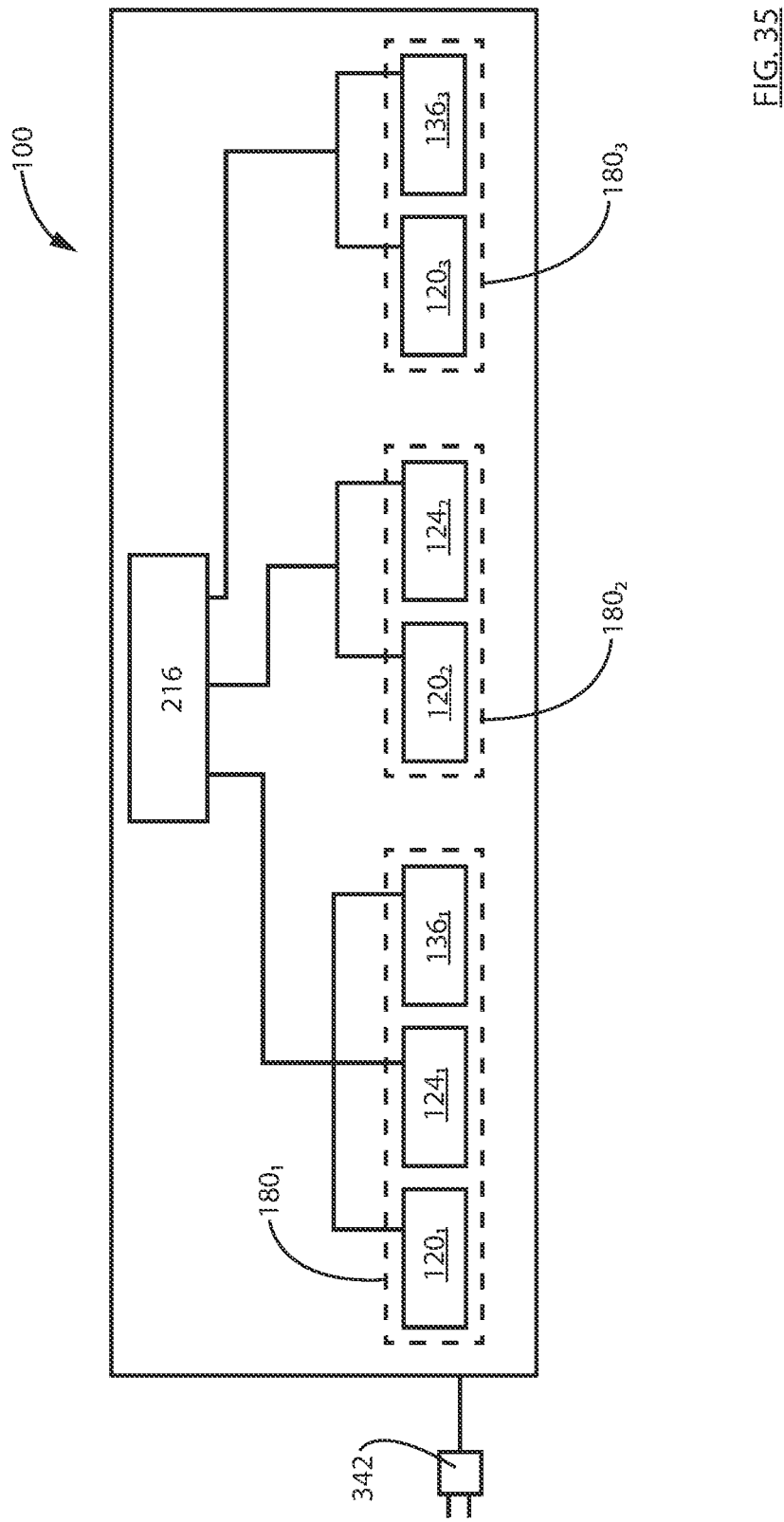

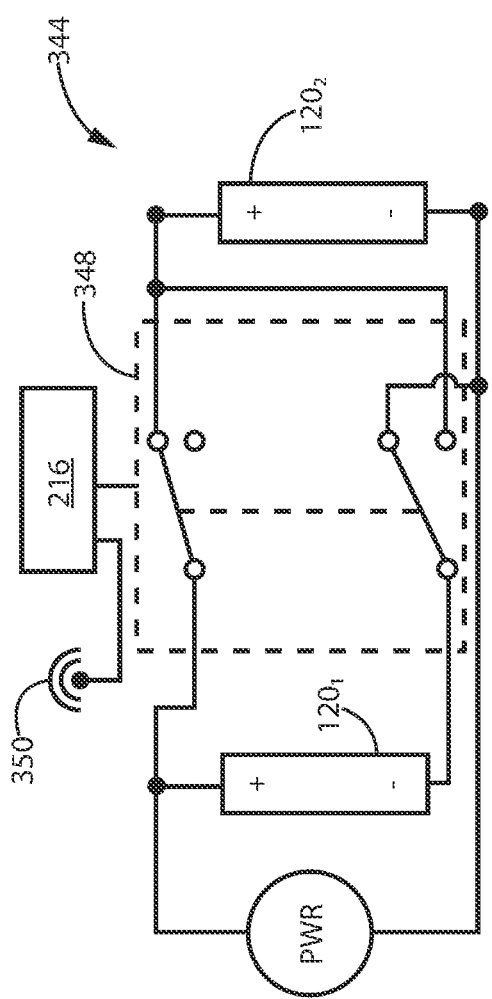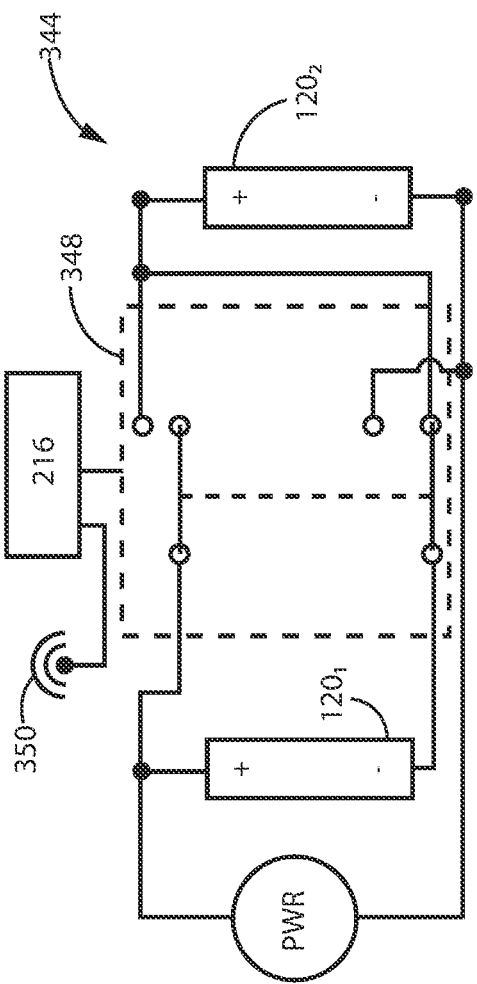

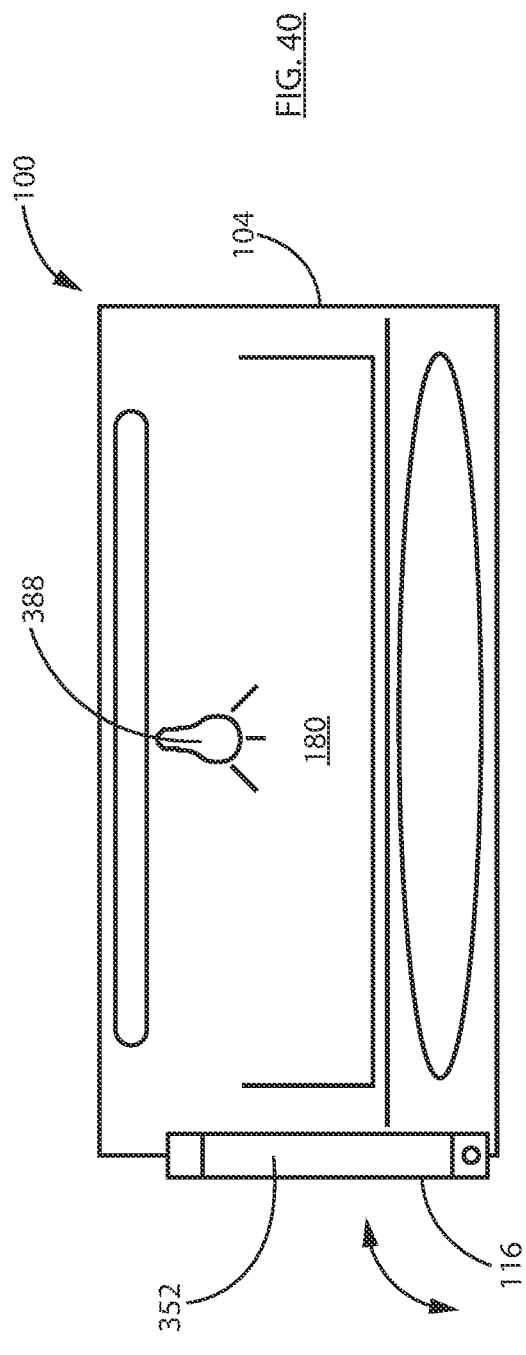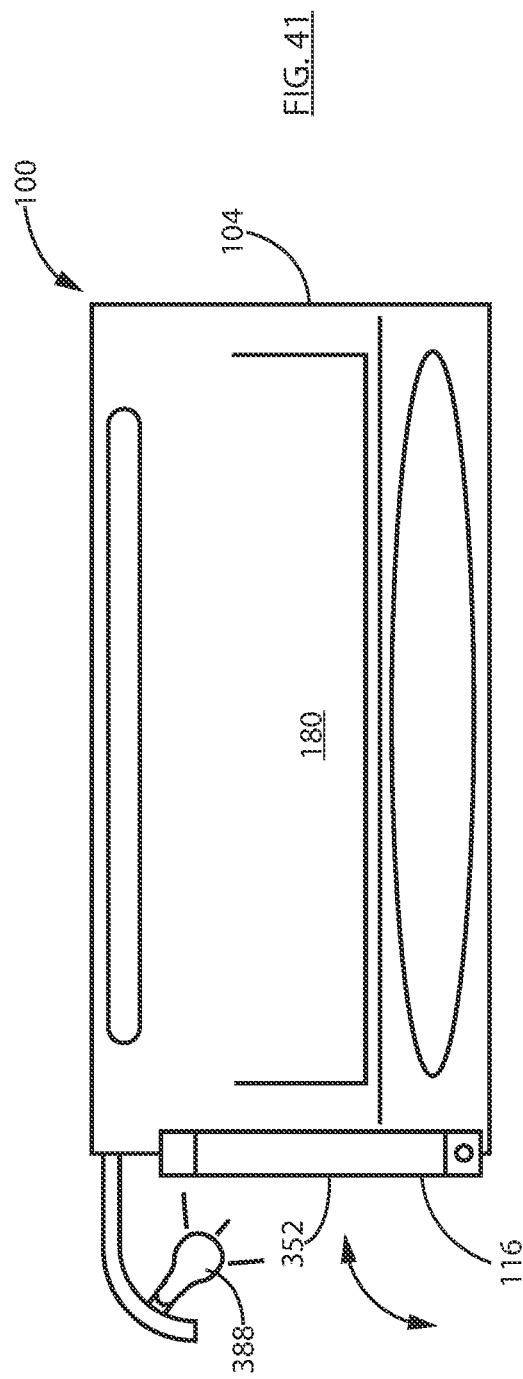

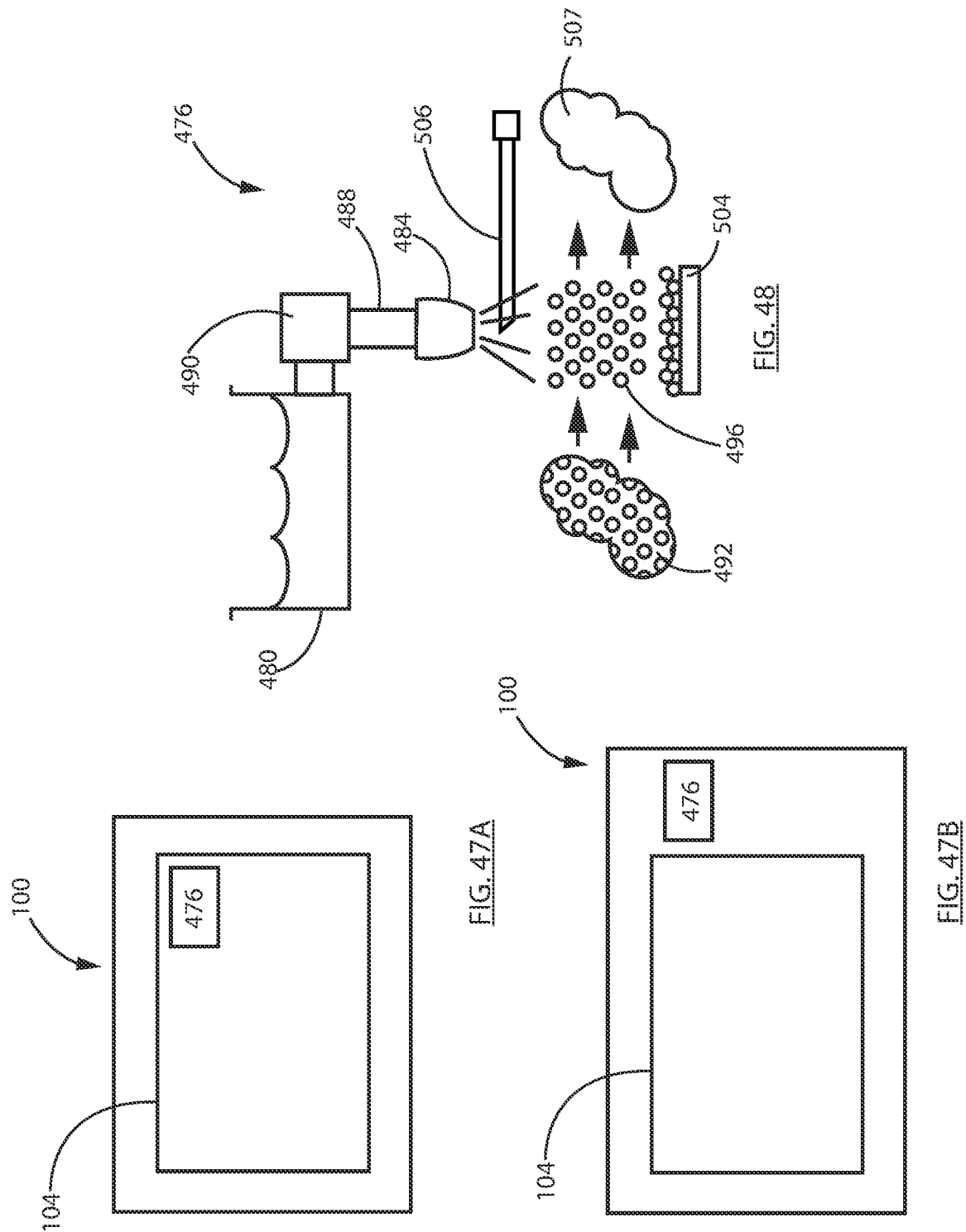

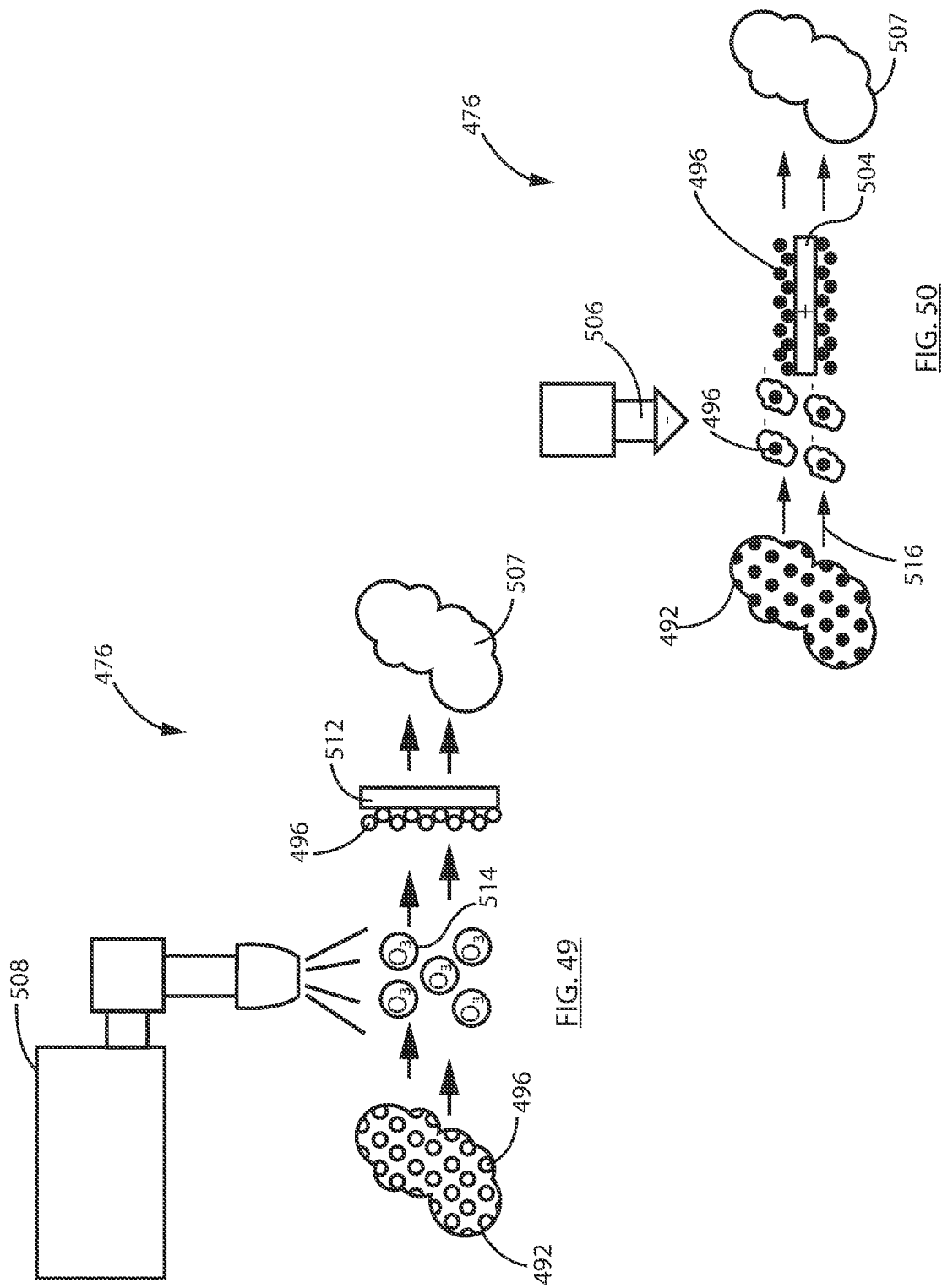

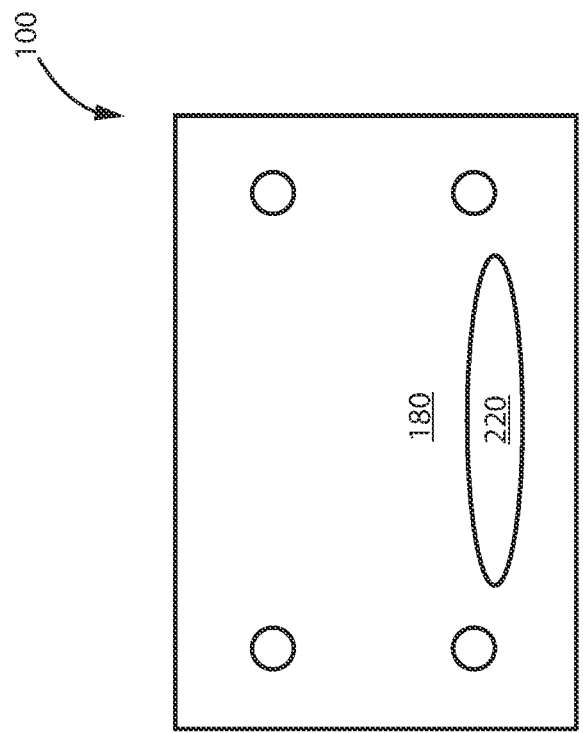
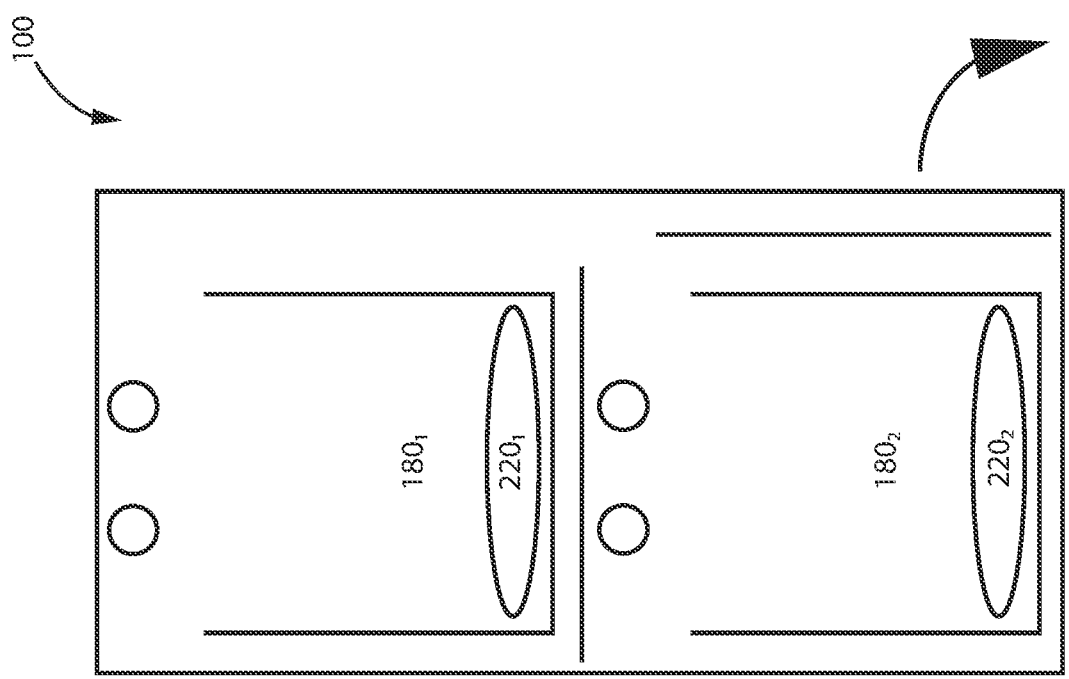

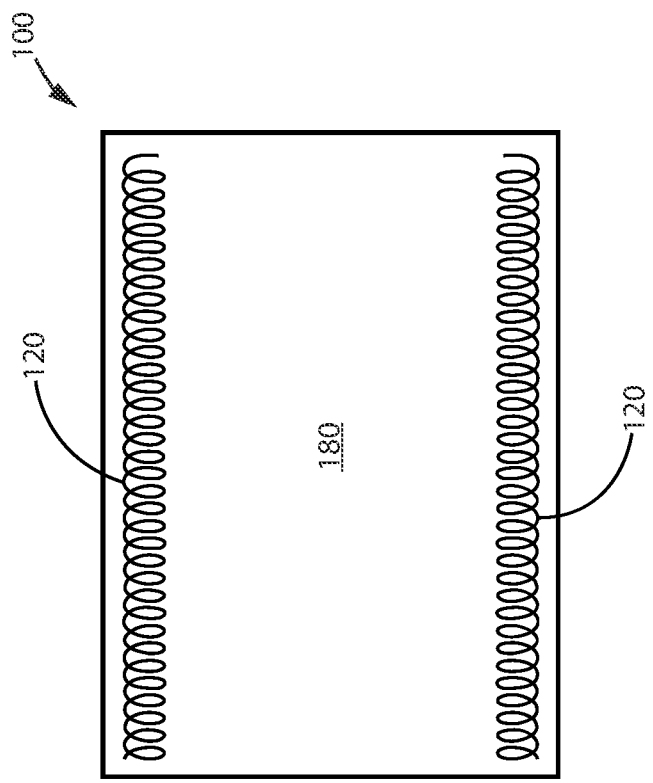
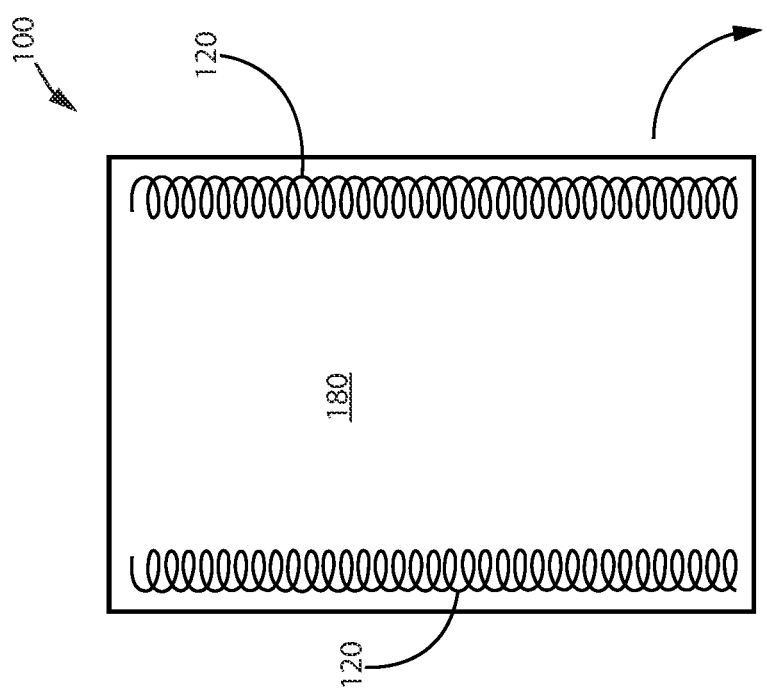

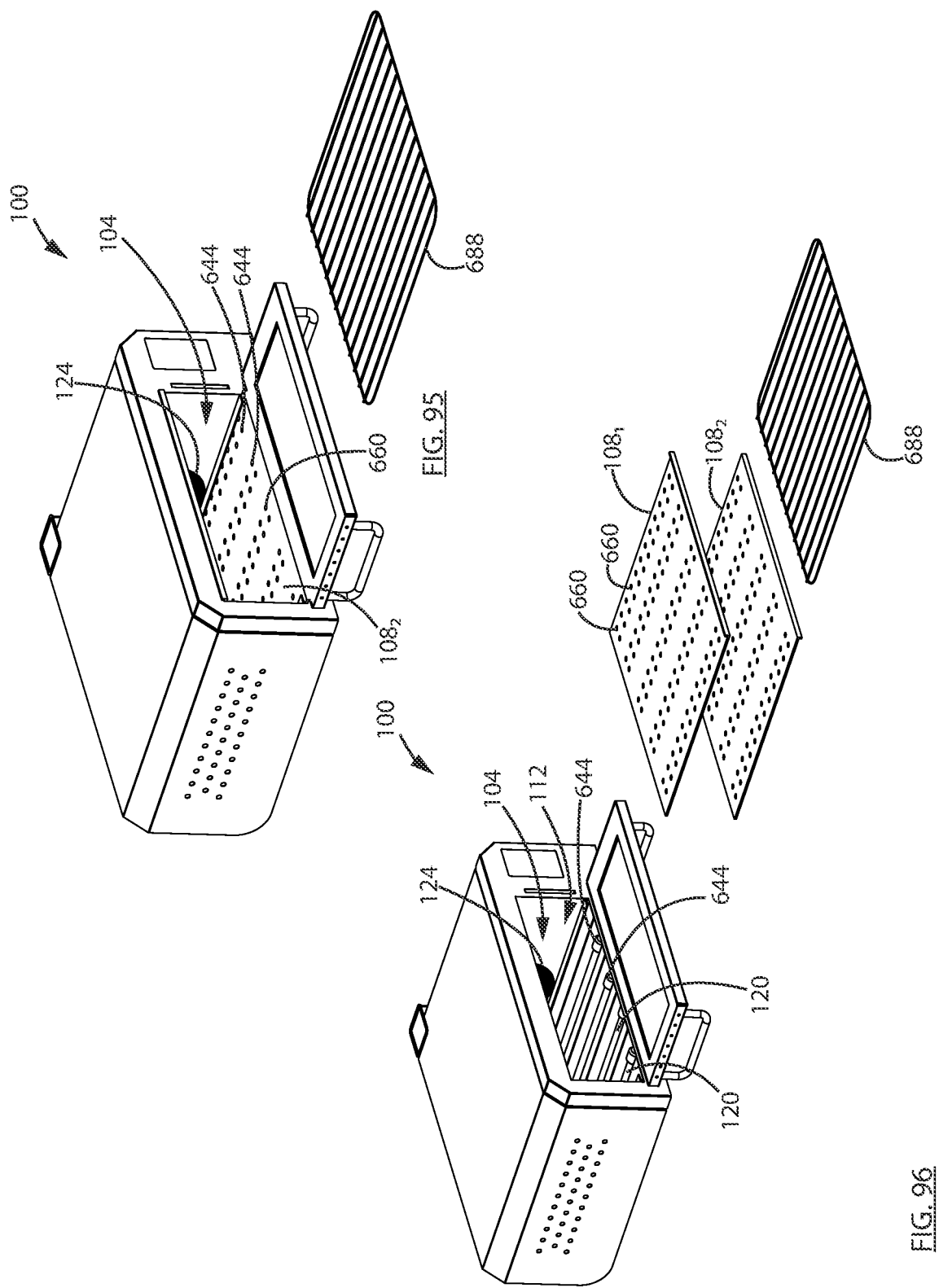

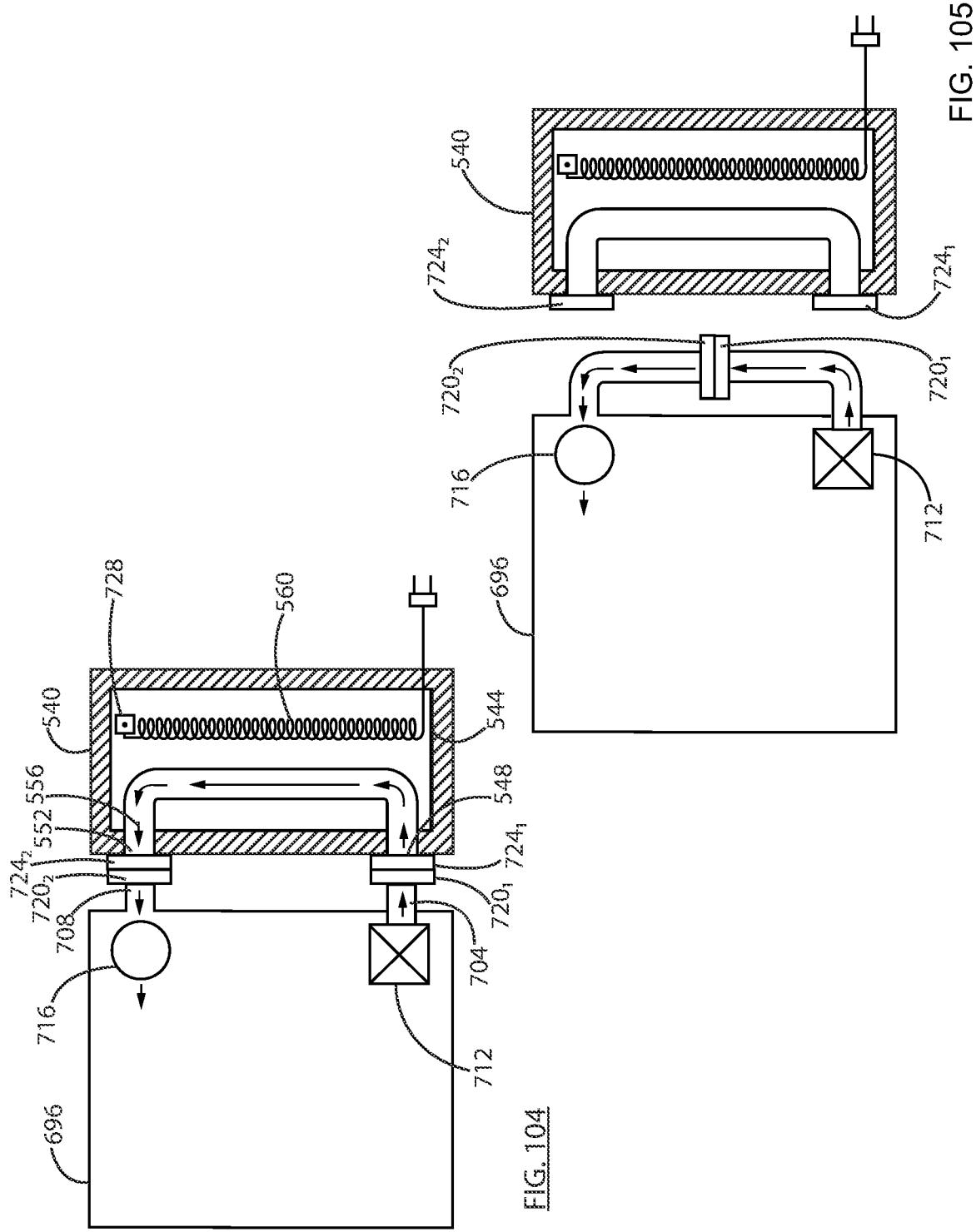

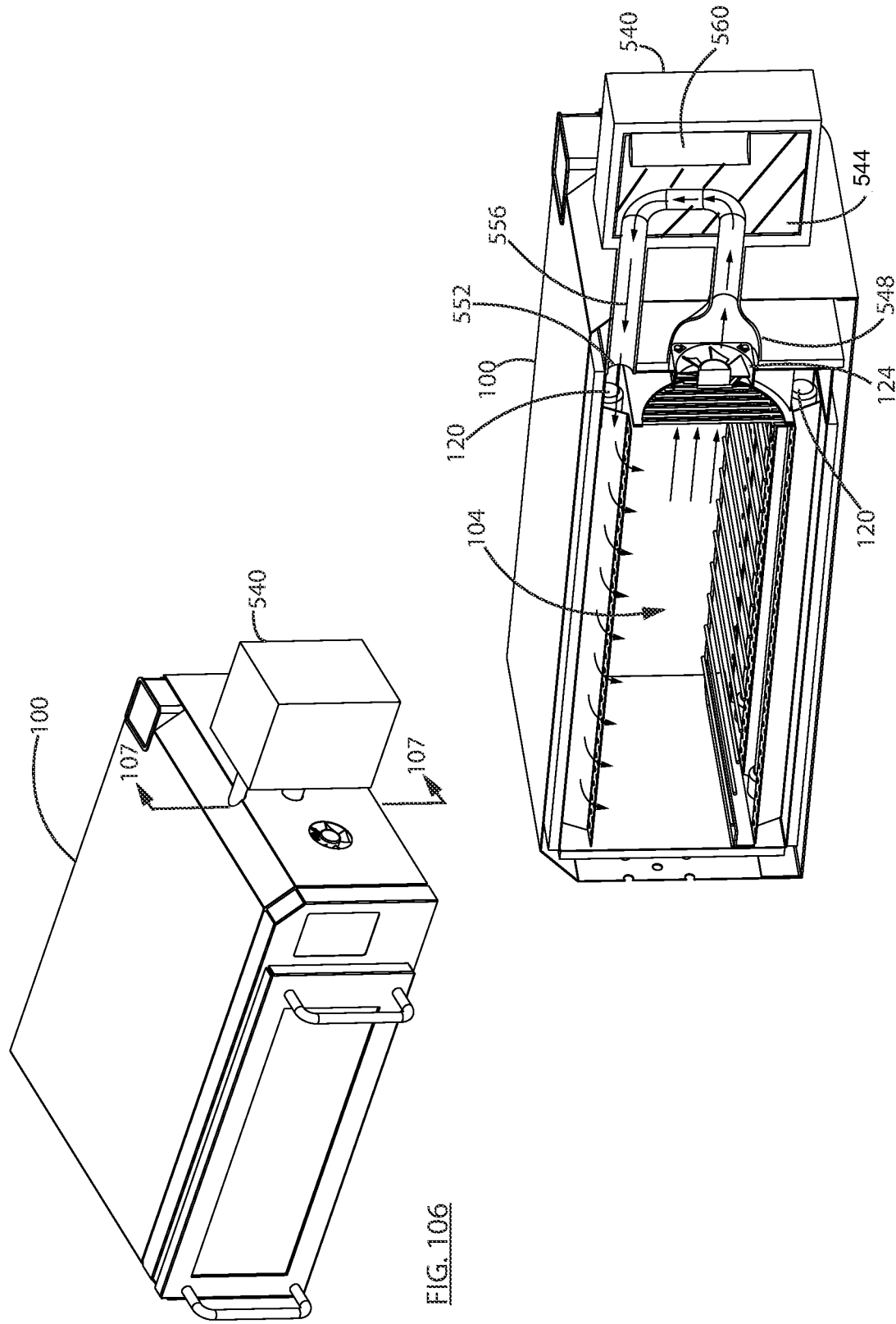

FOOD COOKING APPARATUS AND HEAT STORAGE MEMBER

CROSS-REFERENCE TO RELATED APPLICATION

This application is a continuation of U.S. patent application Ser. No. 16/754,114, filed Apr. 6, 2020, which itself claims benefit of 35 U.S.C. 371 based on co-pending International Patent Application No. PCT/CA2018/051252, filed Oct. 4, 2018, which itself claims priority from U.S. Provisional Patent Application No. 62/569,057, filed on Oct. 6, 2017, the entirety of which is incorporated herein by reference.

FIELD

This disclosure relates to the field of food cooking apparatus and heat storage members.

INTRODUCTION

A food cooking apparatus is a device that has a compartment to receive food for cooking, and that heats the food through one or more of conduction, convection, and radiation.

SUMMARY

In accordance with one aspect of this disclosure, there is provided a hot air oven or fryer having multiple cooking zones. For example, the cooking apparatus may have 2, 3, 4 or more cooking zones. The cooking zones may be formed by first and second cooking containers that are removably receivable in a cooking chamber, each of the cooking containers defining a cooking volume. Optionally, cooking conditions in each cooking volume are individually controllable. For example, each cooking volume may have its own heating (IR) heating element or elements, one or more air moving members (e.g., a fan) to provide a directed airflow in the cooking volume and/or one or more steamers.

In accordance with another aspect, a cooking apparatus comprises ducting providing forced airflow into a cooking chamber. One or more IR heating elements may be provided inside the ducting. Accordingly, there may be provided a cooking chamber having an openable door provided on the front of the cooking apparatus and a cooking volume. A heating duct, which has a plurality of openings, is located above the cooking volume and an IR heating element is provided in the heating duct with the IR heating element overlying at least some of the openings. A fan assembly upstream of the IR heating element. Alternately, or in addition, one or more IR heating elements may be provided between the ducting. Accordingly, there may be provided a cooking chamber having an openable door provided on the front of the cooking apparatus and a cooking volume. A plurality of spaced apart heating ducts may be provided above the cooking volume, the heating ducts having a plurality of openings located above the cooking volume with an IR heating element provided between adjacent heating ducts and a fan assembly upstream of the IR heating element.

In accordance with another aspect, the cooking apparatus may be operated such that, during a cooking cycle, the cooking apparatus draws, e.g., at least 75%, 80%, 90%, 100% of the rated power of the cooking apparatus for at least 50%, 60%, 70%, 85%, 90%, 95% or 100% of the cooking time. This may be achieved by varying the power drawn by one or more of the energy consuming elements (e.g., fan, IR heating element, steamer). For example, to reduce the amount of IR radiation emitted, the power delivered to the fan may be increased to increase the rate of airflow. An increased flow of air over an IR heating element may be used to reduce the amount of IR radiation emitted by the IR heating element (as the temperature of the IR heating element is reduced) while still providing heat (e.g., in the form of forced convection). Alternately, or in addition, more energy may be provided to a steamer to increase the amount of moisture in a cooking volume. Accordingly different cooking regimes may be produced which draw the same or a similar amount of power. For example, at the start of a cooking cycle, more power may be provided to the IR heating element to brown the outside of food in the cooking volume. Once the food is sufficiently browned (which may be pre-programmed based on the duration of this first stage in the cooking cycle), a reduced amount of energy may be provided to the IR heating element and some or more energy may be provided to one or more of a steamer (to provide moisture in the cooking volume) and a fan to produce forced convection or increased forced convection in a cooking volume. Alternately, once the food is sufficiently browned (which may be pre-programmed based on the duration of this first stage in the cooking cycle), the energy provided to the IR heating element may be maintained at the same or a similar level and some or more energy may be provided to one or more of a steamer (to provide moisture in the cooking volume) and a fan to produce forced convection or increased forced convection in a cooking volume In accordance with this aspect, there may be provided a cooking apparatus having a controller operable to adjust the energy provided to a fan assembly wherein the fan assembly is operable at a first power level for a first portion of a cooking cycle and the fan assembly is operable at a second power level for a second subsequent portion of the cooking cycle wherein the second power level is higher than the first power level, whereby operation of the fan assembly at the second power level causes an increase in airflow over an IR heating element and a reduction in IR radiation emitted by the IR heating element.

In accordance with this aspect, there may also be provided a cooking apparatus having a controller operably connected to an IR cooking element and a steamer, wherein the controller has a pre-set cooking setting that represents a cooking regime and, when the pre-set cooking setting is in operation, the controller is operable adjust the distribution of energy to the IR cooking element and the steamer while the cooking apparatus operates at 75% or more of a rated power draw of the cooking apparatus for 70% or more of the pre-set cooking setting.

In accordance with this aspect, there may also be provided a cooking apparatus having a controller operably connected to an IR cooking element and a lower cooking element, wherein the controller has a pre-set cooking setting that represents a cooking regime and, when the pre-set cooking setting is in operation, the controller is operable adjust the distribution of energy to the IR cooking element and the lower cooking element while the cooking apparatus operates at 75% or more of a rated power draw of the cooking apparatus for 70% or more of the pre-set cooking setting.

In accordance with another aspect, a cooking apparatus has at least one, and preferably a plurality of cooking zones. The cooking zones are defined by cooking containers that are removably receivable in a continuous volume defining a cooking chamber. The cooking zones may have cooking conditions that are individually controllable. The cooking chamber has an openable door wherein the openable door has a transparent panel (e.g., one or more layers of glass). The transparent panel of such a multizone cooking apparatus may have a double glass wall with vacuum insulation. Alternately, air may be blown between the layers of glass. Alternately, the transparent panel may comprise a single glass wall with air blown over the glass.

In accordance with another aspect, an energy storage member may be provided. The energy storage member may store energy in the form of heat that is stored for later use. For example, a standard electrical outlet provides a set amount of current. This limits the energy (heat) that may be used to, e.g., cook food and therefore this limits the cooking time. Similarly, the amount of energy that may be provided to an electric kettle is limited and this limits the time required to bring water to a boil in an electric kettle. In accordance with this aspect, an energy storage member may draw electricity (e.g., by plugging the energy storage member into a household electrical outlet) and a heat sink (e.g., a block of metal such as aluminum) may be heated. The heat sink is insulated so as to store the heat for an extended amount of time. An appliance, such as a cooking apparatus (e.g., a cooking apparatus that may be plugged into a household electrical outlet and may be a countertop cooking apparatus as exemplified herein), an electric kettle, a pod coffee maker or a coffee maker may use the heat stored in the heat sink concurrently with heat produced using electricity drawn from a household electrical outlet. Accordingly, the cooking time may be reduced. For example, a cooking apparatus may draw heat from an energy storage member by flowing air through the heat sink to thereby heat or further heat the air. A kettle of coffee maker may flow water through the heat sink to heat or further heat water. It will be appreciated that the energy storage member may be built into an appliance or may be a standalone appliance. In the latter case, the energy storage member may be used with multiple different appliances.

In accordance with this aspect, there may be provided a cooking apparatus comprising a cooking chamber, a first heating member operable to provide heat to the cooking chamber and a heat storage member.

In accordance with this aspect, there may also be provided a portable heat storage member comprising a thermally insulated heat sink, a heating member in thermal communication with the heat sink, a fluid flow path extending through the heat sink, the fluid flow path having an inlet end and an outlet end, the outlet end is connectable in flow communication with a domestic appliance and, an electrical cord connectable with a domestic power outlet.

In accordance with another aspect, a cooking apparatus is provided with a double walled construction over part or all of the exterior shell of the cooking apparatus. Cooling airflows through a space between the double walls, e.g., when the cooking apparatus is in use or when the temperature of, e.g., the outer surface exceeds a predetermined value. An advantage of this design is that it may maintain the exterior surface of part of all of the cooking apparatus at a lower temperature. Alternately, or in addition, insulation may be provided, e.g., adjacent the outer shell of part or all of the cooking apparatus or, if a double wall construction is used, in the space between the double walls. The use of insulation may limit heat loss. This enables more energy to be input to cook the food. If heat is lost through the walls of the cooking apparatus, then the lost heat must be replaced to maintain the temperature in the desired range. By using insulation, the energy that would have been used to replace the lost heat is used to provide more IR, steam or forced convection.

In accordance with this aspect, there may be provided a cooking apparatus having an outer shell, an inner shell spaced from and facing at least a portion of the outer shell with an airflow passage provided between the inner shell and the outer shell, the airflow passage having a cooling air inlet and an exhaust outlet. The cooking apparatus has a cooking chamber having an openable door wherein the cooking chamber is isolated from airflow communication with the airflow passage. A cooling fan assembly is in airflow communication with the airflow passage.

In accordance with this aspect, there may also be provided a cooking apparatus having an air flow passage having a cooling air inlet and an exhaust outlet, a cooking chamber having an openable door, the cooling chamber being isolated from air flow communication with the air flow passage and, a cooling fan assembly in air flow communication with the air flow passage, wherein the exhaust outlet directs cooling air at the openable door.

It will be appreciated that one or more of these aspects may be used in any particular cooking apparatus.

BRIEF DESCRIPTION OF THE DRAWINGS

FIG. 14A-D are schematic illustrations of heating elements associated with cooking zones in accordance with an embodiment;

FIGS. 14E-14J are schematic illustrations of heating elements in accordance with an embodiment;

FIG. 15 is a schematic illustration of a cooking apparatus in accordance with an embodiment;

FIGS. 16-17 are schematic views of a cooking receptacle partially overlaid by an IR shield in accordance with an embodiment;

FIG. 18 is a schematic illustration of a cooking apparatus having an IR shield in accordance with an embodiment;

FIG. 19 is a top plan view of a IR shield panel in accordance with an embodiment;

FIGS. 20-21 are schematic illustrations of a cooking apparatus including IR shields in accordance with various embodiments;

FIGS. 22-23 are schematic illustrations of a cooking apparatus including air movers in accordance with various embodiments;

FIG. 28 is an enlargement of the steam generator of the apparatus of FIG. 1;

FIG. 29 is a cross-sectional view taken along line 29-29 in FIG. 2 with both cooking vessels positioned inside the cooking chamber;

FIG. 35 is a schematic illustration of a cooking apparatus including a controller communicatively coupled to cooking devices associated with multiple cooking zones, in accordance with an embodiment;

FIG. 36 is a schematic illustration of a circuit including heating elements configured in a low power mode;

FIG. 37 is a schematic illustration of the circuit of FIG. 37 with the heating elements configured in a high power mode;

FIGS. 40-42 are schematic illustrations of a cooking apparatus including lighting in accordance with various embodiments;

FIGS. 47A-47B are schematic illustrations of a cooking apparatus including a gas cleaner in accordance with various embodiments;

FIGS. 48-50 are schematic illustrations of gas cleaners in accordance with various embodiments;

FIG. 51 is a schematic illustration of a cooking apparatus in a tall orientation in accordance with an embodiment;

FIG. 52 is a schematic illustration of the cooking apparatus of FIG. 51 in a wide orientation in accordance with an embodiment;

FIGS. 61A and 61B are a schematic illustrations of a cooking apparatus having one or more vertical heating elements, and that is rotatable from a tall orientation (61A) to a wide orientation (61B);

FIG. 95 is a perspective view of a cooking apparatus having a cooking chamber door open and a wire rack removed, in accordance with another embodiment;

FIG. 96 is a perspective view of the cooking apparatus of FIG. 95 having the cooking chamber door open, and the wire rack and two cooking chamber panels removed;

FIG. 104 is a schematic illustration of a heat storage member connected to a domestic appliance, in accordance with an embodiment;

FIG. 105 is a schematic illustration of a heat storage member disconnected from a domestic appliance, in accordance with an embodiment;

FIG. 106 is a perspective view of a heat storage member connected to a cooking apparatus; and FIG. 107 is a cross-sectional view taken along line 107-107 in FIG. 106.

DESCRIPTION OF VARIOUS EMBODIMENTS

Figure 1:
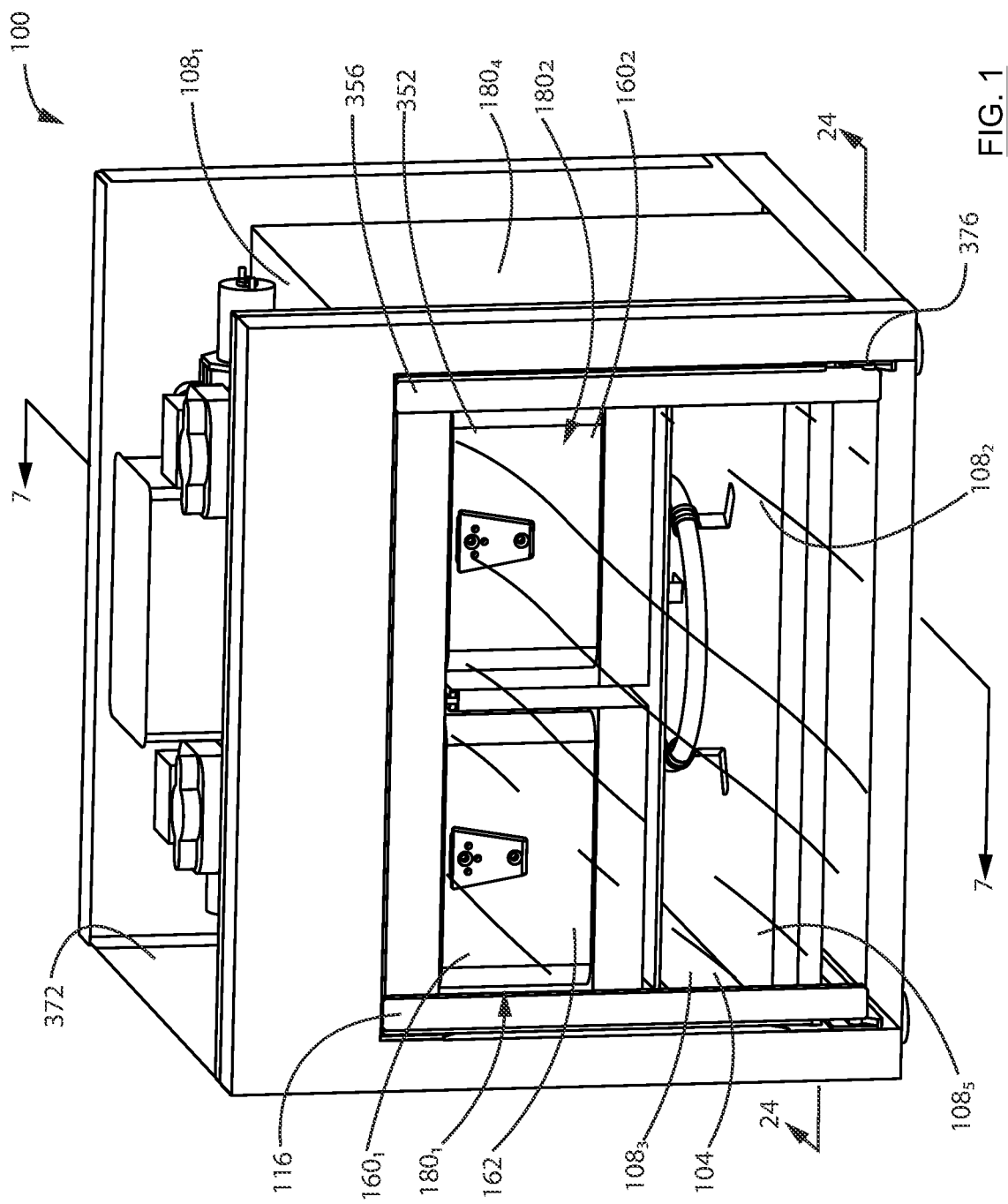
FIG. 1 is a perspective view of a cooking apparatus in accordance with an embodiment.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, I²C, Bluetooth™, or IEEE™ 802.11).

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. 112a, or 112₁). Multiple elements herein may be identified by part numbers that share a base number in common and that differ by their suffixes (e.g. 112₁, 112₂, and 112₃). All elements with a common base number may be referred to collectively or generically using the base number without a suffix (e.g. 112).

General Description of a Cooking Apparatus

Figure 2:
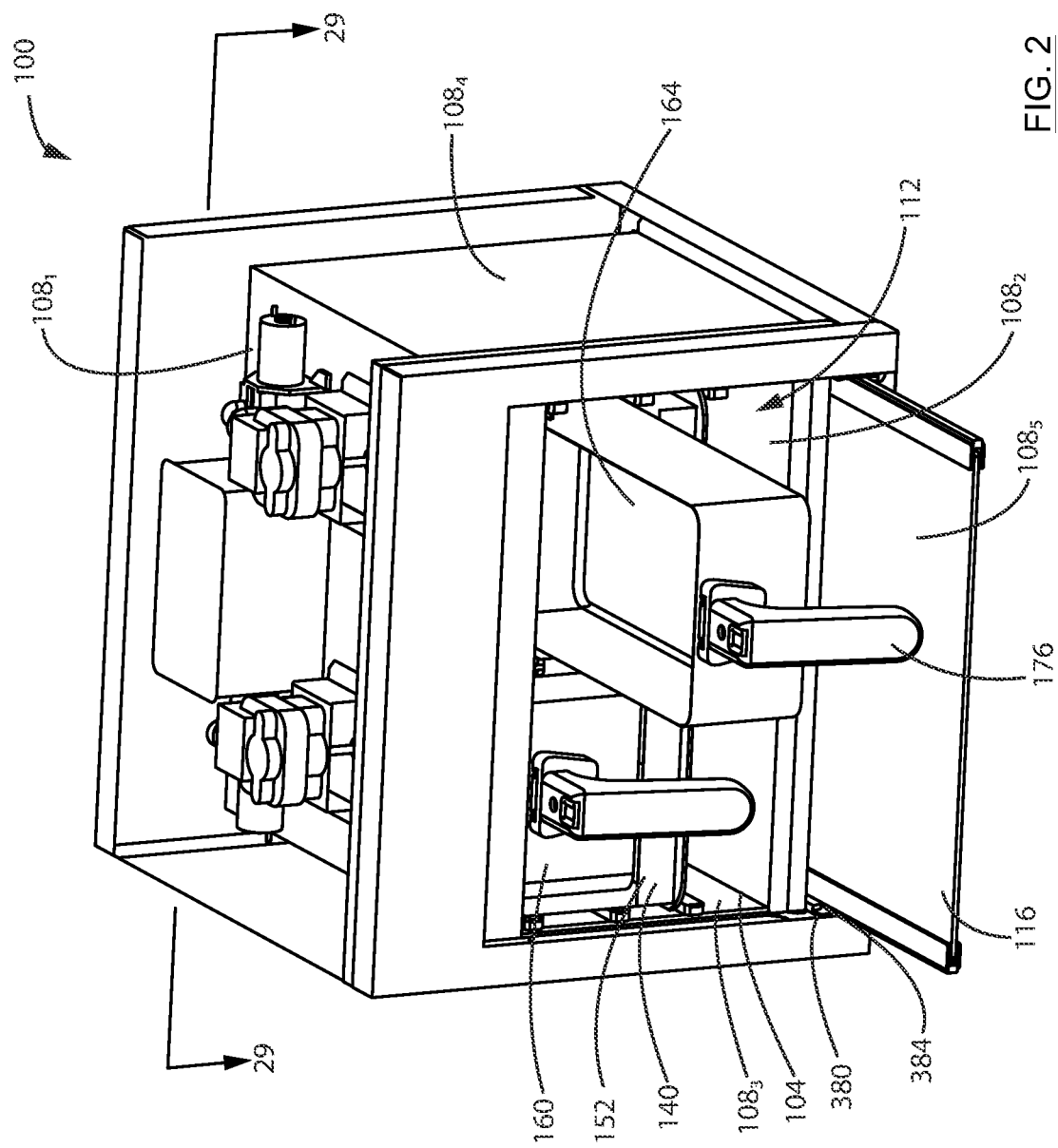
FIG. 2 is a perspective view of the cooking apparatus of FIG. 1 with a door in an open and extended position.
Figure 3:
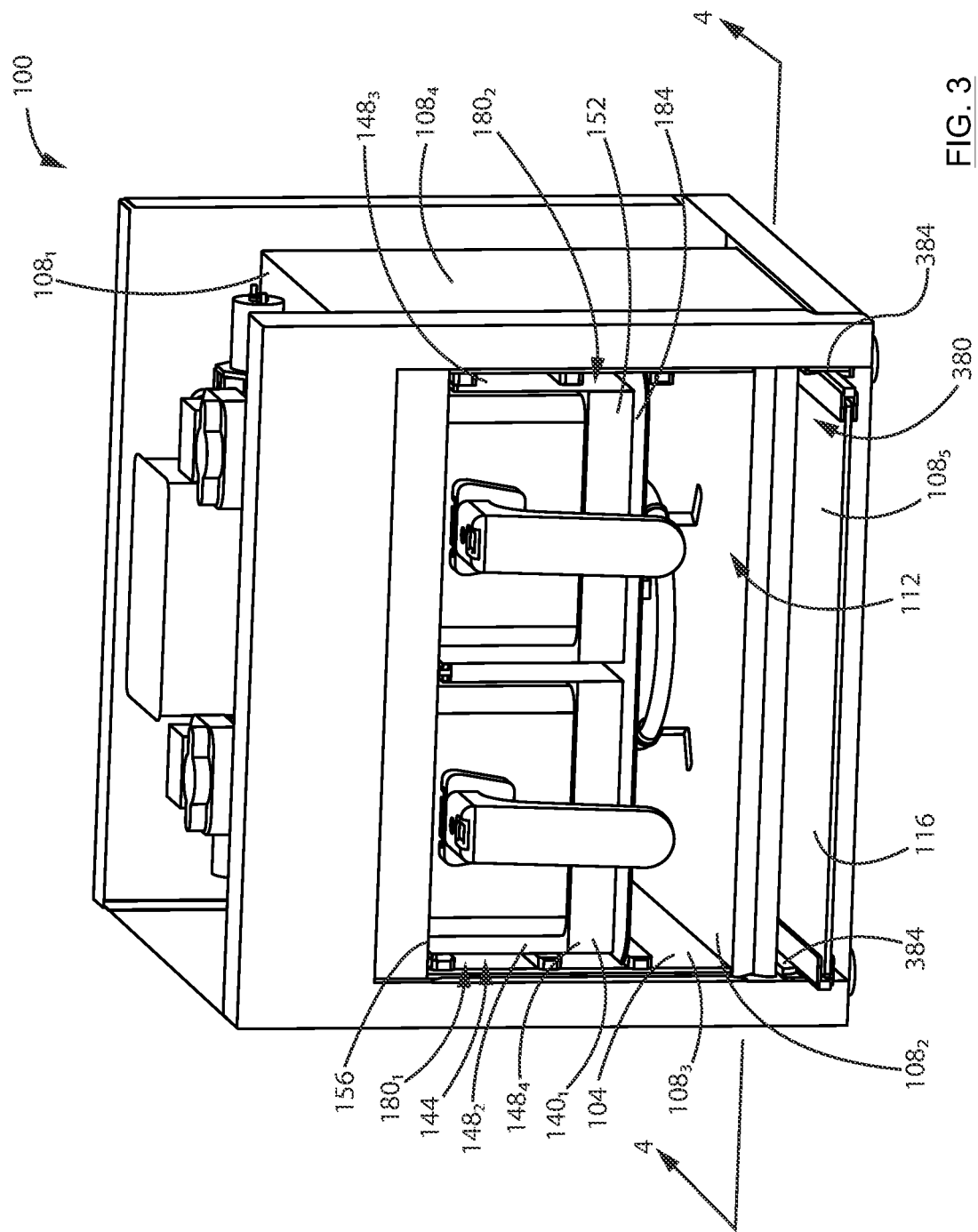
FIG. 3 is a perspective view of the cooking apparatus of FIG. 1 with the door in an open and retracted position.

FIGS. 1-3 exemplify a cooking apparatus 100 in accordance with an embodiment. As shown, cooking apparatus 100 includes a chamber 104 having sidewalls 108 that collectively define a contiguous interior volume 112. Chamber sidewalls 108 may include an openable wall 116 (also referred to as a door 116). Chamber door 116 is openable to provide user access to insert food into cooking chamber 104 and to remove food from cooking chamber 104. FIG. 1 shows chamber door 116 in a closed position to retain heat within cooking chamber 104. FIGS. 2 and 3 show chamber door 116 in open positions.

Figure 4:
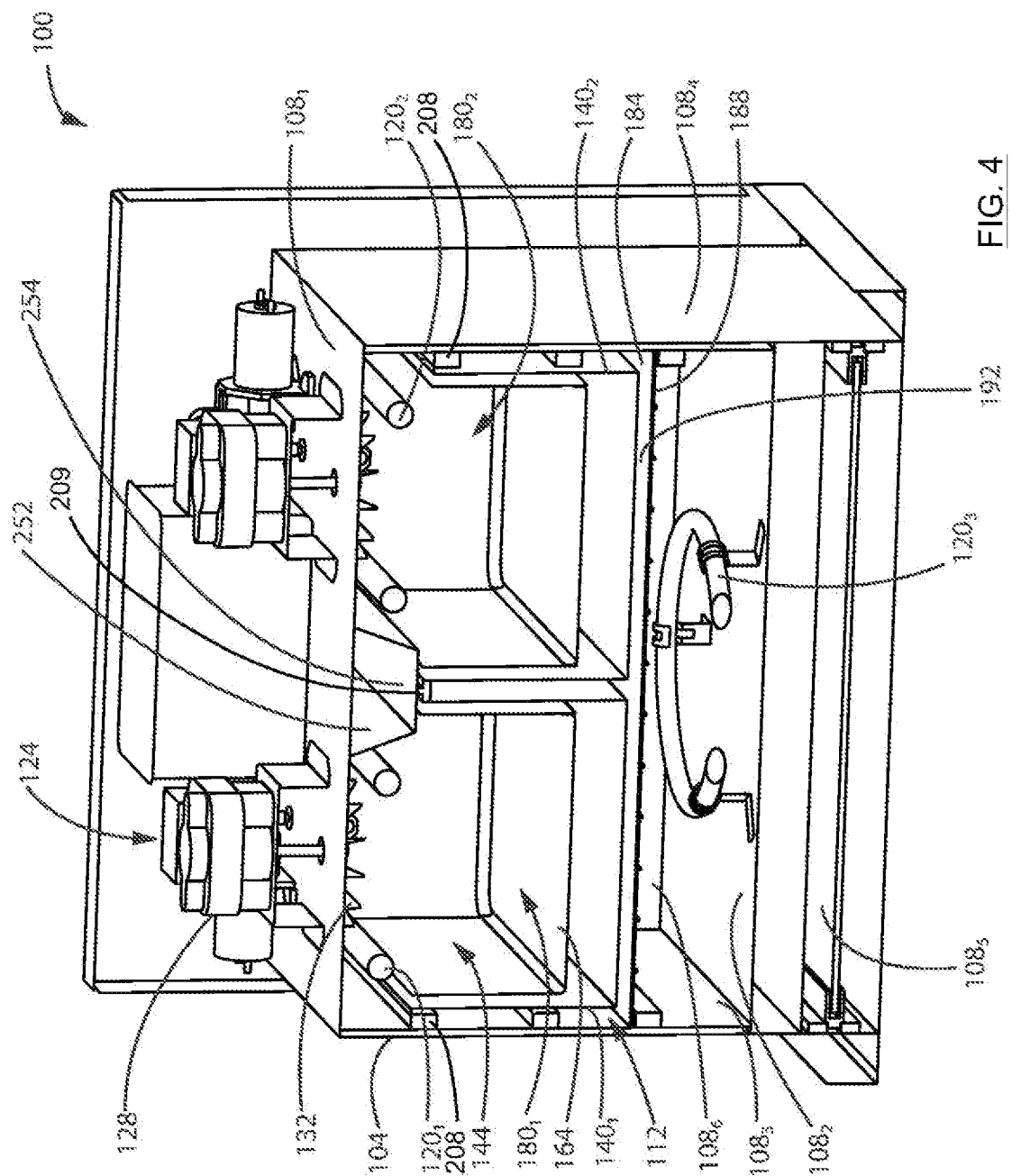
FIGS. 4-5 are cross-sectional views taken along line 4-4 in FIG. 3.
Figure 5:
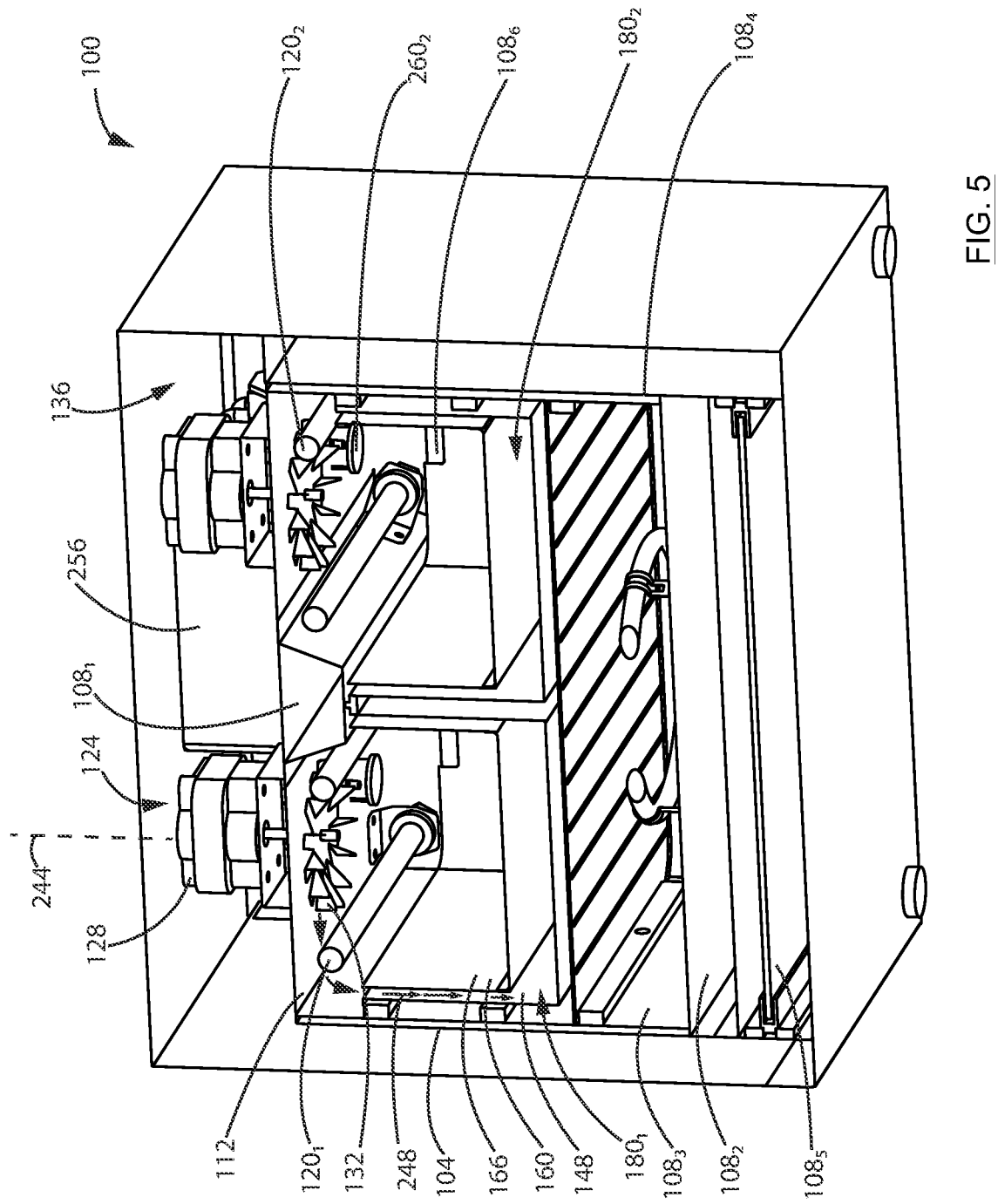

Turning to FIGS. 4-5, chamber 104 can have any configuration suitable for receiving and holding food for cooking. In some embodiments, chamber 104 may be substantially parallelepiped. For example, chamber 104 may be substantially cuboid. This may provide a compact configuration that promotes space efficiency when organized with other similarly shaped appliances, e.g. on a kitchen countertop. In the illustrated example, chamber sidewalls 108 include top and bottom walls $108_1$ and $108_2$, left and right walls $108_3$ and $108_4$, and front and rear walls $108_5$ and $108_6$, which are collectively joined together. Front wall $108_5$ is shown including cooking chamber door 116. In other embodiment, another sidewall 108, such as left wall $108_3$, right wall $108_4$, or top wall $108_1$ may include chamber door 116 or another chamber door to provide access to insert and remove food from chamber interior volume 112 in other directions.

In other embodiments, cooking chamber 104 may have a different configuration of chamber sidewalls 108. For example, cooking chamber 104 may be cylindrical, domed (e.g. semi-spherical), or another regular or irregular shape.

Still referring to FIGS. 4-5, cooking chamber 104 may include any number (i.e. one or a plurality) of heating elements 120 to provide heat to food contained within chamber interior volume 112. Heating elements 120 may be of any type suitable for delivering heat to food. For example, heating elements 120 may include any one or more (or all) of resistive heating elements (i.e. that produce heat through electrical resistance), flame heating elements (i.e. that produce heat by burning fuel, such as natural gas, propane, or butane for example), and infrared heating elements (e.g. including quartz, calrod, or nichrome wire). Heating elements 120 may include a ceramic or mica board insulating support. One or more (or all) of heating elements 120 may extend within chamber interior volume 112 as shown (i.e. may be positioned wholly or partially within chamber interior volume 112), or may be positioned wholly outside of chamber interior volume 112.

When activated (e.g. powered or fueled), heating element(s) 120 may be collectively capable of heating food and/or the air within cooking chamber 104 to at least common food cooking temperatures (e.g. to at least 200° F., such as 200° F. to 800° F.). Temperatures at the lower end of this range (e.g. 200° F.-350° F.) may be suitable for defrosting frozen foods and for slow-cooking techniques that produce tender meats and the like. Temperatures at the higher end of this range (e.g. 350° F.-800° F.) may be suitable for searing foods and fast-cooking techniques that produce crispy pizza crusts and the like.

Cooking apparatus 100 may provide forced convection functionality. When enabled, forced convection employs an air mover to move the air within cooking chamber 104 to disrupt (e.g. displace) the layer of cool gas that forms around exposed surfaces of food under natural convection conditions. Consequently, forced convection may allow food to cook faster and with greater energy efficiency (e.g. consume less electricity and/or fuel usage), all else being equal. Cooking apparatus 100 may include any number (e.g. one or a plurality of) air movers 124. Cooking apparatus 100 may include any air movers 124 suitable for circulating air within chamber interior volume 112 and promoting forced convective heat transfer. For example, air movers 124 may include a motor 128 that drives an air impeller 132 (e.g. a radial flow, mixed flow, or axial flow impeller). When rotated, the air impeller 132 accelerates air within or into chamber interior volume 112. Air impellers 132 may be located within chamber interior volume 112 as shown (e.g. to circulate air within chamber interior volume 112), or may be located outside of chamber interior volume 112 (e.g. within a conduit fluidly connected to chamber interior volume 112) to recirculate air that exits chamber interior volume 112 back into chamber interior volume 112.

In some embodiments, cooking apparatus 100 may permit the forced convection function to be selectively user-activated and user-deactivated. This can allow the user to activate forced convection (e.g. to cook food faster and more energy efficiently), and to deactivate forced convection (e.g. to follow the time and temperature directed by a recipe, which was not intended for forced convection). When forced convection is activated, air mover(s) 124 may be powered on, and when forced convection is deactivated, air mover(s) 124 may be powered off.

In other embodiments, cooking apparatus 100 may not provide forced convection functionality. For example, cooking apparatus 100 may not include an air mover 124 associated with chamber interior volume 112. This may simplify the design of cooking apparatus 100, which may reduce the cost and complexity of manufacturing cooking apparatus 100.

Referring to FIG. 5, cooking apparatus 100 may provide steam generating functionality. For example, cooking apparatus 100 may produce steam within cooking chamber 104 or deliver steam into cooking chamber 104. When air is heated, such as occurs in cooking chamber 104, the moisture capacity of the air rises, which causes the relative humidity to fall. As the relative humidity falls, the rate at which moisture is removed from food into the surrounding air accelerates. Thus, higher air temperatures can lead to food drying out more rapidly. For many foods, such as meats for example, drying is often an undesirable byproduct of cooking that users wish to avoid. By providing steam to cooking chamber 104, cooking apparatus 100 may raise the air humidity within cooking chamber 104 and thereby slow, stop, or reverse the dehumidification (i.e. drying out) of the food being cooked.

Cooking apparatus 100 may include any number (e.g. one or a plurality of) steam generators 136. Cooking apparatus 100 may include any steam generator 136 suitable for producing high humidity air to interact with food cooking within chamber interior volume 112. Steam generator 136 may generate steam within chamber interior volume 112 as shown. Alternatively, steam generator 136 may generate steam outside of chamber interior volume 112, and the generated steam may be directed (e.g. by natural or forced flow) into chamber interior volume 112.

In some embodiments, cooking apparatus 100 may permit the steam generation function (also referred to as the 'humidification function') to be selectively user-activated and user-deactivated. This can allow the user to activate steam generation (e.g. to prevent foods from drying during cooking), and to deactivate steam generation (e.g. to allow foods, such as French fries and chicken wings, to crisp).

In other embodiments, cooking apparatus 100 may not include a steam generator 136. This may simplify the design of cooking apparatus 100, which may reduce the cost and complexity of manufacturing cooking apparatus 100.

Cooking Containers

Figure 6:
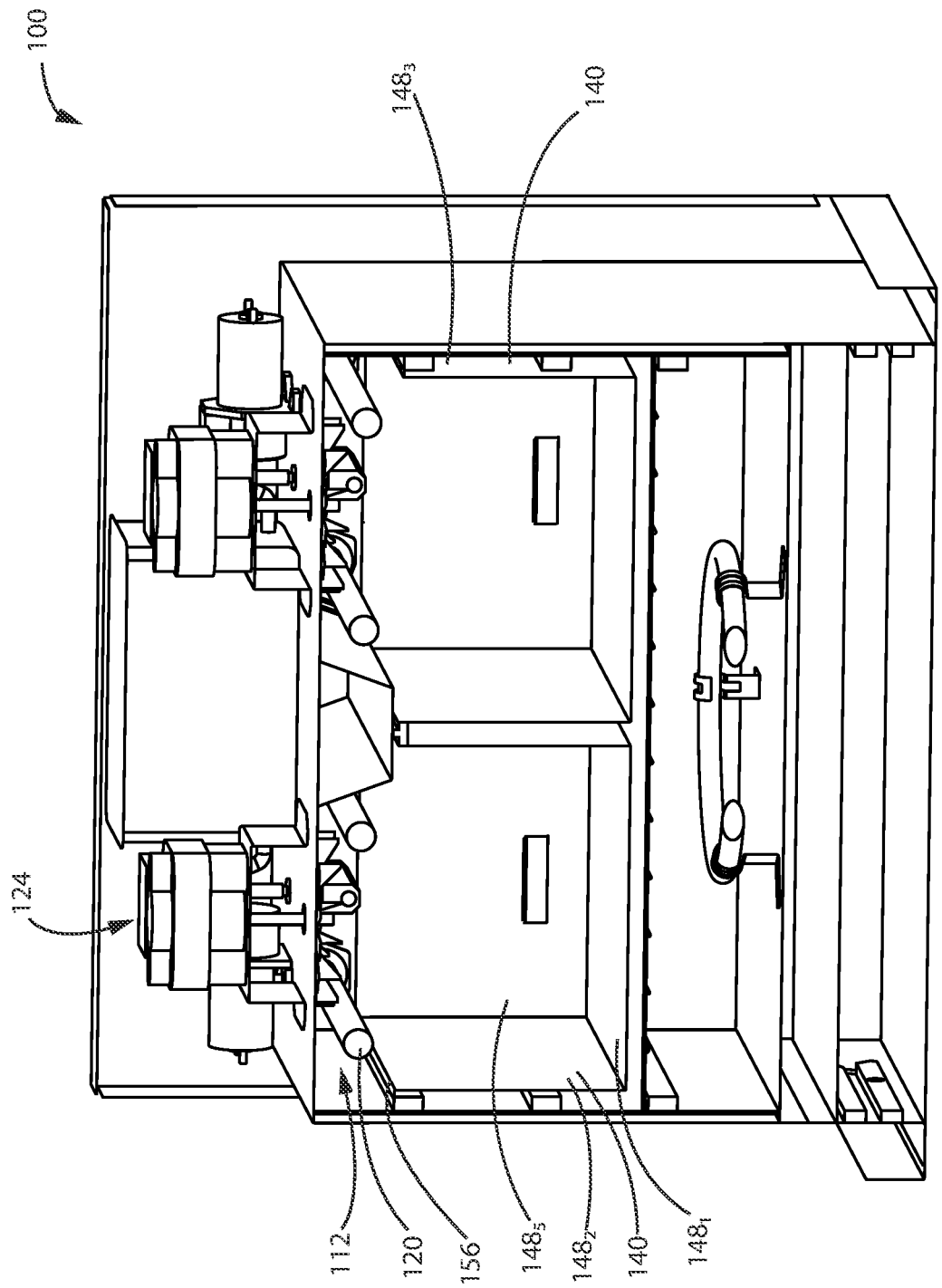
FIG. 6 is the cross-sectional view of FIG. 4, with cooking vessels removed.

Turning to FIG. 6, cooking apparatus 100 may include any number (e.g. one or a plurality) of cooking receptacles 140 that may be removably receivable in a cooking apparatus, each of which may removably receive a cooking vessel 160.

The features in this section may be used by themselves in any cooking apparatus or in any combination or sub-combination with any other feature or features described herein. For example, the feature of the cooking receptacle and the cooking vessel described herein may be used with any of the features of multiple cooking zones, subdividable cooking zones, forced convection, steam generation, dynamic energy utilization, heating element power modes, door transparency, removable handle, retractable door, removable handle, retractable door, lights, self-cleaning, cooking additive distribution, insulation and air cooling, heating ducts, common motor drive, smoke and/or odor control, reorientation and expansion, vertical cooking, toaster, heat storage members, and other features described herein.

Cooking apparatus 100 may include any cooking receptacle 140 sized fit in (e.g., be removably receivable in) chamber interior volume 112 and suitable for holding food that is cooking within chamber interior volume 112. As shown, cooking receptacles 140 may be cooking containers having sidewalls 148 that define an interior volume 144 for holding food. In some embodiments, a receptacle 140 may be substantially parallelepiped. For example, receptacle 140 may be substantially cuboid as shown. In the illustrated example, receptacle 140 includes bottom walls $148_1$, left and right walls $148_2$ and $148_3$, and front and rear walls $148_4$ (FIG. 3) and $148_5$ which are collectively joined together.

Referring to FIG. 3, one or more sides of receptacle 140 may be partially or completely open to accommodate the insertion and removal of food, and/or the passage of heat to food contained in the receptacle 140. In the illustrated embodiment, receptacle 140 includes an at least partially open side 152 that is aligned with openable chamber sidewall 108 to accommodate the passage of food (i.e. insertion of food) into cooking receptacle interior volume 144. Referring to FIG. 6, food may be placed directly into cooking receptacle 140. For example, food may rest on, and in contact with cooking receptacle bottom wall $148_1$.

Returning to FIG. 3, in some embodiments cooking receptacle may include a front wall $148_4$ that may inhibit food, including liquids (e.g. oil, sauces, rendered fat, expelled liquid, or other drippings), from spilling out of the open front end 152. As shown, front wall $148_4$ may be shorter than left and right walls $148_2$ and $148_3$ to allow food to be inserted into cooking receptacle interior volume 144 through the vertical space between front wall $148_4$ and cooking receptacle upper side 156. As shown in FIG. 6, cooking receptacle 140 may have an open side 156 that is aligned with heating elements 120 and/or air mover 124 so that heat and/or convective air can pass through the open side 156 into contact with food contained within cooking receptacle 140. In the illustrated example, open side 156 is an upper side of receptacle 140 and both heating elements 120 and air mover 124 are positioned above cooking receptacle 140. In other embodiments, open side 156 may be a different side of cooking receptacle 140, such as for example, left, right, or rear side $148_2$, $148_3$, $148_4$.

In other embodiments, cooking receptacle 140 does not include front wall $148_4$. This may enlarge the opening in front side 152, which may allow taller food to be inserted into cooking receptacle 140 through front side 152, all else being equal.

Turning to FIGS. 2 and 4, alternatively or in addition to supporting food directly on surfaces of cooking receptacle 140, food may be held within cooking receptacle 140 in or on a cooking vessel 160. Cooking vessel 160 may be any vessel sized to fit within cooking receptacle interior volume 144, and suitable for carrying food during cooking. For example, cooking vessel 160 may be a cooking container such as a pan as shown, a pot, or a fryer basket, or a cooking sheet such as a baking sheet or a wire rack.

It is desirable when cooking some foods (e.g. French fries and chicken wings) to obtain a crispy exterior when cooked. However, some such foods expel liquids as they cook, and if the liquid is allowed to pool in contact with the food, the liquid will inhibit a crispy crust (e.g. will make the contacted food surfaces soggy). In some embodiments, cooking vessel 160 may be supported in cooking receptacle 140 with at least a portion (or all) of the cooking vessel bottom wall 164 spaced apart from cooking receptacle bottom wall $148_1$, and cooking vessel bottom wall 164 may be liquid pervious. This can allow expelled liquids to pass through bottom wall 164 and collect in cooking receptacle 140 out of contact with the remainder of the food in cooking vessel 160. This can promote better and faster crisping of food exteriors that might have otherwise been softened by contact with the expelled liquids.

Cooking vessel bottom wall 164 may have any liquid pervious construction suitable to allow passage of liquids expelled from foods to exit cooking vessel 160. For example, cooking vessel bottom wall 164 may have a plurality of apertures (e.g. perforated apertures as in a pizza pan, or voids between wires as in a cooling rack or fryer basket), or may be made of liquid pervious material (e.g. liquid pervious paper, cloth, mesh, or other fabric).

Figure 7:
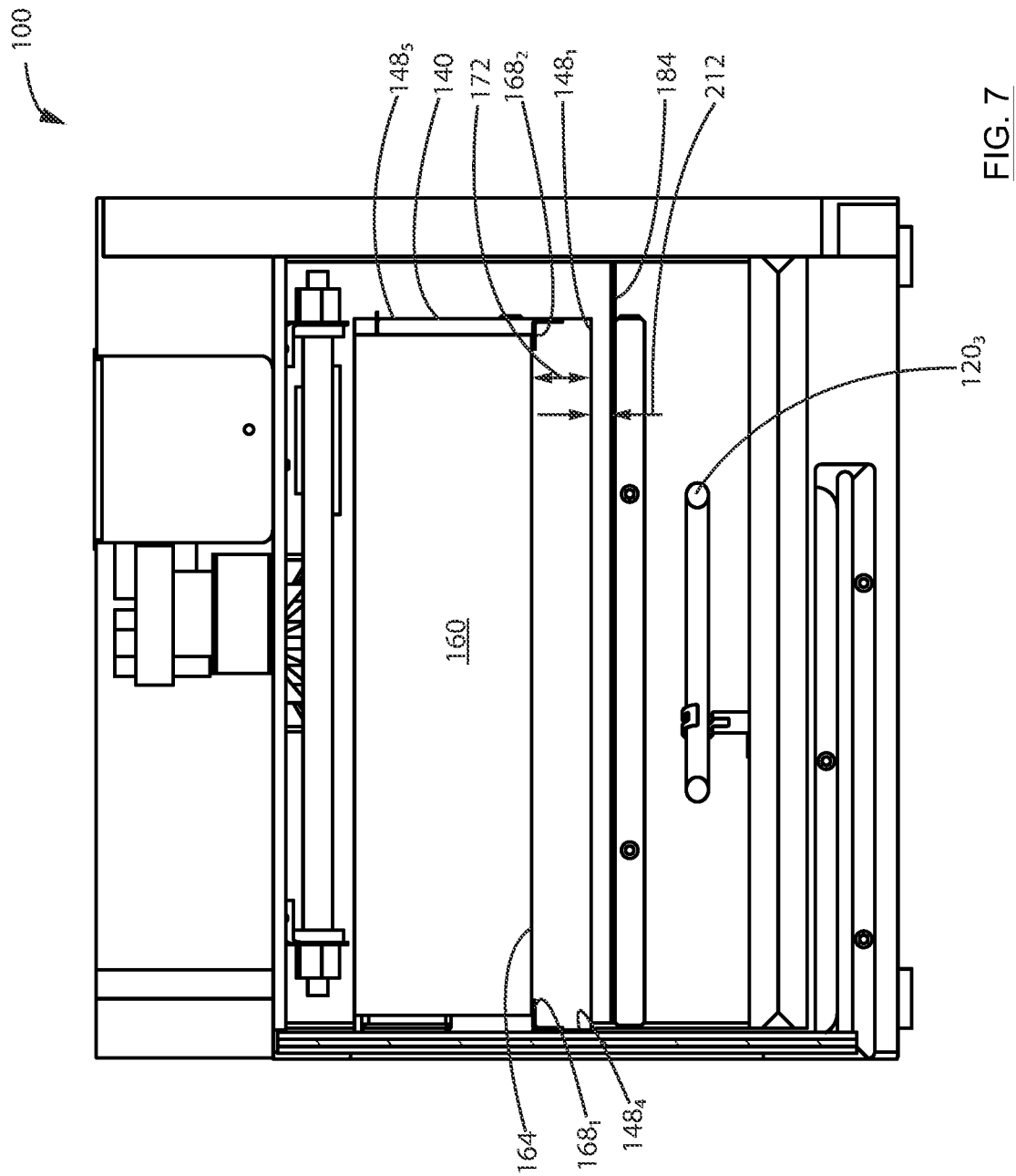
FIG. 7 is a cross-sectional view taken along line 7-7 in FIG. 1.
Figure 8:
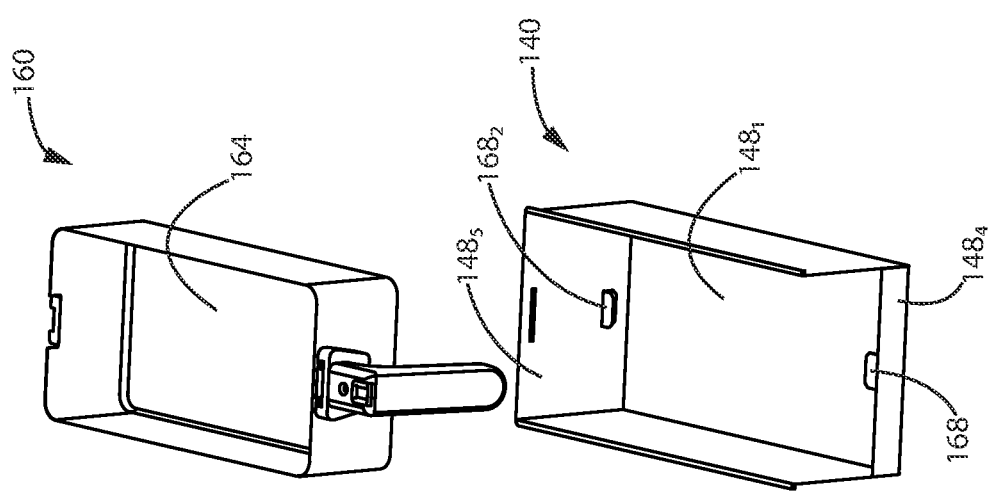
FIG. 8 is a perspective view of a cooking vessel removed from a cooking receptacle in accordance with an embodiment.

Referring to FIGS. 7 and 8, cooking vessel 160 may be supported in cooking receptacle 140 in any manner that spaces at least a portion (or all) of cooking vessel bottom wall 164 from cooking receptacle bottom wall $148_1$. For example, cooking receptacle 140 may have one or more supports 168 as shown, and/or cooking vessel 160 may have one or more legs (not shown) that can hold cooking vessel bottom wall 164 spaced above cooking receptacle bottom wall $148_1$. In the illustrated example, cooking receptacle 140 includes a plurality of spaced apart supports 168 upon which cooking vessel 160 is supported when received in cooking receptacle 140. As shown, cooking receptacle 140 includes a front support $168_1$ connected to cooking receptacle front wall $148_4$, and a rear support $168_2$ connected to cooking receptacle rear wall $148_5$. Alternately, or in addition, some or all of the sidewalls of the cooking vessel may be spaced from the sidewalls of the cooking receptacle 140. For example, if the sidewalls of the cooking vessel 160 are pervious to airflow (e.g., they are made of a wire or mesh material), then spacing the sidewalls of the cooking vessel 160 from the sidewalls of the cooking receptacle 140 may permit airflow through the sides of the cooking vessel. This may be desirable if cooking, e.g., French fries of chick wings. Optionally, if the cooking vessel 160 is a basket, then the sides and the bottom may be spaced from cooking receptacle 140 when placed therein.

Turning to FIG. 7, cooking vessel bottom wall 164 may be supported at any height 172 above cooking receptacle bottom wall $148_1$ suitable for providing a collection space (i.e. a collection volume) for an accumulation of liquids from the food as it cooks. Preferably, height 172 is at least 5 mm, such as 5 mm to 30 mm, to provide adequate volume for liquids to pool between bottom walls $148_1$ and 164. A relatively small height 172 (e.g. 5 mm to 15 mm) may allow cooking receptacle 140 to hold a relatively tall cooking vessel 160. A relatively tall height 172 (e.g. 15 mm to 30 mm) may allow cooking receptacle 140 to collect a relatively large volume of liquids.

In some embodiments, cooking vessel 160 may be receivable in cooking receptacle 140 with bottom walls $148_1$ and 164 in flush contact. This can allow for efficient conductive heat transfer from cooking receptacle bottom $148_1$ to cooking vessel bottom wall 164. An advantage of this design is that it can promote desirable browning of food surfaces in contact with cooking vessel bottom wall 164. In many foods, browning results from a Maillard reaction, which also produces desirable flavors and aromas.

In some embodiments, cooking vessel 160 may have a liquid impervious bottom wall 164. This can allow the food to be partially submerged in fluid within cooking vessel 160 (e.g. for braising), or to be fully submerged in fluid (e.g. for stewing). A fluid impervious bottom wall 164 may also allow for different food to be cooked in cooking receptacle 140 between bottom walls $148_1$ and 164 in isolation from the food in cooking vessel 160. For example, meat may cook within cooking vessel 160 while vegetables may cook within cooking receptacle 140 below cooking vessel 160.

Cooking apparatus 100 may include or be compatible with both cooking vessels 160 with liquid impervious and liquid pervious bottom walls 164. For example, cooking apparatus 100 may include, or there may be available as an accessory, a plurality of cooking vessels 160 of differing configurations (e.g. shapes, sizes, and construction), including at least one cooking vessel 160 having a liquid impervious bottom wall 164 and at least one cooking vessel 160 having a liquid pervious bottom wall 164. This can allow cooking apparatus 100 to cook foods in very different ways according to the cooking vessel 160 selected to carry the food being cooked.

Turning to FIG. 2, cooking vessel 160 may be removable from cooking receptacle 140. For example, cooking vessel 160 may be conveniently removed prior to cooking to deposit food into cooking vessel 160 for cooking, may be replaced to cook the deposited food, and may be removed after cooking to empty/serve the cooked food. Removing cooking vessel 160 may also make cleaning cooking vessel 160 and cooking receptacle 140 more convenient.

Cooking vessel 160 may be removable from cooking receptacle 140 in any manner. In the illustrated embodiment, cooking vessel 160 is movable (e.g. slidable) relative to cooking receptacle 140 through cooking receptacle open side 152 and cooking chamber door 116 for removal from cooking chamber 104. As shown, cooking vessel 160 may include a handle 176 that a user can grasp to safely handle cooking vessel 160 when removing and replacing cooking vessel 160.

Multiple Cooking Zones

Reference is now made to FIG. 4. In some embodiments, cooking chamber 104 may include a plurality of cooking zones 180. As used herein, each "cooking zone" is a distinct volumetric region within cooking chamber 104 that can be selectively subjected to different cooking conditions from the other cooking zone(s), such as heating conditions (e.g. set temperature, heating rate, and/or heating direction), convection conditions (e.g. air circulation speed, and/or air circulation direction), and humidity conditions (e.g. set relative humidity, and/or humidification rate) for example. An advantage of this design is that it can allow food located in different cooking zones to be simultaneously cooked in different cooking conditions.

The features in this section may be used by themselves in any cooking apparatus or in any combination or sub-combination with any other feature or features described herein. For example, the feature of multiple cooking zones described herein may be used with any of the features of the cooking receptacle and the cooking vessel, subdividable cooking zones, forced convection, steam generation, dynamic energy utilization, heating element power modes, door transparency, removable handle, retractable door, self-cleaning, cooking additive distribution, insulation and air cooling, heating ducts, common motor drive, smoke and/or odor control, reorientation and expansion, vertical cooking, toaster, heat storage members, and other features described herein.

The cooking conditions of each cooking zone 180 may be varied (i.e. controlled) substantially independently of the other cooking zones 180 in any manner, such as by operation of one or more electronic or electromechanical cooking devices (e.g. heating elements 120, air movers 124, and/or steam generators 136). As used herein, a cooking condition (e.g. temperature) of a first cooking zone $180_1$ is said to be varied (i.e. controlled) "substantially independently" of the same cooking condition (e.g. temperature) in a second cooking zone $180_2$, where the action taken to affect the change in cooking condition (e.g. power heating element(s) 120) predominantly affects the cooking condition in the first cooking zone $180_1$ (e.g. most of the generated heat goes to first cooking zone $180_1$), or where the action taken or other actions taken (e.g. disabling heating element(s) associated with second cooking zone $180_2$) lessen the change in cooking condition of the second cooking zone $180_2$. In other words, cooking apparatus 100 has one or more electronic or electromechanical devices that can be coordinated to provide individually controllable cooking conditions in two or more cooking zones 180.

Referring to FIGS. 4-5, each cooking zone 180 may be defined by a cooking receptacle 140 or a cooking vessel 160. Cooking apparatus 100 may include any number of cooking receptacles 140 and/or cooking vessels 160 to provide any number of cooking zones 180. In the illustrated embodiment, cooking apparatus 100 includes two cooking receptacles 140 simultaneously positioned within cooking chamber 104. As shown, cooking chamber 104 defines a single contiguous volume while cooking receptacle $140_1$ defines first cooking zone $180_1$, and second cooking receptacle $140_2$ defines second cooking zone $180_2$ within the cooking chamber 14. When a cooking vessel 160 is positioned in a cooking receptacle 140, the cooking vessel 160 may be located in the cooking zone 180 defined by the cooking receptacle 140, or the cooking vessel 160 may define the cooking zone 180.

Turning to FIG. 5, each cooking zone 180 may have associated with it one or more distinct cooking devices (e.g. heating elements 120, air movers 124, and/or steam generators 136). This allows the cooking conditions in each zone to be substantially independently controlled. Each cooking zone 180 may have the same or different cooking devices. In the illustrated embodiment, each cooking zone 180 has above it a respective heating element 120, air mover 124, and steam generator 136. Within each cooking zone 180, these cooking devices may be selectively activated and deactivated according to a cooking program (e.g. set temperature, humidity, convection speed) independently of the cooking devices in the other cooking zone 180.

Still referring to FIG. 5, activating a cooking device (e.g. heating element 120) associated with one cooking zone 180 may impact cooking conditions (e.g. temperature) in another cooking zone 180. For example, imperfect thermal isolation may allow some heat from a heating element $120_1$ in first cooking zone $180_1$ to transmit into second cooking zone $180_2$. Moreover, first cooking zone $180_1$ may be in fluid communication with second cooking zone $180_2$ (e.g., the sidewalls of the cooking receptacles 140 may terminate before the top wall of the cooking volume 104) such that there is some gas (e.g. air) exchange between the cooking zones $180_1$, $180_2$. However, cooking apparatus 100 may mitigate the impact of such effects by operation of cooking devices associated with the second cooking zone $180_2$. For example, heating element $120_2$ may be turned down or turned off to compensate for the heat entering cooking zone $180_2$ from heating element $120_1$. This can allow the cooking zones $180_1$ and $180_2$ to maintain substantially independent cooking conditions.

The cooking device(s) associated with a cooking zone 180 may be positioned anywhere within or outside of the cooking zone 180. In the illustrated embodiment, a heating element 120, an air mover 124, and a steam generator 136 are positioned above each cooking zone 180. In other embodiments, one or more (or all) of the cooking devices may be positioned below, to one side, or inside the cooking zone 180.

Each cooking zone 180 may have the same or different cooking device(s). This can allow each cooking zone 180 to be tailored to cooking the same or different foods, in the same or different quantities, or to producing the same or different cooking conditions. For example, each cooking zone 180 may have associated with it the same or different types of cooking devices (e.g. heating, air moving, or humidifying device), and/or may have associated with it the same type of cooking device as is associated with another zone but of a different configuration (e.g. size, power, or principle of operation). FIG. 5 depicts each cooking zone 180 having associated with it cooking devices of the same types—a heating element 120, an air mover 124, and a steam generator 136. The heating elements $120_1$ and $120_2$ of the first and second cooking zones $180_1$ and $180_2$ may have the same or different configuration. For example, heating elements $120_1$ may have the same or different size, power, or principle of operation (e.g. resistive heater vs. infrared heater). Similarly, for the air movers 124 and steam generators 136.

Referring to FIG. 4, cooking apparatus 100 may include one or more cooking devices that may be associated simultaneously with two or more cooking zones 180. In the illustrated example, a heating element $120_3$ is positioned beneath cooking zones $180_1$ and $180_2$ and provides heat to both. Alternatively or in addition, cooking apparatus 100 may include an air mover 124 positioned to circulate air through a plurality of cooking zones 180, and/or a steam generator 136 positioned to humidify air within a plurality of cooking zones 180.

In some embodiments, a dividing wall 184 may be positioned between common heating element $120_3$, and cooking zones $180_1$ and $180_2$. The dividing wall 184 may help prevent liquid and/or solid food from falling down from cooking zones 180 onto heating element $120_3$ and rapidly burning and/or smoking. Dividing wall 184 may underlie at least a portion of two or more cooking zones 180 above. In the illustrated embodiment, dividing wall 184 extends over the entire area beneath cooking zones 180. Dividing wall 184 may have any structure suitable for preventing liquid and/or solid food from falling down from cooking zones 180 onto heating element $120_3$. For example, dividing wall 184 may be a continuous sheet of material (e.g. metal), a perforated sheet of material, or a wire/mesh rack.

Some heating elements 120, such as infrared and fire based heating elements $120_3$ may generate heat unevenly over the area below cooking zones $180_1$ and $180_2$, with the heat being concentrated in regions nearest the heat source. Alternatively or in addition to helping to prevent food from falling onto heating element $120_3$, dividing wall 184 may help to more evenly distribute heat emitted by common heating element $120_3$ over the area of dividing wall 184. For example, dividing wall 184 may include high conductivity material (e.g. metal, such as aluminum or copper) to distribute heat laterally across the area of dividing wall 184. Where heating element $120_3$ is an infrared heater, or generates infrared heat, dividing wall 184 may include infrared absorbent material. In this case, dividing wall 184 may be referred to as an 'IR absorber'. This can allow dividing wall 184 to absorb the infrared energy emitted by heating element $120_3$ that strikes dividing wall lower surface 188, and re-emit the energy (as infrared or other form of heat radiation) from a majority of (e.g. at least 50%) or substantially the entire (e.g. at least 85% of) dividing wall upper surface 192.

Figure 9B:
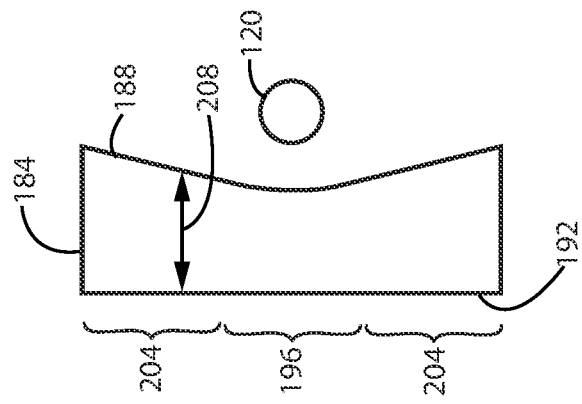
FIG. 9B is a cross-sectional view taken along line 9B-9B in FIG. 9A.
Figure 9A:
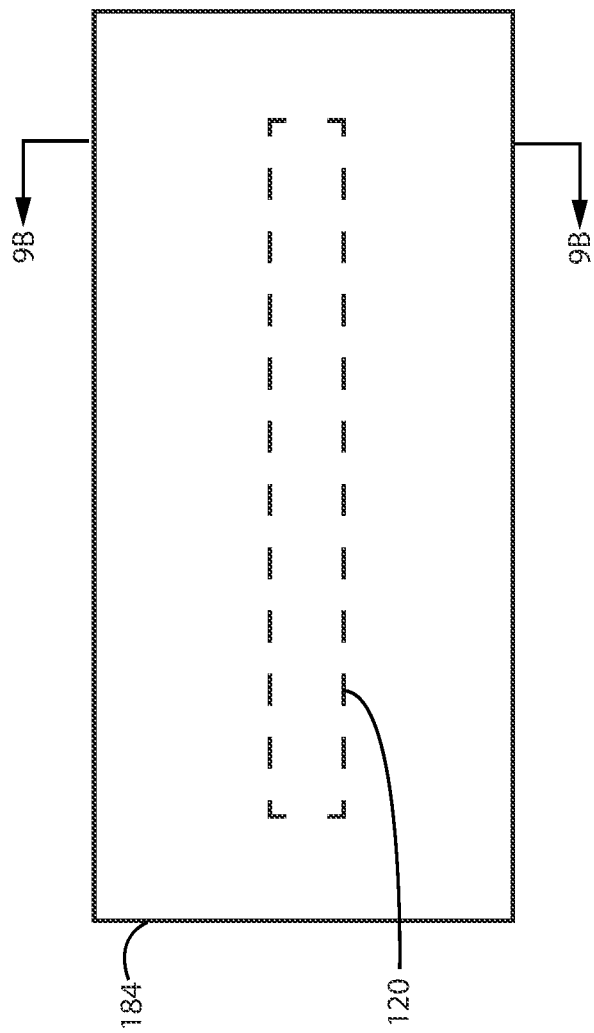
FIG. 9A is a top elevation view of an IR shield overlaying a heating element in accordance with an embodiment.

Optionally, the portions of dividing wall 184 that are immediately above (overlie) the heating element may be made of a less conductive material so as to produce a dividing wall having a more uniform temperature during operation of the cooking apparatus. Such a design is exemplified in FIGS. 9A-9B, which show an infrared absorber 184 overlaying an infrared heating element 120. Dimensions in these figures are exaggerated for illustration purposes. In this example, dividing wall 184 includes infrared absorbing material that absorbs infrared radiation from heating element 120 and re-radiates heat (infrared or otherwise) from dividing wall upper surface 192. In some embodiments, dividing wall 184 may have less infrared absorptive capacity per unit area in region(s) 196 closer to (e.g. directly overlying) heating element 120 than in region(s) 204 farther from heating element 120 (e.g. laterally spaced from heating element 120). Because the heating from infrared radiation is a function of distance (indeed, distance cubed), region 196 closest to heating element 120 may receive more radiation than a region 204 located farther from heating element 120. By providing the farther region 204 with greater infrared absorptive capacity, the infrared absorber 184 may be able to more evenly re-radiate heat across the closer and farther regions 196 and 204 of dividing wall upper surface 192.

Infrared absorber 184 may be configured to provide regions 196 and 204 with different infrared absorptive capacity per unit area in any manner suitable for providing more even heat radiation across dividing wall upper surface 192. In some embodiments, the infrared absorptive capacity per unit area may be varied by varying a thickness 208 of infrared absorber 184. The illustrated example shows infrared absorber 184 having a thickness 208 of infrared absorbent material that is greater in farther regions 204 than in closer region 196. The change in thickness 208 may be gradual as shown, or may change in step-wise fashion for example. Alternatively or in addition to varying thickness 208, infrared absorber 184 may have intermittent strips of infrared absorbent material that are more densely arranged in farther regions 204 than in closer region 196. Alternatively or in addition to varying thickness 208 and using intermittent strips of infrared absorbent material, infrared absorber 184 may include a first infrared absorbent material with lower infrared absorptivity in closer region 196, and include a second infrared absorbent material with higher infrared absorptivity in farther regions 204.

Figure 10:
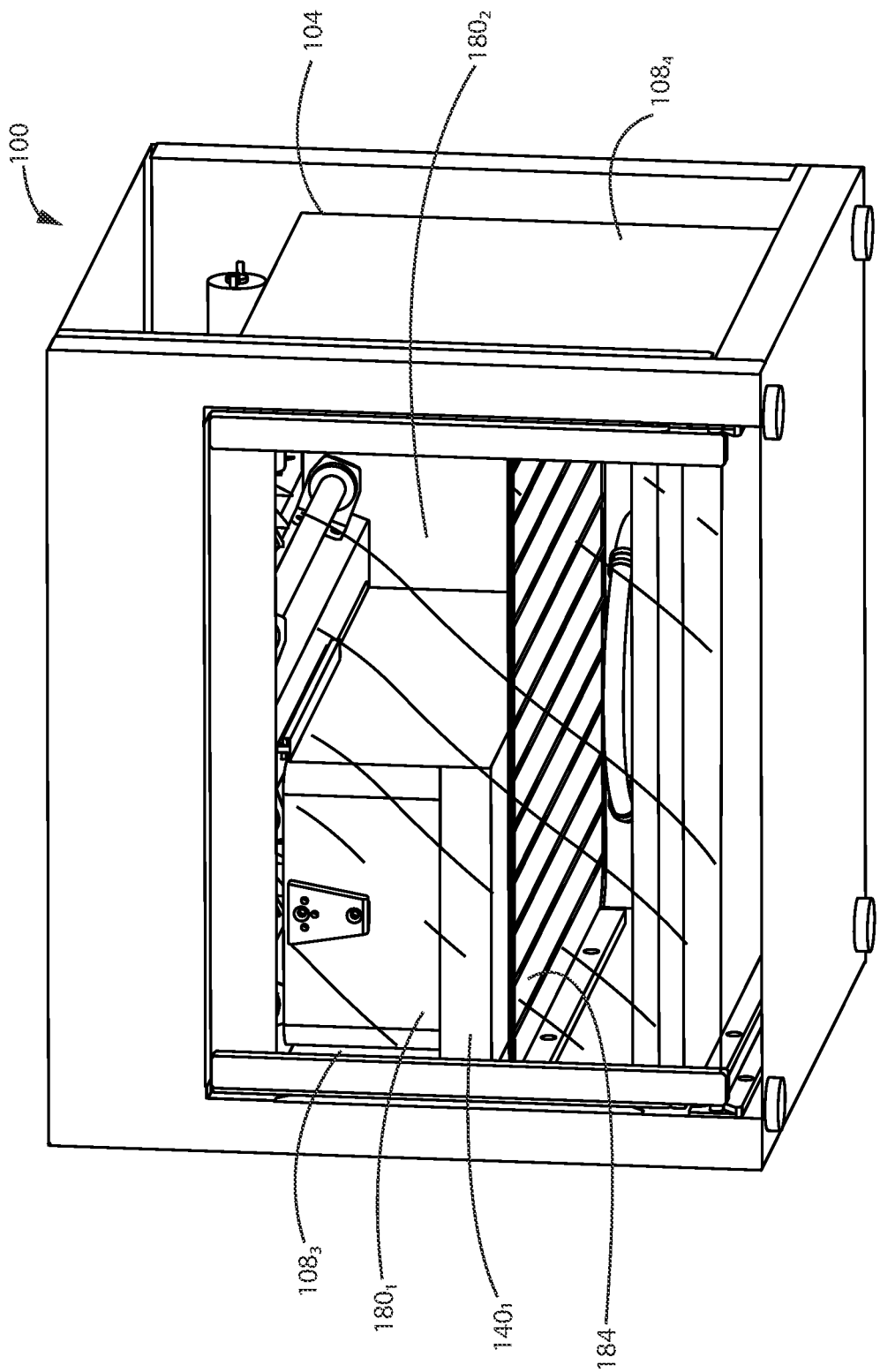
FIG. 10 is a perspective view of the cooking apparatus of FIG. 1 with a cooking vessel and cooking receptacle removed from one cooking zone.

Reference is now made to FIGS. 3 and 10. Cooking apparatus 100 may be reconfigurable to resize cooking zones 180, to divide a cooking zone 180 into two or more cooking zones 180, and/or to merge two or more cooking zones 180 into a single larger cooking zone 180. Cooking apparatus 100 may include any number of (e.g. one or multiple) cooking receptacles 140 and cooking vessels 160 (FIG. 5) simultaneously housed within cooking chamber 104. As discussed above, cooking receptacles 140 and/or cooking vessels 160 (FIG. 5) may define a cooking zone 180 when positioned in cooking chamber 104. One or more (or all) of cooking receptacles 140 and cooking vessels 160 (FIG. 5) may be removable from cooking chamber 104 to reconfigure the cooking zones 180 of cooking apparatus 100. For example, FIG. 10 illustrates a cooking apparatus 100 having one of two cooking receptacles 140 removed from cooking chamber 104. In one aspect, the cooking receptacle 140 when removed from cooking chamber 104 may be more easily cleaned (e.g. in the sink). Moreover, the removal of the cooking receptacle 140 has enlarged cooking zone $180_2$, which now extends downward to dividing wall 184. Food may be placed on dividing wall 184 (e.g. directly, or within a cooking vessel supported on dividing wall 184) to cook by itself, or alongside other food inside the remaining cooking receptacle $140_1$.

Figure 11:
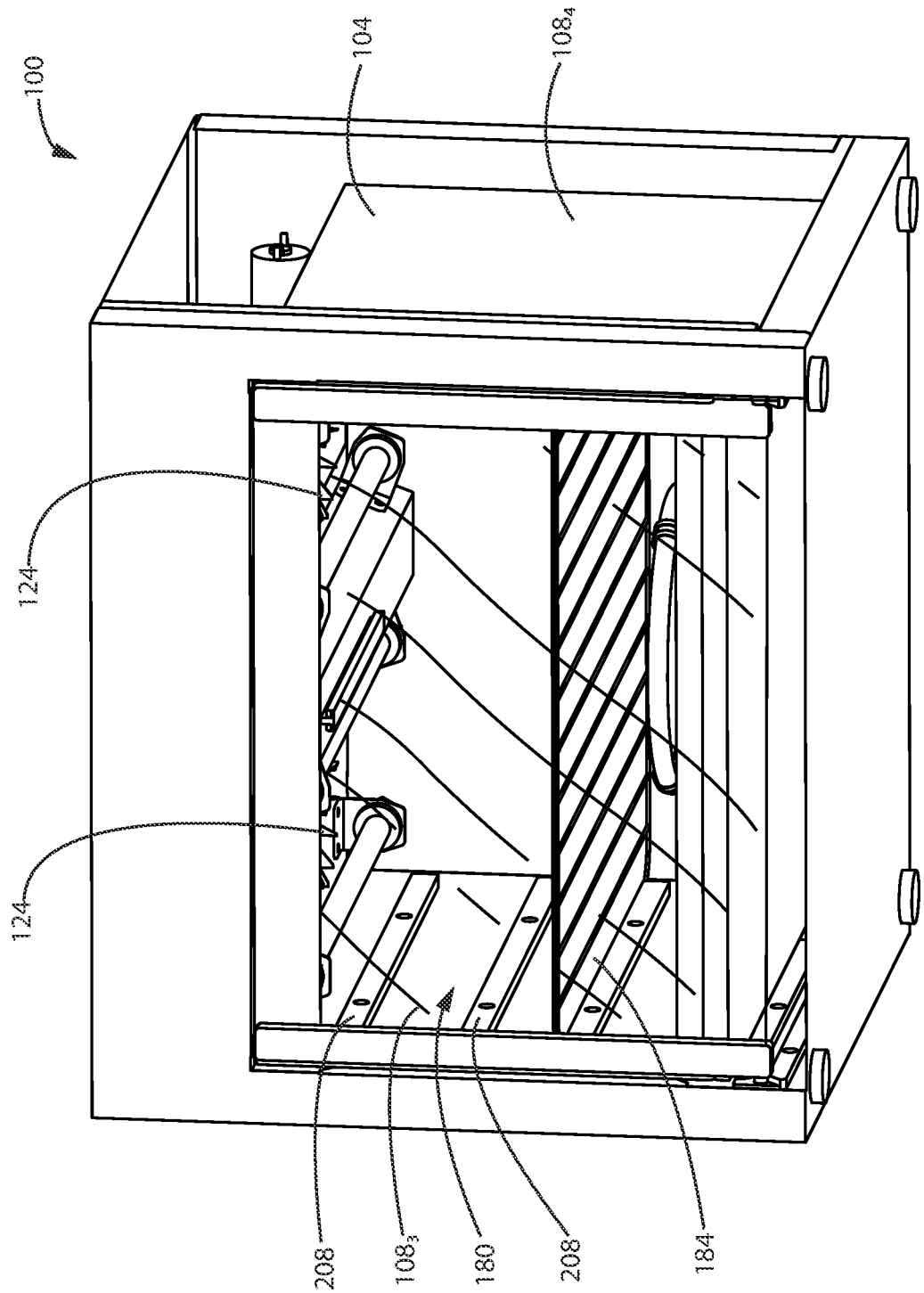
FIGS. 11-12 are perspective views of the cooking apparatus of FIG. 1 with both cooking vessels and cooking receptacles removed from both cooking zones.
Figure 12:
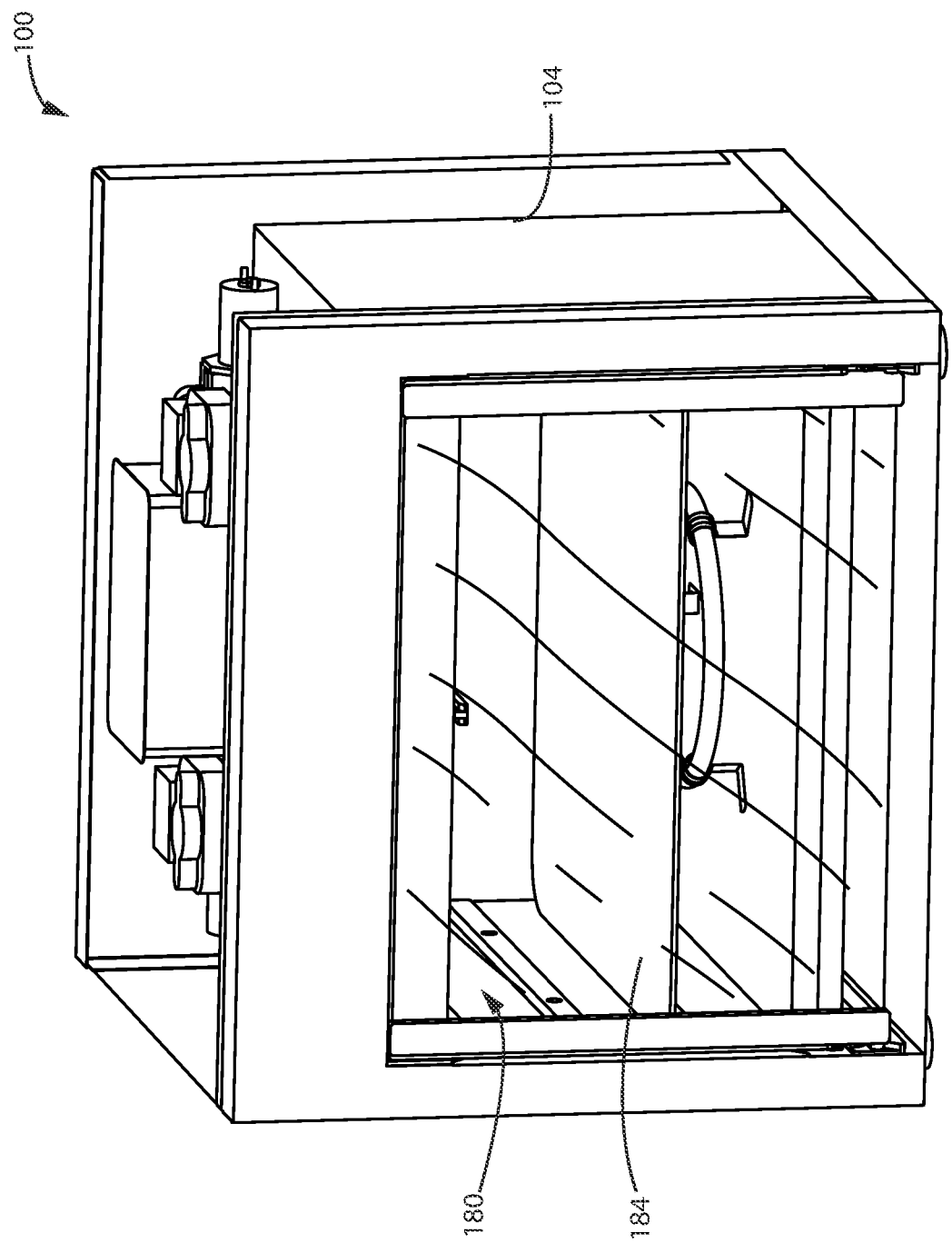

FIGS. 11-12 illustrate cooking apparatus 100 having no remaining cooking receptacles positioned in cooking chamber 104, which results in the first and second cooking zones $180_1$ and $180_2$ combining to form a unitary or contiguous cooking zone 180. The unitary cooking zone 180 may be re-divided by reinserting one or more cooking receptacles or cooking vessels. The enlarged cooking zone 180 may provide greater surface area (e.g. horizontal surface area) to cook larger items, such as a pizza, pie, or cake, which may be supported directly in contact with dividing wall 184, or within a cooking vessel (e.g. pizza pan, pie dish, or cake pan) supported on dividing wall 184.

Referring to FIGS. 10-11, cooking receptacles 140 may be removably receivable in cooking chamber 104 in any manner. For example, cooking receptacles 140 may be sat directly on (i.e. in contact with) dividing wall 184 (i.e. dividing wall 184 may function as a shelf). In the illustrated example, cooking receptacles 140 are suspended above, in spaced apart relation to, dividing wall 184 when positioned in cooking chamber 104. As shown, cooking chamber 104 may include one or more mounts 208 (e.g. rails as shown, or brackets) that support cooking receptacles 140 above dividing wall 184. Mounts 208 may extend from any cooking chamber sidewall 108, such as left and right walls $108_3$ and $108_4$ as shown. Referring to FIG. 4, in the illustrated example, mounts 208, shown as rails, are provided extending from sidewalls $108_3$ and $108_4$, and an additional rail mount 209 is positioned extending from a lower side of a header 254, which forms descending walls 252, positioned at the interface between adjacent cooking zones 180.

Turning to FIG. 7, cooking receptacle bottom wall $148_1$ may be spaced any distance 212 from dividing wall 184 suitable to provide an air-gap between cooking receptacle and dividing wall 184. The air-gap may substantially eliminate heat conduction between cooking receptacle 140 and dividing wall 184, so that heat is predominantly transferred by radiation and convection. This may allow dividing wall 184 to more efficiently absorb and distribute heat from heating element $120_3$ across dividing wall 184, and more evenly transmit heat from dividing wall 184 to cooking receptacle bottom wall $148_1$. Distance 212 is preferably greater than 3 mm (e.g. 3 mm to 50 mm). In some embodiments, distance 212 is greater than 20 mm (e.g. 20 mm to 50 mm), which may permit food to be cooked in direct contact with dividing wall 184 simultaneously as food is cooked within cooking receptacle(s) 140 above. In this case, a third cooking zone may be defined in the space between cooking receptacles 140 and dividing wall 184.

Figure 13:
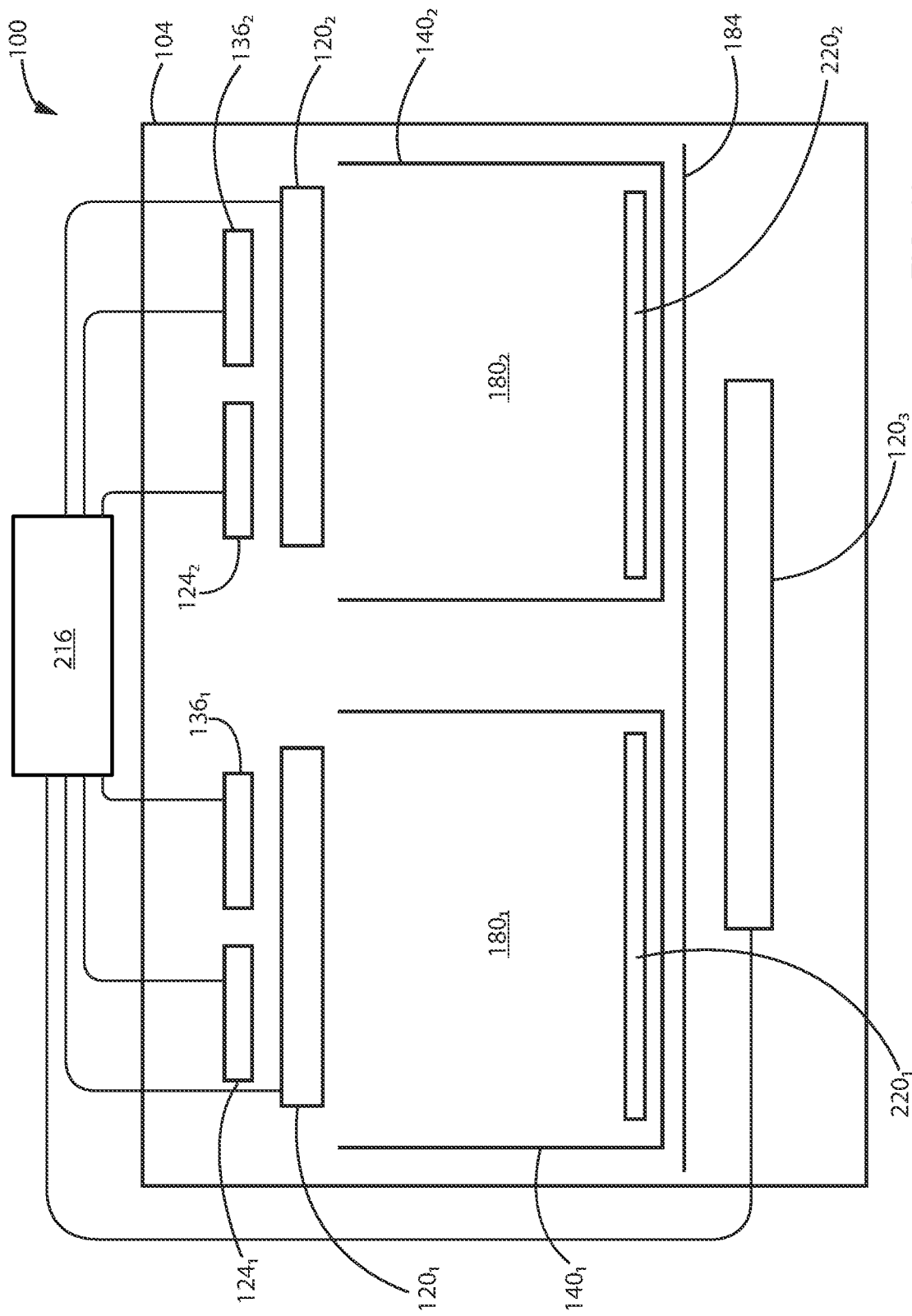
FIG. 13 is a schematic illustration of a cooking apparatus in accordance with an embodiment.

FIG. 13 shows a schematic illustration of cooking apparatus 100 in accordance with an embodiment. As shown, cooking apparatus 100 may include a controller 216 which is communicatively coupled to the cooking devices (e.g. heating elements 120, air movers, 124, and steam generators 136) associated with the plurality of cooking zones (e.g. first and second zones $180_1$ and $180_2$) defined within cooking chamber 104. Controller 216 may include one or more electrical or electromechanical devices (e.g. processor(s), memory, relay(s), switch(es), etc.) that are configured (e.g. wired and programmed) to regulate the operation of the cooking devices of cooking apparatus 100 to execute a cooking program (e.g. selected by the user).

As shown, cooking apparatus 100 may include food $220_1$ within first cooking zone $180_1$, and food $220_2$ within second cooking zone $180_2$. Controller 216 may direct the operation of the cooking devices within cooking apparatus 100 according to a cooking program in order to cook foods $220_1$ and $220_2$. In one embodiment, foods $220_1$ and $220_2$ are different foods that if cooked under identical conditions would require substantially different cooking times to complete their cooking to a desired doneness (e.g. browned and not burnt). For example, food $220_1$ in first cooking zone $180_1$ may be raw French fries, and food $220_2$ in cooking zone $180_2$ may be raw chicken wings.

In some embodiments, controller 216 may direct the operation of the cooking devices according to a cooking program, which aims to cook foods $220_1$ and $220_2$ so that they finish cooking at approximately the same time. This may involve producing different cooking conditions (temperature, convective air speed, and/or humidity) in the two cooking zones 180. For example, controller 216 may direct heating element $120_1$ to produce relatively less heat than heating element $120_2$ to slow the cooking of French fries $220_1$ in first cooking zone $180_1$ and to allow chicken wings $220_2$ in second cooking zone $180_2$ more time to finish cooking, and in the result allow both foods $220_1$ and $220_2$ to finish cooking at the same time. In another example, controller 216 may delay the activation of heating element $120_1$ as compared to heating element $120_2$ to start the cooking of French fries $220_1$ in first cooking zone $180_1$ so that chicken wings $220_2$ in second cooking zone $180_2$ are cooked for a long period of time, whereby both foods $220_1$ and $220_2$ finish cooking at the same time.

In some embodiments, controller 216 may execute a cooking program intended to complete the cooking of foods $220_1$ and $220_2$ in sequence (e.g. spaced apart in time sufficiently to allow one food 220 to be plated and served before the second food 220 finishes cooking, or spaced apart in time sufficiently to allow one food 220 to finish resting contemporaneously as the second food 220 finishes cooking). For example, controller 216 may direct the operation of the cooking devices so that two identical batches of chicken wings $220_1$ and $220_2$, which started cooking at the same time, finish several minutes apart (e.g. by modulating the heat of heating elements 120, the air speed of air movers 124, and/or the humidity generated by steam generators 136).

Each heating element 120 can include a single heating device or a plurality of heating devices having any shape and arranged in any pattern. FIGS. 14A-14D illustrate some exemplary heating elements 120 that are associated with discrete cooking zones 180. FIG. 14A shows an example of heating elements $120_1$ and $120_2$ each having two linear heating devices arranged in parallel. FIG. 14B shows an example of heating elements $120_1$ and $120_2$ each having a round (e.g. circular) heating device. FIG. 14C shows an example of heating elements $120_1$ and $120_2$, each including a plurality of round (e.g. circular) heating devices. FIG. 14D illustrates another example of heating elements $120_1$ and $120_2$, each having a plurality of linear heating devices in a different orientation than shown in FIG. 14A.

FIGS. 14E-14J illustrate some exemplary heating elements $120_3$ that may be common to a plurality of cooking zones. FIG. 14E shows an example of a heating element $120_3$ including a single linear heating element $120_3$. FIG. 14F shows an example of a heating element $120_3$ including a plurality of linear heating elements $120_3$ in parallel. FIG. 14G shows an example of a heating element $120_3$ including a plurality of round (e.g. circular) heating devices side by side. FIG. 14H shows an example of a heating element $120_3$ including a plurality of nested heating devices. FIG. 14I shows an example of a heating element $120_3$ including a plurality of linear heating devices arranged in a different orientation than in FIG. 14F. FIG. 14J shows an example of a heating element $120_3$ including a heating element having an irregular shape.

Subdividable Cooking Zones

Reference is now made to FIGS. 15-16. In some embodiments, a cooking zone 180 (e.g. defined by a cooking receptacle 140, or a cooking vessel) may be subdivided into addition cooking zones 180. This can allow the number of cooking zones within cooking chamber 104 to be increased. Each cooking zone 180 can have different cooking conditions for cooking different foods 220.

The features in this section may be used by themselves in any cooking apparatus or in any combination or sub-combination with any other feature or features described herein. For example, the feature of subdividable cooking zones described herein may be used with any of the features of the cooking receptacle and the cooking vessel, multiple cooking zones, forced convection, steam generation, dynamic energy utilization, heating element power modes, door transparency, removable handle, retractable door, self-cleaning, cooking additive distribution, insulation and air cooling, heating ducts, common motor drive, smoke and/or odor control, reorientation and expansion, vertical cooking, toaster, heat storage members, and other features described herein.

In some embodiments, a cooking zone 180 heated by an infrared heating element 120 may be subdivided by positioning an infrared-opaque barrier 224 (also referred to as an IR shield 224) between the heating element 120 and the cooking zone 180. FIGS. 15-16 illustrate an example in which second cooking zone $180_2$ is subdivided into sub-zones $180_{2A}$ and $180_{2B}$ by overlaying an IR shield 224 over a portion (e.g. one-half) of cooking receptacle $140_2$. This can reduce the IR radiation that strikes food $220_{2B}$ in sub-zone $180_{2B}$ as compared with food $220_{2A}$ in sub-zone $180_{2A}$. As a result, two different foods $220_{2A}$ and $220_{2B}$ can be cooked under different cooking conditions within the same cooking receptacle $140_2$ under the same heating element $120_2$ or in separate receptacles 140 placed in one cooking vessel 160. IR shield 224 may be permanently or removably connected to cooking receptacle 140. A removable IR shield 224 may permit cooking receptacle 140 to be selectively divided or undivided into sub-zones 180 as desired. IR shield may be moveable mounted from a retracted position (e.g., in which it is moved to about a sidewall of chamber 140) to a deployed position as exemplified in FIG. 17.

IR shield 224 may be made of any material effective to block or resist/reduce the transmission of infrared radiation. For example, IR shield 224 may be made of aluminum, aluminized steel, or low iron glass. IR shield 224 may cover an entirety of a sub-zone 180 below, or may be deployed to cover only part of the sub-zone 180 or may include open area(s) (e.g. formed by slots or perforations 228 as shown). Open area(s) 228 may allow IR shield 224 to reduce but not completely block IR radiation from heating elements 120 to the sub-zone 180 below.

Referring to FIG. 17, in some embodiments a zone subdividing wall 232 may be provided to create greater isolation between the sub-zones $180_{2A}$ and $180_{2B}$. In some embodiments, subdividing wall 232 may be air impervious or air flow resistant to reduce air exchange between sub-zones $180_{2A}$ and $180_{2B}$, so that sub-zones $180_{2A}$ and $180_{2B}$ can maintain distinct air temperatures. Alternatively or in addition, subdividing wall 232 may be liquid impervious to reduce liquid exchange, so that the flavors of foods $220_{2A}$ and $220_{2B}$ do not mix. Moreover, subdividing wall 232 may be permanently or removably connected to cooking receptacle $140_2$. A permanently connected subdividing wall 232 may allow subdividing wall 232 to more reliably resist liquid and air exchange between sub-zones $180_{2A}$ and $180_{2B}$. A removably connected subdividing wall 232 may be selectively inserted or removed, and may be sized to fit into a cooking vessel.

Reference is now made to FIG. 18. In some embodiments, IR shield 224 may be formed as a shutter that is movable between an open position, in which IR radiation from heating element 120 is unobstructed or less obstructed by IR shield 224, and a closed position (shown) in which IR radiation from heating element 120 is completely or more obstructed by IR shield 224. As shown, IR shield 224 may include an upper shield panel $236_1$ and a lower shield panel $236_2$. As shown in FIG. 19, upper and lower shield panels $236_1$ and $236_2$ may include open area(s) 228 (e.g. formed by perforations, slots, or spaces between wires) positioned between closed areas 240. Returning to FIG. 18, in the closed position shown, the closed areas 240 of each shield panel 236 at least partially overlie (i.e. overlap) and align with the open areas 228 of the other shield panel 236 to provide complete (or greater) obstruction to IR radiation into the sub-zone $180_8$ below. In the open position, the open areas 228 of each shield panel 236 at least partially overlie (i.e. overlap) and align with the open areas 228 of the other shield panel 236 to provide less obstruction to IR radiation into the subarea $180_8$ below.

At least one of (i.e. one or both of) IR shield panels 236 is movable relative to the other IR shield panel 236 to transition the IR shield 224 between the open and closed positions. In the illustrated example, lower IR shield panel $236_1$ is horizontally movable relative to upper IR shield panel $236_2$ between the open and closed positions. An IR shield panel 236 may be movable by manual (i.e. by hand) or automatic means. For example, IR shield panel 236 may be drivingly connected to an actuator 242, which may be an electromechanical actuator (e.g. solenoid) or a manual actuator (e.g. shaft connected to a handle or button). This may permit controller 216 (FIG. 13) to activate actuator 242 in accordance with a cooking program.

Turning to FIG. 20, IR shield 224 may include a single panel 236 movable between a closed position (shown) and an open position. As illustrated, IR shield 224 provides greater obstruction to IR radiation in the closed position than in the open position.

Referring to FIG. 21, IR shield 224 may include a panel 236 that is rotatable between a closed position and an open position, as in a louvre. Also, a plurality of IR shields 224 may be associated with a single cooking zone 180. In the illustrated example, a first IR shield 224A overlies sub-zone 180A, and a second IR shield 224B overlies sub-zone $180_8$. Each IR shield 224 may be independently actuated to move between an open position and a closed position. In the illustrated example, IR shield 224B is shown in an open position, and IR shield 224B is shown in a closed position.

It will be appreciated that in each example including an IR shield panel 236 movable between an open position and a closed position, the IR shield panel 236 may also be movable to intermediate positions between the open and closed positions that may provide a degree of IR radiation obstruction in between that provided by the open and closed positions.

Forced Convection

Referring to FIG. 5, cooking apparatus 100 may include one or more air movers 124 that act to circulate air within cooking chamber 104. Each air mover 124 may include an impeller 132 driven by a motor 128. The motor 128 rotates the impeller 132 about an axis 244 of rotation, and the rotating impeller 132 accelerates air to circulate within the cooking chamber 104. In the illustrated example, a different air mover 124 is associated with each cooking zone 180. This allows different cooking zones 180 to experience different forced convection (including no forced convection when an air mover 124 for a zone is disabled).

The features in this section may be used by themselves in any cooking apparatus or in any combination or sub-combination with any other feature or features described herein. For example, the feature of forced convection described herein may be used with any of the features of multiple cooking zones, the cooking receptacle and the cooking vessel, subdividable cooking zones, steam generation, dynamic energy utilization, heating element power modes, door transparency, removable handle, retractable door, self-cleaning, cooking additive distribution, insulation and air cooling, heating ducts, common motor drive, smoke and/or odor control, reorientation and expansion, vertical cooking, toaster, heat storage members, and other features described herein.

In other embodiments, one or more cooking zones 180 may not have an associated air mover 124 (e.g., the cooking zone 180 may not feature forced convection). This may simplify the design of cooking apparatus 100, which may reduce the cost and complexity of manufacturing cooking apparatus 100.

In some embodiments, an air mover 124 may be associated with two or more (or all) zones 180. This allows more cooking zones 180 to have forced convection functionality than the number of air movers 124, even if the degree of forced convection is not individually selectable as between some of those cooking zones 180.

In other embodiments, a plurality of air movers 124 may be associated with one cooking zone 180. This allows for greater precision in the delivery of forced convection to a cooking zone 180. For example, this may allow the air flow direction to be selected based upon which of the air movers 124 are activated. In another example, this may allow a sub-zone to be exposed to greater air flow velocity/turbulence than another sub-zone within the cooking zone 180.

Air mover 124 may be positioned anywhere relative to cooking chamber 104. As exemplified in FIG. 5, each air mover 124 includes a motor 128 positioned above cooking chamber upper wall $108_1$, and an impeller positioned 132 just below cooking chamber upper wall $108_1$ above a cooking zone 180. In other embodiments, an air mover 124 may be positioned at any of the other cooking chamber sidewalls 108. In some embodiments, impeller 132 may be located outside of cooking chamber 104 and oriented to force air into cooking chamber 104 through an opening in one of cooking chamber sidewalls 108.

Still referring to FIG. 5, air movers 124 may have impellers 132 configured to accelerate air in any direction suitable for circulating air within cooking chamber 104. In the illustrated embodiment, impeller 132 is configured to accelerate air laterally (e.g. horizontally normal to axis 244) towards left, right, front and rear sidewalls $108_3$-$108_6$. This may create an airflow path that runs along the inside of cooking receptacle sidewalls 148 below. As illustrated in FIG. 22, when a cooking vessel 160 is positioned in the cooking receptacle 140 the lateral airflow path 248 may run between the cooking vessel 160 and the cooking receptacle 140. This may allow for convective heat transfer into the cooking vessel 160 through many or all sidewalls 166 of cooking vessel 160 (e.g., if the cooking vessel is a basket). As a result, this may accelerate the cooking of food 220.

Still referring to FIG. 22, air mover 124 may be positioned and oriented to blow air across heating elements 120, which may be infrared heating elements as discussed above. For example, air mover 124 may be positioned and oriented to blow air laterally across heating elements 120. The heating elements 120 may lose heat to the air flow 248. Accordingly, the air flow 248 is heated by interaction with the heating elements 120. This allows heating elements 120 to simultaneously provide radiative heat to the food 220 below, and to supply the heating for convective heating to the food 220. By reducing the temperate of the heating element, the amount of radiant heating that is provided may be reduced. As shown, air mover impeller 132 may be positioned at the same or higher elevation as an associated heating element 120.

In operation, the speed of air mover motor 128 may be varied to adjust the ratio of radiative heating to convective heating of food 220 in cooking zone 180. For example, the speed of air mover 124 may be increased to allow the air flow to capture additional heat from heating element 120, whereby the ratio of radiative heating to forced convective heating decreases, and vice versa. In some embodiments, the speed of air mover 124 may be varied from 'off' at which the ratio of radiative heating to forced convective heating is 100:0, to maximum speed (e.g. greater than 4,000 RPM) at which the ratio may be 50:50 or less. The total heat input into food 220 may be generally governed by the heat generation of heating element 120.

In alternative embodiments, heating elements 120 may not be located in the air flow path of an adjacent air mover 124. This can avoid cooling heating elements 120, which may reduce the radiative heating that heating elements 120 can provide to the food 220 in the associated cooking zone 180.

Turning to FIG. 11, it will be appreciated that when the cooking receptacles have been removed to provide a combined cooking zone 180, the plurality of air movers 124 associated with the removed cooking receptacles may be operated concurrently to generate an airflow commensurate with the large volume of the combined cooking zone 180.

Referring to FIG. 4, cooking chamber 104 may include one or more (i.e. one or multiple) angular walls 252, which interact with the airflow 248 (FIG. 22) from air mover(s) 124 to efficiently redirect the airflow 248 (FIG. 22) downwards into the cooking zone 180 below. This may help to better isolate forced convection generated by an air mover 124 associated with one cooking zone $180_1$ from impacting the forced convection experienced in another cooking zone 180$_2$. As exemplified, the angular walls 252 are provided adjacent a location at which two cooking zones 180 abut so as to direct air to flow generally downwardly into a respective cooking zone 180 and not laterally into an adjacent cooking zone. In the illustrated embodiment, cooking chamber 104 includes an angular wall 252 (also referred to as an air flow deflector 252 or descending wall 252) associated with each cooking zone 180, each angular wall 252 extending from cooking chamber upper wall 108$_1$ downwardly at a (non-zero) angle to vertical and horizontal (e.g. 20-70 degrees to horizontal). As shown, angular walls 252 may be formed by a header 254 positioned at the interface between adjacent cooking zones 180.

FIG. 22 shows another embodiment including two angular walls 252 associated with the same cooking zone 180. This design may help improve forced convective air flow efficiency, which ultimately may allow cooking apparatus 100 to use a smaller, lighter, less powerful, and less expensive air mover 124 without sacrificing performance, all else being equal. As shown, the angular walls 252 may be positioned at laterally opposed ends of the cooking zone 180. Angular walls 252 may be planar as shown in FIG. 4 or curved as shown in FIG. 22.

Reference is now made to FIG. 23. In some embodiments, cooking apparatus 100 may include one or more IR shields 224 (as described above) as well as one or more air movers 124. The IR shields 224 may be selectively positionable to reduce the IR radiation that passes from heating elements 120 into cooking zone 180. Consequently, IR shields 224 may be closed to further decrease the ratio of radiative heating to convective heating within cooking zone 180. When IR shields 224 are open and air mover 124 is turned off, the ratio of radiative to convective heating may be 100:0, and when IR shields 224 are closed and air mover is at maximum speed, the ratio may be for example 20:80 or less (e.g. 20:80 to 2:98).

Steam Generator

Figure 24:
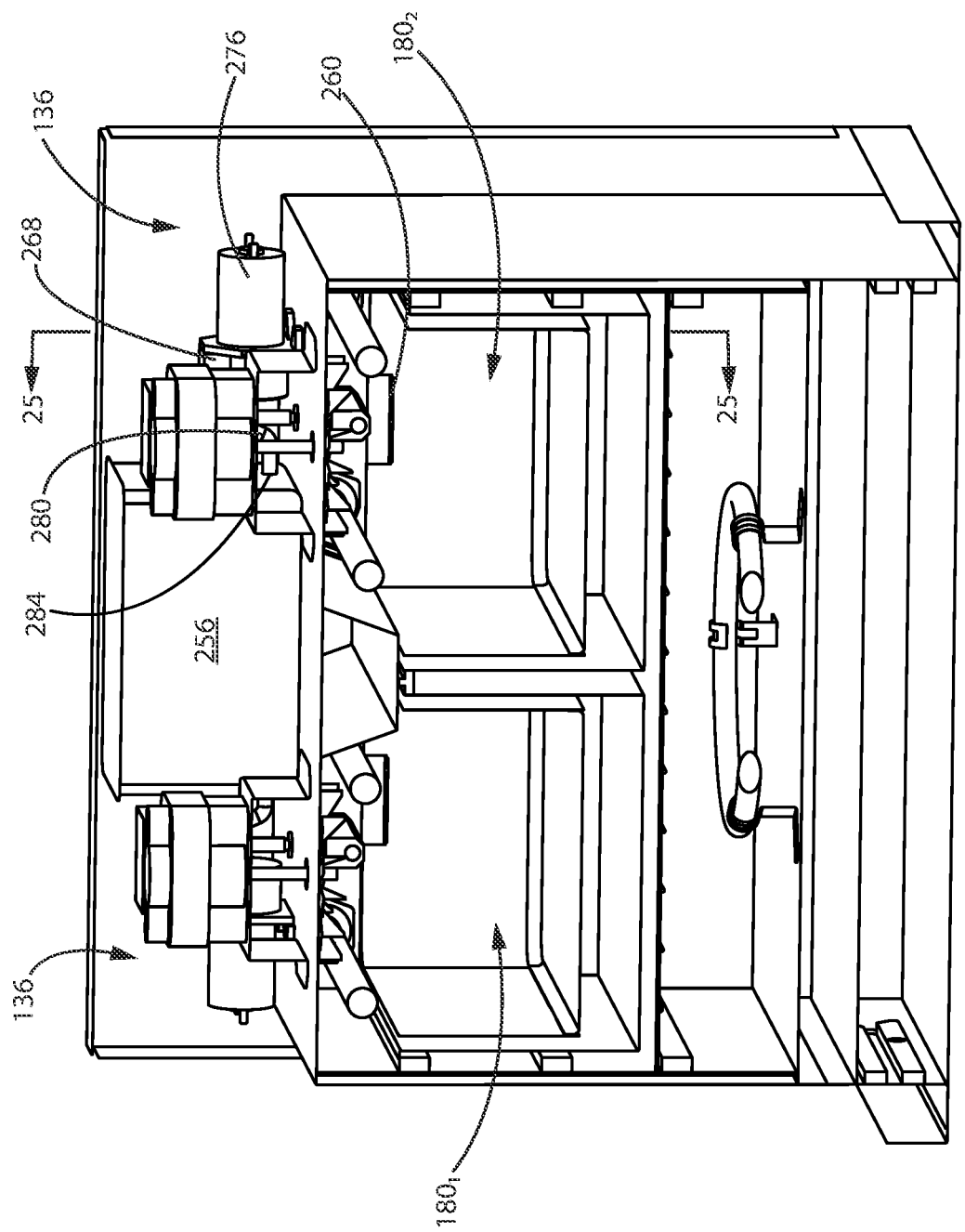
FIG. 24 is a cross-sectional view taken along line 24-24 in FIG. 1.

Reference is now made to FIG. 24. In some embodiments, cooking apparatus 100 may include one or more steam generators 136. As used herein, a "steam generator" can be any device that can convert liquid water into gas, vapor, or tiny airborne droplets, whether that conversion is achieved by heating, evaporating, or nebulizing water, or by another means. Steam generator 136 can be any device that can humidify one or more cooking zones 180. In the illustrated embodiment, each cooking zone 180 has an associated steam generator 136. This allows the humidity within each cooking zone 180 to be individually controlled. In other embodiment, one or more (or all) cooking zones 180 may not have an associated steam generator 136. This may simplify the design of cooking apparatus 100, which may reduce the cost and complexity of manufacturing cooking apparatus 100. In some embodiments, a steam generator 136 may be associated with two or more cooking zones 180. This allows more cooking zones 180 to have humidification functionality than the number of steam generators 136, even if the humidity in some of those cooking zones 180 is not separately controllable.

The features in this section may be used by themselves in any cooking apparatus or in any combination or sub-combination with any other feature or features described herein. For example, the feature of steam generation described herein may be used with any of the features of multiple cooking zones, the cooking receptacle and the cooking vessel, subdividable cooking zones, forced convection, dynamic energy utilization, heating element power modes, door transparency, removable handle, retractable door, self-cleaning, cooking additive distribution, insulation and air cooling, heating ducts, common motor drive, smoke and/or odor control, reorientation and expansion, vertical cooking, toaster, heat storage members, and other features described herein.

Figure 25:
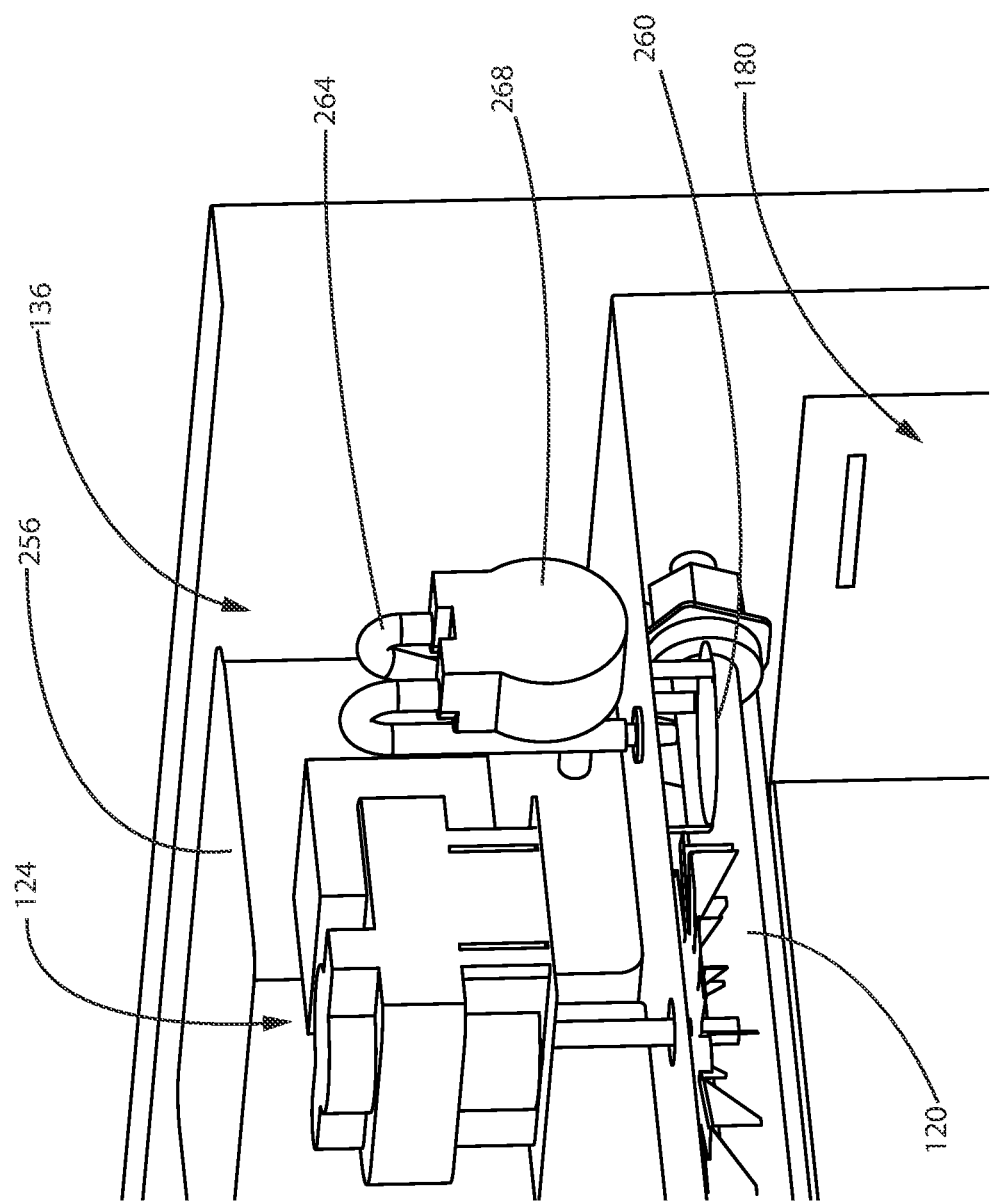
FIG. 25 is a partial cross-sectional view taken along line 25-25 in FIG. 24.

Turning to FIG. 25, steam generator 136 may include a water reservoir 256, a steaming plate 260, and a water flow path 264 from the water reservoir 256 to the steaming plate 260. Water is delivered from the water reservoir 256 to the steaming plate 260, where it is vaporized, such as by boiling or evaporation, to produce water vapor that humidifies the air within cooking zone 180. Humidifying the air within a cooking zone 180 may help to prevent the food being cooked from drying out or burning from heat radiation generated by the heating elements 120. It will be appreciated that instead of a reservoir, and/or in addition thereto, steam generator 136 may be connectable in fluid flow communication with a source of water (e.g., it may be permanently or removably connected to a household water supply)

Water may be directed from water reservoir 256 along water flow path 264 to steaming plate 260 in any manner. In the illustrated example, a pump 268 is positioned in the flow path 264, and selectively operable to control a flow rate of water to the steaming plate 260. For example, as shown in FIG. 13, controller 216 may be communicatively coupled to steam generator 136. This can allow controller 216 to direct the flow rate of water pumped onto the steaming plate, according to a cooking program.

Figure 27:
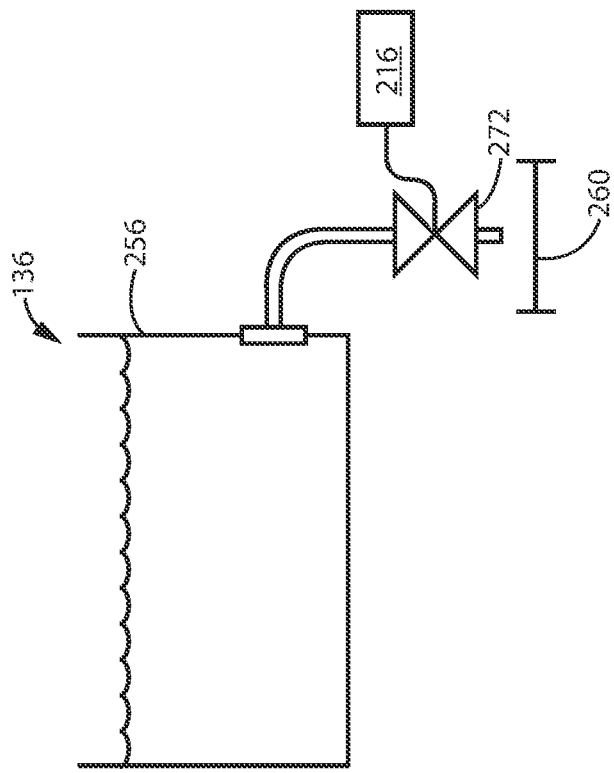
FIGS. 26-27 are schematic illustrations of steam generators in accordance with various embodiments.
Figure 26:
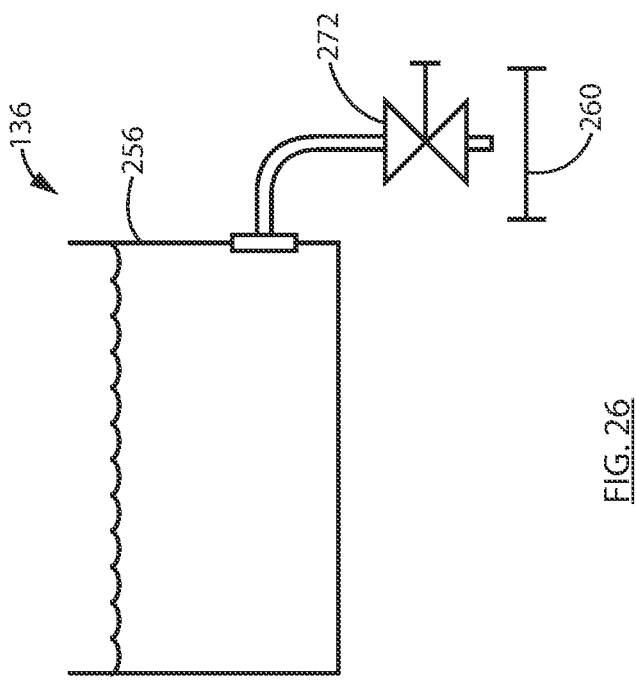

In another embodiment, FIGS. 26-27 illustrate steam generators 136 in which water may travel from water reservoir 256 to steaming plate 260 by gravity alone, and a valve 272 may be selectively opened or closed to regulate the flow rate. The valve 272 may be manually operable (i.e. by hand) as seen in FIG. 26. Alternatively or in addition, valve 272 may be communicably coupled to controller 216 and movable been open and closed positions according to control signals from controller 216, as shown in FIG. 27.

Returning to FIGS. 24-25, pump 268 may be any device suitable for delivering water from water reservoir 256 to steaming plate 260. For example, pump 268 may be a rotary pump, reciprocating pump, peristaltic pump, gear pump, or screw pump. As shown in FIG. 24, pump 268 may include a motor 276 to drive its operation. Motor 276 has been omitted from FIG. 25 to provide better visibility of other components.

Referring to FIGS. 24 and 28, steam generator 136 may include an upstream conduit 280 in the flow path 264 from water reservoir outlet 284 to pump inlet 288, and a downstream conduit 292 from pump outlet 296 to outlet nozzle 304. As shown in FIG. 28, outlet nozzle 304 may be positioned and oriented to direct the water flow (e.g. as a spray, stream, or droplets) onto steaming plate 260.

Still referring to FIG. 28, steaming plate 260 may be any device suitable to accommodate the vaporization of water deposited thereon. In the illustrated example, steaming plate 260 is a flat, horizontal plate upon which water from outlet nozzle 304 is deposited (e.g., water may drip thereon). On contact, the deposited water may spread over the plate upper surface 308, and vaporize. In some embodiments, steam generator 136 may not include a heat source to vaporize liquid deposited on steaming plate 260. Instead, steaming plate 260 may be heated by radiation from one or more heating elements 120. For example, steaming plate 260 may be positioned within close proximity (e.g. less than 10 cm, such as 0 cm to 10 cm) of one or more heating elements 120. Radiation from heating elements 120 may heat steaming plate 260 above 100° C. so that water on steaming plate 260 rapidly boils and/or vaporizes into gas and/or vapor.

Steaming plate 260 may be positioned anywhere within cooking chamber 104. For example, steaming plate 260 may be positioned above or at an upper end of a cooking zone 180, to one side of a cooking zone 180, or below or at a lower end of a cooking zone 180. FIG. 25 shows an example of steaming plate 260 positioned above cooking zone 180. Where the cooking zone 180 has an associated air mover 124, the air mover 124 may blow air in proximity to steaming plate 260 to mix the generated steam with the air in the cooking zone 180.

Steaming plate 260 may be positioned at an elevation above, below, or level with one or more (or all) heating elements 120 that radiate heat onto the steaming plate 260. FIG. 28 shows an example in which steaming plate 260 is positioned above a heating element 120. This allows heating element 120 to radiate upwardly upon steaming plate lower surface 312, without steaming plate 260 providing any obstruction to the downward radiation from heating element 120 towards one or more cooking zones. In the illustrated example, steaming plate 260 is positioned in the direction of air accelerated by air mover 124. As shown, steaming plate 260 may be positioned at the same or lower elevation as air mover 124 so that the steam rising from steaming plate 260 may be efficiently mixed into the cooking chamber 104 by the air blown by air mover 124.

Turning to FIG. 29, steaming plate 260 may be positioned anywhere relative to heating elements 120 that allows steaming plate 260 to receive heat generated by the heating elements 120. In some embodiments, a steaming plate 260 associated with a cooking zone 180 may have a horizontal position that is between two or more heating elements 120 associated with the same cooking zone 180 as shown, or that is between two or more portions of a heating element 120 associated with a cooking zone 180 (e.g. in the case of a U-shaped or circular heating element). This may permit the steaming plate 260 to receive radiation from the two or more heating elements 120 or heating element portions. In the case of multiple heating elements 120 as shown, when one or more of the heating elements 120 is turned down or turned off by controller 216 (FIG. 13) according to a cooking program, steaming plate 260 may continue to receive radiation from the other heating element(s) 120 so that water may continue to be vaporized.

Figure 30:
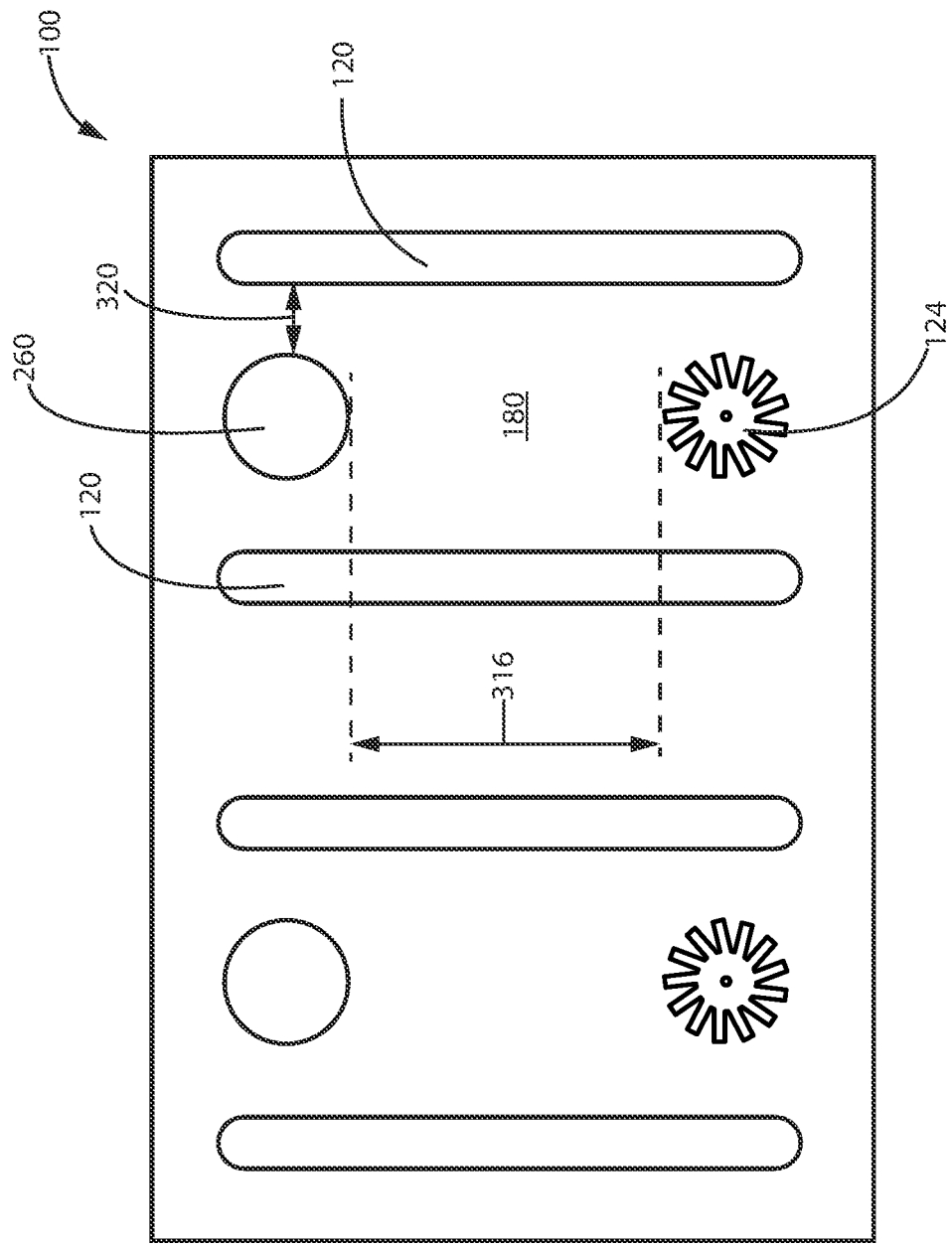
FIG. 30 is a schematic illustration of an arrangement of heating elements, air mover, and steam generator in accordance with an embodiments.

FIG. 29 shows an example in which steaming plate 260 is positioned between two heating elements 120, in close proximity to air mover 124. For example, a distance 316 between steaming plate 260 and air mover 124 may be less than 2 times (e.g. equal to or less than) a distance 320 between steaming plate 260 and one or both of heating elements 120. An advantage of this design is that it can allow air mover 124 to more effectively distribute the steam generated on steaming plate 260 through the cooking zone 180. FIG. 30 shows an example in which steaming plate 260 is positioned between two heating elements 120, and spaced farther from air mover 124. For example, distance 316 between steaming plate 260 and air mover 124 may be greater than two times (e.g. greater than four times) distance 320 between steaming plate 260 and one or both of heating elements 120. An advantage of this design is that it can mitigate the air mover 124 from overcooling the steaming plate 260 which could undesirably reduce or cease steam production on steaming plate 260.

Turning to FIG. 5, each cooking zone 180 may have associated with it a steaming plate 260. As shown, a steaming plate $260_1$ is positioned above cooking zone $180_1$, and a steaming plate $260_2$ is positioned above cooking zone $180_2$. Each steaming plate 260 may receive water from a common water reservoir 256 as shown, or separate water reservoirs. An advantage of providing a common reservoir 256 is that neither steaming plate 260 will run out of water supply while the other has water remaining in a water reservoir 256, and only one water supply may require monitoring for water level and refilling. In other embodiments, a common steaming plate 260 may be associated with multiple cooking zones 180. For example, the common steaming plate 260 may be positioned to create steam in fluid communication with the multiple cooking zones 180.

Figure 31:
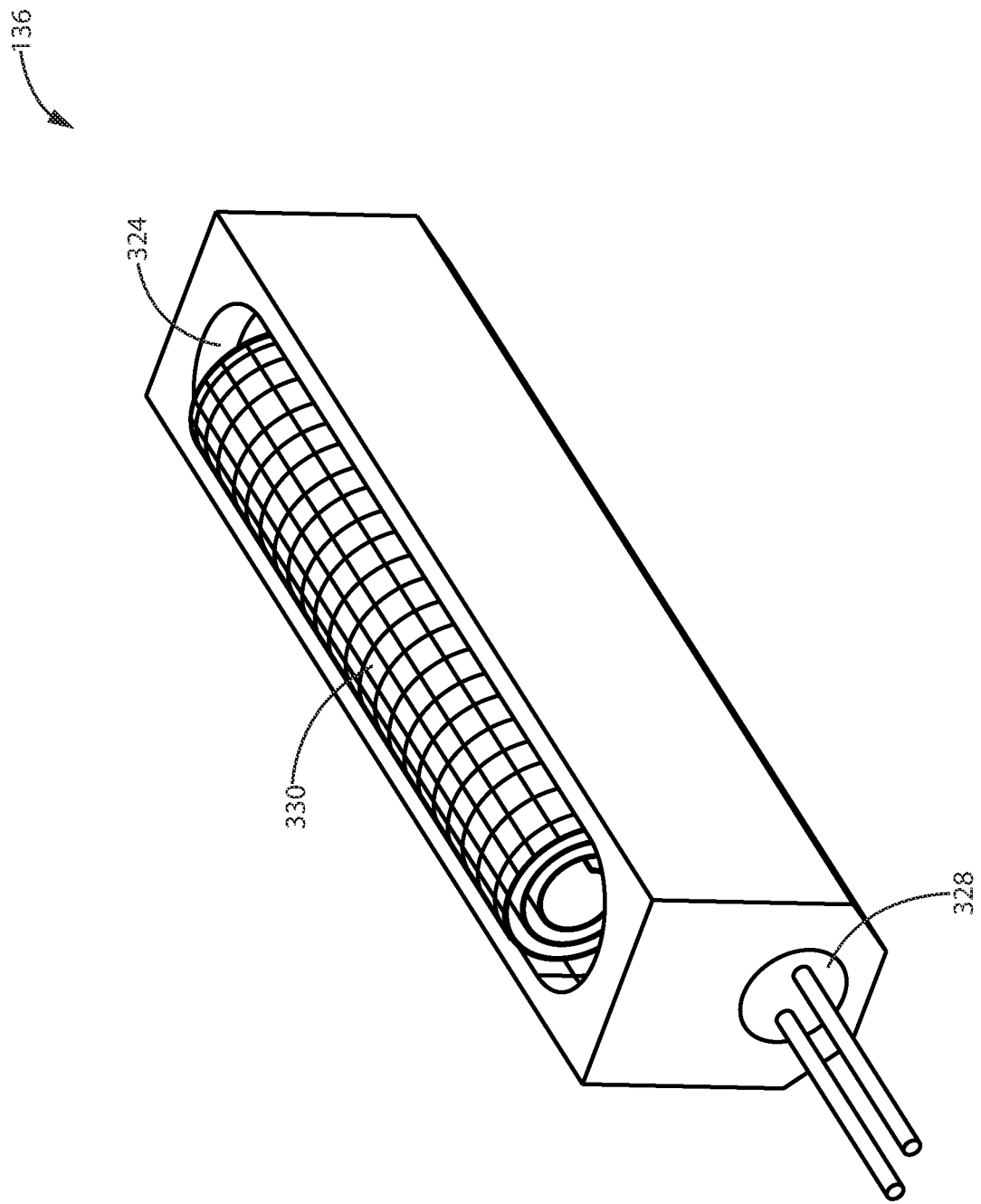
FIG. 31 is a perspective view of a steam generator in accordance with another embodiment.
Figure 32:
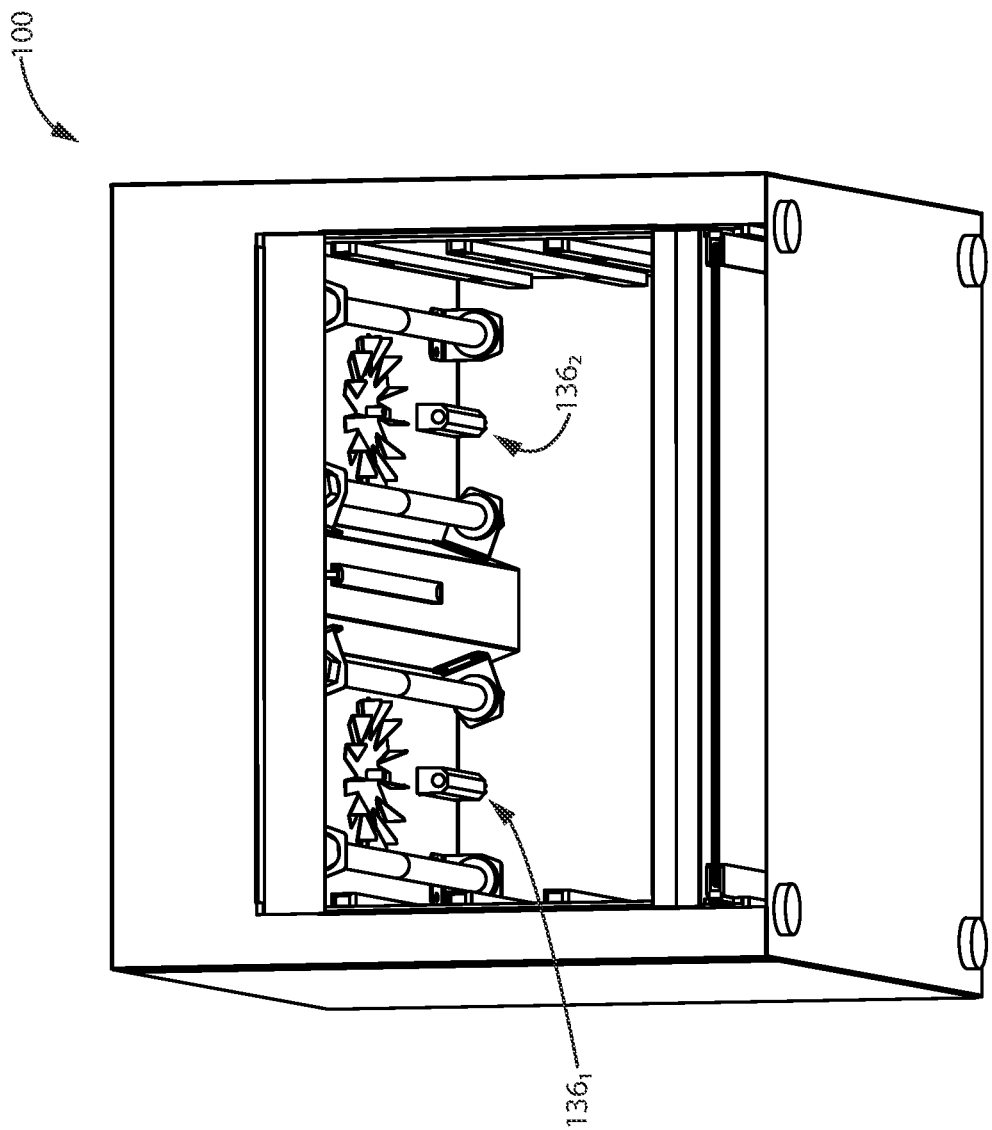
FIG. 32 is a perspective view of the cooking apparatus of FIG. 1 with the door in an open and retracted position, and both cooking receptacles and cooking vessels removed, and including the steam generator of FIG. 31.

Reference is now made to FIGS. 31-32, which shows a steam generator 136 that includes a heater 328 in accordance with another embodiment. An advantage of this design is that it decouples the steam generator 136 from reliance on the heating elements of a cooking zone for heat to generate steam. This can allow, for example, steam generator 136 to continue generating steam even when all heating elements are turned off. As shown, steam generator 136 may be formed as a heating container, having a cavity 324 to hold water, and a heater 328 to boil the water in the cavity 324. The heater 328 can be any device suitable to heat the contained water to boil. For example, heater 328 may be an electric resistance heater, as shown. In some embodiments, mesh fabric 330 may be positioned in or over cavity 324 to reduce splashing from the boiling water.

Figure 33:
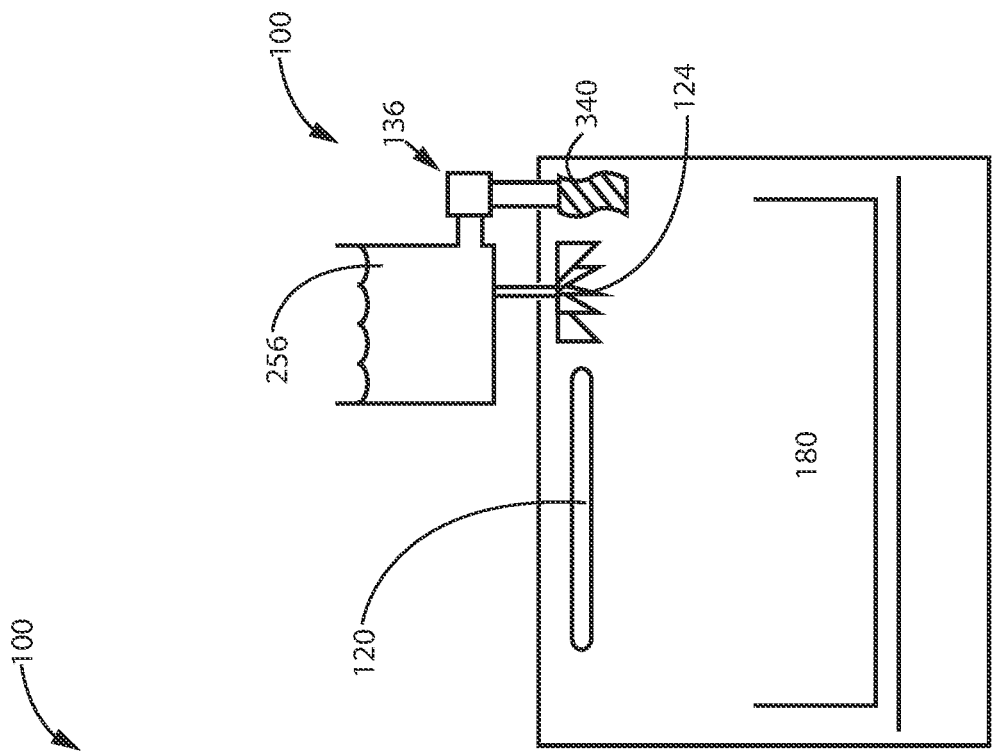
FIGS. 33-34 are schematic illustrations of a cooking apparatus including steam generators in accordance with various embodiments.

Reference is now made to FIG. 33, which shows a cooking apparatus 100 including a steam generator 136 in accordance with another embodiment. As shown, steam generator 136 may be an ultrasonic vaporizer including a nebulizer 332 that vibrates rapidly within a volume of water 336 to vaporize water into water mist. An advantage of this design is that it can produce low temperature water mist that may not increase the air temperature within cooking zone 180 in the way that steam might. This may avoid unduly increasing the air temperature within cooking zone 180, such as when performing low temperature slow-cooking. A drop in air temperature within cooking zone 180 can be easily rectified by activating heating element(s) 120.

Figure 34:
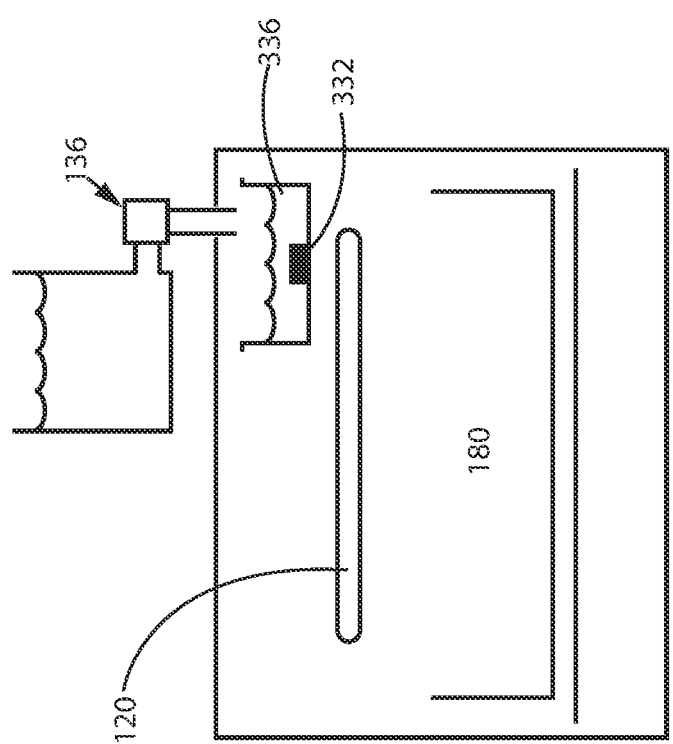

FIG. 34 shows a cooking apparatus 100 including a steam generator 136 in accordance with another embodiment. As shown, steam generator 136 may be an evaporative humidifier, having a liquid absorbent material 340 (e.g. wick) which receives water from water reservoir 256, and allows the water to evaporate off the surface of the absorbent material 340. In some embodiments, an air mover 124 may be positioned to direct air over the surface of absorbent material 340 to accelerate the evaporation.

Any of these alternate steam generators may be placed anywhere already discussed herein.

Dynamic Energy Utilization

Reference is now made to FIG. 35, which shows a schematic illustration of electrical components of a cooking apparatus 100 in accordance with an embodiment. As shown, cooking apparatus 100 may include two or more cooking devices (e.g. heating element(s) 120, air mover(s) 124, and steam generator(s) 136) which are operated under the direction of a controller 216 according to a cooking program (e.g. set temperature, humidity, cooking end time, etc.). A cooking program may also be referred to herein as a 'pre-set cooking setting', which represents a cooking regime. Each of the cooking devices draws electrical power, which may be supplied by an electrical connector 342 connected to mains power.

Cooking apparatus 100 may have a rated power consumption (also referred to as "rated power"), such as 1,500 W for example, which may represent a maximum power input for which the cooking apparatus 100 is designed to operate. In some embodiments, controller 216 may regulate the operation of the cooking devices (e.g. devices 120, 124, and 136) so that cooking apparatus consumes at least 75% (e.g. at least 80% or 90% or 100%) of the rated power during at least 50% (e.g. at least 60%, at least 70%, or at least 90%, or 100%) of the cooking time of a cooking program. The cooking program may include controller 216 maintaining cooking condition(s) including one or more (or all) of a pre-determined temperature, humidity, radiative heating, convective heating, air speed, etc. An advantage of maintaining high power consumption during a large portion of the cooking time is that food may cook more quickly (e.g. by apparatus 100 acting to consume additional power when available). To avoid overcooking food (e.g., by providing too much IR radiation and/or by the temperature of the air in the cooking chamber being too high), the cooking cyclone may be adjusted (such as by controller 216) to direct energy from one or more of the heating elements to the fan and/or the steam generator. Thus, for example, when food is sufficiently browned, the humidity in the cooking chamber may be increased and/or forced convention may be created or the speed of air in the cooking chamber may be increased. In addition, during any portion of a cooking cycle, the amount of humidity in the cooking chamber may be increased by increasing (or providing) energy to the steam generator and reducing energy provided to, e.g., the heating element and/or the fan. Furthermore, this design may allow apparatus 100 to operate more energy efficiently. In many cases, devices 120, 124, and 136 achieve their highest energy efficiency when operating at 75% or more of their respective rated powers. Moreover, by cooking food more quickly, there may be less time during the cooking cycle for apparatus 100 to experience heat loss to the environment.

The features in this section may be used by themselves in any cooking apparatus or in any combination or sub-combination with any other feature or features described herein. For example, the feature of dynamic energy utilization described herein may be used with any of the features of multiple cooking zones, the cooking receptacle and the cooking vessel, subdividable cooking zones, forced convection, steam generation, heating element power modes, door transparency, removable handle, retractable door, self-cleaning, cooking additive distribution, insulation and air cooling, heating ducts, common motor drive, smoke and/or odor control, reorientation and expansion, vertical cooking, toaster, heat storage members, and other features described herein.

Cooking apparatus 100 may vary one or more of (i) the heat output of heating elements 120, (ii) the air speed from air movers 124, (iii) the water flow rate to steam generators 136, and (iv) the heat output of a heater of the steam generator, to regulate the power consumption of cooking apparatus 100. To maintain high power consumption while reducing temperature (or allowing temperature to drop) within a cooking zone 180, controller 216 may increase the air speed from air mover 124 so that the circulating air cools heating element 120 and/or controller 216 may increase water flow rate to steam generator 136 so that energy is consumed to vaporize water.

In some embodiments, in response to a reduction in power consumption from cooking devices associated with one cooking zone 180 (e.g. cooking zone $180_1$), controller 216 may direct cooking devices associated with one or more other cooking zones 180 (e.g. cooking zone $180_2$ or $180_3$) to consume additional power. This may permit the food in the other cooking zone(s) 180 to be cooked more quickly when power becomes available. For example, when controller 216 directs heating element $120_1$ to draw less power (e.g. to maintain or reduce the temperature within cooking zone $180_1$), controller 216 may also direct heating elements $120_2$ and $120_3$ to consume additional power (e.g. to increase the temperature within cooking zones $180_2$ and $180_3$). In the result, the foods within the cooking zones 180 of cooking apparatus 100 may be cooked more quickly by maintaining a power consumption close to the rated power for a majority of the cooking time.

Heating Elements with Power Modes

Reference is now made to FIGS. 36-37. In some embodiments, two or more heating elements 120, associated with the same or different cooking zones, may be selectively configured between low and high power modes. In the low power mode, the heating elements 120 may consume less power and emit less heat than when in the high power mode. FIGS. 36-37 illustrate an embodiment in which heating elements $120_1$ and $120_2$ may be toggled between a lower power mode (FIG. 36) and a high power mode (FIG. 37). As shown, in the low power mode (FIG. 36), heating elements 120 may be electrically connected in series. This reduces the voltage drop across each heating element 120 so that they consume less power and generate less heat, all else being equal. In the high power mode (FIG. 37), heating elements 120 may be electrically connected in parallel. The parallel configuration increases the voltage drop across heating elements 120 relative to the series configuration, so that they consume more power and generate more heat, all else being equal.

The features in this section may be used by themselves in any cooking apparatus or in any combination or sub-combination with any other feature or features described herein. For example, the feature of heating element power modes described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, heating ducts, common motor drive, smoke and/or odor control, reorientation and expansion, vertical cooking, toaster, heat storage members, and other features described herein.

Heating elements 120 may be connected by any electrical circuit 344 suitable for selectively reconfiguring the heating elements 120 between parallel and series configurations. In the illustrated embodiment, electrical circuit 344 is shown including a switch 348 (e.g. a double throw double pole switch) having a first position (FIG. 36) in which heating elements 120 are electrically connected in parallel, and a second position (FIG. 37) in which heating elements 120 are electrical connected in series. Switch 348 may be manually operated (i.e. by hand), or electrically operated as shown. For example, the position of switch 348 may be directed by controller 216 in accordance with a cooking program.

Whatever circuit may be employed to provide heating elements 120 with low and high power modes, controller 216 may select the power mode of heating elements 120 (e.g. toggle switch 348 between the first and second positions) based on a cooking program (e.g. stored in memory within controller 216), and signals from a temperature sensor 350 (e.g. a thermocouple, thermistor, solid-state temperature sensor, or low hysteresis thermomechanical sensor) communicatively coupled to the controller 216. The temperature sensor 350 may be positioned anywhere within cooking apparatus 100 suitable for determining the temperature inside one or more cooking zones 180 (FIG. 4) (i.e. temperature sensor 350 may be 'thermally coupled' to one or more cooking zones 180 (FIG. 4)). For example, controller 216 may direct heating elements 120 to operate in the high power mode when temperature sensor 350 indicates a temperature within a cooking zone that is below the temperature required by the cooking program, and vice versa.

Referring to FIG. 13, in some embodiments, controller 216 executes a cooking program (e.g. stored in memory within controller 216, and selected by the user) that includes one or more (or all) of a prescribed temperature, humidity, and forced convection level for the entire cooking cycle, or for each of several portions of the cooking cycle. For example, controller 216 may execute a cooking cycle that includes the air mover 124 operating at a lower power level during a first portion of the cooking cycle (e.g. first or early 1-10 minutes), and operating at a higher power level during a subsequent second portion of the cooking cycle (e.g. next, later, or last 10-600 minutes).

As described above, an increase in air flow over heating element 120 may act to heat the air flow and cool the heating element 120 whereby convective heating from the air flow may be increased and radiative heating from the heating element 120 may be reduced, and vice versa. Accordingly, in embodiments where the air mover 124 is positioned to cause air to pass over heating element 120, a lower fan power level may allow heating element 120 (e.g. an IR heating element) to radiate greater heat (e.g. IR radiation) onto the food, all else being equal.

As an example, during a first or early portion of the cooking cycle, controller 216 may operate air mover 124 at a lower power level for a duration (e.g. 1-10 minutes) suitable for browning or searing the food by intense heat radiation. During a subsequent, later, or last portion of the cooking cycle, controller 216 may operate air mover 124 at a higher power level to reduce the temperature of heating element 120, whereby radiative heating may be reduced and convective heating may be increased, such as for the purpose of cooking the food to a desired doneness.

Power Consumption Balance Between Cooking Zones

Reference is now made to FIG. 13. In some embodiments, controller 216 may coordinate the power consumption by cooking devices associated with different zones 180 so that cooking apparatus 100 maintains a power consumption that is at least 75% (e.g. at least 80%, 90% or 100%) of the rated power of the cooking apparatus 100 during cooking. In general, when power consumption by cooking zones 180 is redistributed, a decrease in power consumption of a cooking zone 180 may slow the cooking of the food in that cooking zone 180, and an increase in power consumption of another cooking zone 180 may speed up the cooking of the food in this other cooking zone 180.

The features in this section may be used by themselves in any cooking apparatus or in any combination or sub-combination with any other feature or features described herein. For example, the feature of power consumption balance described herein may be used with any of the features of multiple cooking zones, the cooking receptacle and the cooking vessel, subdividable cooking zones, forced convection, steam generation, dynamic energy utilization, heating element power modes, door transparency, removable handle, retractable door, self-cleaning, cooking additive distribution, insulation and air cooling, heating ducts, common motor drive, smoke and/or odor control, reorientation and expansion, vertical cooking, toaster, heat storage members, and other features described herein.

In one embodiment, controller 216 executes a cooking program (e.g. stored in memory within controller 216, and selected by the user) to cook foods 220 such that food $220_1$ within cooking zone $180_1$ completes cooking a predetermined period of time (e.g. 15 minutes) before food $220_2$ within cooking zone $180_2$ completes cooking. This can allow the foods 220 (e.g. appetizers) to be finished cooking and served in sequence over a period of time (e.g. over the course of a banquet reception). In this case, controller 216 may divide the rated power (or at least 75%, 80% or 90% of the rated power) between the cooking devices (e.g. heating elements 120) of the first and second cooking zones 180 to achieve the sequential cooking completion times prescribed by the cooking program. For example, where foods $220_1$ and $220_2$ are identical, controller 216 may direct the cooking devices associated with cooking zone $180_1$ (e.g. heating element $120_1$ and steam generator $136_1$) to collectively consume more power than the collective power consumption of the cooking devices associated with cooking zone $180_2$ (e.g. heating element $120_2$ and steam generator $136_2$) so that food $220_2$ completes cooking a set time after food $220_1$.

Similarly, controller 216 may execute a cooking program to cook foods 220 such that food $220_1$ within cooking zone $180_1$ completes cooking at approximately the same time (e.g. at exactly the same time, or within 1 minute) of the food $220_2$ within cooking zone $180_2$. This can allow the foods $220_1$ (e.g. meat) and $220_2$ (e.g. vegetables) to be plated and served at the same time. In this case, controller 216 may divide the rated power (or at least 75%, 80% or 90% of the rated power) between the cooking devices (e.g. heating elements 120) of the first and second cooking zones 180 to achieve the substantially simultaneous cooking completion times prescribed by the cooking program. For example, where food $220_1$ requires more heat to complete cooking than food $220_2$, controller 216 may direct the cooking devices associated with cooking zone $180_1$ (e.g. heating element $120_1$ and $136_1$) to collectively consume more power than the collective power consumption of the cooking devices associated with cooking zone $180_2$ (e.g. heating element $120_2$ and steam generator $136_2$) so that foods $220_1$ and $220_2$ complete cooking at approximately the same time.

Transparent Door, Removable Handle, Retractable Door and Lights

Reference is now made to FIG. 1. In some embodiments, a sidewall 108 of cooking chamber 104 may include a cooking chamber door 116. Cooking chamber door 116 may define a wall of one or more (or all) cooking zones 180. For example, a wall of the cooking chamber 104. At least a portion of cooking chamber door 116 may also be substantially transparent (e.g. at least 50% transparent to visible light) to allow the user to view into the one or more cooking zones 180 and determine the status of the foods cooking inside. Cooking chamber door 116 may include any transparent material suitable to provide visibility of food inside cooking chamber 104 and which is heat resistant (e.g. to at least 400° F.). For example, cooking chamber door 116 may be made of transparent glass.

The features in this section may be used by themselves in any cooking apparatus or in any combination or sub-combination with any other feature or features described herein. For example, the feature of door transparency described herein may be used with any of the features of multiple cooking zones, the cooking receptacle and the cooking vessel, subdividable cooking zones, forced convection, steam generation, dynamic energy utilization, self-cleaning, cooking additive distribution, insulation and air cooling, heating ducts, common motor drive, smoke and/or odor control, reorientation and expansion, vertical cooking, toaster, heat storage members, and other features described herein.

FIG. 1 illustrates an embodiment in which cooking chamber door 116 defines a wall to both of cooking zones $180_1$ and $180_2$. As shown, cooking chamber door 116 includes a transparent portion 352 and a non-transparent portion 356. Transparent portion 352 may be sized and positioned so that when cooking chamber door 116 is in the closed position shown, a user can see through the transparent portion 352 into the first and second cooking zones 180. In the illustrated example, cooking vessels $160_1$ and $160_2$ are shown positioned in cooking zones 180 with solid sidewalls 162 that would block visibility to food within the cooking vessels 160. In other embodiments, one or both of cooking vessels $160_1$ and $160_2$ may be removed (see, e.g. FIGS. 10 and 11), and/or a front-facing vessel wall 162 may be configured to provide visibility of the food inside when a user peers through transparent portion 352 of cooking chamber door 116. For example, a front-facing vessel wall 162 may include a substantially transparent material (e.g. glass), or open area(s) (e.g. apertures or spacing between wires or bars). In some embodiments, front-facing vessel wall 162 may have at least 30% open area to provide clear visibility to the food inside. For example, front-facing vessel wall 162 may include a wire mesh material.

Referring to FIGS. 1 and 2, cooking chamber door 116 may be movable between a closed position (FIG. 1) and an open position (FIG. 2). In the open position (FIG. 2) cooking vessels 160 may be inserted or removed from cooking chamber 104 through cooking chamber front wall $108_5$. As shown, a cooking vessel 160 may include a handle 360 that a user may grasp to manipulate the position of the cooking vessel 160. In some embodiments, handle 360 may be removably connected to cooking vessel 160. This may permit handle 360 to be removed during cooking cycles when cooking chamber door 116 is closed. An advantage of this design is that vessel handle 360 can remain cool outside of the cooking chamber 104, ready to be reconnected to the cooking vessel 160 after the cooking cycle is complete. Another advantage of this design is that vessel handle 360 does not occupy space within cooking chamber 104 which may allow cooking chamber 104 to accommodate a larger volume cooking vessel 160, all else being equal.

Figure 39:
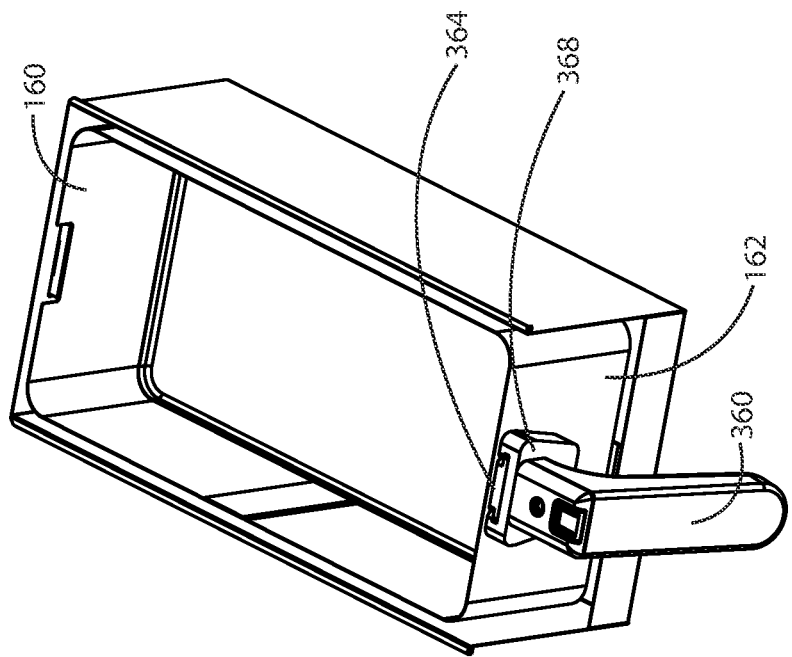
FIG. 39 is a perspective view of the cooking vessel and cooking receptacle of FIG. 38, in which a handle is connected to the cooking vessel.
Figure 38:
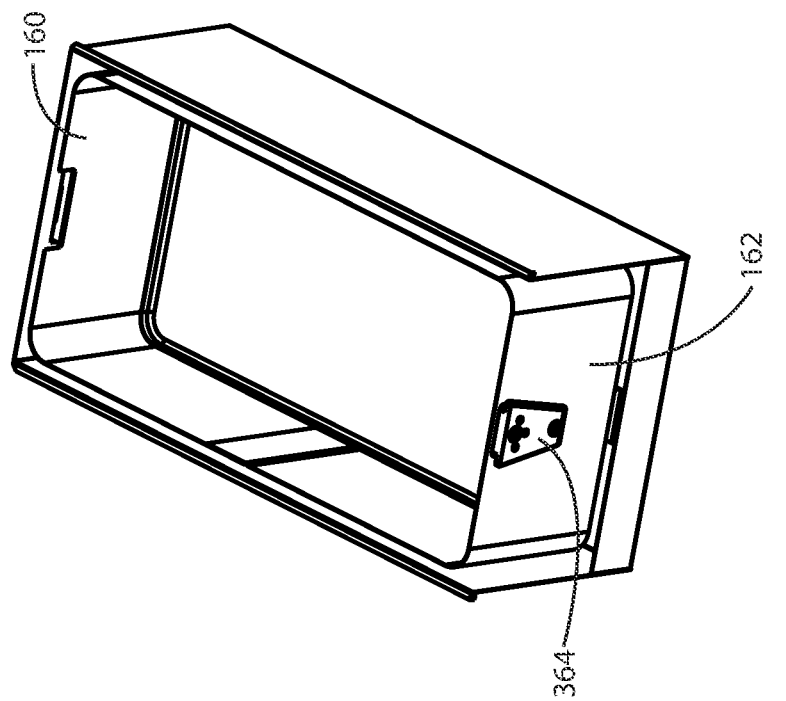
FIG. 38 is a perspective view of a cooking vessel in a cooking receptacle, in which a handle is not connected to the cooking vessel.

FIGS. 1 and 38 show a cooking vessel 160 with a handle removed, and FIGS. 2 and 39 show cooking vessel 160 with a handle 360 attached. Handle 360 may have any configuration that can be grasped by a user to remove and insert a cooking vessel 160 into cooking chamber 104. Further, handle 360 may be removably connected to cooking vessel 160 in any manner that allows handle 360 to be connected to manipulate the position of cooking vessel 160 and disconnected after cooking vessel 160 is moved into the cooking chamber 104. In the illustrated example, front-facing vessel sidewall 162 includes a connecting member 364, and handle 360 includes a connecting member 368. Connecting members 364 and 368 are configured to mate as shown in FIG. 39, and while mated a user can manipulate handle 360 to slide cooking vessel 160 in and out of cooking chamber 104.

Returning to FIG. 1, cooking chamber door 116 may be movably connected to cooking apparatus 100 in any manner that allows cooking chamber door 116 to move between open and closed positions. For example, cooking chamber door 116 may be slidably or pivotally connected to cooking apparatus 100. In the illustrated embodiment, cooking chamber door 116 is pivotally connected to an outer housing 372 of cooking apparatus 100. As shown, cooking chamber door 116 may include a hinge 376 that connects the cooking chamber door 116 to cooking apparatus 100.

Reference is now made to FIGS. 2 and 3. In some embodiments, when cooking chamber door 116 is in the open position, the cooking chamber door 116 may be moved between an extended open position (FIG. 2) and a retracted open position (FIG. 3). In the retracted position (FIG. 3), at least a portion of cooking chamber door 116 (e.g. at least 25% or at least 50% of cooking chamber door 116) may be positioned within a storage recess 380. An advantage of this design is that the retracted open position may reduce the footprint of cooking apparatus 100, and prevent cooking chamber door 116 from being dirtied or damaged while manipulating cooking vessels 160 or cooking receptacles 140.

Storage recess 380 may be positioned on any side of cooking chamber 104. In the illustrated example, storage recess 380 is shown positioned below cooking chamber bottom wall $108_2$. In other embodiments, storage recess 380 may be positioned above cooking chamber upper wall $108_1$, or to the left or right of cooking chamber left and right walls $108_3$ and $108_4$. As shown, storage recess 380 may be substantially parallel to an adjacent cooking chamber sidewall 108. For example, storage recess 380 is shown as a extending substantially horizontally parallel to cooking chamber bottom wall $108_2$.

Cooking chamber door 116 may be movable into storage recess 380 in any manner. In the illustrated embodiment, cooking chamber door 116 is reoriented to parallel with storage recess 380 when moved from the closed position (FIG. 1) to the extended open position (FIG. 2). From the extended open position (FIG. 2), cooking chamber door 116 may be translated rearwards into storage recess 380. As shown, storage recess 380 may include one or more door guides 384 that support cooking chamber door 116 in the open retracted position and guide cooking chamber door 116 into storage recess 380.

In alternative embodiments, cooking chamber door 116 may not have a retracted open position. Accordingly, cooking apparatus 100 may not include a storage recess 380, which may reduce the size of cooking apparatus 100 all else being equal.

Figure 42:
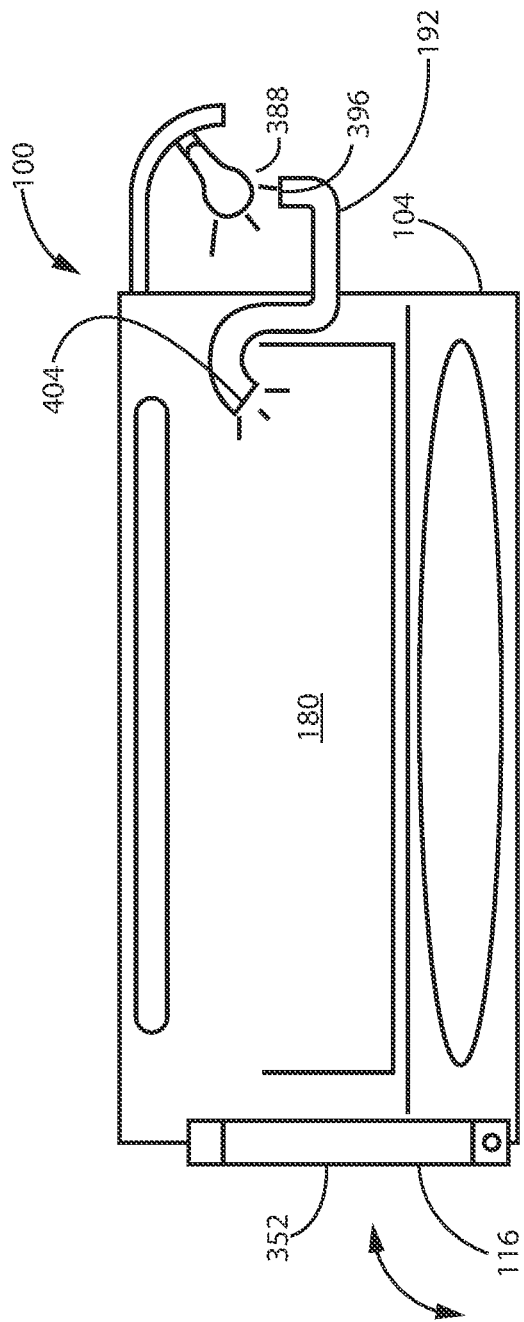

Referring to FIGS. 40-42, cooking apparatus 100 may include one or more lights 388 configured to illuminate one or more cooking zones 180 within cooking chamber 104. An advantage of this design is that the additional illumination can provide better visibility inside cooking chamber 104 to a user peering through transparent portion 352 of cooking chamber door 116.

Light 388 can be any device suitable for illuminating a cooking zone 180. For example, light 388 may include an incandescent light, a halogen light, a compact fluorescent light, an LED light, or another type of light. As shown in FIG. 40, light 388 may be positioned within cooking chamber 104. In this case, light 388 may be heat resistant to at least the rated cooking temperatures inside cooking chamber 104 (e.g. at least 400° F.). In other embodiments, light 388 may be located outside of cooking chamber 104. FIG. 41 illustrates an example of a light 388 positioned outside of cooking chamber 104 and oriented to shine light into cooking chamber 104 through cooking chamber door 116. An advantage of this design is that it allows the use of more conventional, non-heat resistant lights 388, which may be more economical and easier for a consumer to purchase.

Referring to FIG. 42, in some embodiments, light 388 is positioned exterior to cooking chamber 104 and the illumination produced is routed into cooking chamber 104 by a light transmitter 392, such as a light pipe, fiber optics, or glass tube. Light transmitter 392 may extend from a first end 396 located outside of cooking chamber 104 to a second end 404 located inside of cooking chamber 104. First end 396 may be positioned to receive illumination produced by light 388, and second end 404 may be positioned to emit the transmitted light into one or more (or all) cooking zones 180.

Self-Cleaning

Figure 43:
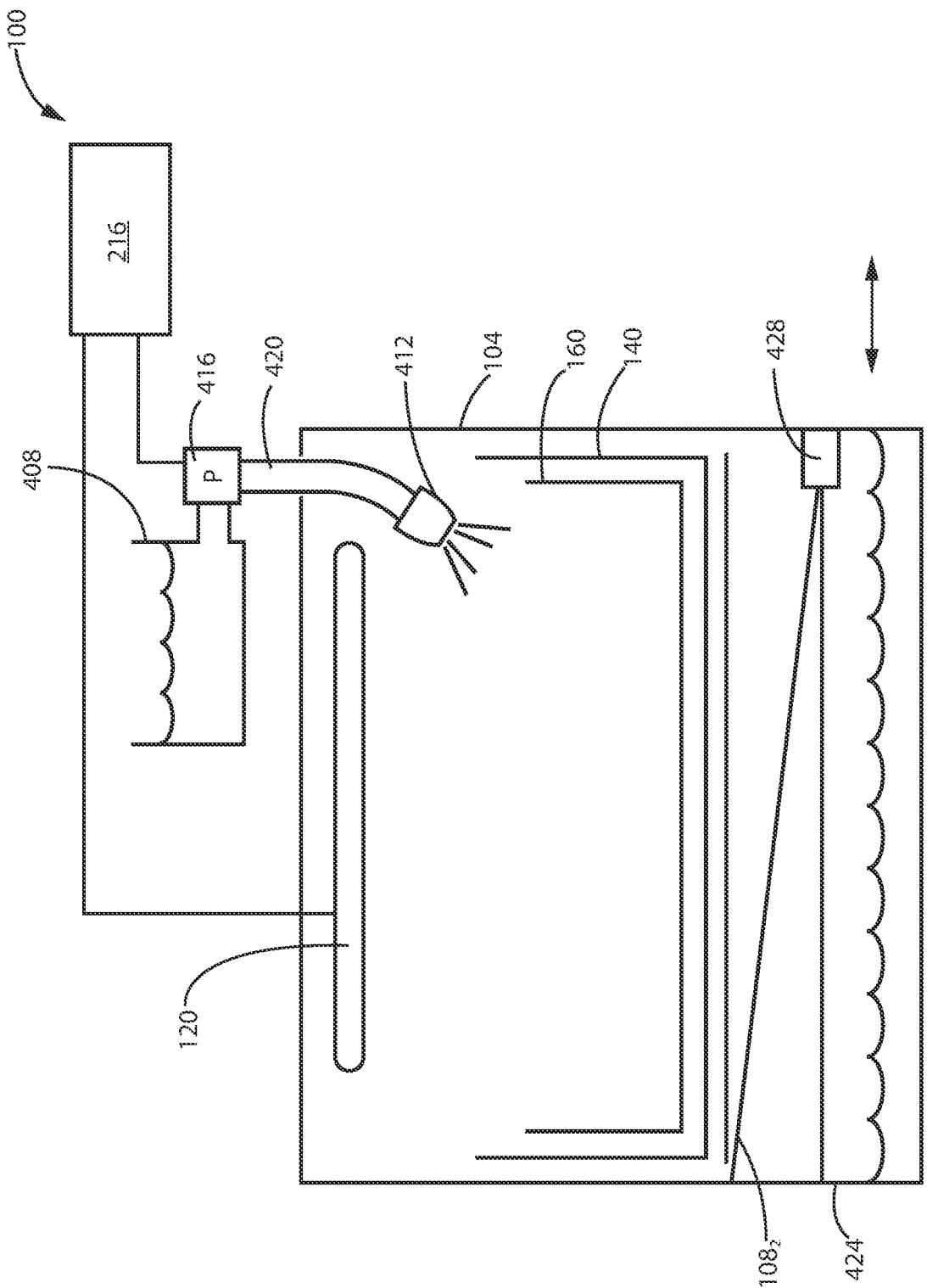
FIG. 43 is a schematic illustration of a cooking apparatus including a self-cleaning function, in accordance with an embodiment.

Reference is now made to FIG. 43. In some embodiments, cooking apparatus 100 may include a self-cleaning function. An advantage of this design is that it can make cleaning cooking apparatus 100 less work for the user. As shown, cooking apparatus may include a liquid reservoir 408, a spray nozzle 412, and a pump 416 in a flow path 420 that extends from the liquid reservoir 408 to the spray nozzle 412. Pump 416 may be communicatively coupled to controller 216, which may signal pump 416 to activate and move liquid from liquid reservoir 408 to nozzle 412 to spray into cooking chamber 104. The liquid may act to remove dirt that has accumulated on the walls of the cooking chamber 104 and/or other components inside cooking chamber 104 (e.g. cooking receptacles 140 and cooking vessels 160).

The features in this section may be used by themselves in any cooking apparatus or in any combination or sub-combination with any other feature or features described herein. For example, the feature of self-cleaning described herein may be used with any of the features of multiple cooking zones, the cooking receptacle and the cooking vessel, subdividable cooking zones, forced convection, steam generation, dynamic energy utilization, door transparency, removable handle, retractable door, cooking additive distribution, insulation and air cooling, heating ducts, common motor drive, smoke and/or odor control, reorientation and expansion, vertical cooking, toaster, heat storage members, and other features described herein.

Liquid reservoir 408 may hold any liquid suitable for cleaning food-based accumulations (e.g. burnt or dehydrated food particles, oil residue, or other food matter) within cooking chamber 104. For example, liquid reservoir 408 may store water, detergent, or a mixture of water and detergent. Spray nozzle 412 may be any device suitable to distribute liquid drawn by pump 416 onto the surfaces inside cooking chamber 104. In some embodiments, cooking apparatus 100 includes a plurality of spray nozzles 412 that receive liquid from liquid reservoir 408 (e.g. via pump 416 or another pump) to provide more complete coverage over the surfaces within cooking chamber 104.

After making contact with the surfaces within cooking chamber 104, the sprayed liquid may be collected in a disposal container 424. For example, cooking chamber bottom wall 108₂ may be sloped to direct accumulated liquid by gravity into an outlet port 428 into disposal container 424. Disposal container 424 may be removable from cooking apparatus 100 so that the collected dirty liquid can be discarded (e.g. into a drain). Outlet port 428 of disposal container 424 may be closeable so that the dirty liquid does not spill while carrying disposal container 424.

In some embodiments, controller 216 may be operable to execute a cleaning program. The cleaning program may be stored in memory within controller 216, and may include instructions that configure controller 216 to activate pump 416 to deliver liquid to spray nozzle 412 to spray into cooking chamber 104. In some embodiments, the cleaning program may also include powering heating element(s) 120 to heat cooking chamber 104 (e.g. to a predetermined cleaning temperature). Depending on the composition of the cleaning liquid, the heating may improve the cleaning efficiency of the cleaning liquid.

Cooking Additive

Figure 44:
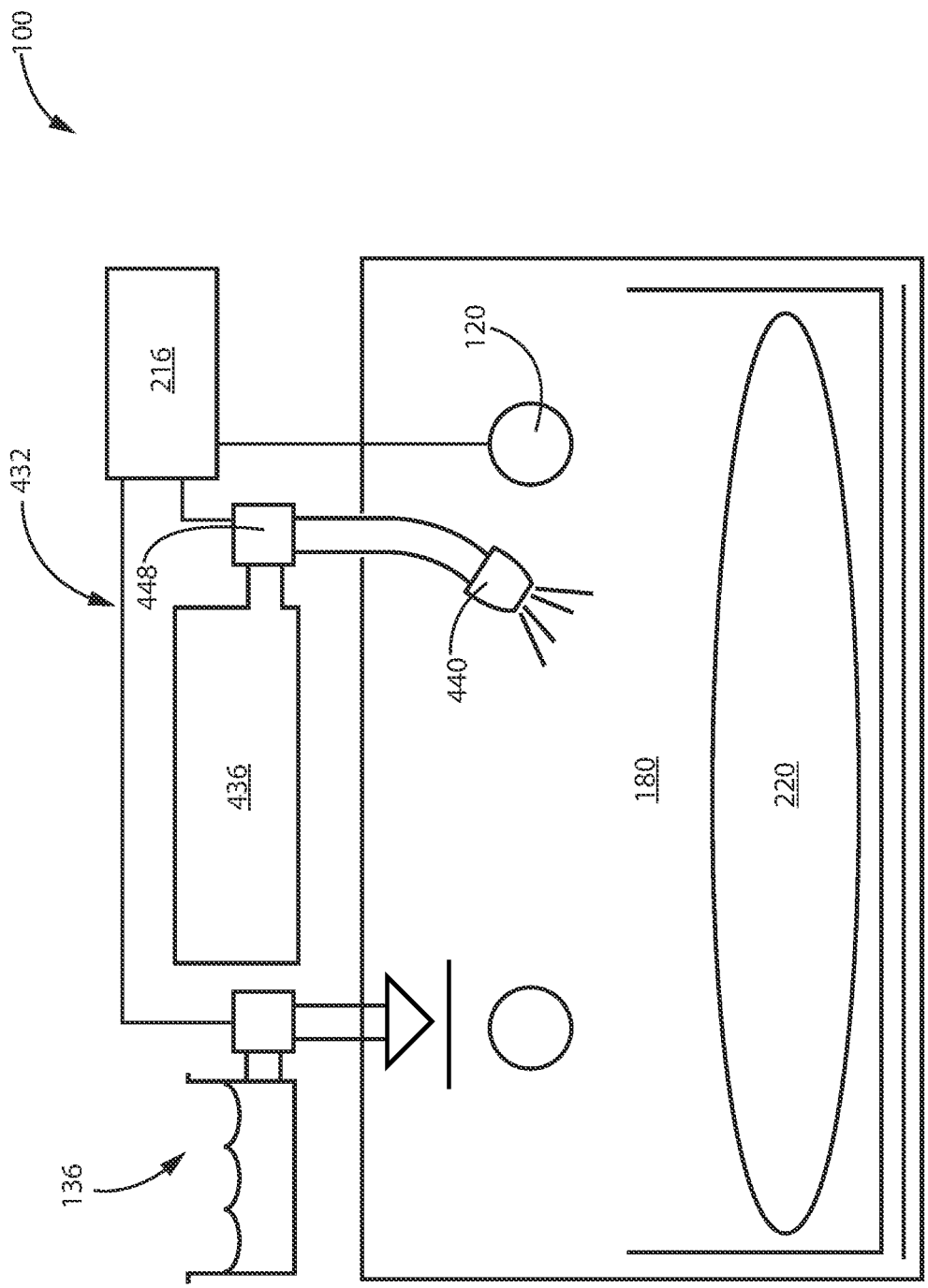
FIG. 44 is a schematic illustration of a cooking apparatus including a cooking additive distributor in accordance with an embodiment.

Reference is now made to FIG. 44. In some embodiments, cooking apparatus 100 may include a cooking additive distributor 432. Cooking additive distributor 432 may be any device operable to distribute cooking additive onto food 220 within a cooking zone 180. Cooking additive may be any human editable substance and may be liquid (e.g. cooking oil, stock, or wine), or solid (e.g. dried spices or herbs, natural or artificial, which may be flaked or powdered). An advantage of this design is that it can automate the addition of cooking additives to food at the start, finish, or intermediate portion of a cooking cycle, thereby relieving the user of taking this action. Moreover, the addition of cooking additives may take place without opening cooking zone 180 (i.e. without opening the cooking chamber door) for user access to food 220, and therefore without venting the hot and/or humid atmosphere within cooking zone 180.

The features in this section may be used by themselves in any cooking apparatus or in any combination or sub-combination with any other feature or features described herein. For example, the feature of cooking additive distribution described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, insulation and air cooling, heating ducts, common motor drive, smoke and/or odor control, reorientation and expansion, vertical cooking, toaster, heat storage members, and other features described herein.

As shown, cooking additive distributor 432 may include one or more (i.e. one or multiple) additive reservoirs 436, which may be connected to one or more additive spray nozzles 440 by way of one or more conduits 444. A conveyor 448 may be positioned in the additive flow path between additive reservoir 436 and additive spray nozzle 440 to force or admit (e.g. by gravity) additive from additive reservoir 436 to discharge from spray nozzle 440.

Additive conveyor 448 may be any device suitable for forcing or admitting additive from additive reservoir 436 to discharge from spray nozzle 440. In some embodiments, additive conveyor 448 may include a pump (e.g. for liquid additive), a blower (e.g. for powdered conveyor), a belt conveyor (e.g. for larger solids), or a valve (e.g. for gravity feeding flowable additives) for example.

Still referring to FIG. 44, controller 216 may be communicatively coupled to cooking additive distributor 432 for directing the timing and quantities of additive to be introduced into the cooking zone 180, according to a cooking program (e.g. stored in memory of the controller 216). In one example, controller 216 may have a cooking program for making cooked French fries from raw, fresh (i.e. not frozen), sliced potato sticks 220. The cooking program may include:
  i. activating steam generator 136 for a duration (e.g. 1 to 15 minutes) sufficient to par-cook the potato sticks 220,
  ii. deactivating steam generator 136,
  iii. activating cooking additive distributor 432 to spray coat the potato sticks 220 with cooking oil (e.g. vegetable oil),
  iv. deactivating cooking additive distributor 432, and
  v. activating heating elements 120 (e.g. infra-red heating elements) to cook the potato sticks 220 until the potato sticks 220 are golden brown French fries (e.g. for a predetermined time period, such as 1 to 45 minutes).

Insulation and Air Cooling

Figure 45:
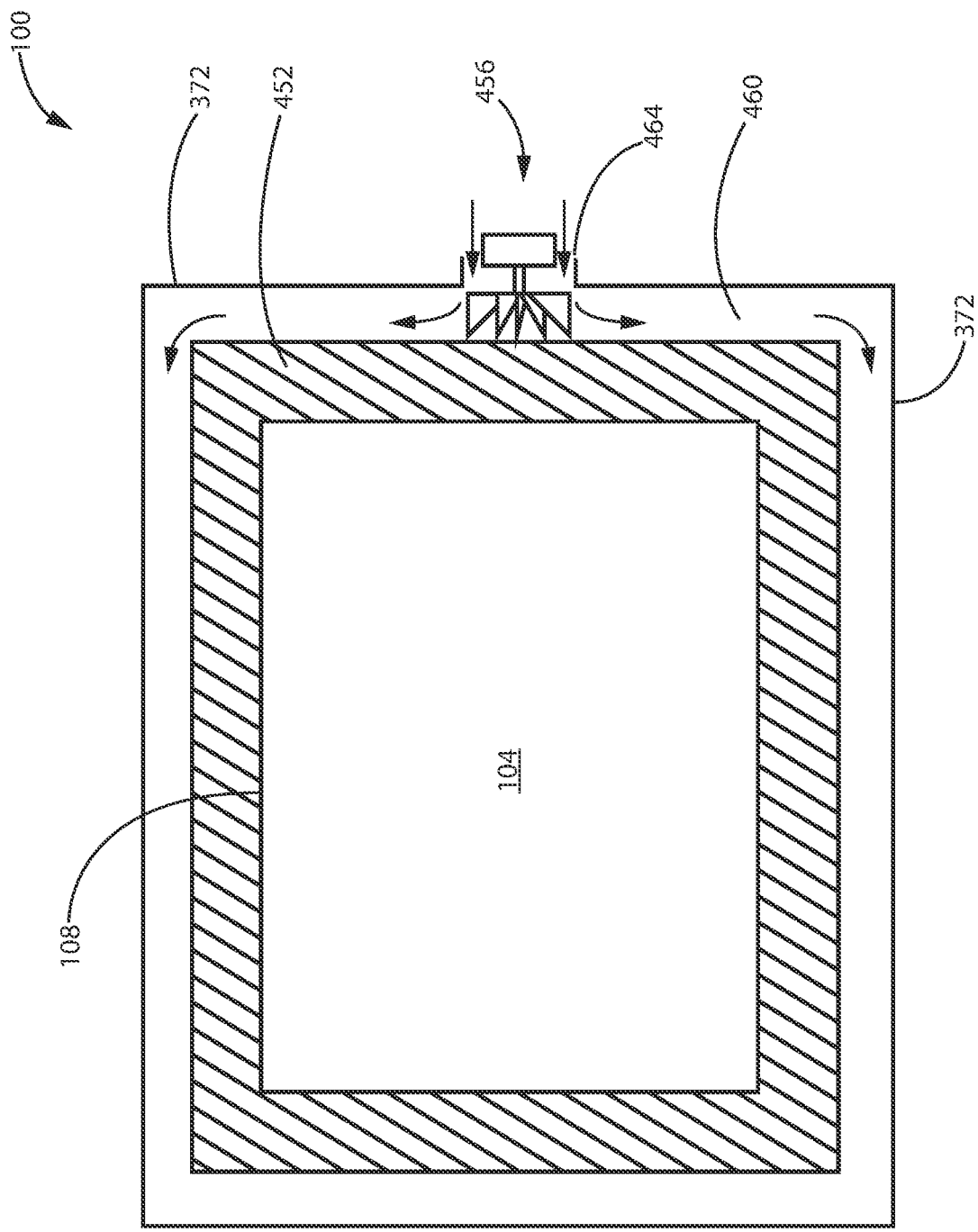
FIG. 45 is a schematic illustration of a cooking apparatus including a cooling fan in accordance with an embodiment.

Reference is now made to FIG. 45. In some embodiments, cooking apparatus 100 may have insulation 452 surrounding at least a portion (e.g. at least 50%, or at least 70%) of cooking chamber 104. An advantage of this design is that it can reduce heat loss through cooking chamber sidewalls 108, whereby more heat is retained within cooking chamber 104, and less power is required (e.g. to power cooking devices, such as air movers, steam generators, and heating elements) to replace the lost heat. Consequently, cooking apparatus 100 (which may be a counter top, portable cooking appliance which has an electrical plug for insertion into a household electrical outlet) may operate more energy efficiently, and may be capable of increasing the temperature within cooking chamber 104 more rapidly, all else being equal. Another advantage of this design is that it can help keep outer housing 372 (also referred as 'outer shell' 372) cooler so that outer housing 372 may be safe to touch.

The features in this section may be used by themselves in any cooking apparatus or in any combination or sub-combination with any other feature or features described herein. For example, the features of insulation and air cooling described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, heating ducts, common motor drive, smoke and/or odor control, reorientation and expansion, vertical cooking, toaster, heat storage members, and other features described herein.

Insulation 452 may be any heat insulating material, such as for example a vacuum insulated panel, silica aerogel, polyurethane (e.g. rigid panel or spray foam), polystyrene, or fiberglass matting. Preferably, insulation 452 has an insulation property of at least R-5. As shown, insulation 452 may be laid between cooking chamber sidewalls 108 and appliance outer shell 372.

Still referring to FIG. 45, in some embodiments cooking apparatus 100 may include a cooling fan 456 positioned to introduce ambient air (i.e. air external to cooking apparatus 100) into a space between cooking chamber 104 (which may form an inner shell) and appliance outer shell 372. For example, cooling fan 456 may be positioned to blow air through vacant space 460 between insulation 452 and appliance outer shell 372. The circulating ambient air may help to cool the appliance outer shell 372 making the appliance outer shell 372 safer to touch during cooking. In the illustrated example, cooling fan 456 is positioned adjacent an air opening 464 (also referred to as cooling air inlet 464) in appliance outer shell 372 through which cooling fan 456 draws air into vacant space 460. In other embodiments, the fan may be positioned between insulation 452 and appliance outer shell 372 or at an exhaust air outlet.

Figure 66:
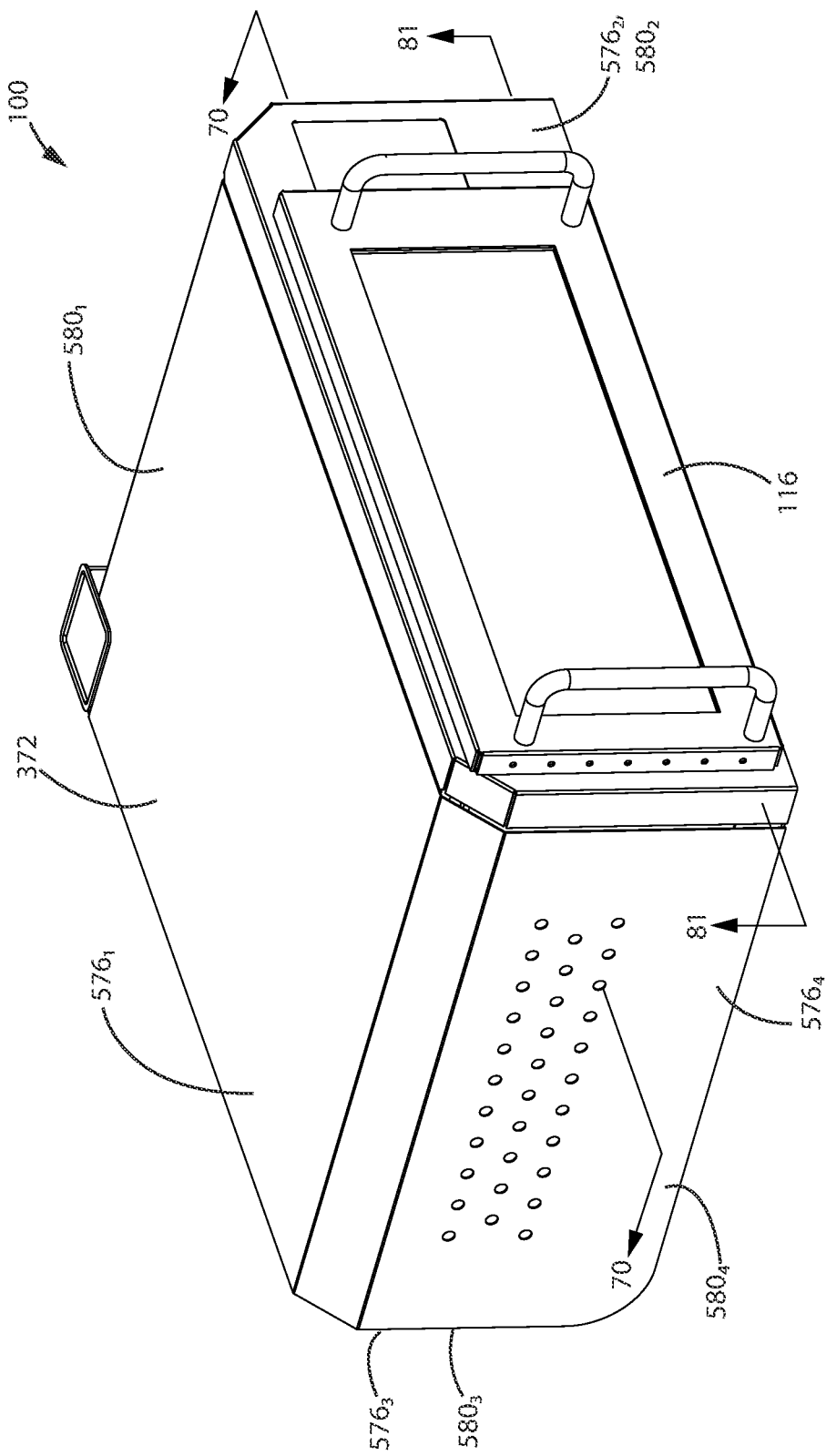
FIG. 66 is a perspective view of a cooking apparatus in accordance with another embodiment.
Figure 67:
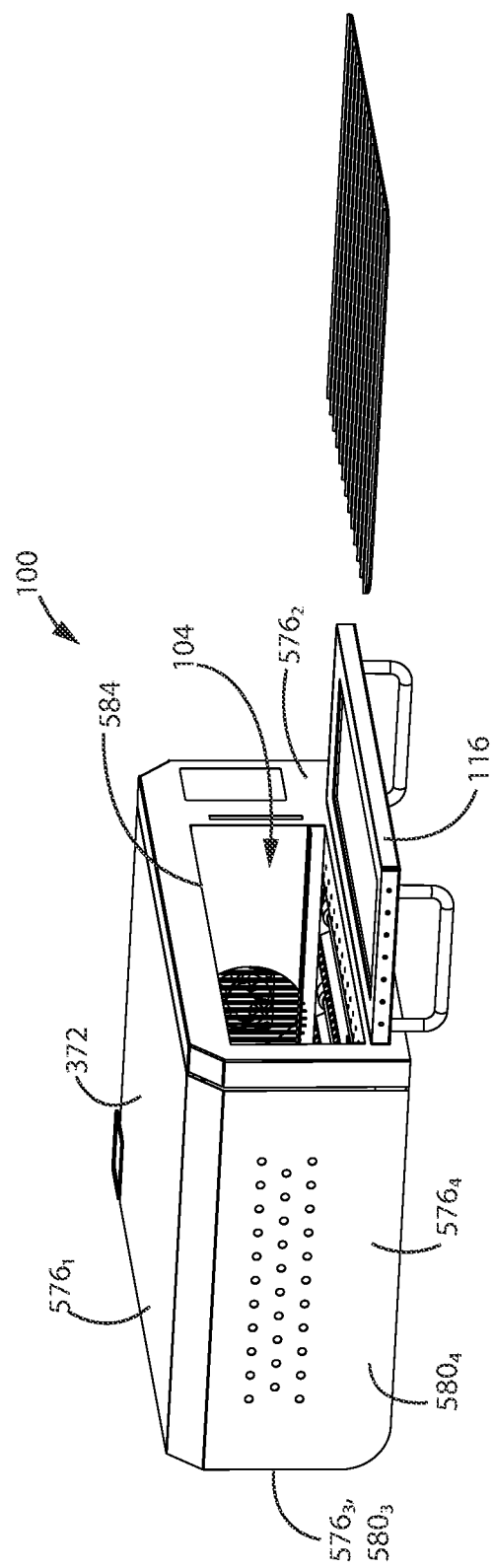
FIG. 67 is a perspective view of the cooking apparatus of FIG. 66 with a cooking chamber door opened and wire rack removed.
Figure 68:
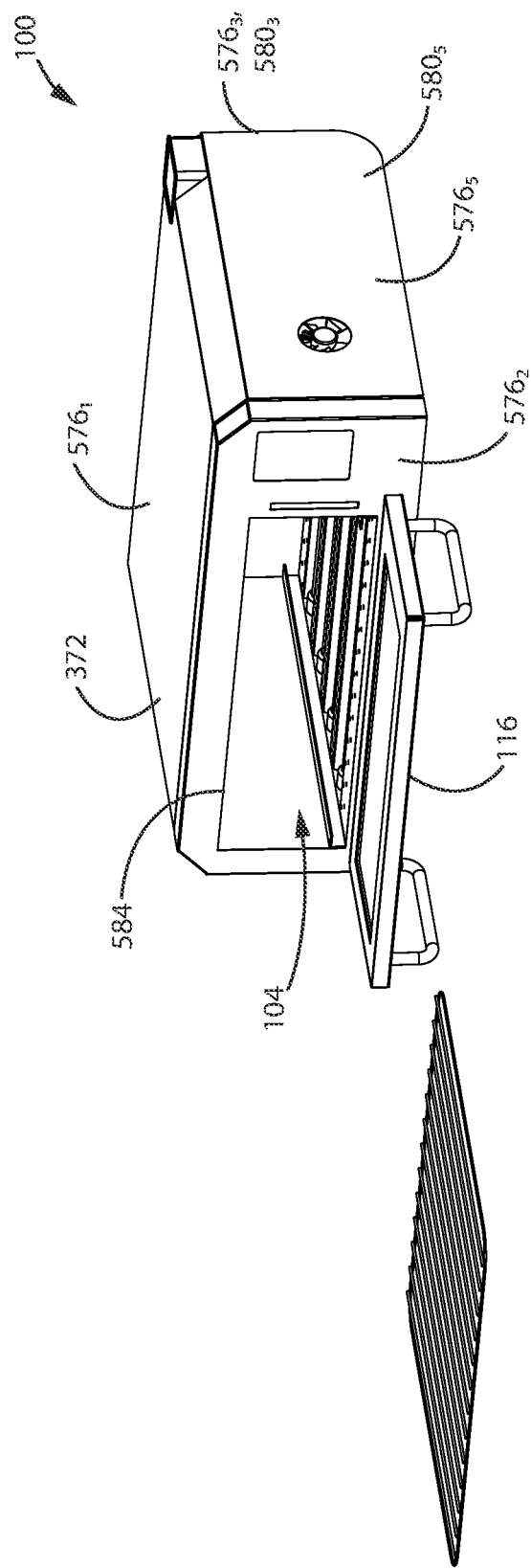
FIG. 68 is another perspective view of the cooking apparatus of FIG. 66 with the cooking chamber door and wire rack removed.

FIGS. 66-68 show a cooking apparatus 100 in accordance with an embodiment. As shown, cooking apparatus 100 may include an outer shell 372 having outer shell sides 576. Outer shell sides 576 may include a top $576_1$, a front $576_2$, a rear $576_3$, and transversely opposed sides $576_4$ and $576_5$. Outer shell sides 576 may be defined by one or more panels 580. For example, outer shell 372 may include one or more (or all) of a top panel $580_1$, a front panel $580_2$, a rear panel $580_3$, and transversely opposed side panels $580_4$ and $580_5$. One or more of shell sides 576 may include an opening 584 to cooking chamber 104 that can be opened and closed by moving a cooking chamber door 116.

Figure 69:
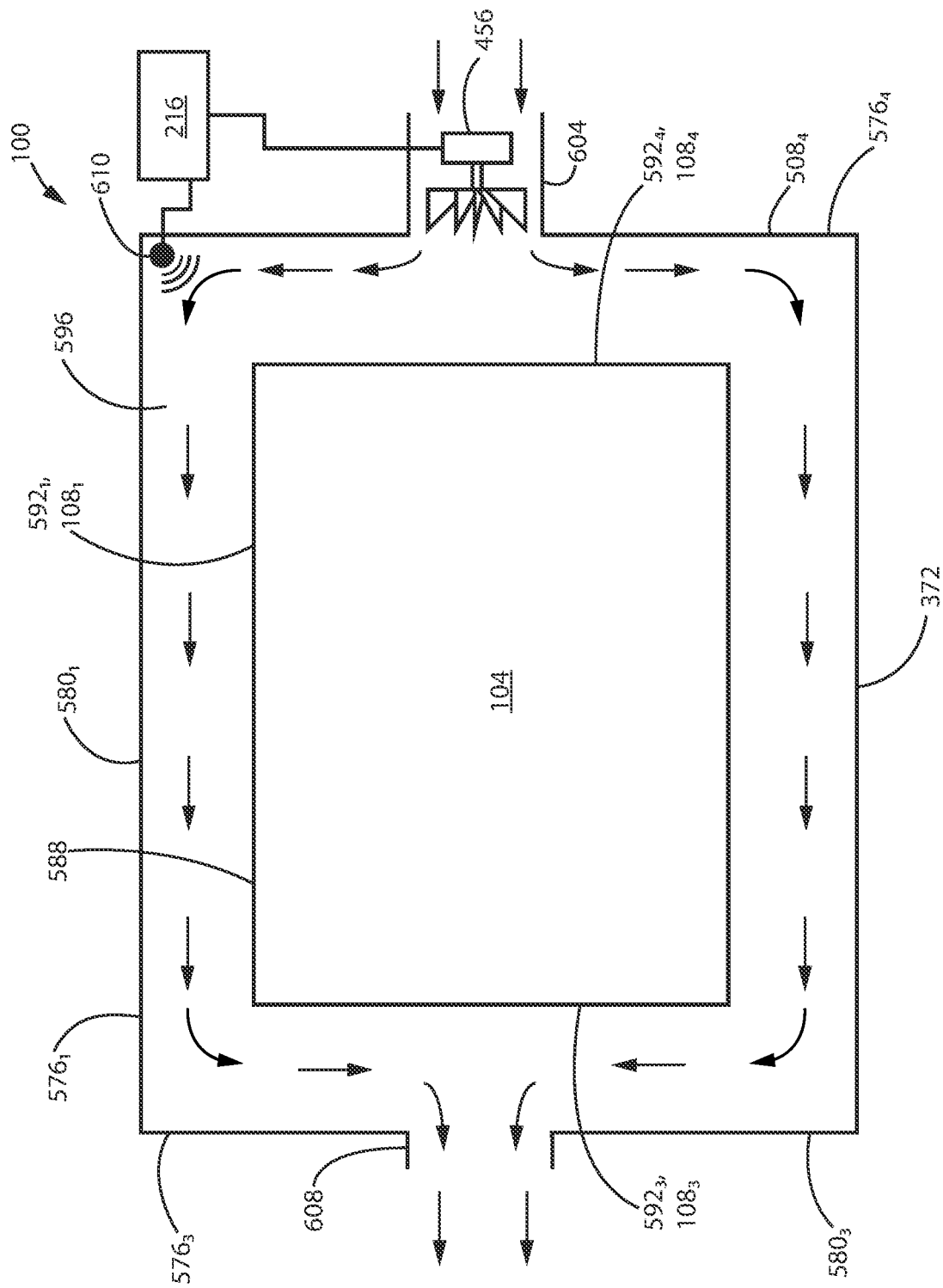
FIG. 69 is a schematic illustration of a cooking apparatus in accordance with an embodiment.
Figure 70:
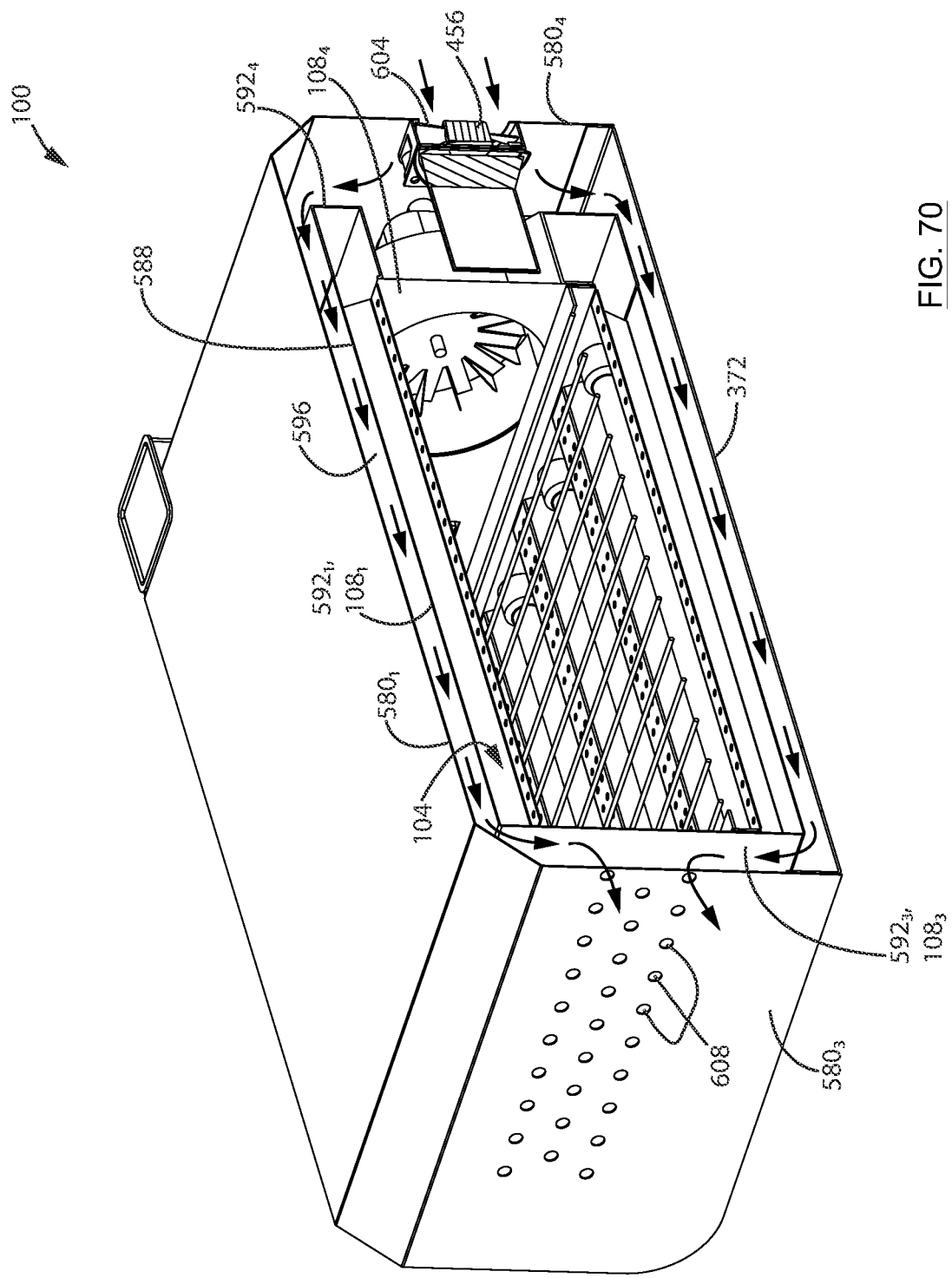
FIG. 70 is a cross-sectional view taken along line 70-70 in FIG. 66 in accordance with an embodiment.

Turning to FIGS. 69-70, cooking apparatus 100 may include an inner shell 588. Inner shell 588 may include inner shell panels 592 including one or more (or all) of a top panel $592_1$, a rear panel $592_2$, and transversely opposed side panels $592_3$ and $592_4$. One or more (or all) of inner shell panels 592 may be provided by a cooking chamber sidewall 108, or all of inner shell panels 592 may be discrete from cooking chamber sidewalls 108. In the schematic illustration of FIG. 69, all of inner shell panels 592 are provided by cooking chamber sidewalls 108. In the example embodiment of FIG. 70, a subset of inner shell panels 592 (e.g. top panel $592_1$ and one side panel $592_3$) is provided by cooking chamber sidewalls 108 (e.g. top wall $108_1$, and left side wall $108_3$), and at least one inner shell panel 592 (e.g. side panel $592_4$) is discrete from cooking chamber sidewalls 108 (e.g. discrete from right side wall $108_4$).

Still referring to FIGS. 69-70, inner shell 588 may be spaced from and facing at least a portion of (e.g. some or all of) outer shell 372. For example, one or more (or all) of inner shell panels 592 may be spaced from and facing a corresponding outer shell panel 580. In the illustrated embodiment, outer shell top and side panels $580_1$, $580_3$, $580_4$, are shown spaced from and facing corresponding inner shell top and side panels $592_1$, $592_3$, $592_4$ respectively.

An air flow passage 596 may be defined in the space 460 between inner and outer shells 588, 372. As shown, air flow passage 596 may extend from a cooling air inlet 604 to an exhaust outlet 608. A cooling fan assembly 456 may be positioned to move ambient air (i.e. air external to cooking apparatus 100) into air flow passage 596 through cooling air inlet 604, and out of air flow passage 596 through exhaust outlet 608. The cool ambient air flowing through air flow passage 596 may help reduce the temperature of outer shell 372, which may make outer shell 372 safe for users to touch.

Figure 71:
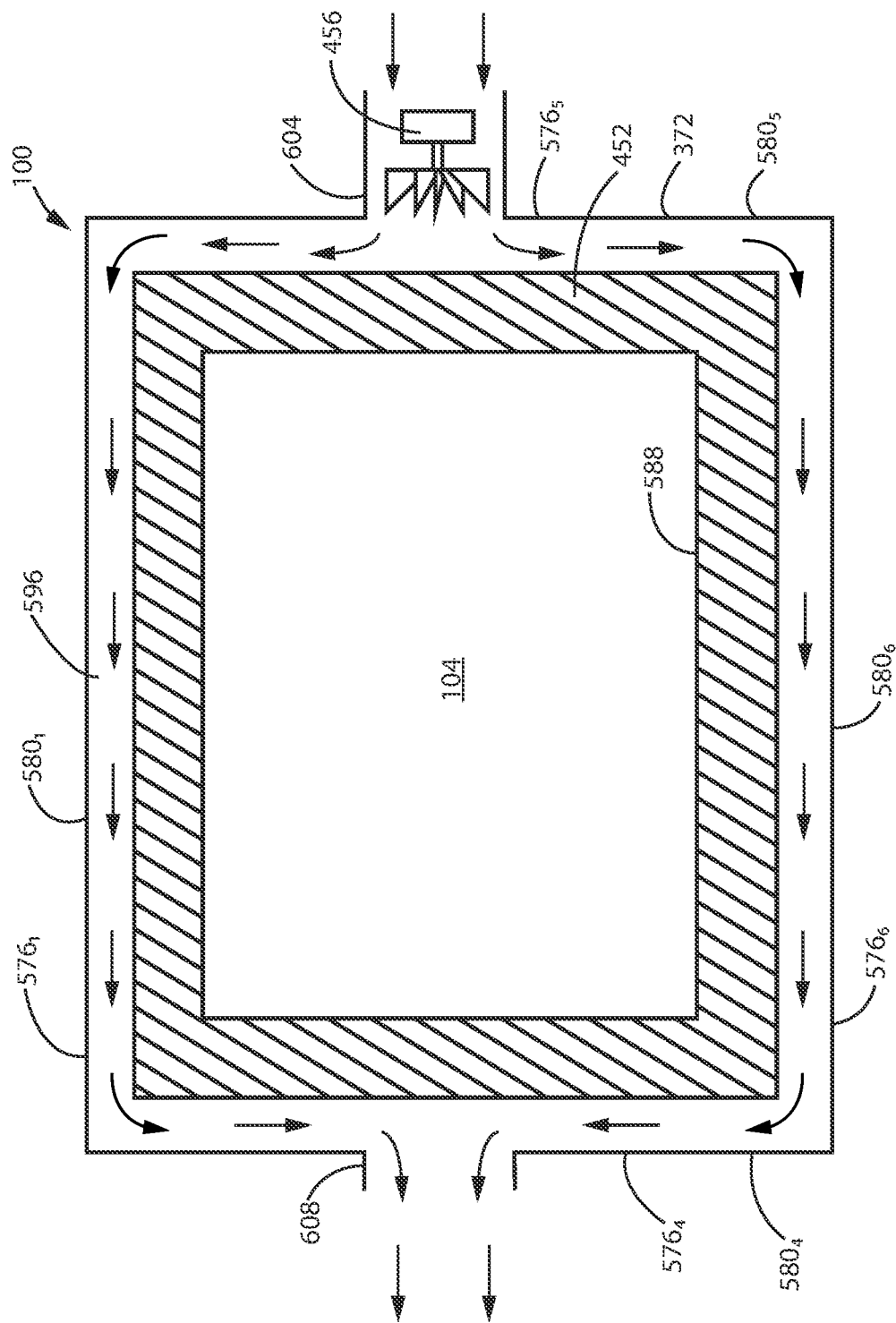
FIG. 71 is a schematic illustration of a cooking apparatus in accordance with an embodiment.
Figure 72:
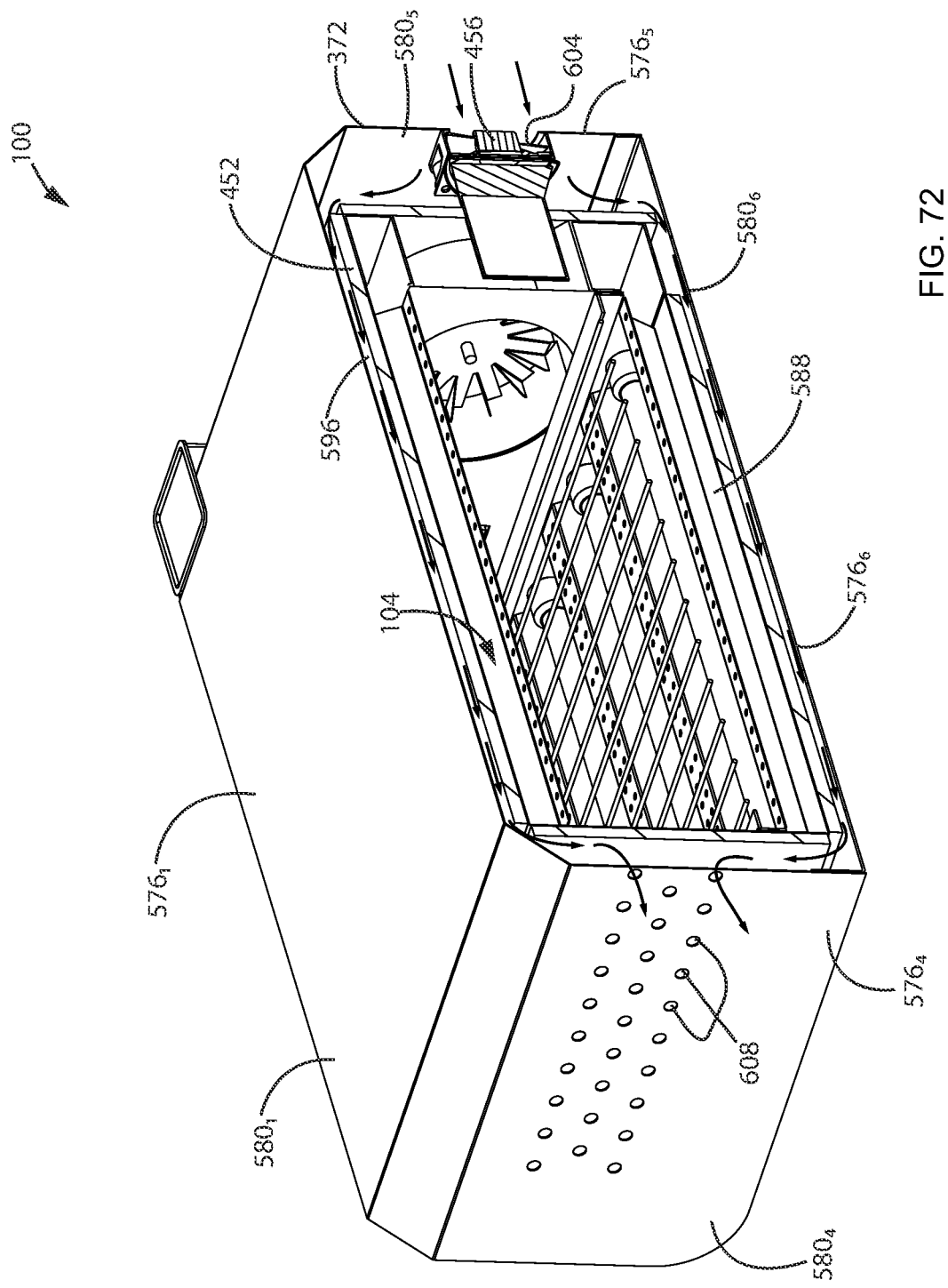
FIG. 72 is a cross-sectional view taken along line 70-70 in FIG. 66 in accordance with another embodiment.

As shown, cooking chamber 104 may be isolated from air flow communication with air flow passage 596. This may mitigate the ambient air flow cooling cooking chamber 104 during a cooking cycle. In the illustrated embodiment, air flow passage 596 is bounded by (e.g. in contact with) inner shell 588. FIGS. 71-72 show an alternative embodiment including optional insulation 452 between inner and outer shells 588, 372. Insulation 452 may overlie at least a portion of one or both of inner shell 588 and outer shell 372. In the illustrated embodiment, insulation 452 is shown overlying inner shell 588, whereby air flow passage 596 extends between outer shell 372 and insulation 452. In this configuration, insulation 452 may reduce heat loss from cooking chamber 104 to the cooling air flow within passage 596. It will be appreciated that the insulation may be adjacent the inner shell and/or the outer shell.

Figure 73:
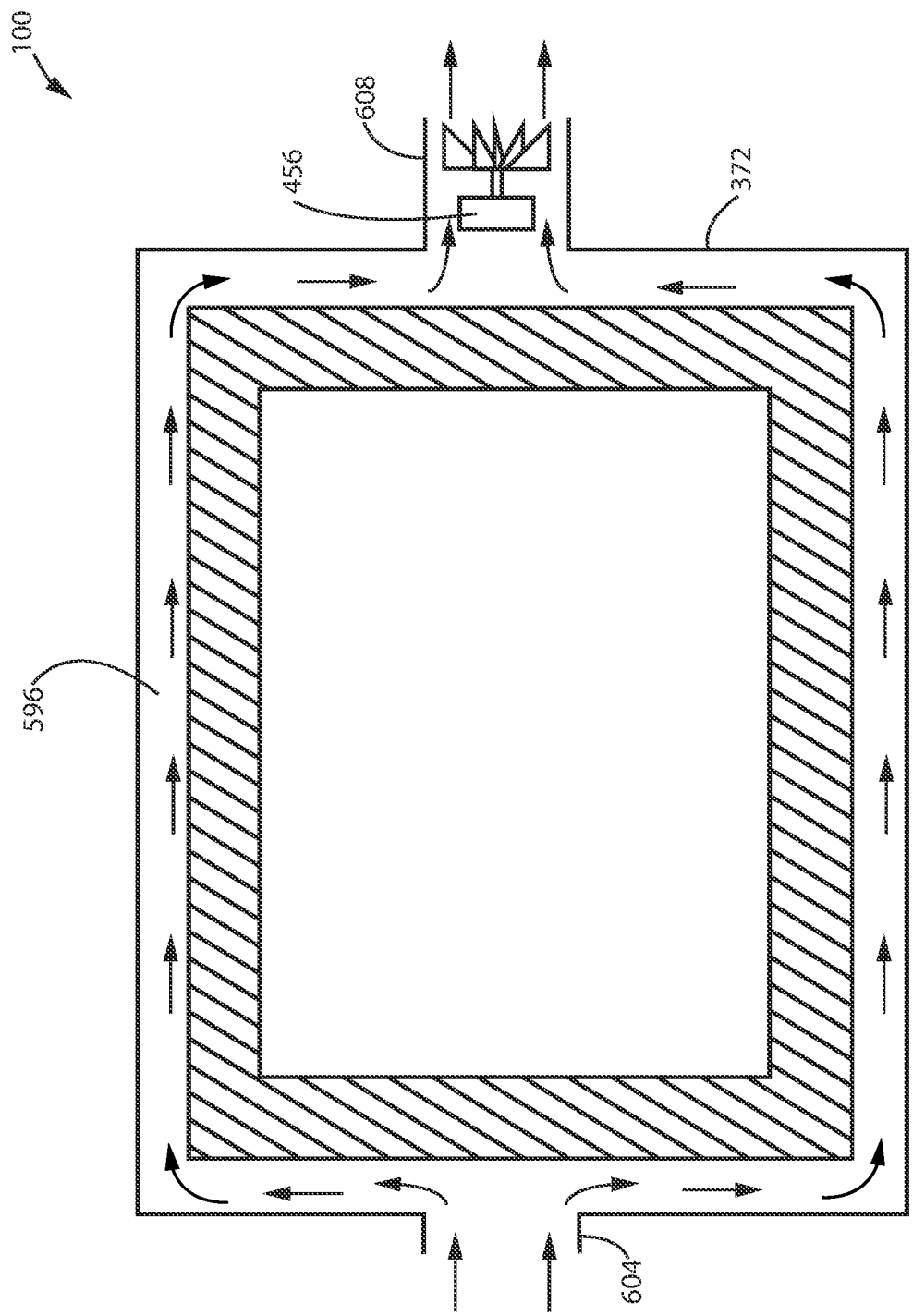
FIG. 73 is a schematic illustration of a cooking apparatus in accordance with an embodiment.
Figure 74:
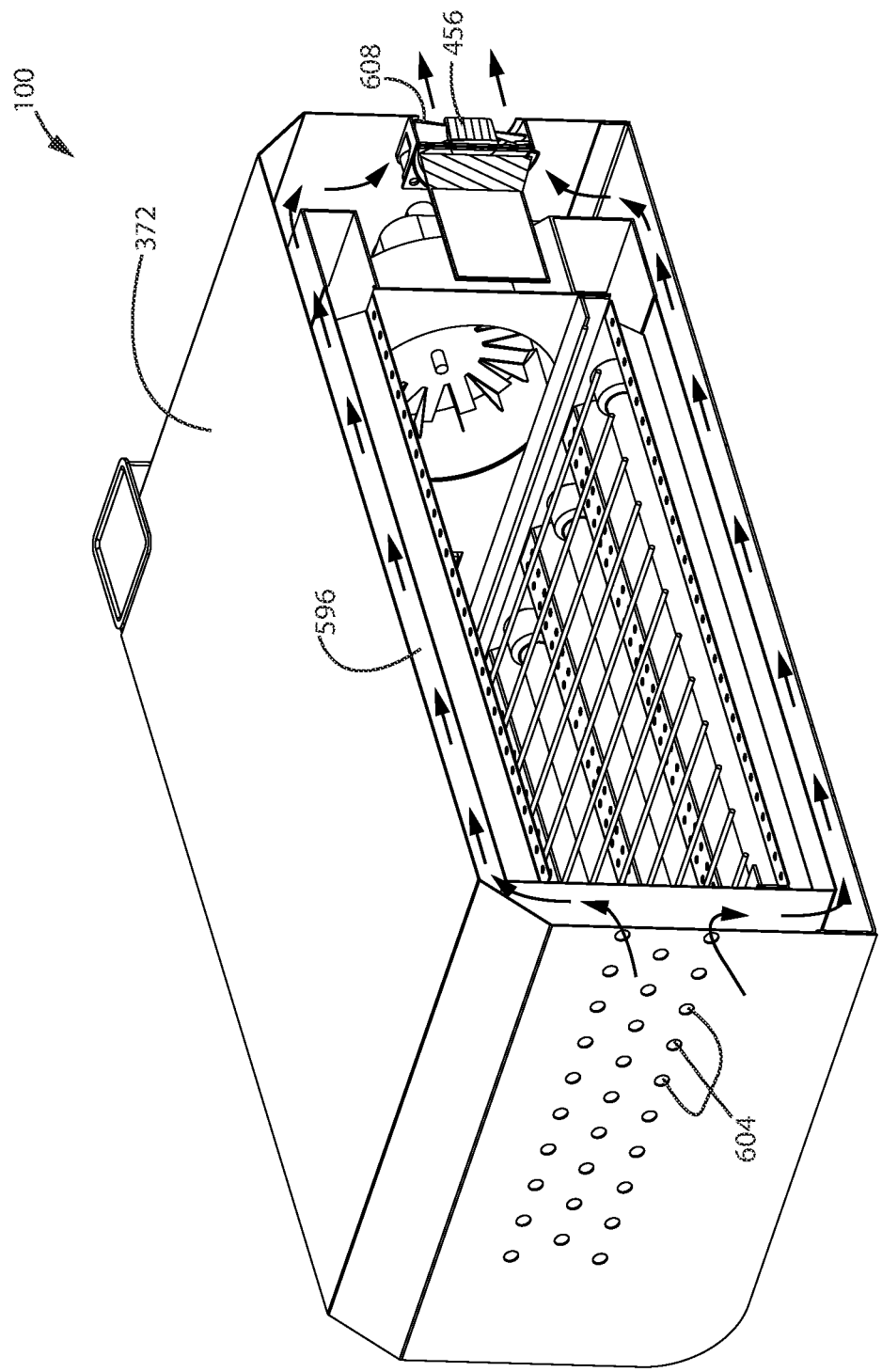
FIG. 74 is a cross-sectional view taken along line 70-70 in FIG. 66 in accordance with another embodiment.

Still referring to FIGS. 71-72, cooling fan assembly 456 may be located anywhere that allows cooling fan assembly 456 when activated to move air within air flow passage 596 from cooling air inlet 604 to exhaust outlet 608. For example, cooling fan assembly 456 may be located internal to air flow passage 596 as shown, or external to air flow passage 596. FIGS. 69-72 show examples in which cooling fan assembly 456 is located at cooling air inlet 604. This may reduce hot air exposure to cooling fan assembly 456 as compared with positioning cooling fan assembly 456 at exhaust outlet 608 where the air flow is hottest. FIGS. 73-74 show alternative embodiments in which cooling fan assembly 456 is located at exhaust outlet 608. This may help to blow hot air exiting exhaust outlet 608 farther from outer shell 372, which may mitigate the exhausted hot air accumulating around outer shell 372 where it can burn users.

Figure 75:
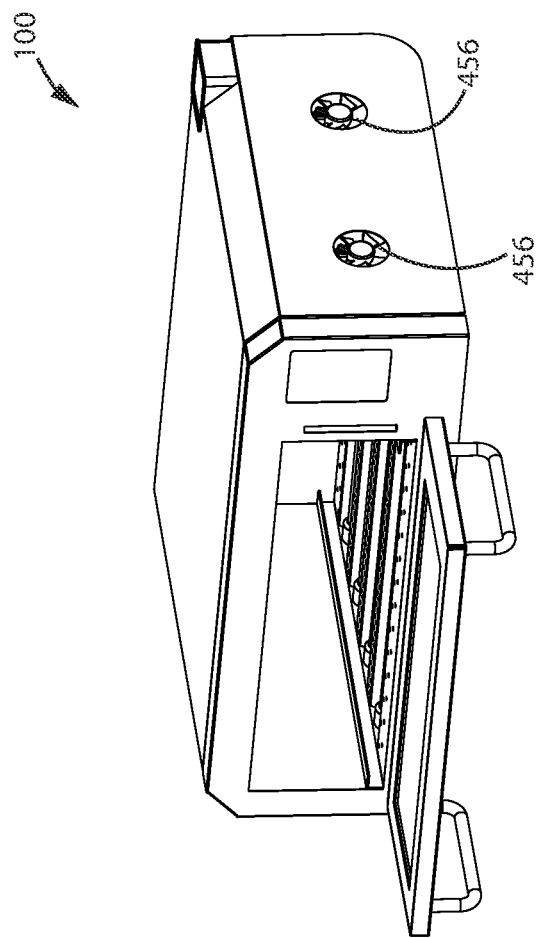
FIG. 75 is a perspective view of the cooking apparatus of FIG. 66 in accordance with another embodiment.

In alternative embodiments, cooling fan assembly 456 may be located within air flow passage 596 between cooling air inlet 604 and exhaust outlet 608. In some embodiments, cooking apparatus 100 includes two or more cooling fan assemblies 456. For example, cooking apparatus 100 may include one cooling fan assembly 456 at cooling air inlet 604 and one cooling fan assembly 456 at exhaust outlet 608. FIG. 75 shows an embodiment in which cooling fan assembly 456 includes at least two fan assemblies 456, both of which are located at a cooling air inlet or outlet (e.g. depending on the configured flow direction of the fan assemblies 456). This may provide greater cooling capacity (e.g. cooling airflow rates) without adding substantially to the size (e.g. outside dimensions) of cooking apparatus 100.

Referring to FIGS. 71-72, cooling air inlet 604 and exhaust outlet 608 may be positioned anywhere on outer shell 372. For example, cooling air inlet 604 and exhaust outlet 608 may be located at opposed sides 576 (e.g. opposed panels 580) of outer shell 372. This may allow the air flow passage 556 which extends from cooling air inlet 604 to exhaust outlet 608 to provide cooling for several sides 576 (e.g. panels 580) of outer shell 372. Moreover, this may provide separation between cooling air inlet 604 and exhaust outlet 608, which may mitigate cooling air inlet 604 recirculating hot air discharged from exhaust outlet 608.

In the illustrated embodiment, cooling air inlet 604 is located at one outer shell side $576_5$ (e.g. outer shell panel $580_5$), and exhaust outlet 608 is located at a transversely opposed outer shell side $576_4$ (e.g. outer shell panel $580_4$). As shown, air flow passage 596 may extend over (and thereby provide cooling for) transversely opposed outer shell sides $576_4$, $576_5$ (e.g. outer shell panels $580_4$, $580_5$) and outer shell top side $576_1$ (e.g. outer shell top panel $580_1$). In use, transversely opposed sides $576_4$, $576_5$, and top side $576_1$ may be the most commonly exposed to user contact, and therefore obtain the greatest benefit from forced air cooling. In some embodiments, air flow passage 596 may also extend along outer shell lower side $576_6$ (e.g. outer shell lower panel $580_6$) as shown. This may mitigate heat damage to a counter-top surface on which cooking apparatus 100 is supported.

Figure 76:
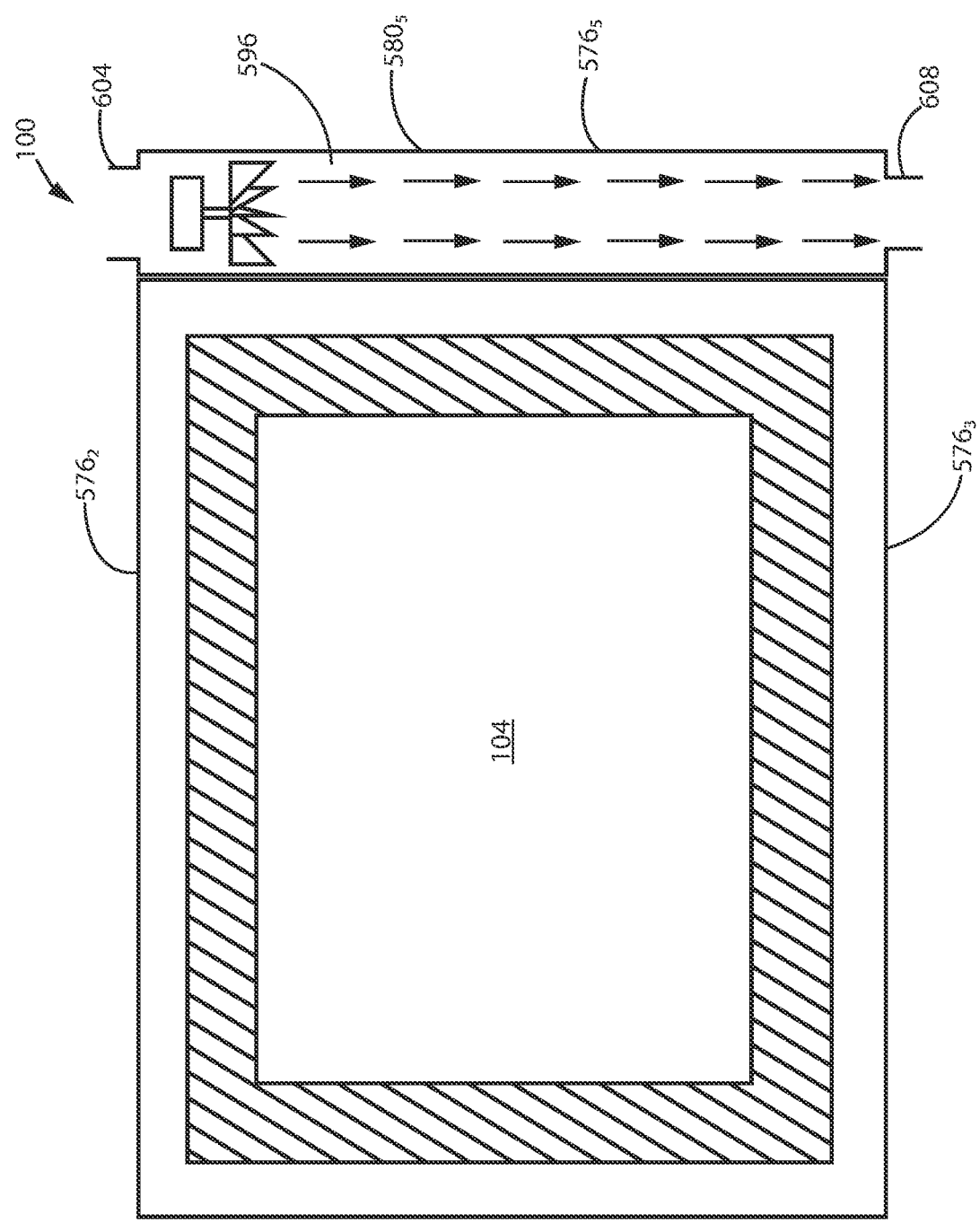
FIG. 76 is a schematic illustration of a cooking apparatus in accordance with an embodiment.
Figure 77:
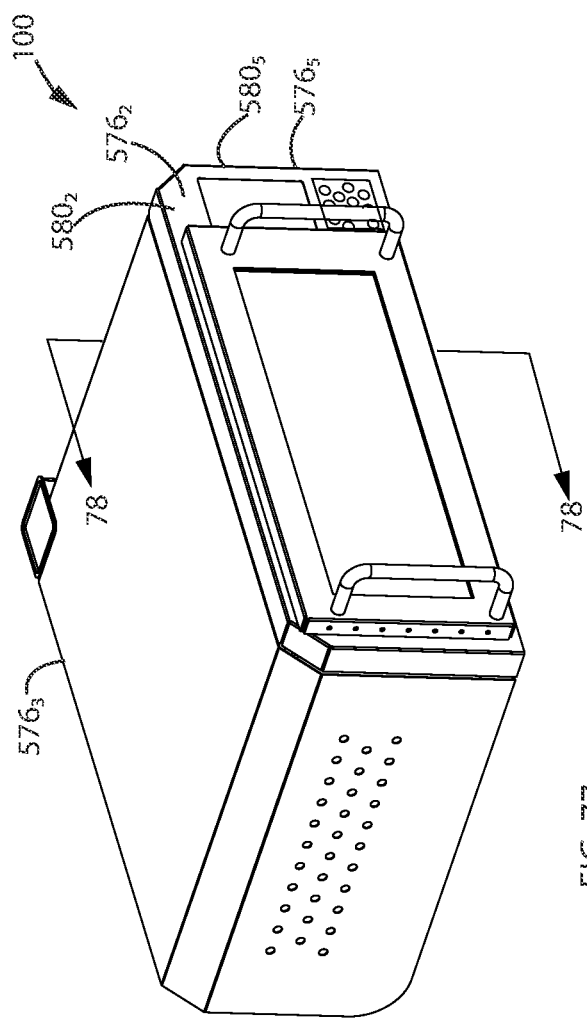
FIG. 77 is a perspective view of a cooking apparatus in accordance with an embodiment.
Figure 78:
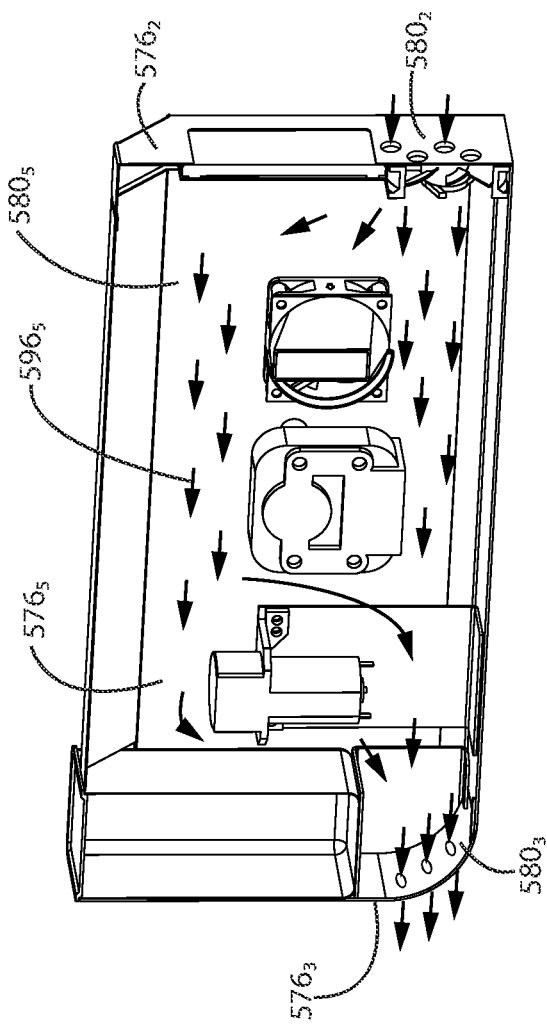
FIG. 78 is a cross-sectional view taken along line 78-78 in FIG. 77.

Referring to FIGS. 76-78, in some embodiments a cooling air flow passage 596 extends primarily (e.g. exclusively) along one outer shell side 576 (e.g. one outer shell panel 580). There may be one or many such cooling air flow passages 596 extending along different outer shell sides 576. One or more cooling fan assembly 456 may be associated with each such air flow passage 596. This may allow the cooling provided by each cooling air flow passage 596 to different outer shell sides 576 to be individually controlled. In the illustrated example, an air flow passage 596 is shown extending primarily along outer shell side $576_5$ between front side $576_1$ and rear side $576_3$. As shown, the cooling air inlet 604 and exhaust outlet 608 may be provided in the front and rear sides $576_2$, $576_3$ (e.g. front and rear panels $580_2$, $580_3$).

Figure 79:
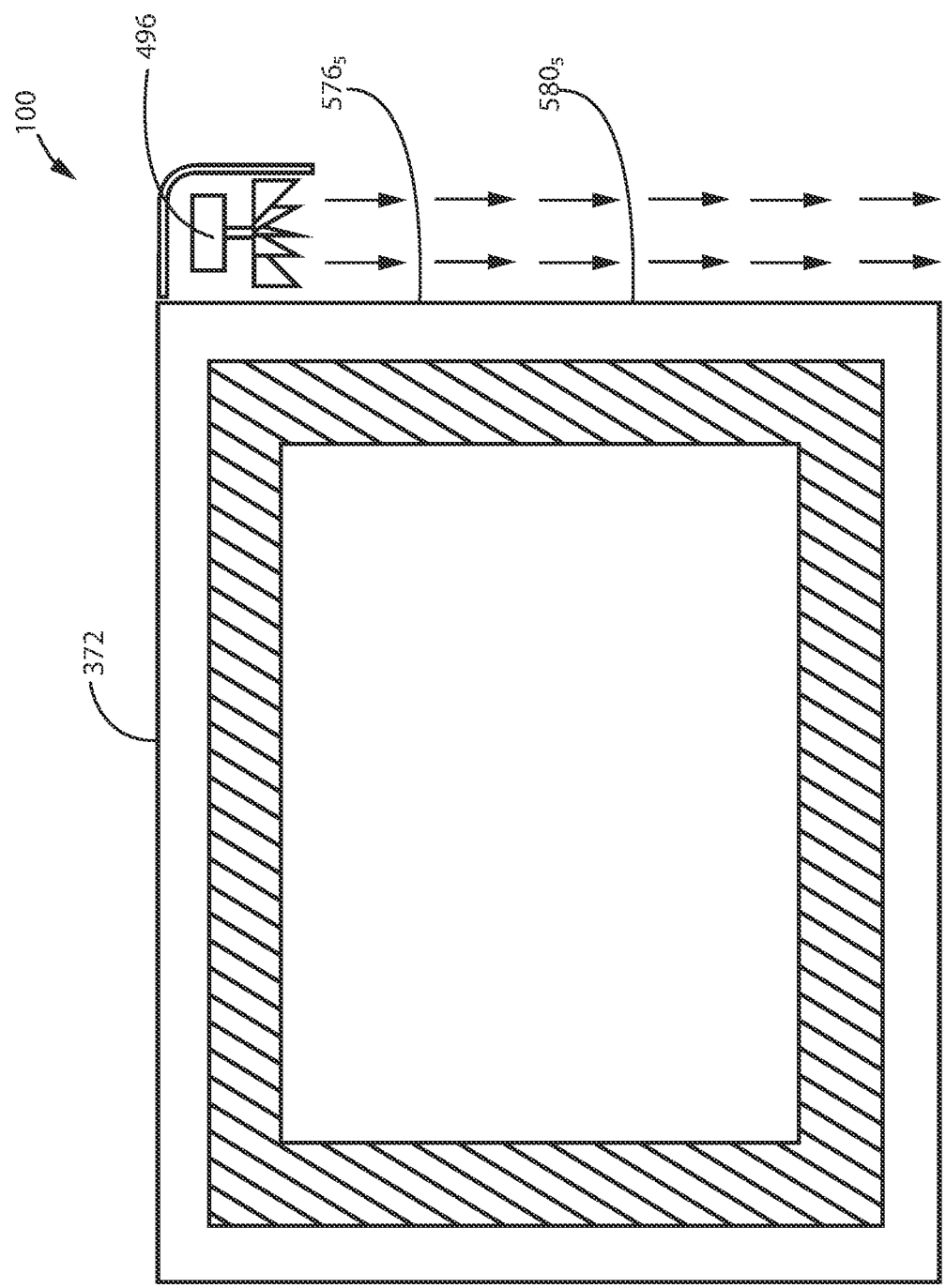
FIG. 79 is a schematic illustration of a cooking apparatus in accordance with an embodiment.
Figure 80:
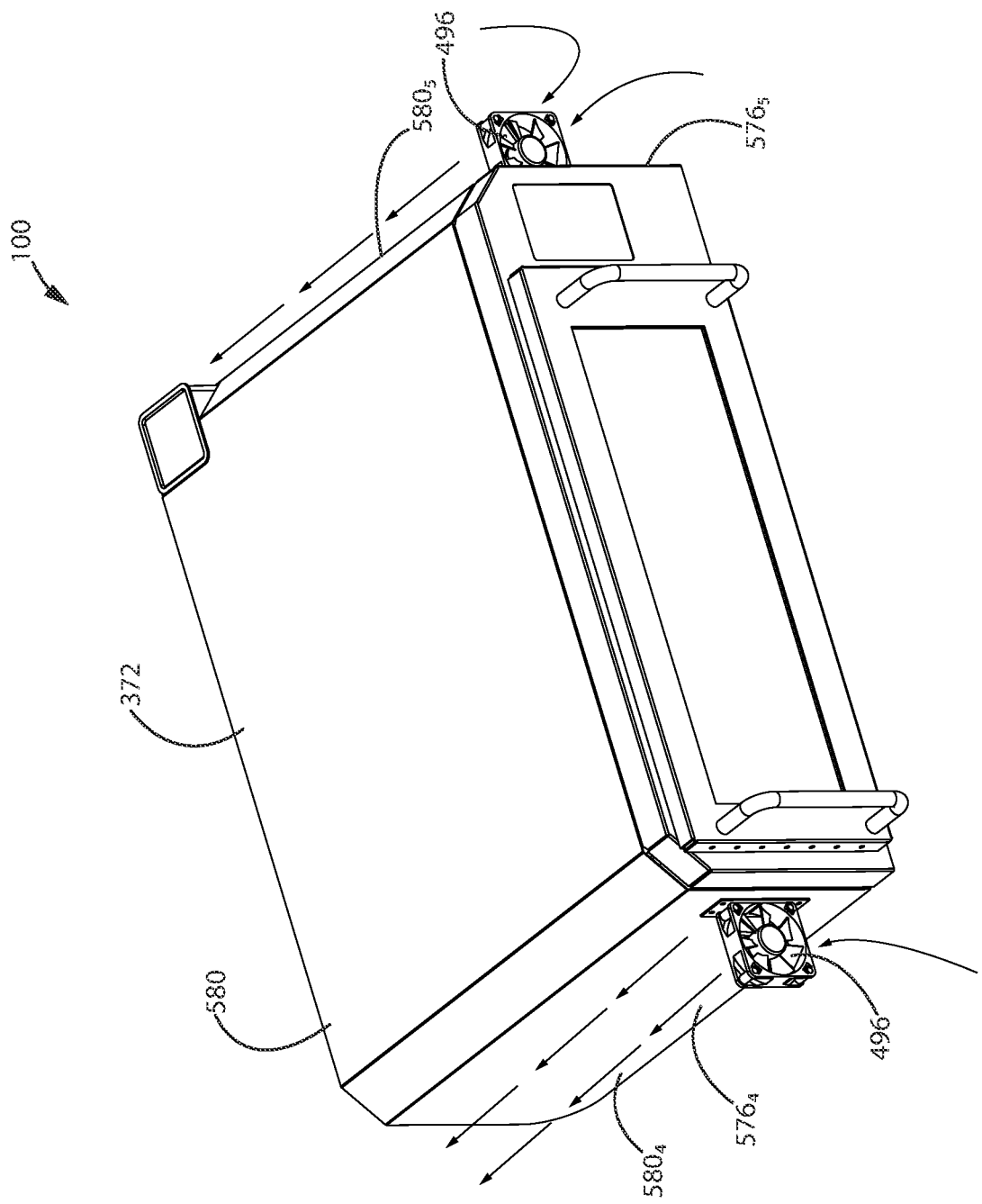
FIG. 80 is a perspective view of a cooking apparatus in accordance with an embodiment.

Referring to FIGS. 79-80, in some embodiments one or more cooling fan assemblies 496 may be positioned to blow external air over an exterior surface of outer shell 372. This may simplify the design of cooking apparatus 100 by eliminating the need for providing an air flow passage between outer and inner shells. This may also make fan assembly 456 more easily accessed for cleaning, repair, or replacement, and may allow fan assembly 456 to be removed to make cooking apparatus 100 more compact. The cooling fan assembly (or assemblies) 456 may be positioned to direct exterior air over an exterior of any one or more of outer shell sides 576 (e.g. over any one or more outer shell panels 580). In the illustrated example, cooking apparatus 100 includes cooling fan assemblies 456 positioned to direct exterior air over transversely opposed sides $576_4$, $576_5$ (e.g. over outer shell panels $580_4$, $580_5$).

Returning to FIG. 69, cooling fan assembly 456 may be activated in any manner that allows cooling fan assembly 456 to provide air cooling to one or more of outer shell sides 576 (e.g. to one of more of outer shell panels 580). In some embodiments, cooling fan assembly 456 may be activated whenever cooking apparatus 100 is activated. For example, cooling fan assembly 456 and cooking apparatus 100 may be directly connected to a common power circuit, whereby cooling fan assembly 456 is powered on to provide cooling whenever cooking apparatus 100 is powered on or whenever cooking apparatus 100 is performing a cooking cycle. This may simplify the activation logic for cooling fan assembly 456, which may reduce the cost and complexity of manufacturing cooking apparatus 100.

In some embodiments, cooling fan assembly 456 is communicatively coupled to controller 216. This allows controller 216 to provide control signals that direct when cooling fan assembly 456 is activated (e.g. powered and providing air cooling), and inactive (e.g. powered off). As an example, cooling fan assembly 456 may be configured, according to a cooking program, to direct cooling fan assembly 456 to remain active for a predetermined duration (e.g. 1 minute to 30 minutes) after a cooking cycle is completed. This may allow cooling fan assembly 456 to cool outer shell 372 after the cooking cycle is completed, thereby mitigating outer shell becoming hot due to residual heat from cooking chamber 104.

In some embodiments, cooling fan assembly 456 remains active until a temperature sensor 610 senses a temperature below a predetermined temperature. This can allow cooling fan assembly 456 to operate only as long as required for the temperature of outer shell 372 to become safe to touch (e.g. a predetermined threshold less than 50° C.), or safe for adjacent equipment (e.g. a predetermined threshold less than 75° C.). This may reduce the energy consumption and noise produced by cooling fan assembly 456. For example, controller 216 may direct cooling fan assembly 456 to deactivate in response to receiving signals from temperature sensor 610 indicative of a temperature below the predetermined threshold.

As shown, temperature sensor 610 may be thermally coupled to outer shell 372. For example, temperature sensor 610 may be located interior of outer shell 372 as shown (e.g. within air flow passage 596), or exterior of outer shell 372. In some embodiments, there may be several temperature sensors 610. For example, each temperature sensor 610 may be associated with different positions on outer shell 372.

Alternatively or in addition to deactivating cooling fan assembly 456 after a predetermined during following a cooking cycle, or after temperature sensor 610 senses a temperature below a predetermined temperature, cooling fan assembly 456 may be activated in response to temperature sensor 610 sensing a temperature exceeding a predetermined temperature. This can delay activating cooling fan assembly 456 until outer shell 372 approaches or exceeds a temperature that is unsafe to touch (e.g. with a predetermined temperature of 40° C. or more), or that is unsafe for adjacent equipment (e.g. with a predetermined temperature of 60° C. or more). For example, controller 216 may direct cooling fan assembly 456 to activate in response to receiving signals from temperature sensor 610 indicative of a temperature exceeding the predetermined threshold.

Figure 81:
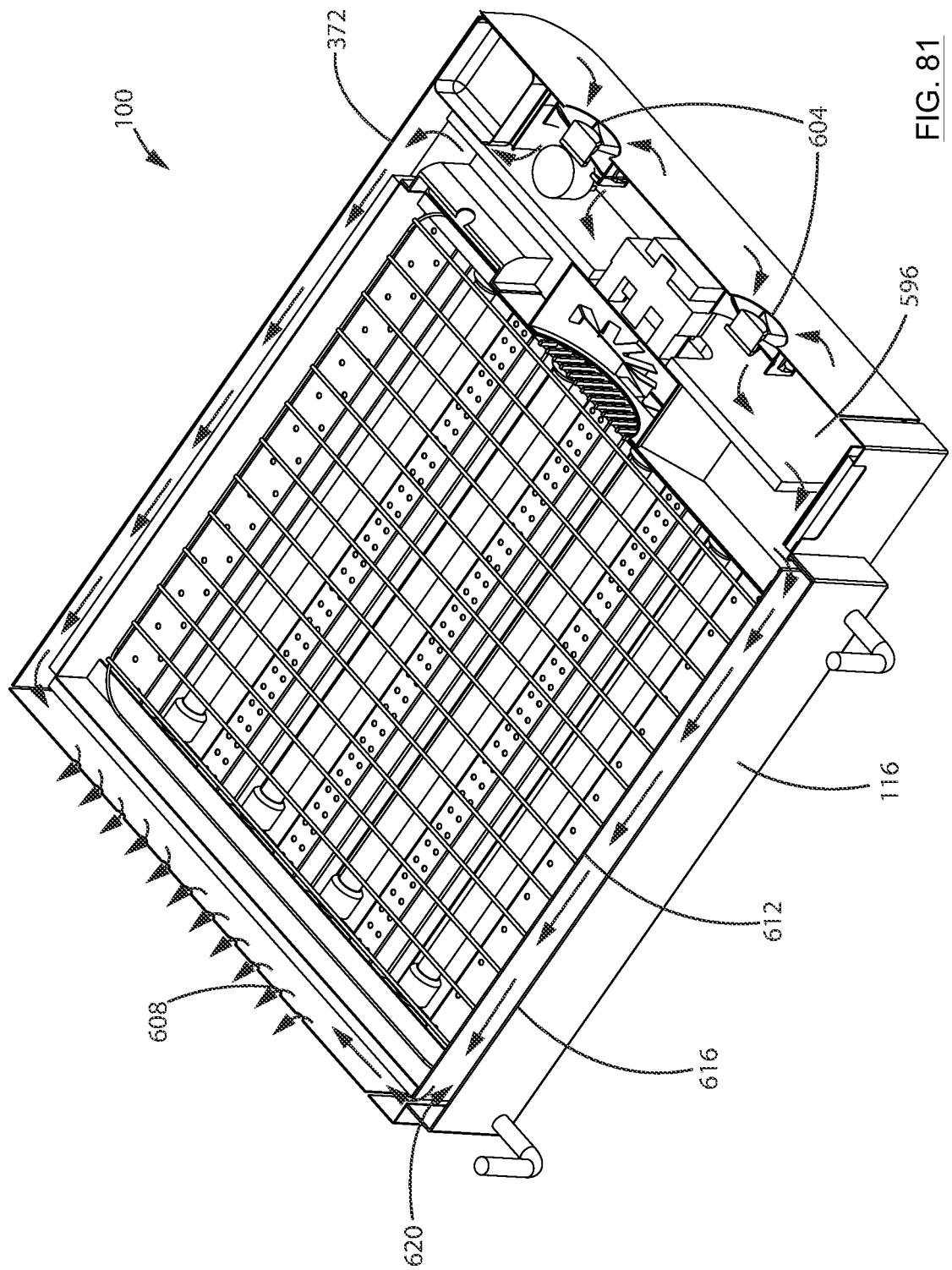
FIG. 81 is a cross-sectional view taken along line 81-81 in FIG. 66, in accordance with an embodiment.

Reference is now made to FIG. 81. Alternatively or in addition to providing cooling for outer shell 372, cooking apparatus 100 may provide cooling to cooking chamber door 116. This may help make cooking chamber door 116 safe to touch during cooking cycles, which may mitigate users burning themselves upon contact with cooking chamber door 116.

As shown, cooling air flow passage 596 may extend across cooking chamber door 116. This allows the cool ambient air moving through cooling air flow passage 596 to provide cooling to cooking chamber door 116. In the illustrated example, cooking chamber door 116 includes an inner panel 612 (also referred as inner layer 612) at least partially spaced from an outer panel 616 (also referred to as outer layer 616) to define a vacant space 620 between the inner and outer panels 612, 616. Vacant space 620 may be positioned in the air flow passage 596 between cooling air inlet 604 and exhaust outlet 608.

Figure 82:
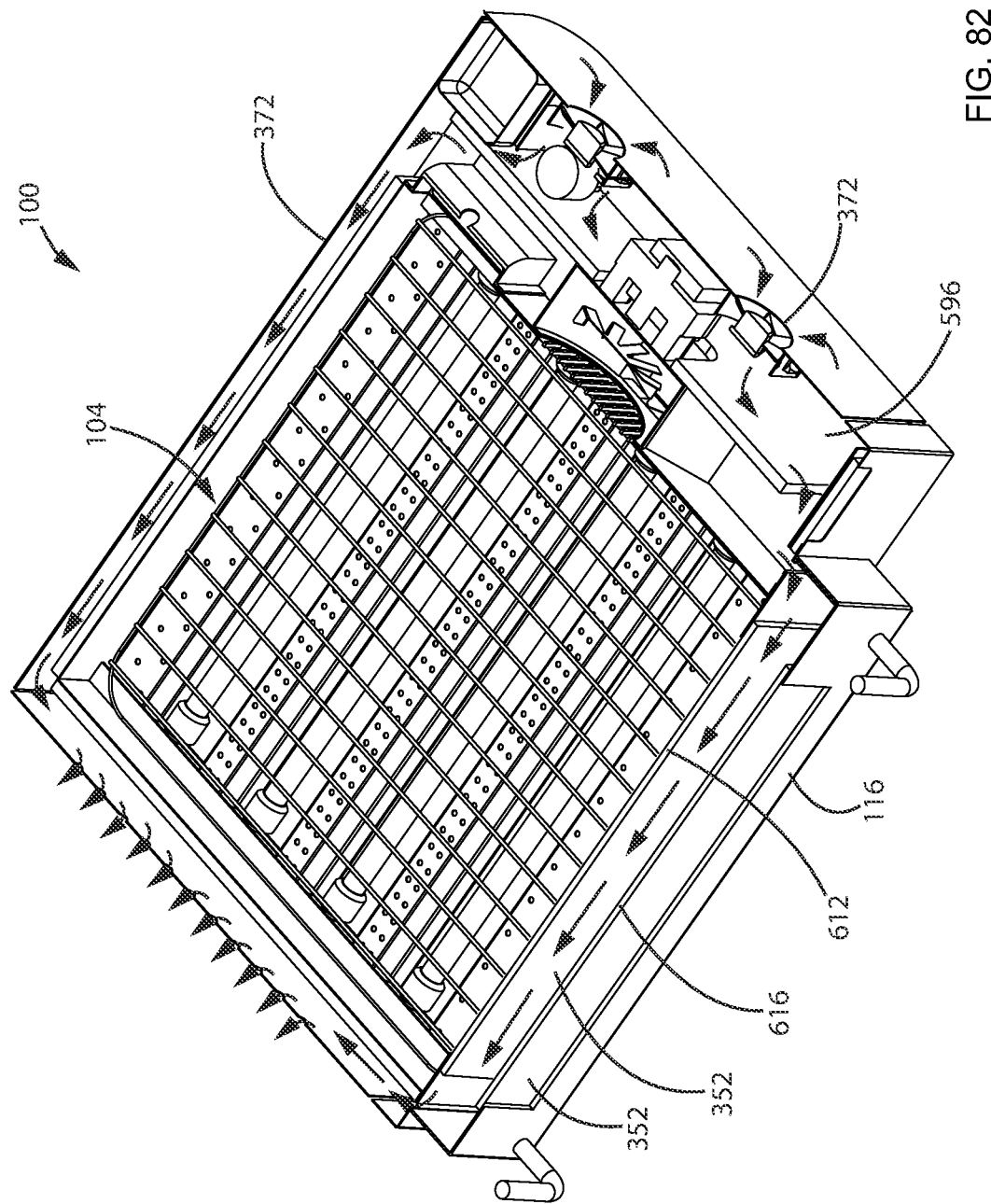
FIG. 82 is a cross-sectional view taken along line 81-81 in FIG. 66, in accordance with another embodiment.

FIG. 81 shows an example in which cooking door panels 612, 616 are opaque panels (e.g. made of metal, such as stainless steel or aluminum). FIG. 82 shows an example in which cooking door panels 612, 616 each include a transparent portion 352, and transparent portions 352 are aligned to provide visibility into cooking chamber 104.

Figure 83:
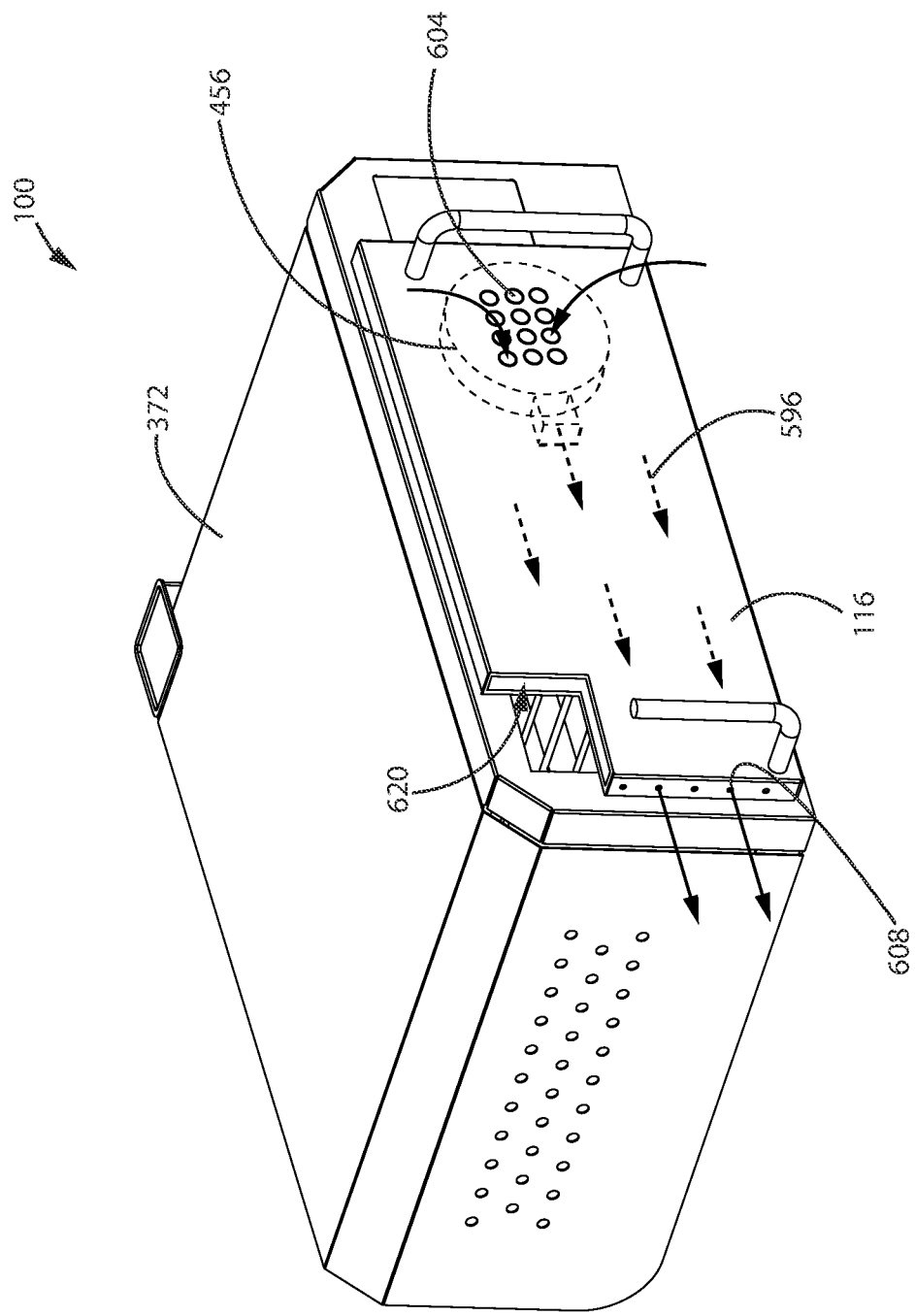
FIG. 83 is a perspective view of a cooking apparatus having a cooking chamber door shown partially cut away, in accordance with an embodiment.

Referring to FIG. 83, in some embodiments an air flow passage 596 extends predominantly (e.g. exclusively) across cooking chamber door 116. This may avoid the cost and complexity of positioning an openable cooking chamber door 116 in the same air flow passage that cools outer shell 372. As shown, cooking chamber door 116 may include a cooling air inlet 604, an exhaust outlet 608, and an air flow passage 596 from cooling air inlet 604 to exhaust outlet 608 through vacant space 620. In the illustrated example, a cooling fan 456 is provided on cooking chamber door 116 (e.g. within air flow passage 596 as shown, or outside of air flow passage 596) to move air through air flow passage 596 from cooling air inlet 604 to exhaust outlet 608.

Figure 84:
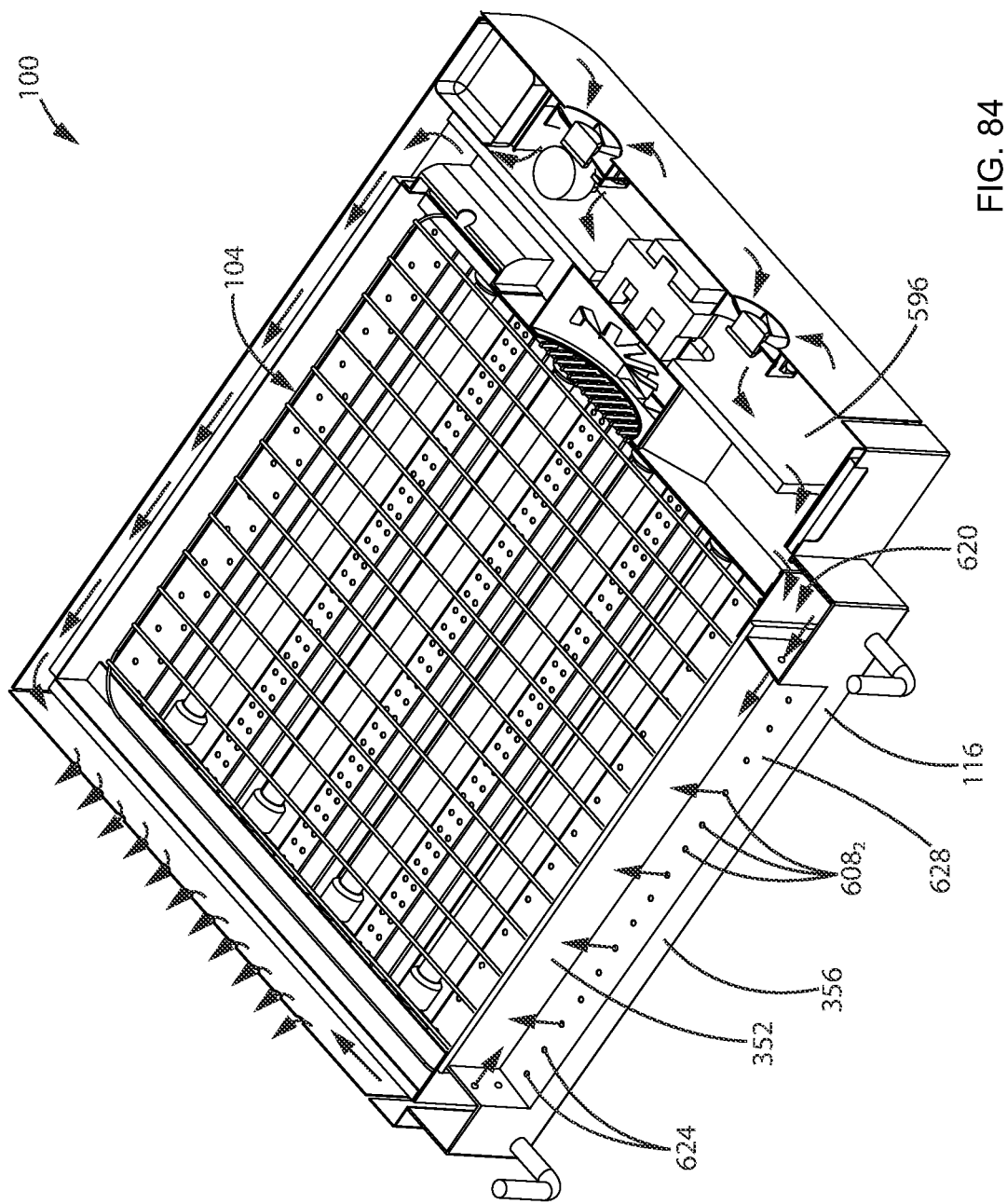
FIG. 84 is a cross-sectional view taken along line 81-81 in FIG. 66, in accordance with another embodiment.

Reference is now made to FIG. 84. In some embodiments, cooking chamber door 116 includes an exhaust outlet $608_2$ that discharges cooling air from air flow passage 596 into contact with (e.g. across) cooking chamber door 116. This can help to cool an outer surface of cooking chamber door 116 to help make cooking chamber door 116 safe to touch during cooking cycles. For example, this may help to cool a portion (e.g. transparent portion) of cooking chamber door 116 that has only a single layer, and therefore cannot support an air flow passage 596.

Exhaust outlet $608_2$ may be located anywhere on cooking chamber door 116 suitable to discharge gas from air flow passage 596 into contact with (e.g. across) cooking chamber door 116. In the illustrated example, cooking chamber door 116 includes a transparent panel 352 (e.g. a glass panel) bordered by a frame 356. As shown, frame 356 may include interior vacant space 620 positioned in the air flow path 596 downstream of cooling air inlet 604. Frame 356 may include an exhaust outlet 608 formed by one or a plurality of outlet openings 624 oriented to discharge cooling air at cooking chamber door 116. For example, outlet openings 624 may be located along an inner side 628 of frame 356. As shown, this may permit exhaust outlet 608 to partially or completely surround door panel 352. This may help to provide more even cooling across the surface of door panel 352, and thereby mitigate hotspots that can burn users on contact.

It will be appreciated that, in another embodiment, cooling air may be blown downwardly over the outer surface of the door when the door is in a closed position. For example, the exhaust outlet may be provided above the openable door when the door is in a closed position.

Heating Ducts

In some embodiments, the cooking apparatus may include heating ducts that distribute hot air into the cooking chamber. The heating ducts may receive pressurized air from an upstream fan, and include numerous outlet perforations of a size and number to product high velocity air streams (e.g. jets) that impinge on food within the cooking chamber. The high velocity may allow the hot air streams to make direct contact with the food before diffusing into the cooking chamber. This may expose surfaces of the food to higher temperature air, which may accelerate cooking. The high velocity air streams may also be effective for displaying humid air masses settled around surfaces of the food, and thereby accelerate dehydration such as for the purpose of crisping the food (e.g. French fries, chicken wings, or pizza crust).

The features in this section may be used by themselves in any cooking apparatus or in any combination or sub-combination with any other feature or features described herein. For example, the feature of heating ducts described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, common motor drive, smoke and/or odor control, reorientation and expansion, vertical cooking, toaster, heat storage members, and other features described herein.

Figure 85:
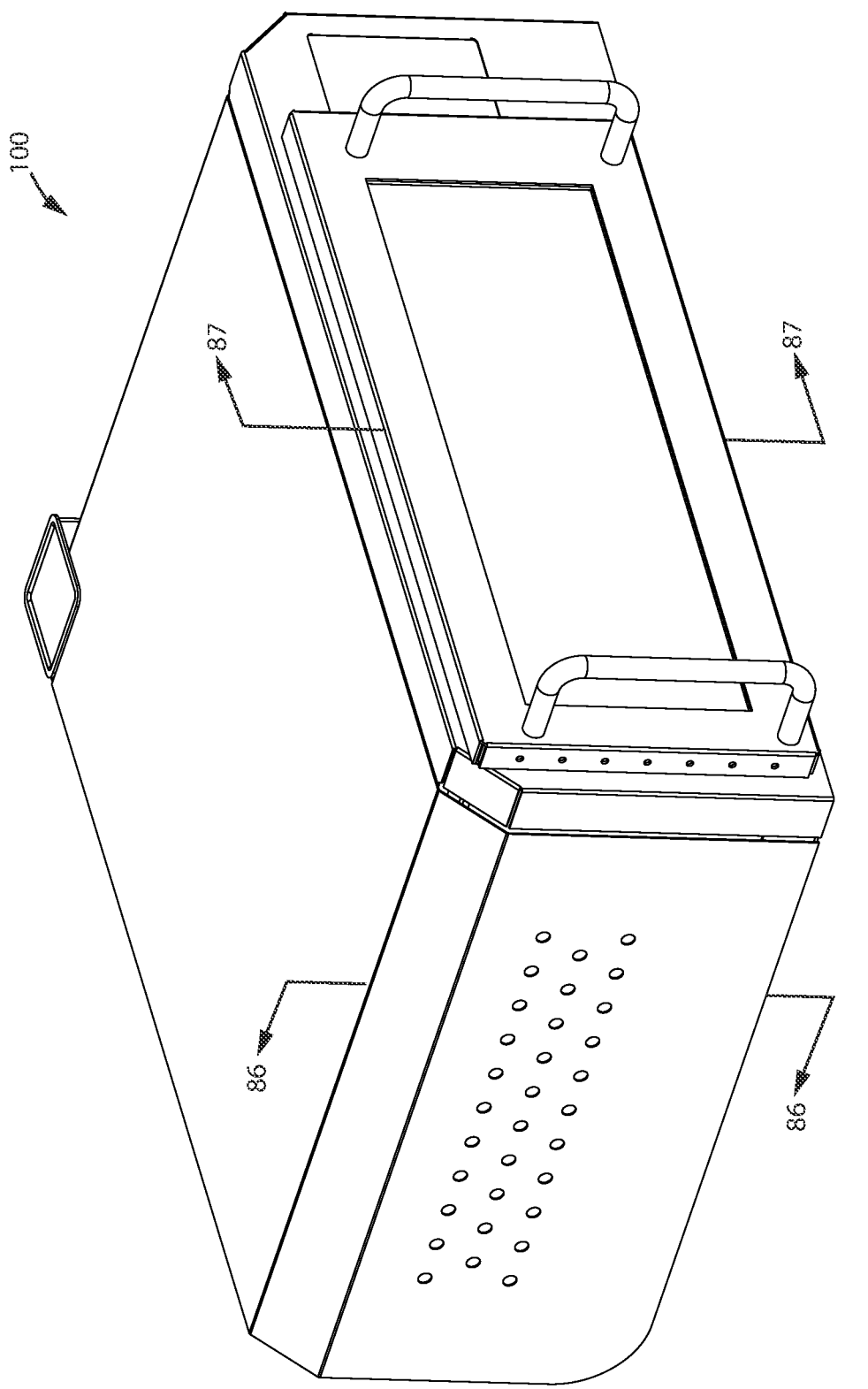
FIG. 85 is a perspective view of a cooking apparatus in accordance with an embodiment.
Figure 86:
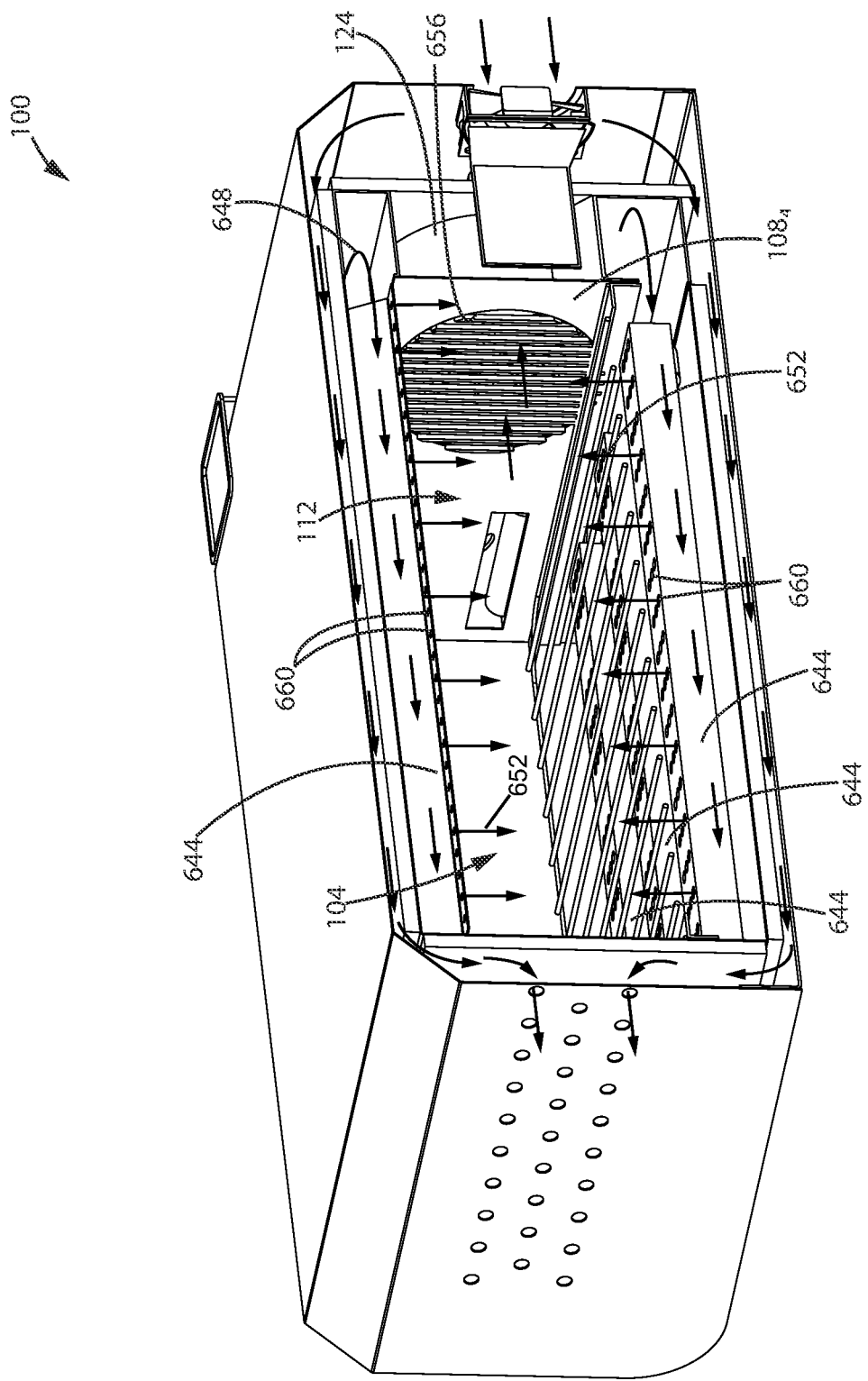
FIG. 86 is a cross-sectional view taken along line 86-86 in FIG. 85, in accordance with an embodiment.

Reference is now made to FIGS. 85-86. As shown, cooking apparatus 100 may include a plurality of heating ducts 644 located downstream of an air mover 124 (e.g. a fan). Air mover 124 and heating ducts 644 may be positioned in an air flow path 648, which extends from an air inlet 656 to outlet openings 660. As shown, air inlet 656 may be provided on a sidewall 108 of cooking chamber 104 (e.g. right sidewall $108_4$ as shown, or any other cooking chamber sidewall 108 such as the upper wall) to allow air mover 124 to pull hot air from cooking chamber 104 into air flow path 648. Outlet openings 660 may be provided in heating ducts 644 to allow re-entry of the recirculated hot air back into cooking chamber 104 as high velocity air streams.

Heating ducts 644 may be positioned above, below, and/or to one or more side(s) of cooking chamber 104. The location(s) of heating ducts 644 relative to cooking chamber 104 (e.g. above, below, and/or to the side) may depend on the intended use(s) of cooking apparatus 100. For example, heating ducts 644 may be positioned above cooking chamber interior volume 112 to allow the air streams 652 re-entering cooking chamber 104 to strike food held in containers (e.g. cooking receptacles 140 (FIG. 2), or cooking vessel 160 (FIG. 2)), which may shield the food from air streams entering from other sides of cooking chamber 104. As another example, heating ducts 644 may be positioned below cooking chamber interior volume 112 to allow the air streams 652 re-entering cooking chamber 104 to strike exposed lower surfaces of foods (e.g. the crust of a pizza).

The illustrated embodiment shows a plurality of heating ducts 644 positioned above cooking volume 112, and a plurality of heating ducts 644 positioned below cooking volume 112. This allows cooking apparatus 100 to adapt to different foods that have different cooking requirements and that different exposed surfaces while cooking. Heating ducts 644 may extend in a lateral (i.e. side-to-side, or left-right) direction as shown, or in a forward-rearward direction as in FIGS. 95-96.

Figure 87:
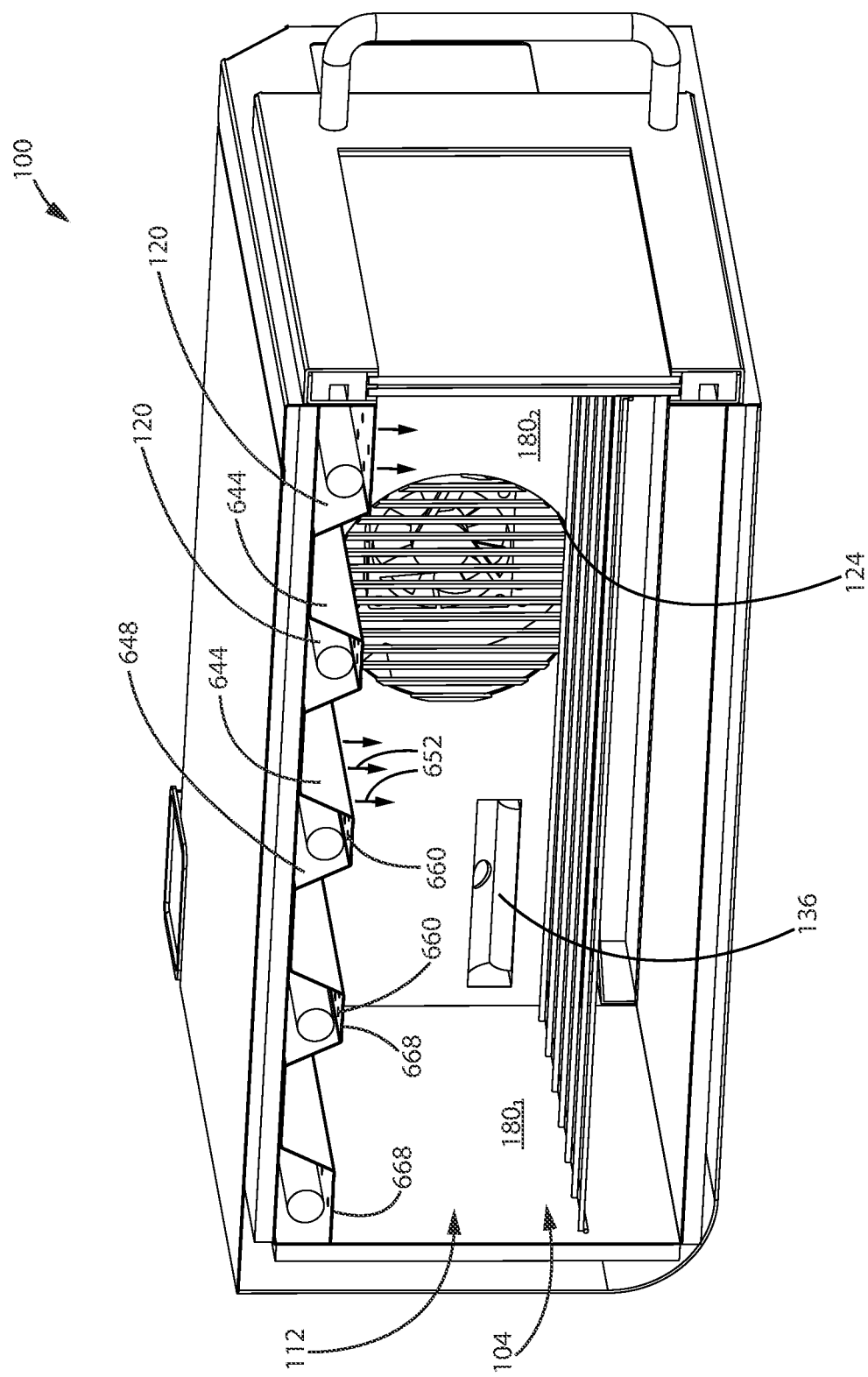
FIG. 87 is a cross-sectional view taken along line 87-87 in FIG. 85, in accordance with another embodiment.

Reference is now made to FIG. 87. In some embodiments, one or more heating elements 120 may be positioned in the air flow path 648. This allows the diffuse air pulled into the air flow path 648 by air mover 124 to be heated to a higher temperature within air flow path 648 before re-entering cooking chamber 104 through air outlet openings 660.

Heating element(s) 120 may be positioned anywhere along air flow path 648. For example, a heating element 120 may be positioned within one or more (or all) of heating ducts 644. This positions heating elements 120 immediately upstream of air outlet openings 660, whereby air heated by heating elements 120 immediately re-enters cooking chamber 104 through air outlet openings 660. As compared with positioning heating elements 120 upstream of heating ducts 644, this design may help reduce heat loss (and thus improve energy efficiency) as the air flow travels from heating elements 120 to air outlet openings 660.

Alternatively or in addition, a heating element 120 may be positioned in air flow path 648 upstream of air outlet openings 660. This may permit relatively few heating elements 120 (e.g. a single heating element 120) to heat all of the air that ultimately exits air outlet openings 660. In some embodiments, this may reduce the number of heating elements 120 in cooking apparatus 100 and thereby reduce the cost and complexity of manufacturing cooking apparatus 100.

Still referring to FIG. 87, air mover 124 may be sized to produce a flow rate (e.g. in cubic feet per minute, CFM) of air sufficient to produce air streams 652 at air outlet openings 660 with an air velocity suitable for rapid cooking and/or crisping of foods in cooking chamber 104. In some embodiments, air mover 124 may have a rated flow rate capable of producing air streams 652 with a velocity of between 2 MPH and 25 MPH (e.g., 5-25, 5-20, 10-20, 10-15 MPH). The lower portion of this range (e.g. 2 MPH to 8 MPH) may be suitable for creating more gentle air streams 652 (e.g. for delicate foods, such as fish). The upper portion of this range (e.g. 8 MPH to 25 MPH) may be suitable for creating more rapid air streams 652 (e.g. for robust foods, such as pizza, French fries, and chicken wings).

The air outlet openings 660 may be sized so that multiple air streams 652 may strike one item of food. This may provide a more even distribution of hot air streams over a surface of the food item, and mitigate a hot spot that may lead to isolated burning. In some embodiments, air outlet openings 660 may be sized between 0.02 in$^2$ and 0.5 in$^2$ (e.g., 0.02-0.25; 0.05-0.25; 0.05-0.1; 0.0.5-0.75 in$^2$). Each heating duct 644 may include numerous such air outlet openings 660, such as between 25 and 500 air outlet opening 660.

Moreover, cooking apparatus 100 may include any number of heating ducts 644. For example, cooking apparatus 100 may include between 1 and 25 heating ducts 644, which may be collectively positioned above, below, and/or to a side of cooking volume 112. In the illustrated example, cooking apparatus 100 includes 5 heating ducts 644 located above cooking volume 112.

Still referring to FIG. 87, in some embodiments heating elements 120 are IR heating elements, and at least a portion (or all) of heating ducts 644 may be permeable to infrared radiation emitted by IR heating elements 120. For example, at least a portion 668 located between the IR heating element 120 and cooking volume 112 may allow at least 30%, and more preferably at least 50% (e.g. 50%-100%, 60%-90%, 60%-80%) of IR radiation emitted by IR heating elements 120 towards portion 668 to pass through into cooking volume 112. IR permeability of heating duct portion 668 may be provided by air outlet openings 660, and/or the material of heating duct portion 668. For example, heating duct portions 668 (or an entirety of heating ducts 644) may be made of stainless steel.

Figure 88:
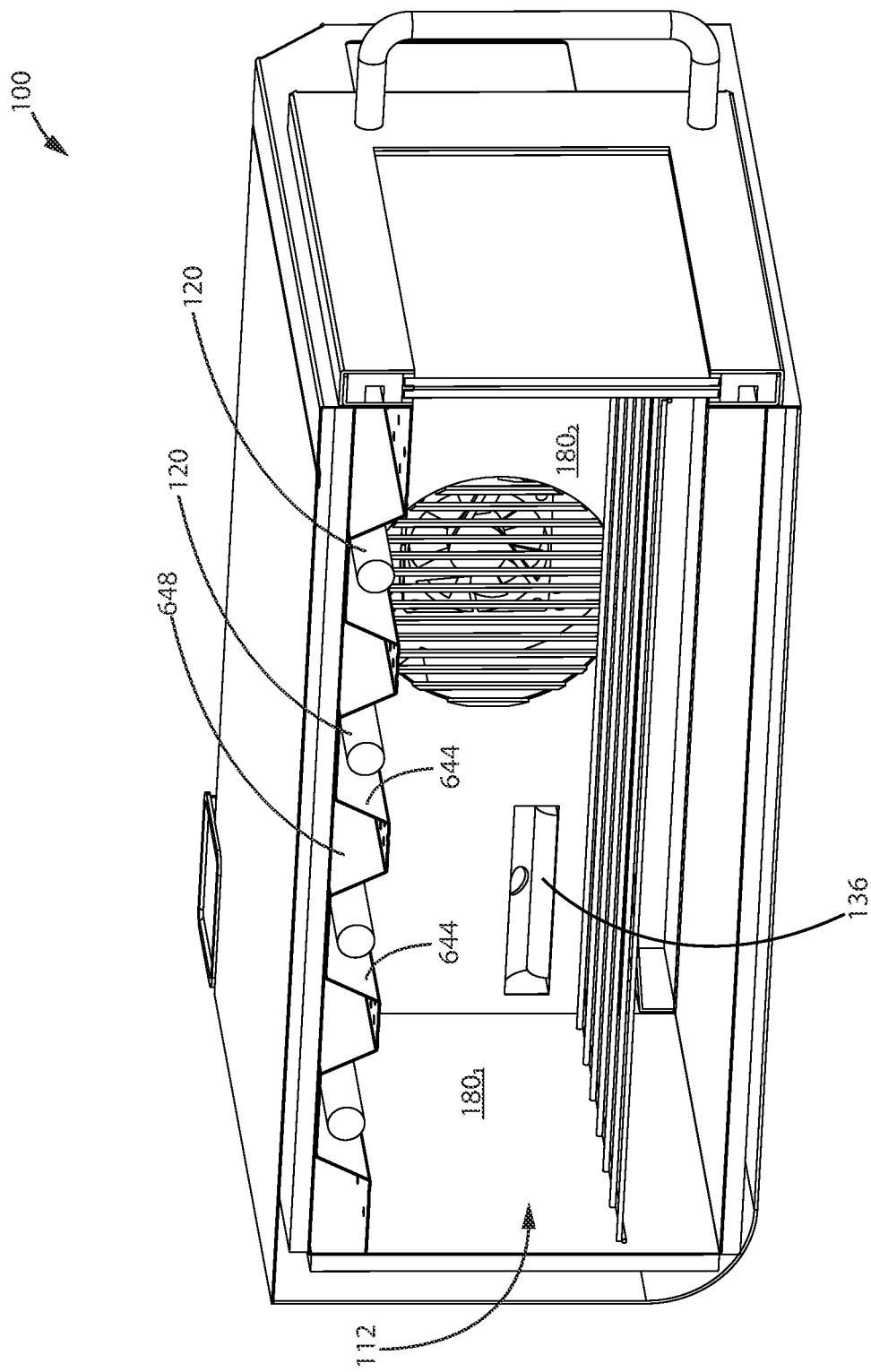
FIG. 88 is a cross-sectional view taken along line 87-87 in FIG. 85, in accordance with another embodiment.
Figure 89:
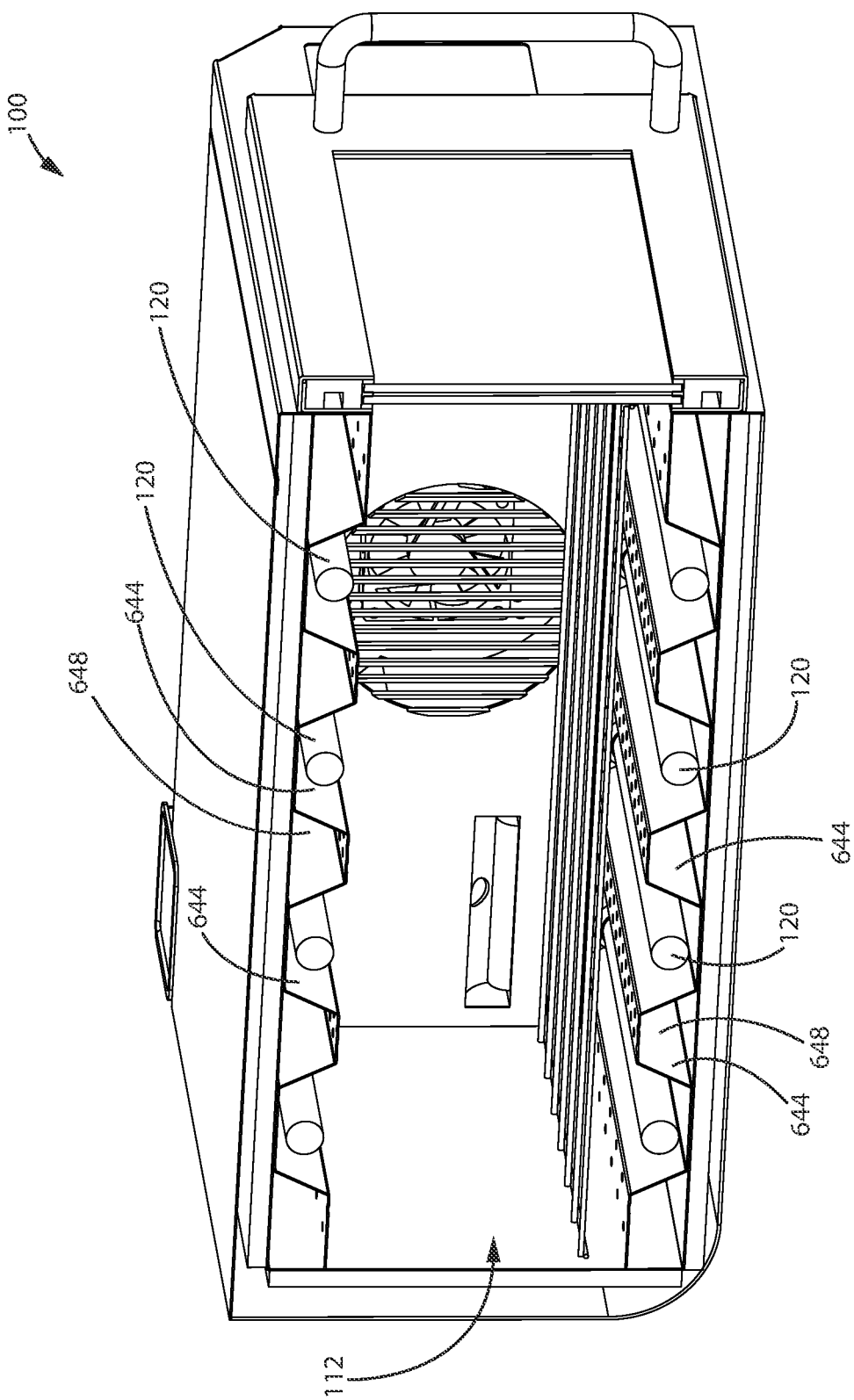
FIG. 89 is a cross-sectional view taken along line 87-87 in FIG. 85, in accordance with another embodiment.

Reference is now made to FIGS. 88-89. Alternatively or in addition to providing one or more heating elements 120 within air flow path 648, cooking apparatus 100 may include one or more heating elements 120 outside of air flow path 648. For example, one or more heating elements 120 may be provided above, below, and/or to one or more sides of cooking volume 112. Such heating elements 120 may produce heat (e.g. IR radiation) less affected (e.g. unaffected) by the rate of air flow through air flow path 648, and with an unimpeded line of sight to food or a cooking container within cooking volume 112. This may make it easier to regulate the radiative heat emitted by heating elements 120, and may allow heating elements 120 to radiate more heat (e.g. for searing food) when air mover 124 is activated and moving air within air flow path 648, all else being equal.

In the illustrated examples, heating elements 120 are located between adjacent heating ducts 644. As shown, each heating element 120 may be flanked by (e.g. horizontally aligned with) adjacent heating ducts 644. For example, heating elements 120 and heating ducts 644 may be arranged in an alternating pattern. This may help to evenly distribute both the radiative heating provided by heating elements 120 and the high velocity air heating providing by heating ducts 644. FIG. 88 shows an example in which heating elements 120 and heating ducts 644 are located above cooking volume 112. FIG. 89 shows an example in which heating elements 120 and heating ducts 644 are located above and below cooking volume 112.

Figure 90:
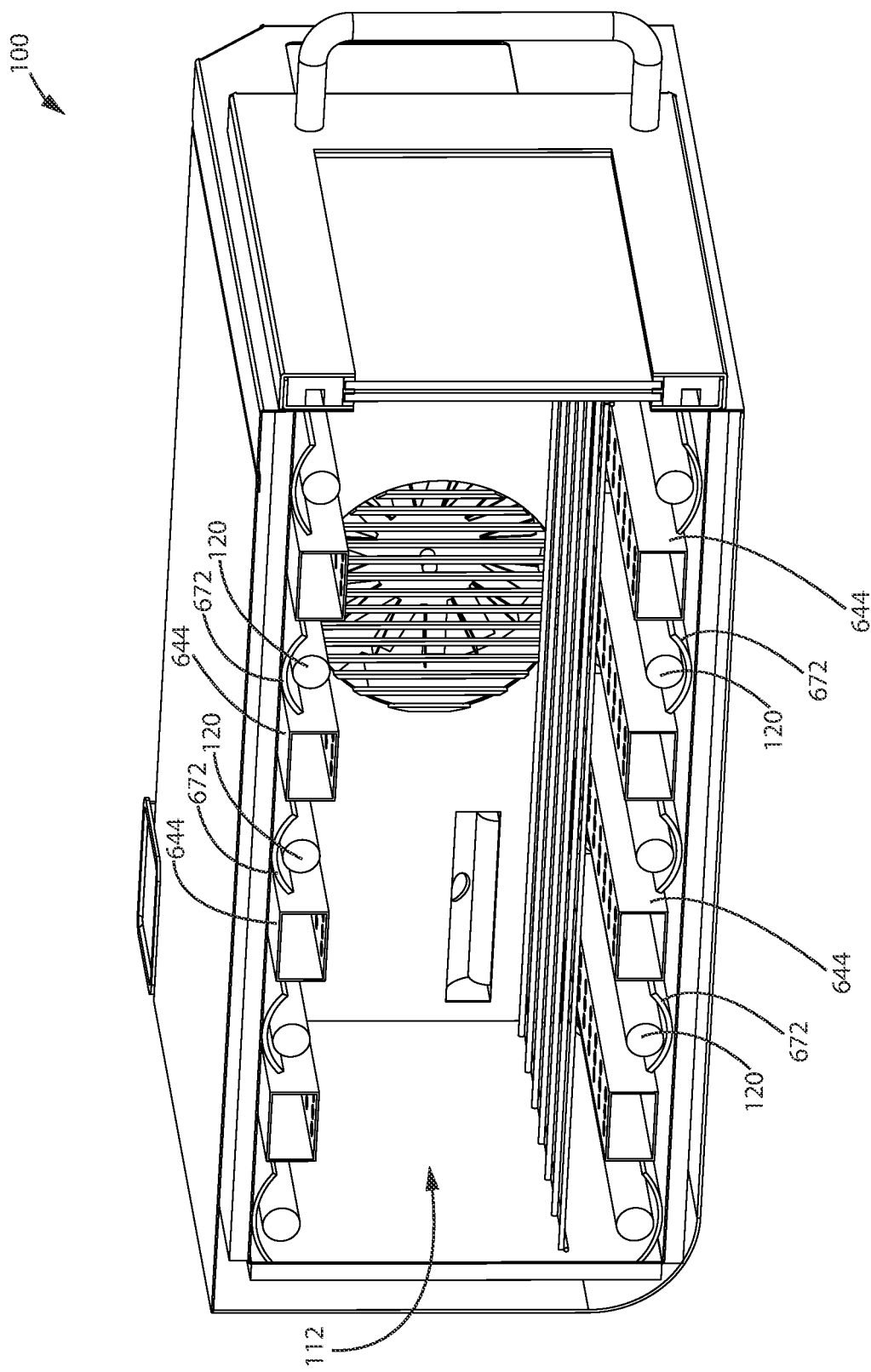
FIG. 90 is a cross-sectional view taken along line 87-87 in FIG. 85, in accordance with another embodiment.

Referring to FIG. 90, in some embodiments a heating element 120 may be located between an IR reflector 672 and cooking volume 112. The IR reflector 672 may help to reflect, towards cooking volume 112, IR radiation that was emitted by heating elements 120 away from cooking volume 112. This may improve the heat efficiency of cooking apparatus 100 by directing a greater portion of IR radiation, emitted by heating elements 120, towards food within cooking volume 112, all else being equal, while reducing heating of the exterior of the appliance.

IR reflector 672 may have any configuration suitable for reflecting IR radiation emitted by heating elements 120. For example, IR reflector 672 may be composed of a material having a reflectivity to IR radiation of at least 50% and preferably at least 70%. In some embodiments, IR reflector 672 may include aluminum or an aluminum coated substrate, which may have a polished surface finish to increase IR reflectivity.

A heating element 120 and an associated IR reflector 672 may be located inside or outside of a heating duct 644. In the illustrated embodiment, pairs of heating elements 120 and IR reflectors 672 are located outside of heating ducts 644. As shown, a heating element 120 and a corresponding IR reflector 672 may be positioned between adjacent heating ducts 644.

Figure 91:
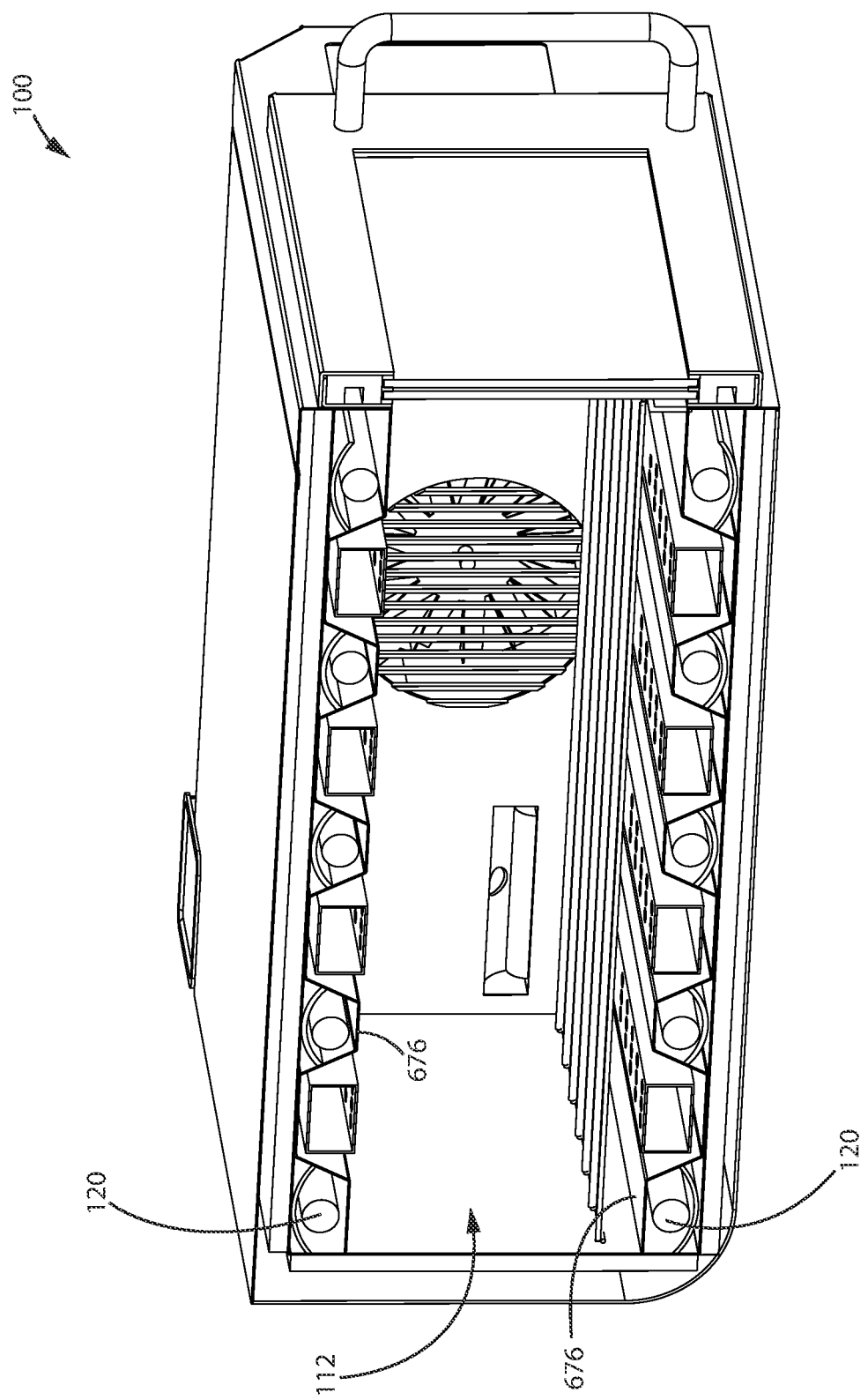
FIG. 91 is a cross-sectional view taken along line 87-87 in FIG. 85, in accordance with another embodiment.
Figure 92:
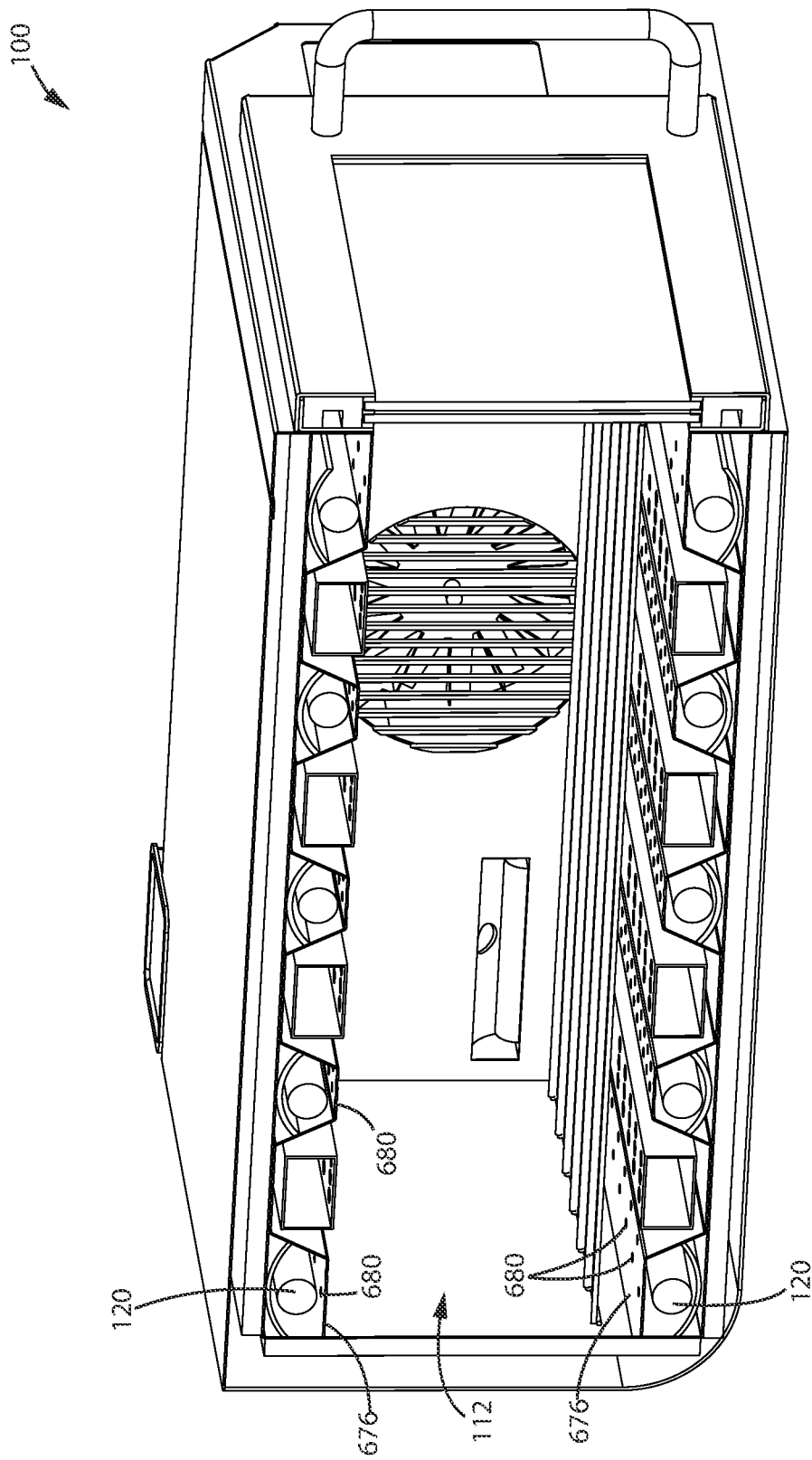
FIG. 92 is a cross-sectional view taken along line 87-87 in FIG. 85, in accordance with another embodiment.

Still referring to FIG. 90, each heating element 120 is illustrated as being uncovered. This provides each heating element 120 with line of sight into cooking volume 112, whereby IR radiation from each heating element 120 directed towards cooking volume 112 is unimpeded. FIG. 91-92 show examples in which a cover panel 676 is positioned between heating elements 120 and cooking volume 112. As compared with the uncovered heating elements 120 of FIG. 90, cover panel 676 may help to shield heating elements 120 from food spatter that may burn and smoke on heating elements 120. Cover panel 676 may be easily cleaned.

Cover panel 676 may be permeable to IR radiation emitted by IR heating element 120. For example, cover panel 676 may be free of openings as in FIG. 91 and made of IR permeable material, or may include openings 680 as in FIG. 92 and be made of any material.

Figure 93:
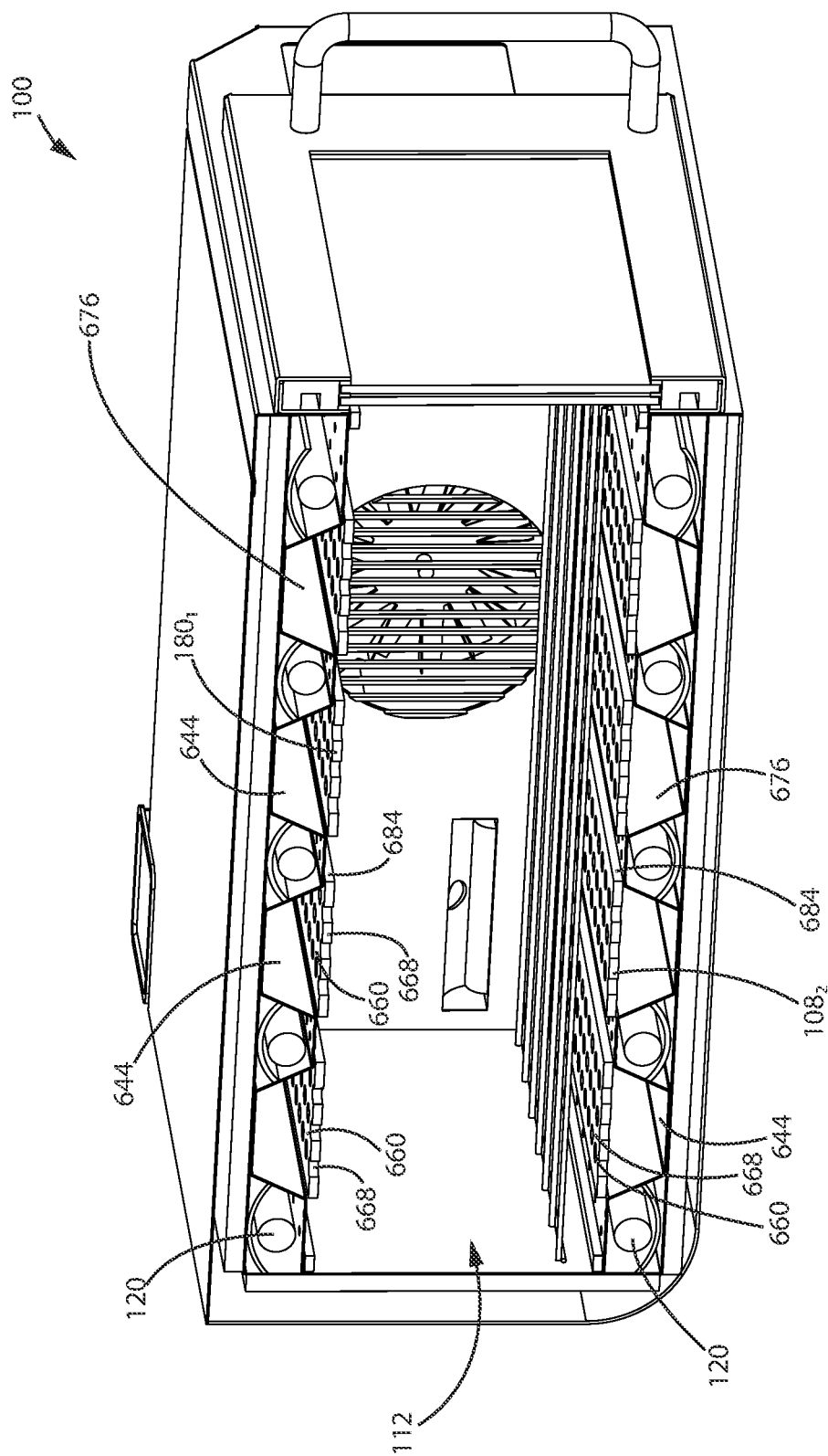
FIG. 93 is a cross-sectional view taken along line 87-87 in FIG. 85, in accordance with another embodiment.
Figure 94:
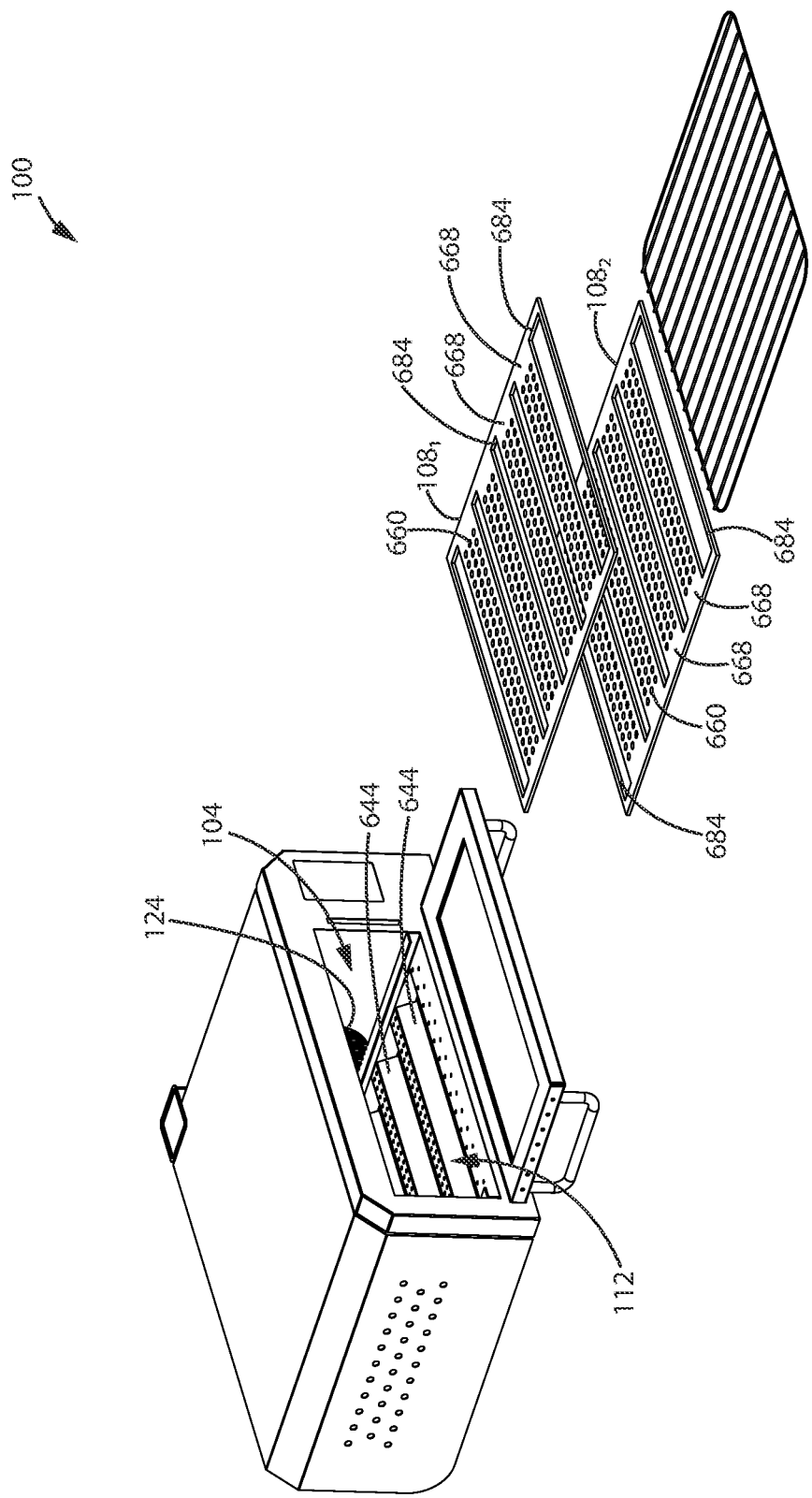
FIG. 94 is a perspective view of the cooking apparatus of FIG. 93 with cooking chamber panels and a wire rack removed.

Reference is now made to FIGS. 93-94. In some embodiments, at least a portion 668 of one or many heating ducts 644 may be part of a cooking chamber panel 108. For example, a substantially planar cooking chamber panel 108 (e.g. top panel $108_1$ and/or bottom panel $108_2$) may cover inside ends of heating ducts 644 and including portions 668 that have air outlet openings 660. This design may make it easier to clean cooking chamber 104 including portion 668 of heating ducts 644 that may be exposed to spatter from food.

Cooking chamber panel 108 may allow much or all of IR radiation emitted by IR heating elements 120 to enter cooking volume 112. FIGS. 93-94 show an example in which cooking chamber panels 108 have large openings 684, which align with heating elements 120, such that heating elements 120 effectively remain uncovered by cooking chamber panels 108. This may help to increase the proportion of IR radiation, emitted by heating elements 120, that enters cooking volume 112 and contributes to cooking food. Accordingly, this may improve the energy efficiency of cooking apparatus 100. In some embodiments, heating elements 120 may be overlaid by a cover panel 676. As shown, chamber panel openings 684 may avoid introducing a second layer of impedance to the passage of IR radiation from IR heating elements 120 into cooking volume 112.

FIGS. 95-96 show another example in which cooking chamber panels 108 include heating duct portions 668 having air outlet openings 660. In this example, heating elements 120 are shown positioned in heating ducts 644. The material of the cooking chamber panels 108 (e.g. top and bottom panels $108_1$, $108_2$) may be permeable to IR radiation on account of the material of cooking chamber panels 108 and/or air outlet openings 660. As shown, cooking chamber panels 108 may not include large panel openings that avoid the panels 108 overlaying heating elements 120. Accordingly, cooking chamber panels 108 have a lower percentage open area for spatter to bypass the cooking chamber panels 108. For this reason, cooking chamber panels 108 may make cooking chamber 104 easier to clean and may provide better support for cooking accessories (e.g. wire racks, containers, etc.). In the illustrated embodiment, cooking apparatus 100 includes an optional wire rack 688 that is removably positionable in cooking chamber 104 to support food and food containers above bottom panel $108_2$.

Figure 97:
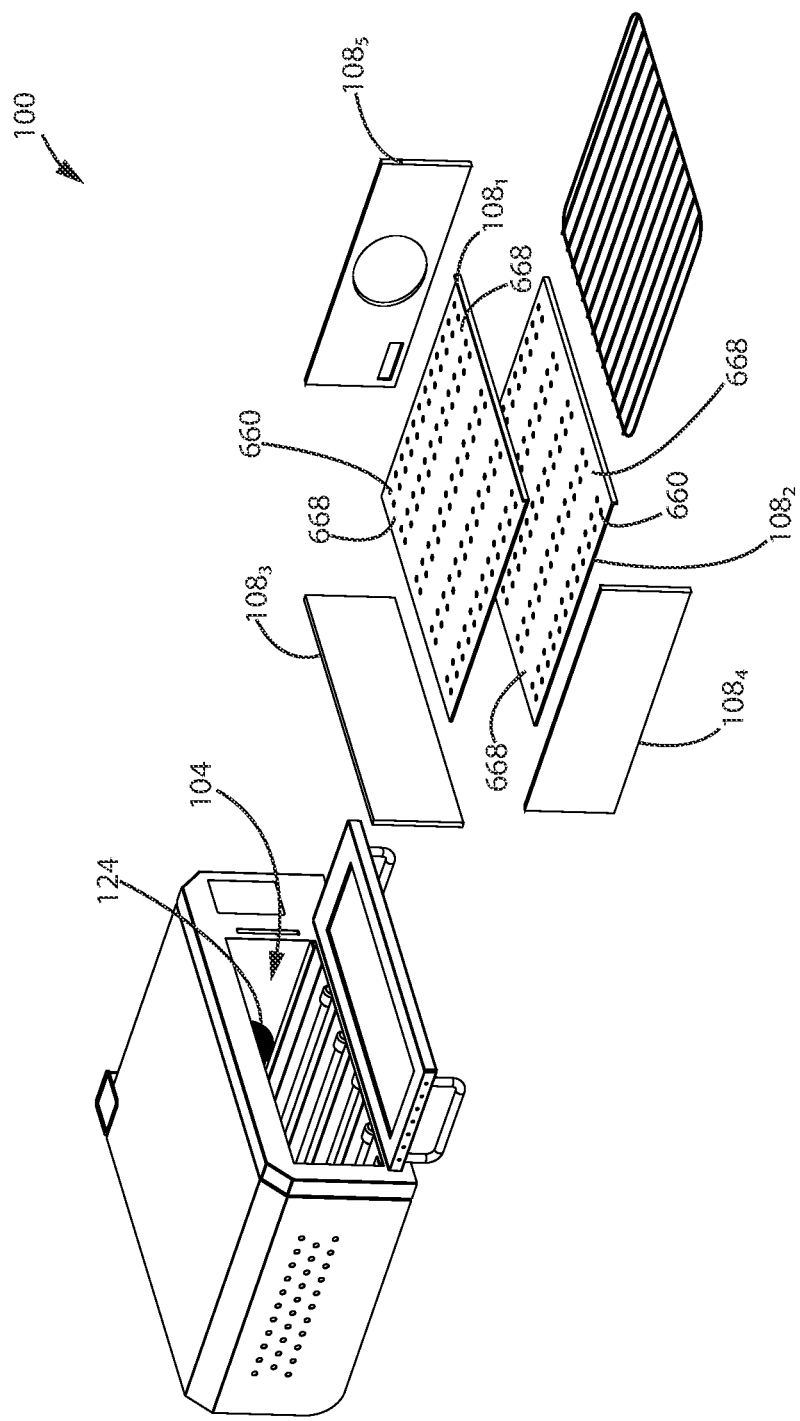
FIG. 97 is a perspective view of the cooking apparatus of FIG. 95 having the cooking chamber door open, and the wire rack and five cooking chamber panels removed.

Referring to FIGS. 94, 96, and 97, one or more cooking chamber panels 108 may be removable from cooking apparatus 100. This may permit the cooking chamber panels 108 to be cleaned (e.g. in a sink with water and soap). Further, this may provide access behind cooking chamber panels 108 to clean any food spatter that may have bypassed the cooking chamber panel 108 through an opening 660, 680. In some embodiments, a cooking chamber panel 108, which includes a heating duct portion 668 with air outlet openings 660, may be removed for the duration of a cooking cycle to provide convective air flow using air mover 124 without creating high velocity air streams. This may permit cooking apparatus 100 to selectively provide high velocity air streams or slow convective air flow depending on the cooking technique a user may choose for the food being cooked.

Figure 98:
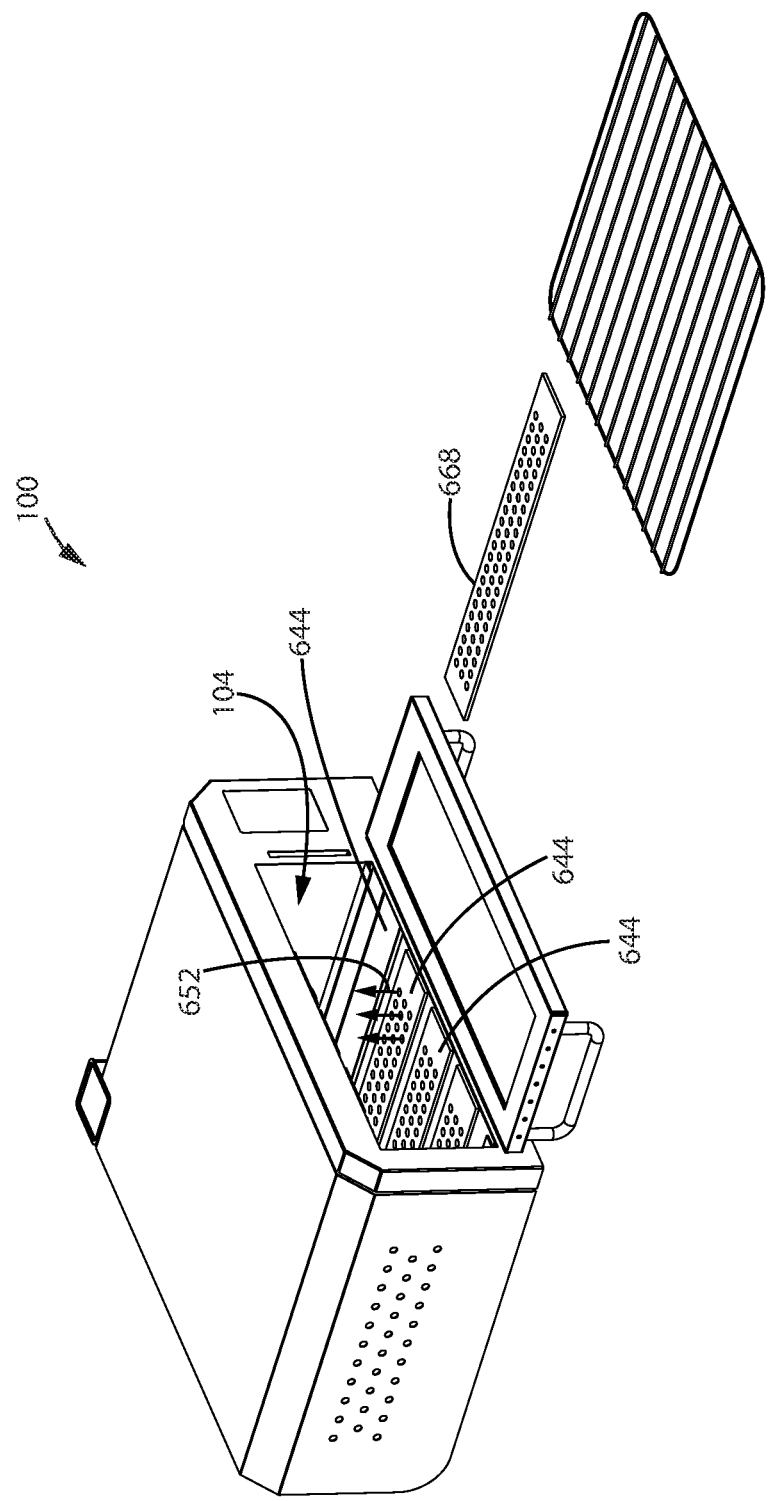
FIG. 98 is a perspective view of a cooking apparatus having a cooking chamber door open, and a wire rack and heating duct portion removed, in accordance with another embodiment.

Referring to FIG. 98, in some embodiments one or more (or all) of heating ducts 644 has a respective duct portion 668 that is individually removable. This can allow cooking apparatus 100 to produce air streams 652 along only a subset of heating ducts 644 that have their duct portion 668 still in place. For example, when cooking chamber 104 is divided into several cooking zones as described above, heating ducts 644 associated with one cooking zone may have duct portions 668 in place to produce high velocity air streams, while heating ducts 644 associated with another cooking zone may have duct portions 668 removed to produce low velocity convective heating.

FIGS. 94 and 96 show an example in which the panels $108_1$, $108_2$ that overlie heating ducts 644 are removable. FIG. 97 shows an example in which all cooking chamber panels 108 are removable. Preferably, removable panels 108 can be removed from cooking chamber 104 and replaced without the use of tools (e.g. without removing any screws or similar fasteners). For example, FIGS. 94 and 96 show cooking chamber panels $108_1$, $108_2$ that are slideably removable and insertable into cooking chamber 104. As used herein and in the claims, an element described as removable can be removed and replaced without causing any damage.

Figure 99:
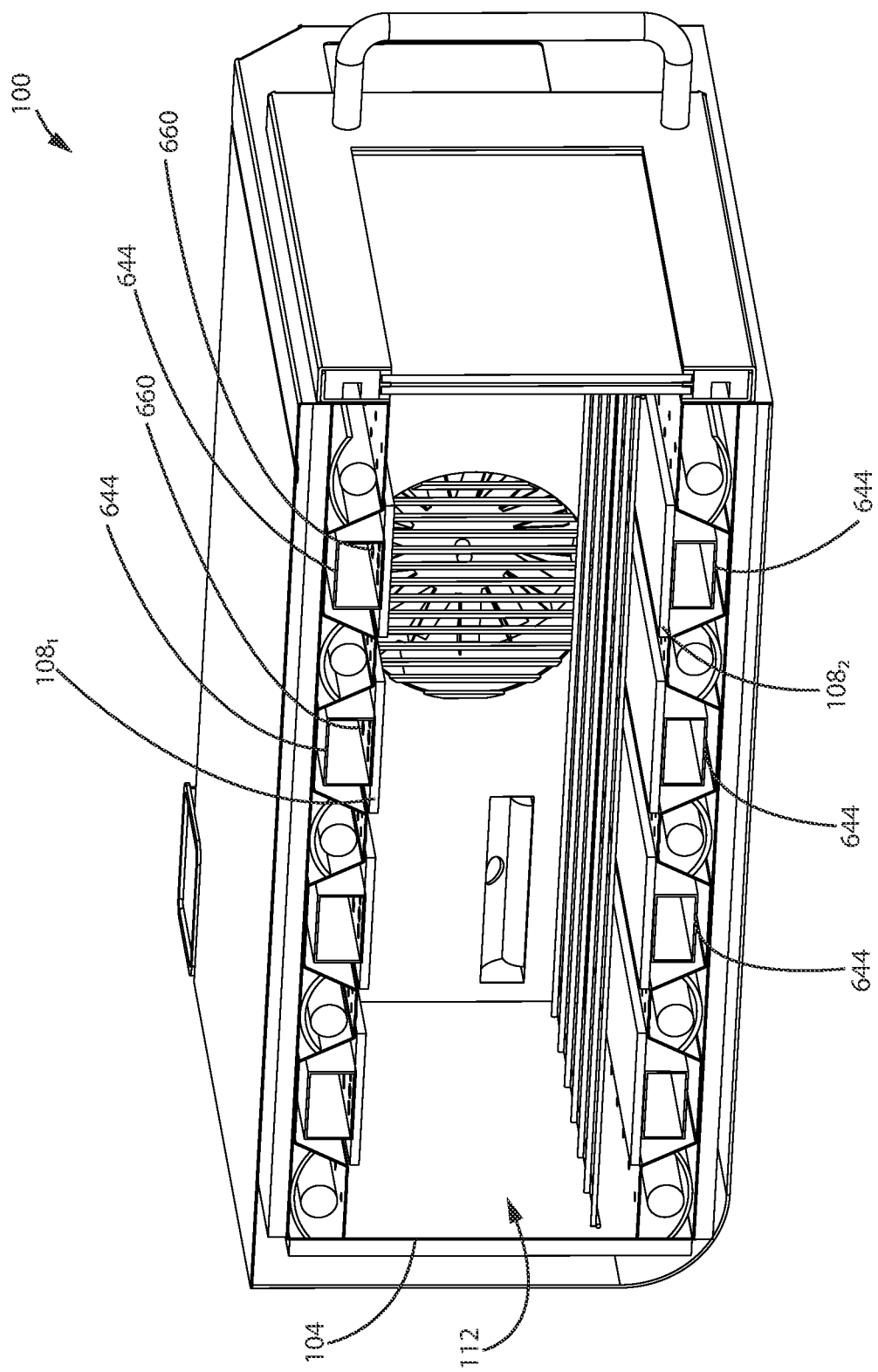
FIG. 99 is a cross-sectional view taken along line 87-87 in FIG. 85, in accordance with another embodiment.
Figure 100:
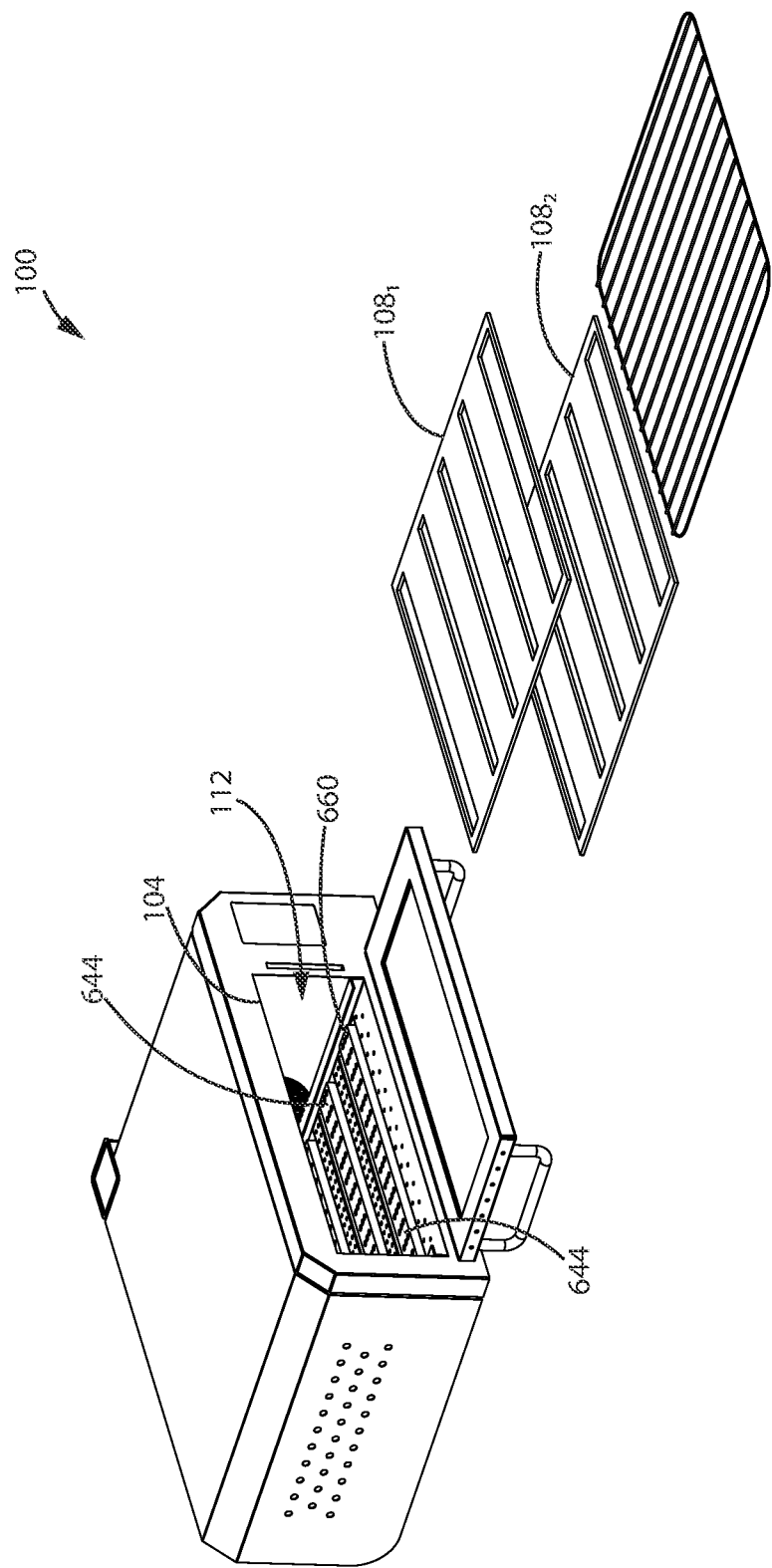
FIG. 100 is a perspective view of the cooking apparatus of FIG. 99 having a cooking chamber door open, and a wire rack and two cooking chamber panels removed.

Referring to FIGS. 99-100, in some embodiments, cooking chamber 104 may include one or more removable panels 108 that when positioned in cooking chamber 104 cover (e.g. close) air outlet openings 660 and obstruct air streams from exiting outlet openings 660. In use, a cover panel 108 may be positioned to obstruct air outlet openings 660 of a subset of heating ducts 644 so that air moving through air flow path 648 (FIG. 86) is directly primarily or entirely through the other heating ducts 644 whose air outlet openings 660 remain unobstructed. Furthermore, the air outlet openings 660 that remain unobstructed may generate higher velocity air streams as compared to if all air outlet openings 660 were unobstructed. This design allows a user to select which of heating ducts 644 produces high velocity air streams. For example, a bottom cover panel $108_2$ may be removed from cooking chamber 104, and a top cover panel $108_1$ may be positioned in cooking chamber 104 so that high velocity air streams are produced only from heating ducts 644 located below cooking volume 112 (e.g. to crisp a bottom crust of a pizza). The reverse situation may be applied to produce high velocity air streams only from heating ducts 644 located above cooking volume 112 (e.g. where a cooking container allows access to the food being cooked only from above).

Figure 101:
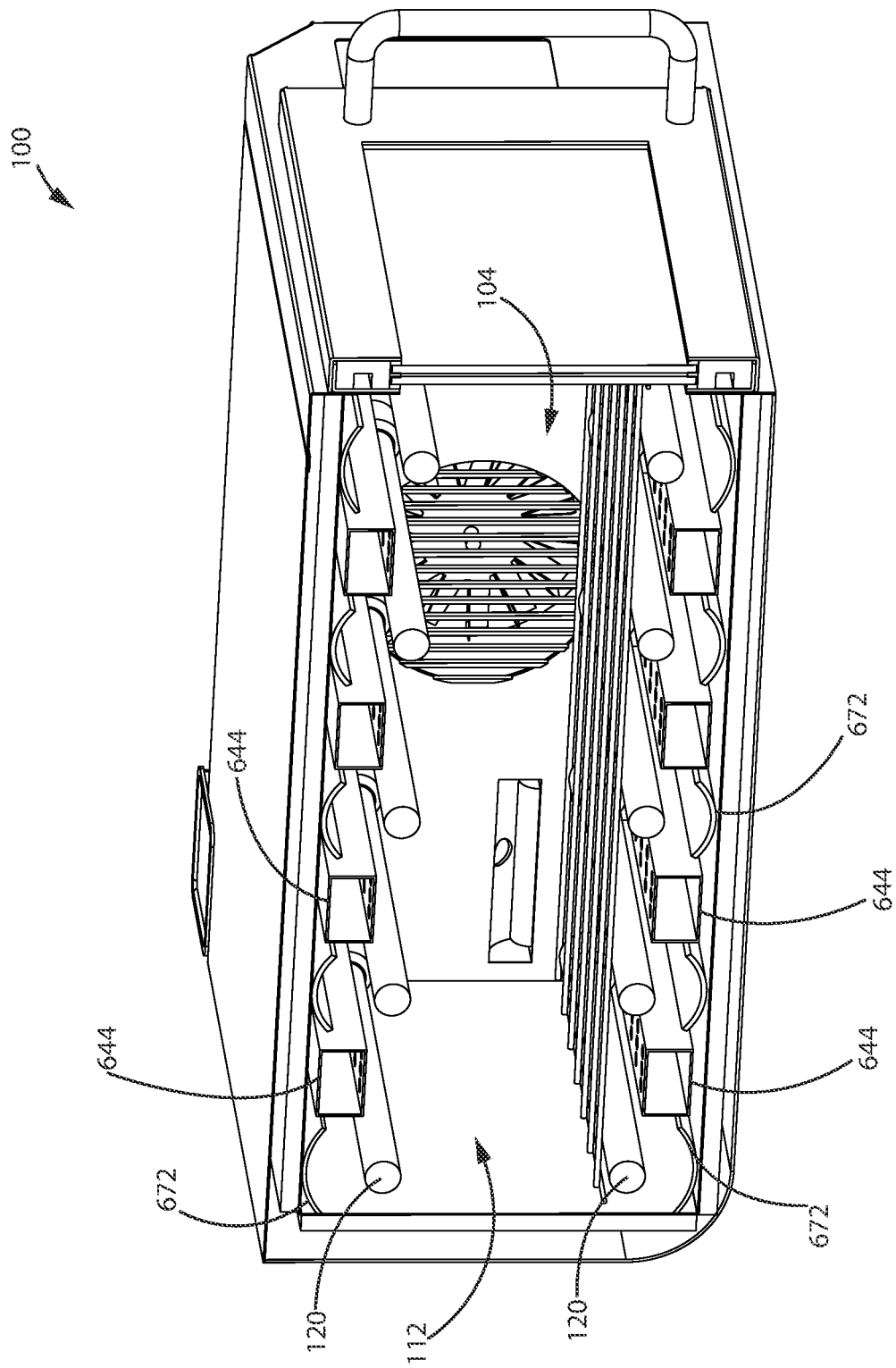
FIG. 101 is a cross-sectional view taken along line 87-87 in FIG. 85, in accordance with another embodiment.
Figure 102:
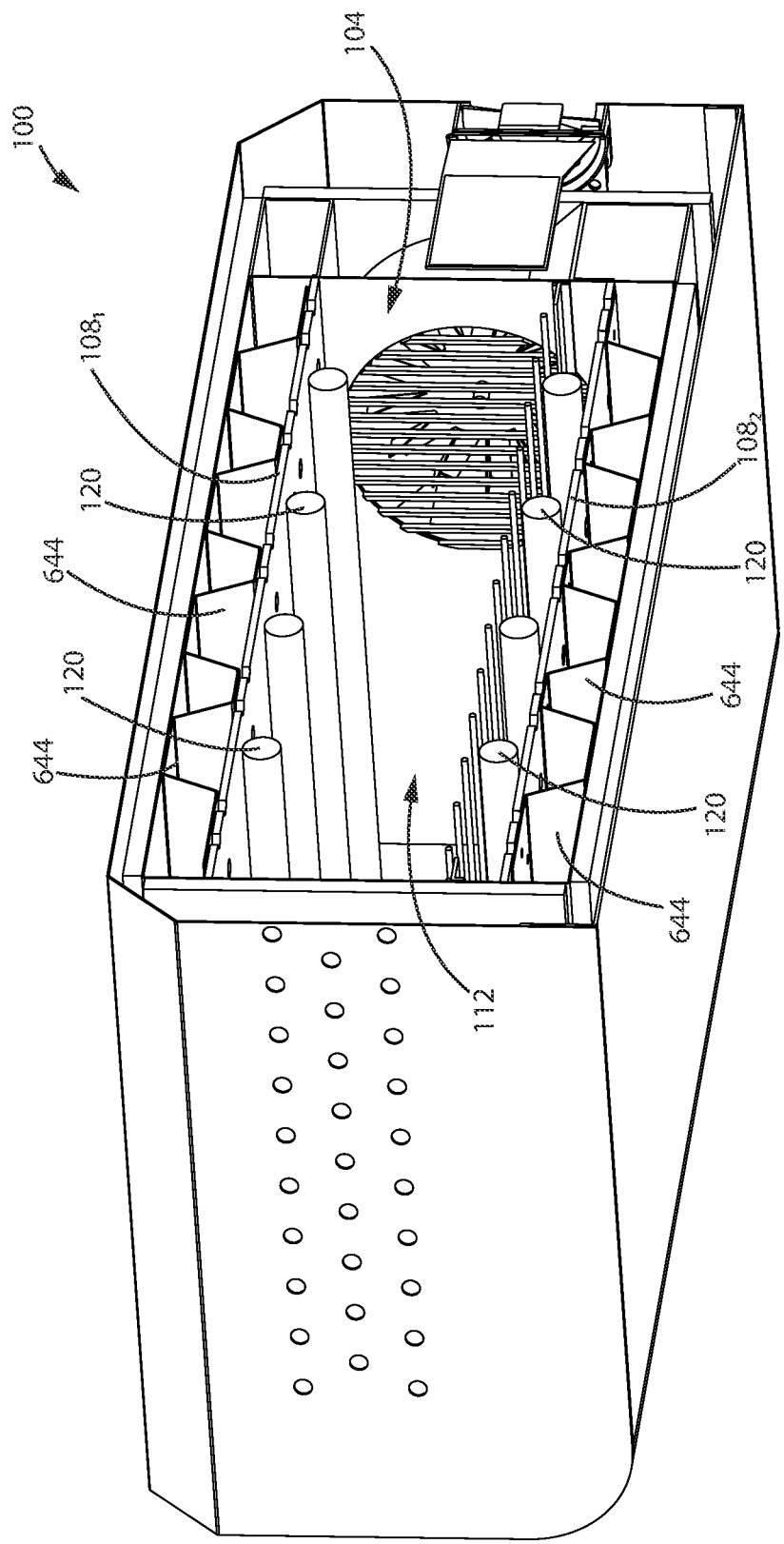
FIG. 102 is a cross-sectional view taken along line 86-86 in FIG. 85, in accordance with an embodiment.

Reference is now made to FIGS. 101-102. In some embodiments, a heating element 120 may be located inwardly (i.e. relative to cooking volume 112) of adjacent heating ducts 644. This may allow heating elements 120 to radiate heat with greater intensity upon a region of food below. In some cases, this may allow greater air flow around heating elements 120, whereby heating elements 120 may provide greater contributions to the air temperature within cooking chamber 104. FIG. 101 shows an example in which an IR reflector 672 is provided behind each heating element 120 to reflect stray IR radiation towards cooking volume 112. FIG. 102 shows an example in which heating elements 120 are located in front of cooking chamber panels 108.

Figure 103:
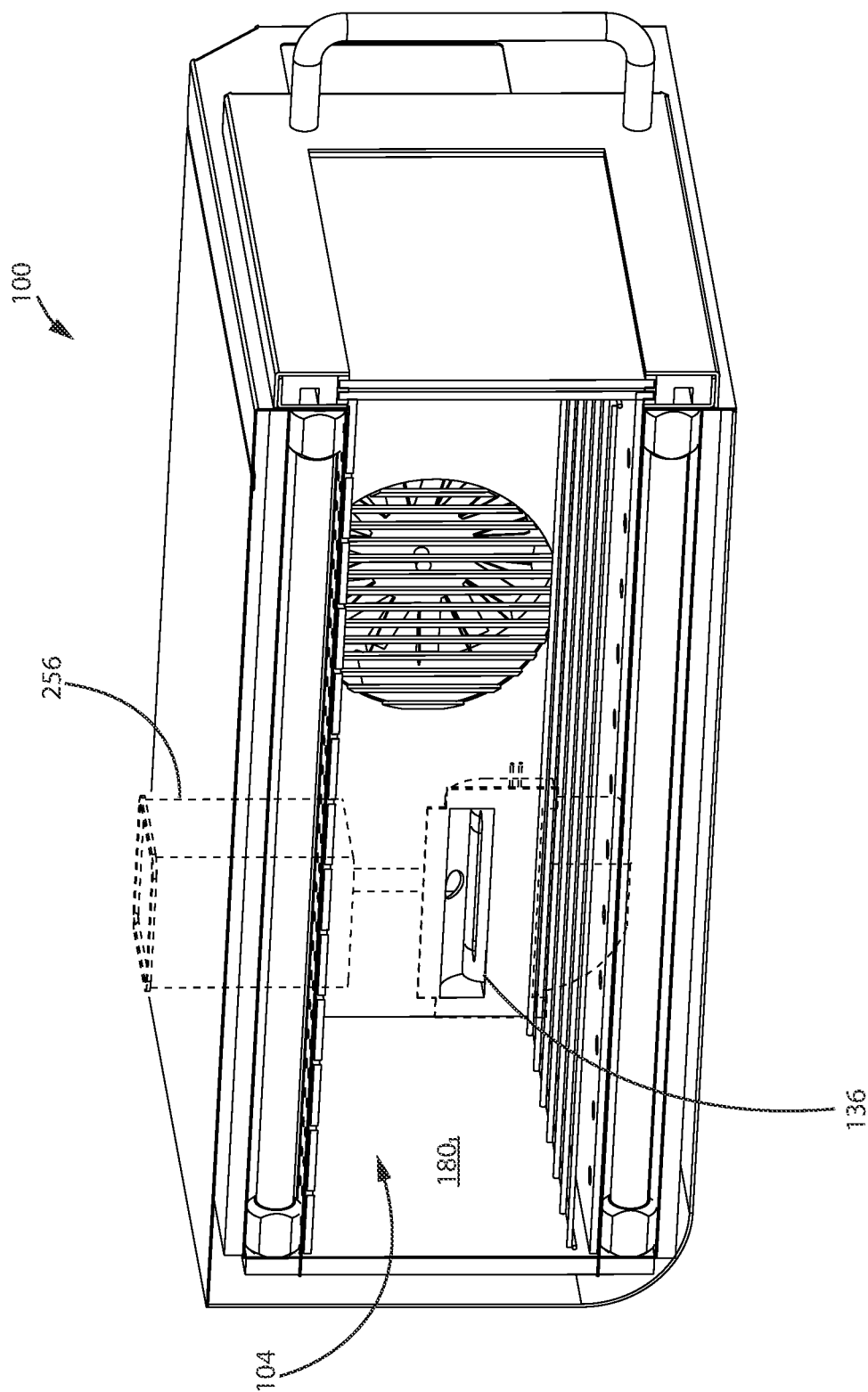
FIG. 103 is a cross-sectional view taken along line 87-87 in FIG. 85, in accordance with another embodiment.

Returning to FIGS. 87-88, cooking chamber 104 may be divided into a plurality of cooking zones 180 having individually controllable cooking conditions, as described in detail above. For example, each cooking zone 180 may include one or more respective cooking devices, such as heating elements 120, heating ducts 644, and steam generators 136. As shown in FIG. 103, a cooking zone 180 may include a steam generator 136 positioned within cooking chamber 104, and that receives water from a water reservoir 256. Cooking zones 180 may be further isolated by positioning a cooking container, such as cooking receptacles 140 (FIG. 2) and/or cooking vessels 160 (FIG. 2) within cooking chamber 104 as described in detail above.

Common Motor Drive

Figure 46:
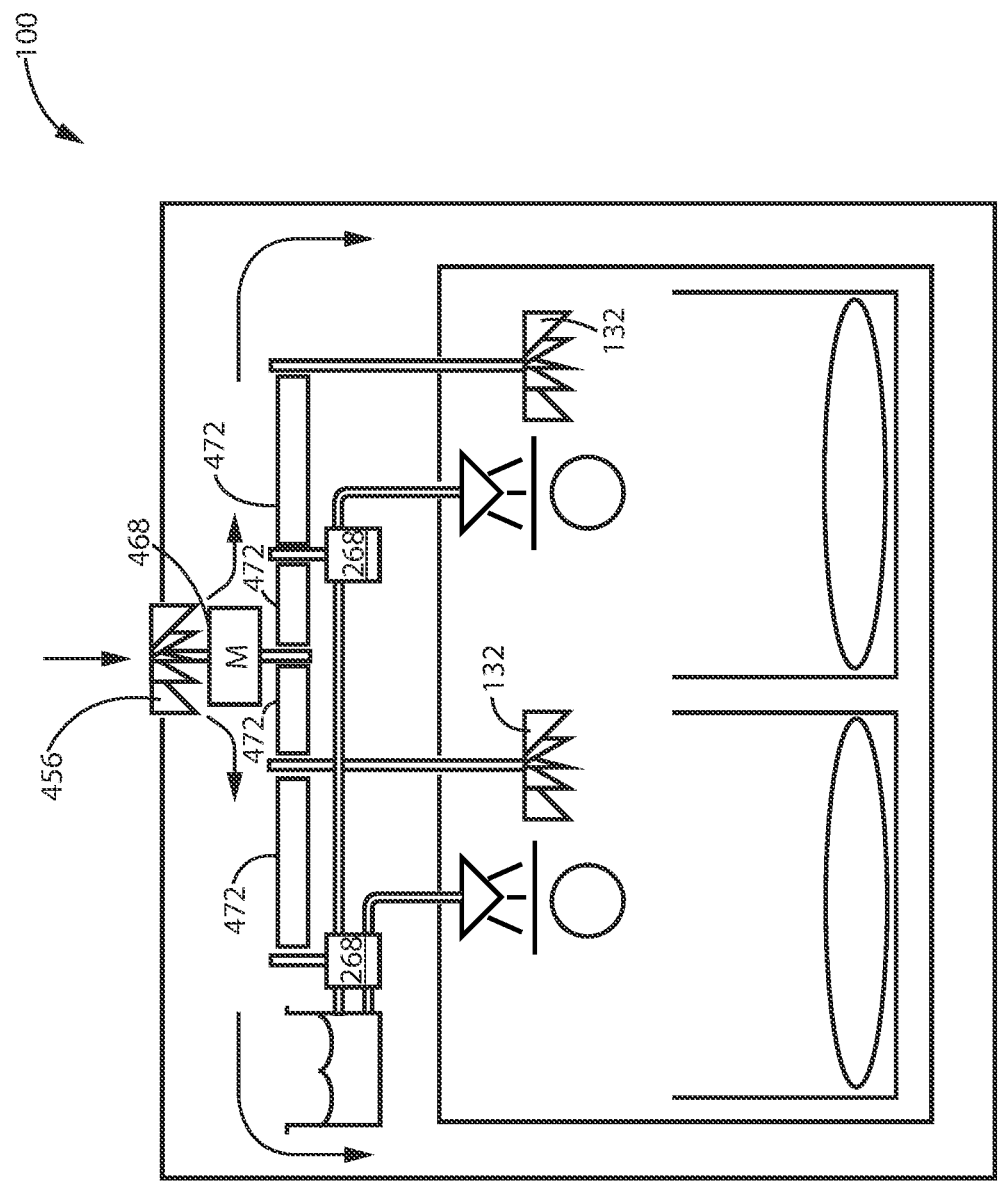
FIG. 46 is a schematic illustration of a cooking apparatus including a common motor driving multiple motor-driven devices in accordance with an embodiment.

Reference is now made to FIG. 46. In some embodiments, two or more of the same or different motor driven devices within cooking apparatus 100 are driven by a common motor 468. An advantage of this design is that it can reduce the number of motors used to operate cooking apparatus 100, which may thereby reduce the cost, weight, and size of cooking apparatus 100, all else being equal.

The features in this section may be used by themselves in any cooking apparatus or in any combination or sub-combination with any other feature or features described herein. For example, the feature of using a common motor drive described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, heating ducts, reorientation and expansion, vertical cooking, toaster, heat storage members, and other features described herein.

The illustrated embodiment shows examples of steam generator pumps 268, air mover impellers 132, and cooling fan 456 as motor driven devices. As shown, any two or more (or all as shown) of these devices can be driven by a common motor 468. Common motor 468 may be connected to motor-driven devices 268, 132, and 456 in any manner suitable for motor 468 to drive their operation. In the illustrated example, each of devices 268, 132, and 456 is connected to common motor 468 by a transmission member 472. Each transmission member 472 may include one or more (or all) of gears, belts, chain, pulleys, and rods, which may cooperate to transmit the rotation of common motor 468 to the respective device 268, 132, or 456. Further, each transmission member 472 may have the same or different transmission ratio, which is the ratio of the output speed of common motor 468 to the rotation speed of the device 268, 132, or 456 when that device is connected to common motor 468 by the transmission member 472. The ratio may be less than 1, in which case the device is driven at a speed less than the motor output speed; equal to 1, in which case the speeds are the same; or greater than 1, in which case the device is driven at a speed greater than the motor output speed.

Smoke/Odor Control

Reference is now made to FIGS. 47A-47B. In some embodiments, cooking apparatus 100 may include a gas cleaner 476. Gas cleaner 476 may act upon gases circulating within or discharging from cooking apparatus 100 to remove smoke and/or odor particles. An advantage of this design is that it can reduce the quantum of undesirable smoke and/or odors emanating from cooking apparatus 100, which may be used on a countertop without range hood to capture exhaust gases. FIG. 47A shows an example of gas cleaner 476 positioned within cooking chamber 104, and FIG. 47B shows an example of gas cleaner 476 positioned outside of cooking chamber 104 (e.g. within an exhaust conduit).

The features in this section may be used by themselves in any cooking apparatus or in any combination or sub-combination with any other feature or features described herein. For example, the feature of smoke and/or odor control described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, heating ducts, common motor drive, reorientation and expansion, vertical cooking, toaster, heat storage members, and other features described herein.

Gas cleaner 476 can be any device suitable for removing smoke and/or odor particles from gases circulating within or discharging from cooking apparatus 100. In some embodiments, gas cleaner 476 may include a wet scrubber, an ozone deodorizer, an electrostatic precipitator, or combinations thereof. FIG. 48 shows an example of a gas cleaner 476 that includes a wet scrubber. As shown, gas cleaner 476 may include a liquid (e.g. water) reservoir 480, a spray nozzle 484, and a liquid flow path 488 from the charged liquid reservoir 480 to the spray nozzle 484. A pump 490 may be positioned in the liquid flow path 488 to force liquid from the reservoir 480 to spray from the spray nozzle 484. Spray nozzle 484 may spray a charged liquid (e.g. water) mist over dirty/odorous gas 492, so that the charged liquid droplets attach to smoke and/or odor particles 496 in the gas 492, and collect on or in a collector 504, and clean/fresh gas 507 free of the collected particles 496 exits gas cleaner 476.

The liquid mist from spray nozzle 484 may be charged in any manner. In the illustrated example, a charged needle 506 is positioned in the flow path of the liquid mist to impart a charge upon the liquid mist, thereby producing electrostatically charged mist.

Collector 504 may be any device that can collect the charged mist with particles 496 attached. For example, collector 504 may include one or more plates or wires that are oppositely charged compared to the liquid mist.

FIG. 49 shows an example of a gas cleaner 476 including an ozone deodorizer. As shown, gas cleaner 476 may include an ozone generator 508, and an ozone destroyer 512. In use, ozone generator 508 may emit ozone particles that mix with the dirty/odorous gas 492 so that the ozone molecules 514 attach to the particles 496, then the ozone molecules 514 carrying the particles 496 are destroyed by interaction with the ozone destroyer 512 (depositing the particles 496 on ozone destroyer 512), and clean/fresh gas 507 free of the collected particles 496 exits gas cleaner 476.

Ozone destroyer 512 can be any device that can destroy ozone molecules, such as by converting the ozone molecules to other forms (e.g. to $O_2$ oxygen). In some embodiments, ozone destroyer 512 includes a catalytic ozone destroyer, a thermal ozone destroyer, or combinations thereof.

FIG. 50 shows an example of a gas cleaner 476 including an electrostatic precipitator. As shown, gas cleaner 476 may include a charged needle 506 upstream from a collector 504. Charged needle 506 may have a large charge (e.g. negative 5,000 to negative 10,000 volts, or positive 5,000 to positive 10,000 volts), and may be positioned in a gas flow path 516. Dirty/odorous gas 492, or at least the particles 496 therein, is charged as it passes over charged needle 506. The charged gas 492 deposits particles 496 as it passes over, between, or through collector 504. A clean/fresh gas 507 exits from gas cleaner 476, free of the collected particles 496.

Collector 504 may be any device that can collect particles 496 from the charged gas 492 as gas 492 passes over, between, or through collector 504. Collector 504 has an electrostatic potential difference from the particles 496 such that it attracts particles 496 to separate from gas 492. For example, collector 504 may be an oppositely charged (compared to gas 492) or grounded sponge (wet or dry), metal plate(s), metal mesh, paper or plastic covered conductors, conductive paper or plastic, wool, stream of atomized liquid (e.g. water), or liquid pool.

Reorientation and Expansion

Reference is now made to FIGS. 51-52. In some embodiments, cooking apparatus 100 may be rotatable between a tall orientation (FIG. 51) and a wide orientation (FIG. 52). In the tall orientation (FIG. 51), cooking apparatus 100 may have one or more cooking zones 180 stacked vertically and occupy a relatively small footprint. In the wide orientation (FIG. 52), cooking apparatus 100 may have one or more cooking zones 180 horizontally side-by-side and occupy a relatively larger footprint. An advantage of this design is that it can allow cooking apparatus 100 to occupy less counter space in the tall orientation (FIG. 51) when cooking one or several foods 220 having relatively smaller horizontal widths, and allow cooking apparatus 100 to selectively transition to the wide orientation (FIG. 52) to accommodate foods 220 (e.g. pizza) having a relatively larger horizontal width. In such a case, heating elements may be positioned for use when the appliance is vertically oriented as in FIG. 51 or horizontally oriented as in FIG. 52, or they may be repositionable.

The features in this section may be used by themselves in any cooking apparatus or in any combination or sub-combination with any other feature or features described herein. For example, the feature of reorientation and expansion described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, heating ducts, common motor drive, smoke and/or odor control, vertical cooking, toaster, heat storage members, and other features described herein.

Figure 53:
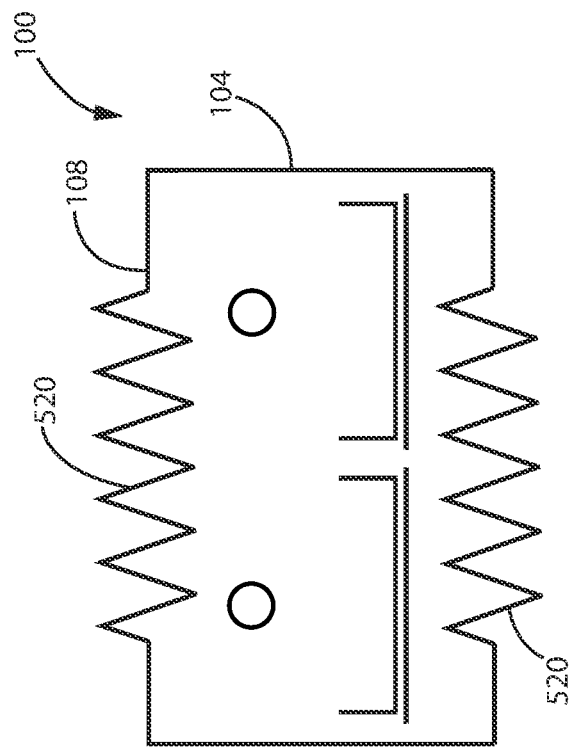
FIG. 53 is a schematic illustration of a cooking apparatus in a compact configuration in accordance with an embodiment.
Figure 54:
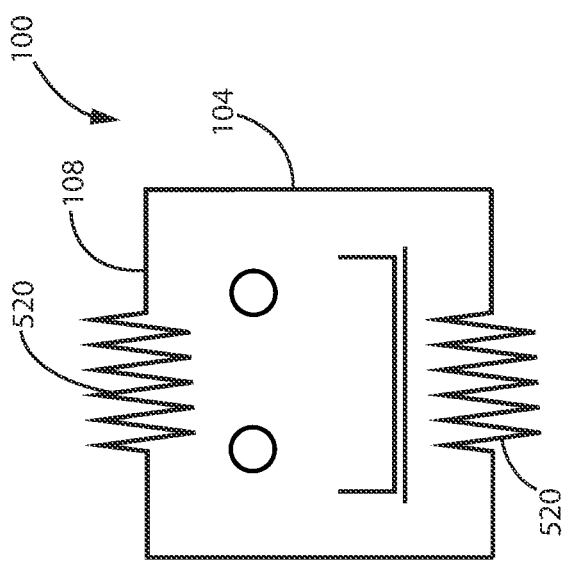
FIG. 54 is a schematic illustration of the cooking apparatus of FIG. 53 in an expanded configuration in accordance with an embodiment.
Figure 55:
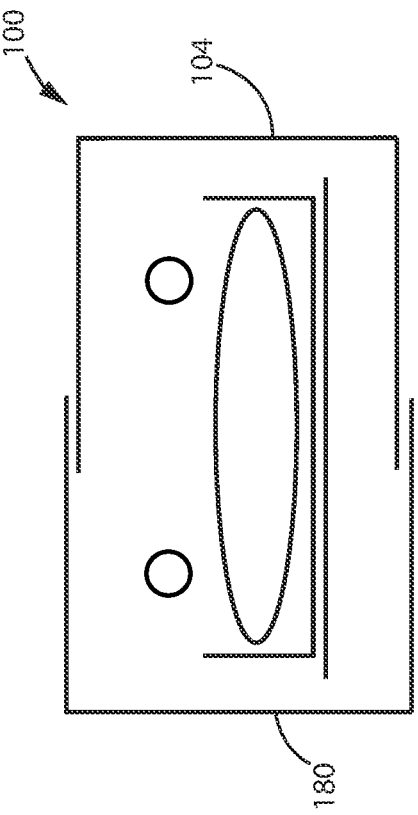
FIG. 55 is a schematic illustration of a cooking apparatus in a compact configuration in accordance with an embodiment.
Figure 56:
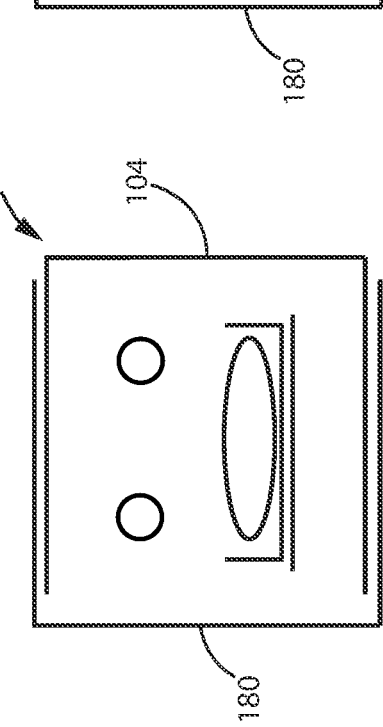
FIG. 56 is a schematic illustration of the cooking apparatus of FIG. 55 in an expanded configuration in accordance with an embodiment.

Turning to FIGS. 53-56, in some embodiments, cooking apparatus 100 may be horizontally expandable. As shown, cooking apparatus 100 may be movable between a compact configuration (FIGS. 53 and 55), and an expanded configuration (FIGS. 54 and 56). An advantage of this design is that cooking apparatus 100 can have a smaller footprint that occupies less counter space, until and unless a larger cooking chamber 104 is required to cook more or larger food than the compact configuration can accommodate.

Cooking apparatus 100 may be expandable in any manner that increase the horizontal dimension of cooking chamber 104. FIGS. 53-54 show an example in which cooking chamber sidewalls 108 include expandable (e.g. accordion) portions 520 that move between a compact configuration (FIG. 53) and an expanded configuration (FIG. 54). FIGS. 55-56 show an example in which cooking chamber 104 includes sidewalls 108 that can nest in the compact configuration (FIG. 55), and move farther part in the expanded configuration (FIG. 56).

Vertical Cooking

Figure 57:
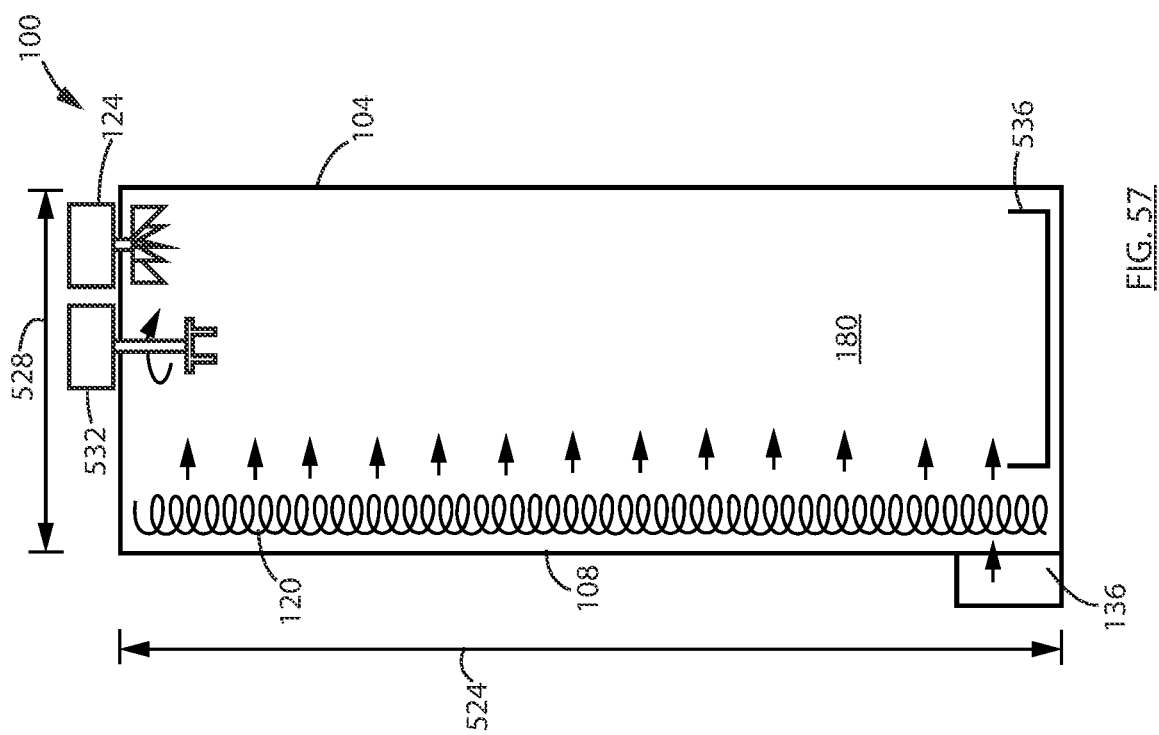

Reference is now made to FIG. 57. In some embodiments, cooking apparatus 100 may include a cooking chamber 104 with vertically oriented heating element(s) 120 extending along at least one vertical sidewall 108 of the cooking chamber 104. As shown, cooking chamber 104 may have a height 524 that is greater than (e.g. at least 1.5 times, or at least 2 times) a width 528 of the cooking chamber 104. An advantage of this design is that it can allow for cooking tall food items and can deliver relatively even heating across the height of the cooking chamber 104.

The features in this section may be used by themselves in any cooking apparatus or in any combination or sub-combination with any other feature or features described herein. For example, the feature of vertical cooking described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, heating ducts, common motor drive, smoke and/or odor control, reorientation and expansion, toaster, heat storage members, and other features described herein.

Still referring to FIG. 57, in some embodiments the cooking apparatus 100 may include a steam generator 136 positioned inside or outside of cooking chamber 104, and configured to humidify the air inside cooking chamber 104.

In some embodiments, cooking apparatus 100 may include a rotating spit 532 for rotisserie cooking. As shown, a drip tray 536 may be positioned below spit 532 to catch food drippings.

Figure 58:
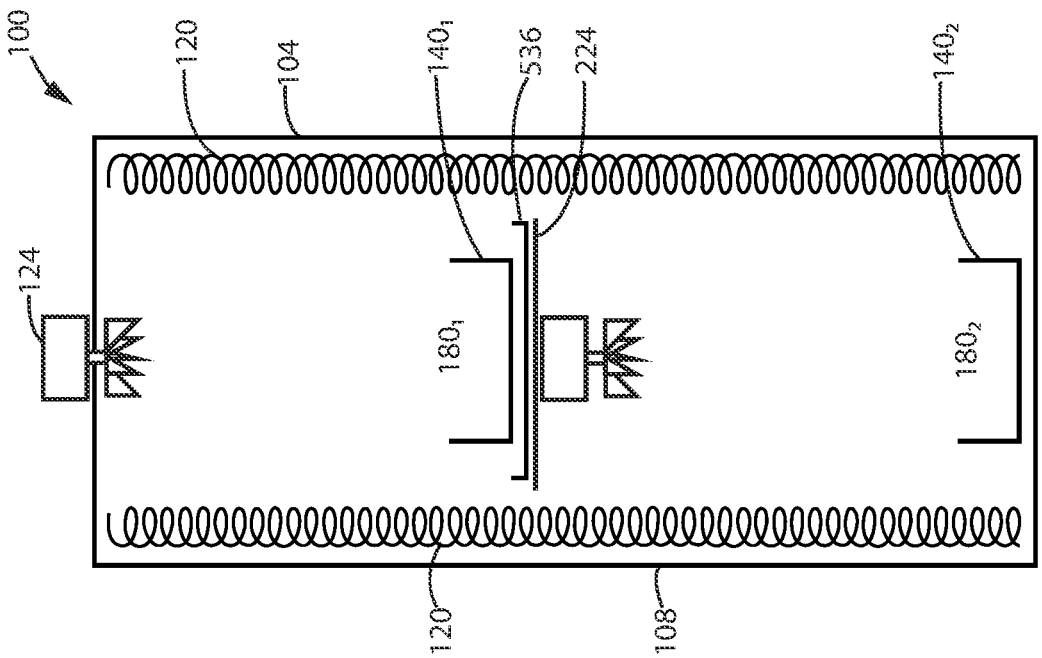
FIGS. 57-60 are schematic illustrations of a cooking apparatus having one or more vertical heating elements in accordance with various embodiments.

Turning to FIG. 58, the vertically oriented cooking chamber 104 may be permanently or selectively divided into two or more vertically stacked cooking zones 180. As shown, one or more of the cooking zones 180 may include a drip tray 536. The stacked cooking zones 180 may be separated by an IR shield 224. IR shield 224 may be removably insertable into cooking chamber 104 so that cooking chamber 104 can be selectively configured into one or many cooking zones 180. IR shield 224 may optionally be IR reflective to reflect IR radiation that strikes the IR shield 224 back into the cooking zones 180.

Figure 60:
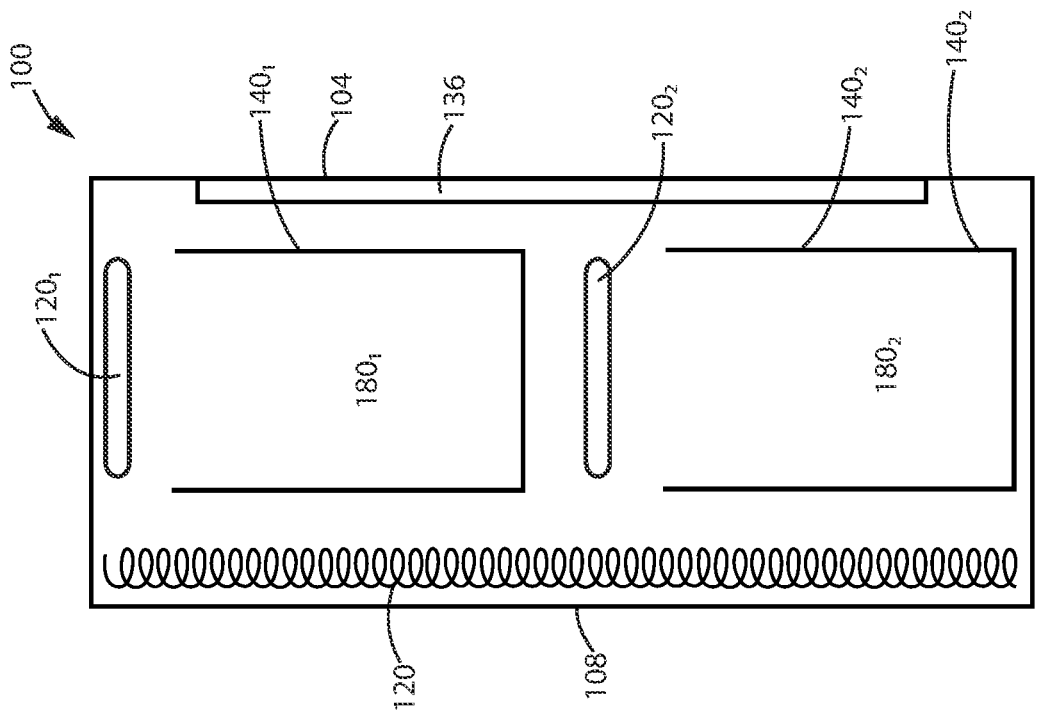
Figure 59:
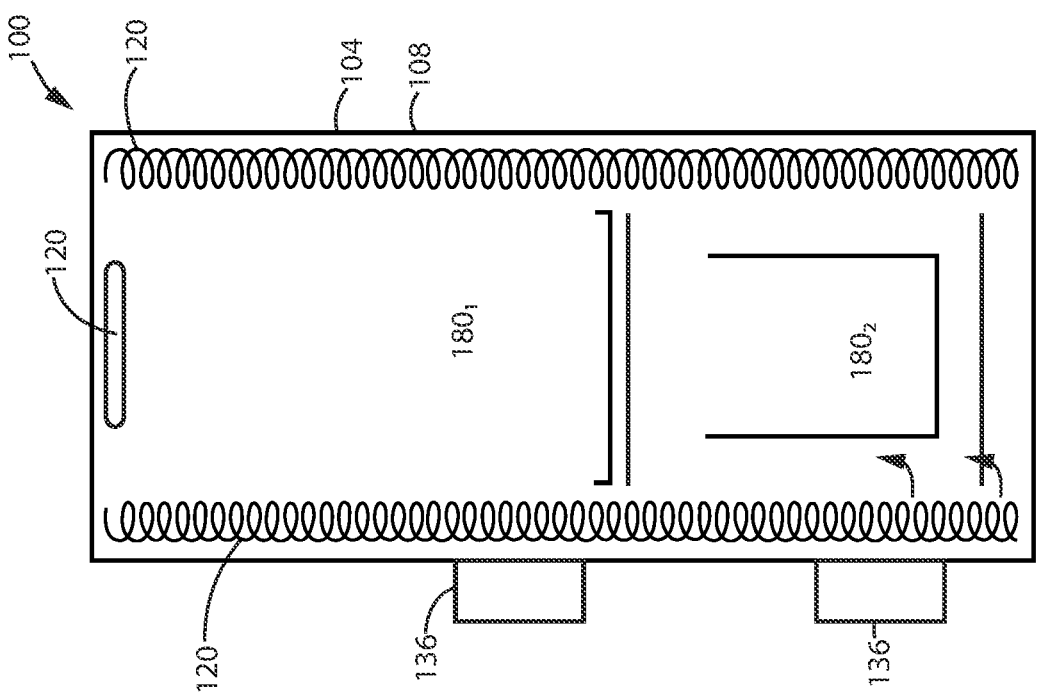

As shown in FIGS. 59-60, in addition to one or more vertical heating elements 120, cooking apparatus 100 may include a heating element 120 overlying one or more (or all) vertically stacked cooking zones 180. The overlying heating element(s) 120 may radiate heat from an additional direction onto food within the cooking zone(s) 180 for more even cooking. FIGS. 59-60 also illustrate that cooking zones 180 may be used with or without cooking receptacles 140. In FIG. 60, an IR shield or other divider is not positioned between cooking zones 180. Instead, cooking receptacles 140 are relied upon to isolate the cooking zones 180.

As shown in FIGS. 57-58, cooking apparatus 100 may include one or more air movers 124 to provide forced convection to one or more associated cooking zones 180. FIGS. 57 and 59 illustrate that one or more steam generators 136 may be provided to generate humidity in one or more associated cooking zones 180. FIG. 60 illustrates an example in which steam generator 136 is an evaporative humidifier including an absorbent material (e.g. wick) that is provided on or defines a vertical sidewall 108 of the cooking chamber 104.

Turning to FIGS. 61A and 61B, in some embodiments, cooking apparatus 100 may be rotated between a tall orientation and a wide orientation. As shown, in the tall orientation, heating element(s) 120 may be vertically oriented along vertical cooking chamber sidewall(s) 108. The tall orientation may be preferable for cooking tall foods, such as to rotisserie cook a vertically suspended portion of meat. In the horizontal orientation, heating element(s) 120 may be horizontally oriented (e.g. above and below cooking zone 180 as shown). This orientation may be preferable for cooking wide foods, such as a pizza.

Toaster

Figure 62:
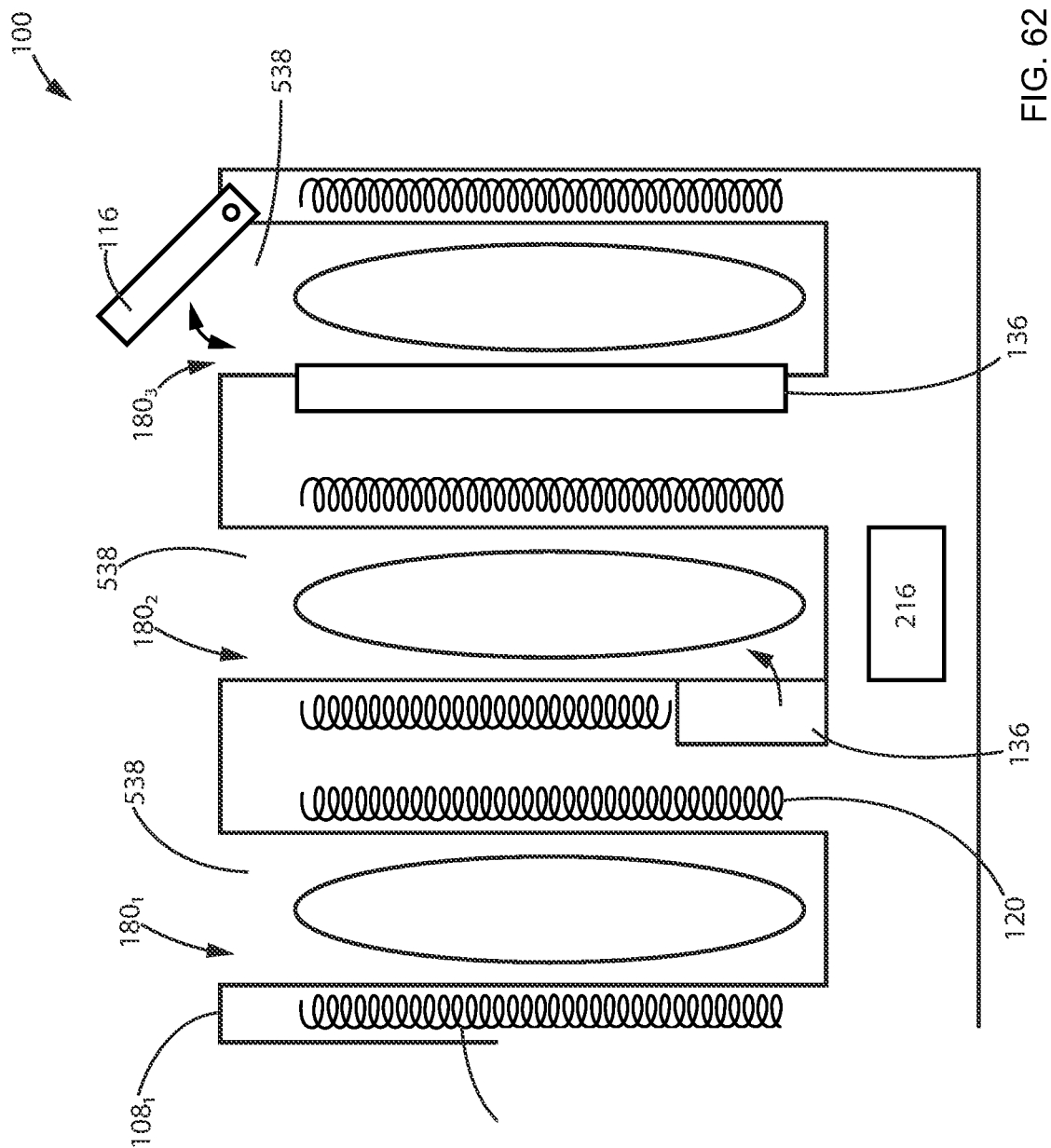
FIG. 62 is the schematic illustration of a cooking apparatus configured as a top-loaded toaster in accordance with an embodiment.

Reference is now made to FIG. 62, which shows a cooking apparatus 100 configured as a top-loading toaster. As shown, cooking apparatus 100 may include two or more thermally isolated cooking zones 180. An opening 538 aligned with each cooking zone 180 may be provided in cooking chamber upper wall $108_1$ for inserting and removing food from cooking zones 180. One or more or all of cooking zones 180 may have an associated cooking chamber door 116 to selectively close the cooking zone 180 for better control over the cooking conditions in the cooking zone 180.

The features in this section may be used by themselves in any cooking apparatus or in any combination or sub-combination with any other feature or features described herein. For example, the feature of a toaster described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, heating ducts, common motor drive, smoke and/or odor control, reorientation and expansion, heat storage members, and other features described herein.

Each cooking zone 180 may have at least one associated heating element 120 (e.g. IR heating element), which may extend along a height of the cooking zone 180 as shown. In some embodiments, one or more (or all) cooking zones 180 may have an associated steam generator 136 to humidify the air in the cooking zone 180. Cooking zone $180_1$ is shown having no associated steam generator, cooking zone $180_2$ is shown having an associated steam generator $136_2$ positioned outside the cooking zone $180_2$, and cooking zone $180_3$ is shown having a steam generator $136_3$ that is provided on or defines a wall of the cooking zone $180_3$.

Heat Storage Member

Figure 63:
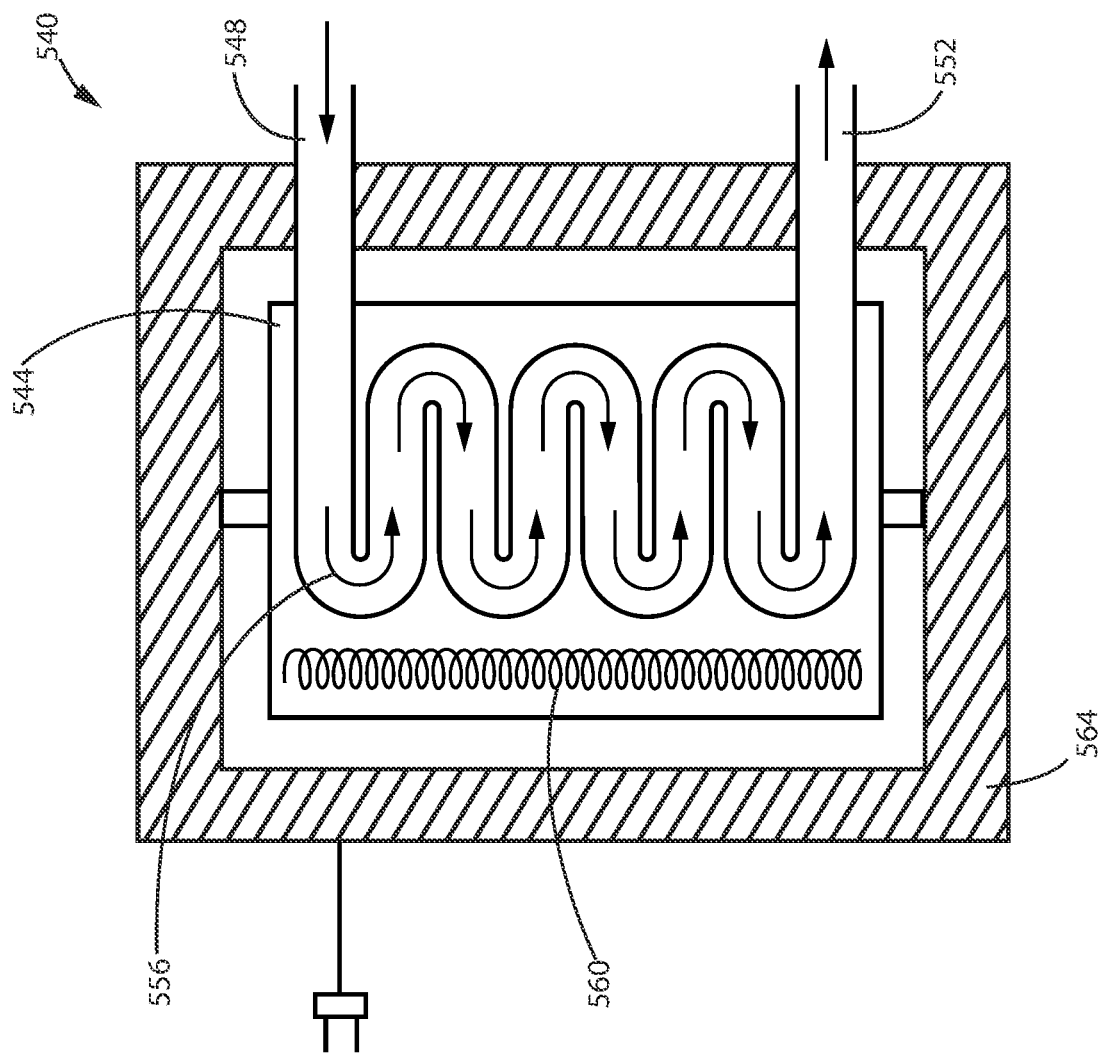
FIGS. 63-65 are schematic illustrations of a hot water heater in accordance with various embodiments.

Reference is now made to FIG. 63, which shows a fluid heater 540 (also referred to as a heat storage member or energy storage member) in accordance with an embodiment. As shown, fluid heater 540 may include an energy storage member 544 (e.g. large block of metal, such as aluminum, also referred to as a 'heat sink'), a fluid inlet 548, a fluid outlet 552, and a flow path 556 that extends from the fluid inlet 548 across or through the energy storage member 544 to the fluid outlet 552. Fluid, such as water or air, may be quickly heated by drawing heat from energy storage member 544 as the fluid flows along the flow path 556 from the fluid inlet 548 to the fluid outlet 552. An advantage of this design is that it can provide nearly instant hot fluid (e.g. hot water or hot air). In the case of liquid, such as water, the hot fluid may be dispensed, e.g. into a cup, or used to supply another device, such as a kettle or pod coffee maker for example.

The features in this section may be used by themselves in any cooking apparatus or in any combination or sub-combination with any other feature or features described herein. For example, the feature of a heat storage member described herein may be used with any of the features of multiple cooking zones, the cooking receptacle and the cooking vessel, subdividable cooking zones, forced convection, steam generation, dynamic energy utilization, door transparency, removable handle, retractable door, self-cleaning, cooking additive distribution, insulation and air cooling, heating ducts, common motor drive, smoke and/or odor control, reorientation and expansion, toaster, and other features described herein.

Still referring to FIG. 63, fluid heater 540 may include a heating element 560 (e.g. resistance heater) that draws power from an electrical cord 568 with a mains power connector for example (e.g., it may be removably plugged into a household electrical outlet). Heating element 560 may be thermally connected (e.g. in contact with or embedded within) energy storage member 544 for heating energy storage member 544. Energy storage member 544 may be of a material and size that can quickly store large amounts of energy from heating element 560, and quickly release that heat to fluid flowing along flow path 556 (e.g., a metal block such as aluminum). As shown, energy storage member 544 may be partially or complete surrounded in insulation 564 to mitigate the loss of heat to the environment. Insulation 564 may include physical insulation, vacuum insulation, or both. Preferably, insulation 564 has an insulation rating of at least R-5.

Figure 65:
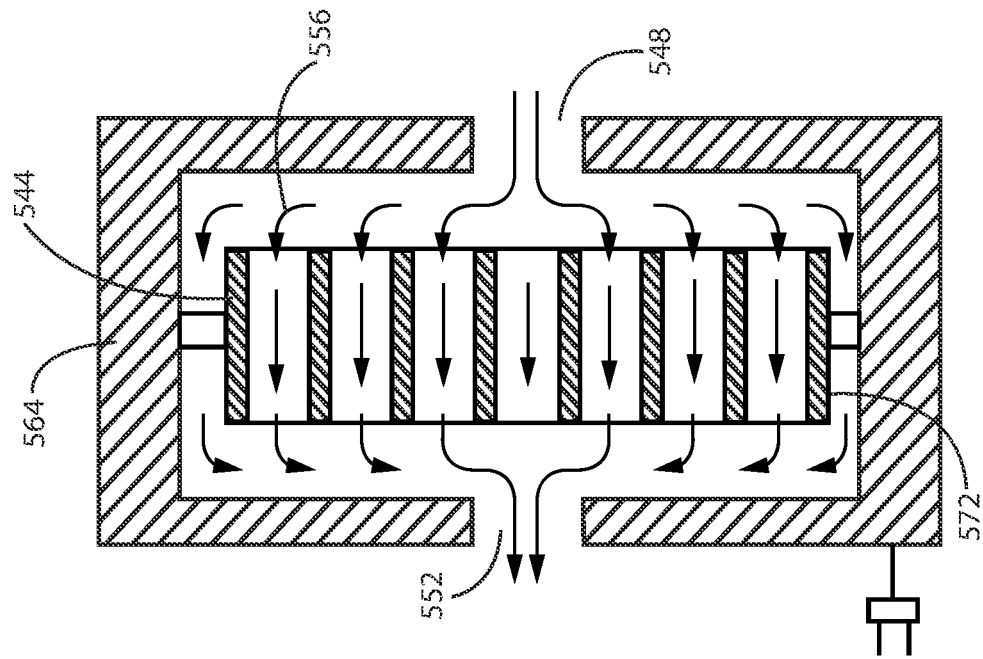
Figure 64:
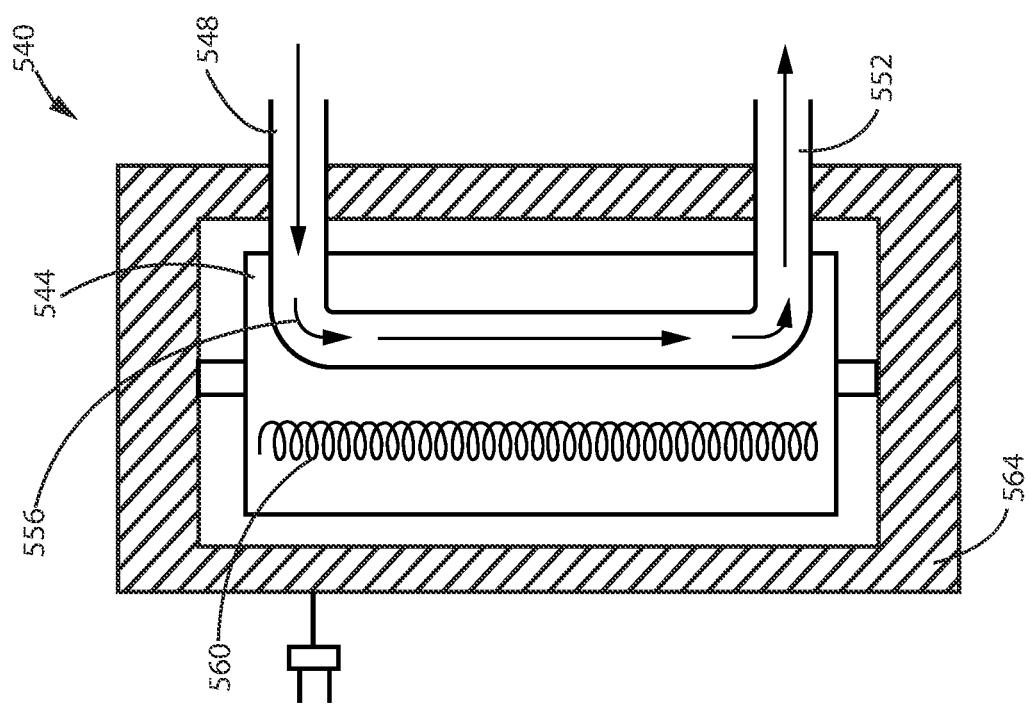

Energy storage member 544 may define any flow path 556 between fluid inlet 548 and fluid outlet 552 that is suitable for efficiently delivering heat to fluid. FIG. 63 shows an example of a flow path 556 that is tortuous to provide a greater residency time and surface area for the fluid to receive heat from heating element 560. FIG. 64 shows a less tortuous C-shaped flow path 556. FIG. 65 shows an example of an energy storage member 544 including a plurality of fins 572 across which the flow path 556 extends. Fins 572 increase the surface area of contact between energy storage member 544 and fluid in the flow path 556 for a more rapid and efficient exchange of heat. Baffles may be provided in the flow path. It will be appreciated that the energy storage member 554 may be made of a single piece of substrate (metal) or several pieces secured together to provide the flow path 556.

Reference is now made to FIG. 104, which shows heat storage member 540 connected to an appliance 696. Appliance 696 may be an electric kettle, a coffee maker, or any embodiment of cooking apparatus 100 described herein. As shown, heat storage member 540 includes a thermally insulated heat sink 544, a heating member 560 in thermal communication with heat sink 544, and a fluid flow path 556. Fluid flow path 556 is shown including an inlet end 548 connected, preferably removably connectable, in fluid communication with appliance fluid outlet 704, and an outlet end 552 connected, preferably removably connectable, in fluid communication with appliance fluid inlet 708.

In use, heat sink 544 may be pre-heated prior to appliance 696 initiating a hot fluid operation (e.g. brewing or cooking cycle), and then an appliance fluid mover 712 (e.g. pump for liquids, or fan for air) may be activated to circulate fluid (e.g. water or air) from appliance 696 through heat storage member 540 where the fluid is heated by receiving heat from heat sink 544, and then returned as hot fluid back to appliance 696. The hot fluid may be further heated by an appliance heating member 716 as part of the hot fluid operation. It will be appreciated that heat sink 544 may be pre-heated prior to or subsequent to heat sink being fluidically connected to an appliance.

An advantage of this design is that it can allow appliance 696 to add heat to the circulating fluid at a higher rate (i.e. wattage) than capable by appliance 696 alone. During the hot fluid operation, the circulating fluid may be concurrently heated by appliance heating member 716 and heat stored in heat storage member 540. This allows heat storage member 540 to supplement the heat supplied by heating member 716. In some cases, heat storage member 540 may be turned off during the hot fluid operation so that the supplemental heat is provided without placing additional burden on the power circuit to which appliance 696 is connected (i.e. avoids blowing a fuse).

In some embodiments, heat storage member 540 may be a portable heat storage member 540 that is removably connectable to appliance 696. This can allow heat storage member 540 to be connected to an appliance 696 only when required for supplemental heating. In some embodiments, heat storage member 540 may be selectively connected to any one of numerous different appliances 696. This allows a single heat storage member 540 to be selectively connected to one of the numerous different domestic appliances 696 (e.g. electric kettle, coffee maker, or cooking apparatus) to provide supplemental fluid heating for a hot fluid operation.

Alternately, the heat sink may be part of an appliance (it may be provided as a unitary appliance). In such a case, the heat sink may be heated by flowing a heated fluid therethrough. Accordingly, the heat storage member may not have a heating element.

Referring to FIGS. 104-105, heat storage member 540 may be removably connected to appliance 696 in any manner. As shown, appliance 696 may include inlet and outlet connectors $720_1$, $720_2$, and heat storage member 540 may include inlet and outlet connectors $724_1$, $724_2$. Inlet and outlet connectors $720_1$, $720_2$ may be connected to inlet and outlet connectors $724_1$, $724_2$ as shown in FIG. 104 to fluidly connect heat storage member 540 to domestic appliance 696. Connectors 720, 724 may be disconnected to fluidly disconnect heat storage member 540 from domestic appliance 696. When disconnected, appliance connectors 720 may be left disconnected pending a reconnection to heat storage member connectors 724, may be closed (e.g. by end-caps), or may be connect to each other to allow appliance fluid mover 712 to recirculate fluid across appliance heating member 716 when disconnected from heat storage member 540 as shown in FIG. 105.

In some embodiments, appliance 696 does not have a heating member 716. For example, heat storage member 540 may be the primary or sole source of fluid heating for appliance 696, and appliance 696 may require a connection to heat storage member 540 to execute a hot fluid operation. An advantage of this design is that it may allow a single heat storage member 540 to provide fluid heating for two or more domestic appliances 696. This may make those domestic appliances 696 more compact and less expensive.

Referring to FIG. 104, optionally heat storage member 540 may include a temperature sensor 728 that is thermally coupled to heat sink 544. In some embodiments, heating element 560 may be activated or deactivated based on temperature readings from temperature sensor 728. For example, heating element 560 may be activated when temperature sensor 728 senses that heat sink 544 has a temperature below a predetermined threshold. The predetermined threshold may correspond with a temperature to which heat sink 544 is preheated before a hot fluid operation. For hot fluid operations involving liquid, such as water, the predetermined temperature may be less than 200° C., such as between 75° C. and 200° C. For hot fluid operations involving gas, such as air, the predetermined temperature may be less than 500° C., such as between 200° C. and 500° C.

Reference is now made to FIG. 106, which shows an example in which heat storage member 540 is connected to a domestic appliance, which may be any embodiment of cooking apparatus 100 described herein. As shown, airflow path 556 may include an outlet end 552 in fluid communication with cooking chamber 104, and an inlet end 548 in fluid communication with cooking chamber 104. Air mover 124 may draw air from cooking chamber 104 into inlet end 548 of airflow path 556, and the air may exit outlet end 552 back into cooking chamber 104.

Heat storage member 540 may be pre-heated prior to initiating a cooking cycle within cooking chamber 104. In some embodiments, pre-heating heat storage member 540 may include activating heating element 560 for a pre-determined duration, or until temperature sensor 728 (FIG. 104) senses that a temperature of heat sink 544 exceeds a pre-determined temperature. Alternatively or in addition, pre-heating heat storage member 540 may include activating heating element 120 to generate hot air that air mover 124 draws into heat storage member 540. In this case, the hot air may be responsible for, or contribute to, pre-heating heat sink 544 (e.g. for the predetermined duration or to the predetermined temperature). An advantage of this design is that it may allow heat storage member 540 to include a less powerful heating element 560 or no heating element 560 at all. This may reduce the cost of heat storage member 540.

In use, cooking apparatus 100 may execute a cooking cycle that includes air mover 124 circulating air through heat storage member 540, such that the circulating air may be heated by heat storage member 540 alone or concurrently with one or more heating elements 120. In the latter case, concurrent heating by heat storage member 540 and heating element(s) 120 may allow cooking apparatus 100 to produce greater temperature for prolonged duration, which may otherwise have consumed energy at a rate (e.g. watts) exceeding an energy rating of cooking apparatus 100 and/or a domestic power circuit (e.g. fuse) from which cooking apparatus 100 draws power.

As described above in connection with FIG. 105, heat storage member 540 may be removably connected to cooking apparatus 100.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made.

Clauses

Set 1

1. A cooking apparatus having a front, a rear and transversely opposed sides, the cooking apparatus comprising:
    a. a cooking chamber having an openable door provided on the front of the cooking apparatus and a cooking volume;
    b. a heating duct provided above the cooking volume, the heating duct having a plurality of openings located above the cooking volume, an IR heating element provided in the heating duct overlying at least some of the openings; and,
    c. a fan assembly upstream of the IR heating element.
2. The cooking apparatus of clause 1 wherein air exits the openings at a velocity from 10 to 25 MPH.
3. The cooking apparatus of clause 1 wherein a portion of the heating duct positioned between the IR heating element and the cooking volume is IR permeable.
4. The cooking apparatus of clause 3 wherein the portion of the heating duct is made of stainless steel.
5. The cooking apparatus of clause 3 further comprising moveable members that are moveable between a first position wherein the moveable members are positioned between the heating duct and the cooking chamber and a second retracted positon, wherein the moveable members are made of an IR blocking material.

6. The cooking apparatus of clause 1 wherein a portion of the heating duct positioned between the IR heating element and the cooking volume is an IR absorbent material.

7. The cooking apparatus of clause 6 further comprising moveable members that are moveable between a first position wherein the moveable members are positioned between the heating duct and the cooking chamber and a second retracted positon.

8. The cooking apparatus of clause 1 wherein the cooking apparatus has a plurality of heating ducts and a plurality of IR heating elements, wherein the ducts extend across the top of the cooking volume and one of the IR heating elements is provided in at least some of the heating ducts.

9. The cooking apparatus of clause 8 wherein the heating ducts extend in a forward/rearward direction.

10. The cooking apparatus of clause 1 further comprising a first and a second cooking container removably receivable in the cooking chamber, each of the cooking containers defining a cooking volume when installed in the cooking chamber, the cooking containers subdivide the cooking chamber into different cooking zones and each cooking zone is provided with at least one heating duct having an IR heater positioned therein.

11. The cooking apparatus of clause 1 wherein the velocity of air passing over the IR heating element is adjustable.

12. The cooking apparatus of clause 1 further comprising a controller operatively connected to the fan assembly wherein the controller is operable to adjust an amount of IR radiation outputted by the IR heating element by adjusting a rate of rotation of the fan assembly.

13. The cooking apparatus of clause 1 wherein a portion of the heating duct having the openings is removable.

14. A cooking apparatus having a front, a rear and transversely opposed sides, the cooking apparatus comprising:
   a. a cooking chamber having an openable door provided on the front of the cooking apparatus and a cooking volume;
   b. a plurality of spaced apart heating ducts provided above the cooking volume, the heating ducts having a plurality of openings located above the cooking volume;
   c. an IR heating element provided between adjacent heating ducts; and,
   d. a fan assembly upstream of the IR heating element.

15. The cooking apparatus of clause 14 wherein air exits the openings at a velocity from 10 to 25 MPH.

16. The cooking apparatus of clause 14 wherein the cooking apparatus has a plurality of heating ducts and a plurality of IR heating elements, wherein the ducts extend across the top of the cooking volume and one of the IR heating elements is provided in at least exterior of the heating ducts.

17. The cooking apparatus of clause 16 wherein the heating ducts extend in a forward/rearward direction.

18. The cooking apparatus of clause 14 further comprising a first and a second cooking container removably receivable in the cooking chamber, each of the cooking containers defining a cooking volume when installed in the cooking chamber, the cooking containers subdivide the cooking chamber into different cooking zones and each cooking zone is provided with at least one heating duct having an IR heater positioned therein.

19. The cooking apparatus of clause 14 wherein the velocity of air passing over the IR heating element is adjustable.

20. The cooking apparatus of clause 14 further comprising a controller operatively connected to the fan assembly wherein the controller is operable to adjust an amount of IR radiation outputted by the IR heating element by adjusting a rate of rotation of the fan assembly.

21. The cooking apparatus of clause 14 wherein a portion of the heating duct having the openings is removable.

Set 2

1. A cooking apparatus comprising:
   a. a cooking chamber having an openable door provided on the front of the cooking apparatus and a cooking volume;
   b. an upper IR heating element;
   c. a fan assembly upstream of the IR heating element whereby the fan assembly causes air to pass over the IR element; and,
   d. a controller operable to adjust the energy provided to the fan assembly wherein the fan assembly is operable at a first power level for a first portion of a cooking cycle and the fan assembly is operable at a second power level for a second subsequent portion of the cooking cycle wherein the second power level is higher than the first power level,
   whereby operation of the fan assembly at the second power level causes an increase in airflow over the IR heating element and a reduction in IR radiation emitted by the IR heating element.

2. The cooking apparatus of clause 1 wherein the first portion of the cooking cycle has a duration for browning food in the cooking volume.

3. The cooking apparatus of clause 1 wherein the cooking apparatus operates at 75% or more of a rated power draw of the cooking apparatus for 70% or more of the cooking cycle.

4. The cooking apparatus of clause 1 wherein the cooking apparatus operates at 75% or more of a rated power draw of the cooking apparatus for 80% or more of the cooking cycle.

5. The cooking apparatus of clause 1 wherein the cooking apparatus further comprises a lower cooking element and the controller is adjustable to vary the energy provided to the upper IR element and the lower cooking element.

6. The cooking apparatus of clause 5 wherein the cooking apparatus further comprises a steamer and the controller is adjustable to vary the power provided to the steamer.

7. The cooking apparatus of clause 6 wherein the controller is operable to produce a pre-determined cooking temperature in the cooking volume while the cooking apparatus operates at 75% or more of a rated power draw of the cooking apparatus for 70% or more of the cooking cycle.

8. The cooking apparatus of clause 6 wherein the controller is operable to produce a pre-determined cooking temperature in the cooking volume and a pre-determined humidity level in the cooking volume while the cooking apparatus operates at 75% or more of a rated power draw of the cooking apparatus for 70% or more of the cooking cycle.

9. The cooking apparatus of clause 1 wherein the cooking apparatus further comprises a steamer and the controller is adjustable to vary the power provided to the steamer.
10. The cooking apparatus of clause 9 wherein the controller is operable to adjust the temperature in the cooking volume while the cooking apparatus operates at 75% or more of a rated power draw of the cooking apparatus for 70% or more of the cooking cycle.
11. The cooking apparatus of clause 9 wherein the controller is operable to adjust a temperature in the cooking volume and a humidity level in the cooking volume while the cooking apparatus operates at 75% or more of a rated power draw of the cooking apparatus for 70% or more of the cooking cycle.
12. A cooking apparatus comprising:
   a. a cooking chamber having an openable door provided on the front of the cooking apparatus and a cooking volume;
   b. an IR heating element;
   c. a steamer;
   d. a forced convection fan assembly in flow communication with the cooking volume; and,
   e. a controller operably connected to the IR cooking element and the steamer, wherein the controller has a pre-set cooking setting that represents a cooking regime and, when the pre-set cooking setting is in operation, the controller is operable adjust the distribution of energy to the IR cooking element and the steamer while the cooking apparatus operates at 75% or more of a rated power draw of the cooking apparatus for 70% or more of the pre-set cooking setting.
13. The cooking apparatus of clause 12 wherein the cooking apparatus operates at 75% or more of a rated power draw of the cooking apparatus for 80% or more of the pre-set cooking setting.
14. A cooking apparatus comprising:
   a. a cooking chamber having an openable door provided on the front of the cooking apparatus and a cooking volume;
   b. an upper IR heating element;
   c. a lower heating element
   d. a steamer;
   e. a forced convection fan assembly in flow communication with the cooking volume; and,
   f. a controller operably connected to the IR cooking element and the lower heating element,
   wherein the controller has a pre-set cooking setting that represents a cooking regime and, when the pre-set cooking setting is in operation, the controller is operable adjust the distribution of energy to the IR cooking element and the lower cooking element while the cooking apparatus operates at 75% or more of a rated power draw of the cooking apparatus for 70% or more of the pre-set cooking setting.
15. The cooking apparatus of clause 14 wherein the cooking apparatus operates at 75% or more of a rated power draw of the cooking apparatus for 80% or more of the pre-set cooking setting.
16. The cooking apparatus of clause 14 further comprising a steamer, the controller is also operably connected to the steamer and the controller is operable adjust the distribution of energy to the IR cooking element, the lower cooking element and the steamer while the cooking apparatus operates at 75% or more of a rated power draw of the cooking apparatus for 70% or more of the pre-set cooking setting.
17. The cooking apparatus of clause 17 wherein the cooking apparatus operates at 75% or more of a rated power draw of the cooking apparatus for 80% or more of the pre-set cooking setting.
18. The cooking apparatus of clause 17 wherein the cooking apparatus operates at 85% or more of a rated power draw of the cooking apparatus for 85% or more of the pre-set cooking setting.

Set 3

1. A cooking apparatus having a front, a rear and transversely opposed sides, the cooking apparatus comprising:
   a. a cooking chamber having an openable door and a cooking chamber depth extending from a front end of the cooking chamber to a rear end of the cooking chamber; and,
   b. a first cooking container removably receivable in the cooking chamber, the first cooking container defining a cooking volume, the first cooking containers having a cooking container depth extending from a front end of the cooking container to a rear end of the cooking container,
   wherein the openable door has a transparent panel.
2. The cooking apparatus of clause 1 wherein the first cooking container has a removable handle.
3. The cooking apparatus of clause 2 wherein a depth of the handle and the cooking container depth is greater than the cooking chamber depth, whereby the handle is removed from the first cooking container prior to the openable door being closed when the cooking container is in the cooking volume.
4. The cooking apparatus of clause 3 further comprising a second cooking container, when installed in the cooking chamber, the first and second cooking containers subdivide the cooking chamber into different cooking zones that are in fluid flow communication with each other.
5. The cooking apparatus of clause 4 wherein, when the first and second cooking containers are removed from the cooking chamber, the cooking chamber defines a single contiguous volume.
6. The cooking apparatus of clause 4 wherein each cooking container is individually removable from the cooking chamber.
7. The cooking apparatus of clause 1 wherein at least a portion of the front end of the first cooking container is see-through.
8. The cooking apparatus of clause 8 wherein the portion of the front end of the first cooking container is made of a transparent material or a wire mesh.
9. The cooking apparatus of clause 1 wherein the openable door is retractable to a retracted position when opened.
10. The cooking apparatus of clause 9 wherein, when the openable door is in the retracted position and the first and second cooking containers are in the cooking volume, the openable door is positioned below the first and second cooking containers.
11. The cooking apparatus of clause 10 wherein, when the openable door is pivotally and slideably mounted whereby the openable door first pivots to an open position and then slides inwardly to the retracted position.
12. The cooking apparatus of clause 1 wherein the transparent panel is made of glass.

13. A cooking apparatus comprising a cooking chamber having an openable door wherein the openable door is retractable to a retracted position when opened.
14. The cooking apparatus of clause 13 wherein, when the openable door is in the retracted position and a cooking container is in the cooking chamber, the openable door is positioned below the cooking container.
15. The cooking apparatus of clause 14 wherein, when the openable door is pivotally and slideably mounted whereby the openable door first pivots to an open position and then slides inwardly to the retracted position.
16. The cooking apparatus of clause 13 wherein the openable door has a transparent panel.

Set 4
1. A cooking apparatus comprising:
   a. a cooking chamber;
   b. a first heating member operable to provide heat to the cooking chamber; and,
   c. a heat storage member.
2. The cooking apparatus of clause 1 wherein the heat storage member is external to the cooking apparatus.
3. The cooking apparatus of clause 2 wherein the heat storage member is removably connectable in thermal communication with the cooking apparatus.
4. The cooking apparatus of clause 3 wherein the heat storage member comprises a thermally insulated heat sink, the heat sink having an air flow path therethrough wherein an outlet end of the air flow path is in air flow communication with the cooking chamber.
5. The cooking apparatus of clause 1 wherein the first heating member is operable to heat the heat storage member prior to heating the cooking chamber.
6. The cooking apparatus of clause 5 wherein the heat storage member comprises a thermally insulated heat sink, the heat sink having an air flow path therethrough wherein an inlet end of the air flow path is in air flow communication with a hot air stream produced by the first heating member.
7. The cooking apparatus of clause 6 wherein an outlet end of the airflow path is in airflow communication with the cooking chamber.
8. The cooking apparatus of clause 1 wherein the heat storage member comprises a second heating member that is operable to heat the heat storage member.
9. The cooking apparatus of clause 8 wherein the second heating member is operable to heat the heat storage member prior to the cooking chamber being heated.
10. The cooking apparatus of clause 1 wherein the cooking chamber is concurrently heated by the first heating member and heat stored in the heat storage member.
11. The cooking apparatus of clause 1 wherein the heat storage member comprises a thermally insulated heat sink, the heat sink having an air flow path therethrough wherein an outlet end of the air flow path is in air flow communication with the cooking chamber.
12. The cooking apparatus of clause 11 wherein the heat storage member comprises a second heating member that is operable to heat the heat sink.
13. The cooking apparatus of clause 12 wherein the heat storage member is removably connectable with the cooking apparatus.
14. A portable heat storage member comprising:
   a. a thermally insulated heat sink;
   b. a heating member in thermal communication with the heat sink;
   c. a fluid flow path extending through the heat sink, the fluid flow path having an inlet end and an outlet end, the outlet end is connectable in flow communication with a domestic appliance; and,
   d. an electrical cord connectable with a domestic power outlet.
15. The portable heat storage member of clause 14 wherein the domestic appliance is one of an electric kettle, a coffee maker and a cooking apparatus.
16. The portable heat storage member of clause 14 wherein the outlet end is removably connectable in flow communication with a domestic appliance.
17. The portable heat storage member of clause 14 wherein the outlet end is selectively connectable in flow communication with at least two domestic appliances.
18. The portable heat storage member of clause 14 further comprising a temperature sensor wherein the heating element is operated to heat the heat sink when the temperature sensor senses that the heat sink is below a pre-determined temperature.

Set 5
1. A cooking apparatus having a top, a front, a rear and transversely opposed sides the cooking apparatus comprising:
   a. an outer shell;
   b. an inner shell spaced from and facing at least a portion of the outer shell;
   c. an air flow passage provided between the inner shell and the outer shell, the air flow passage having a cooling air inlet and an exhaust outlet; and,
   d. a cooking chamber having an openable door, the cooking chamber is isolated from air flow communication with the air flow passage; and,
   e. a cooling fan assembly in air flow communication with the airflow passage.
2. The cooking apparatus of clause 1 wherein the cooling fan assembly is actuated when the cooking apparatus is actuated.
3. The cooking apparatus of clause 1 wherein the cooling fan assembly operates after the end of a cooking cycle for a predetermined period of time.
4. The cooking apparatus of clause 1 further comprising an outer shell temperature sensor wherein the cooling fan assembly operates after the end of a cooking cycle until the outer shell temperature sensor senses a temperature below a predetermined temperature
5. The cooking apparatus of clause 1 further comprising an outer shell temperature sensor wherein the cooling fan assembly is actuated when the outer shell temperature sensor senses a temperature above a predetermined temperature.
6. The cooking apparatus of clause 1 wherein the outer shell comprises a top panel and a plurality of side panels and the inner shell comprises a top panel spaced from and facing the top panel of the outer shell and a plurality of side panels spaced from and facing the side panels of the outer shell.
7. The cooking apparatus of clause 1 further comprising insulation overlying at least a portion of at least one of the inner shell and the outer shell.
8. The cooking apparatus of clause 1 further comprising insulation provided between at least a portion of the inner shell and the outer shell.

9. The cooking apparatus of clause 1 wherein the air inlet passage is provided on one of the transversely opposed sides and the exhaust outlet is provided on the other transversely opposed side.

10. The cooking apparatus of clause 1 wherein the cooling fan assembly is provided internal of the airflow passage.

11. The cooking apparatus of clause 10 wherein the cooling fan assembly is at the exhaust outlet.

12. The cooking apparatus of clause 1 wherein the exhaust outlet directs cooling air over the openable door.

13. The cooking apparatus of clause 12 wherein the openable door comprises a single layer of glass.

14. The cooking apparatus of clause 12 wherein the openable door comprises two spaced apart layers of glass.

15. The cooking apparatus of clause 12 wherein the openable door comprises two spaced apart layers of glass and the airflow passage extends between the layers of glass.

16. A cooking apparatus having a top, a front, a rear and transversely opposed sides the cooking apparatus comprising:
   a. an air flow passage having a cooling air inlet and an exhaust outlet; and,
   b. a cooking chamber having an openable door, the cooling chamber is isolated from air flow communication with the air flow passage; and,
   c. a cooling fan assembly in air flow communication with the air flow passage
   wherein the exhaust outlet directs cooling air at the openable door.

17. The cooking apparatus of clause 16 wherein the openable door comprises a single layer of glass.

18. The cooking apparatus of clause 16 wherein the openable door comprises two spaced apart layers of glass.

19. The cooking apparatus of clause 16 wherein the openable door comprises two spaced apart layers of glass and the airflow passage extends between the layers of glass.

20. The cooking apparatus of clause 16 wherein the exhaust outlet directs cooling over the openable door.

The invention claimed is:

1. A portable air fryer comprising, when positioned on a horizontal surface, a top, a bottom, a front having an openable door, a rear and, when viewed from the front, a left side and an opposed right side, the portable air fryer having a chamber that is operable as a unitary cooking zone, wherein a descending wall descends from an upper end of the chamber and terminates above a lower wall of the chamber wherein, when the portable air fryer is positioned on a horizontal surface, the descending wall descends to an elevation below a first heating element and the descending wall includes a rail mount whereby the unitary cooking zone is sub-dividable by the insertion of first and second cooking containers when the openable door is in an open position to provide two smaller first and second cooking volumes,
   wherein the first cooking container is slidably insertable through the front of the portable air fryer into the chamber and the second cooking container is slidably insertable through the front of the portable air fryer into the chamber, each of the first and second cooking containers is individually slideably insertable into the chamber,
   wherein each cooking container has a lower wall, sidewalls extending upwardly from the lower wall and an open top and, when each of the cooking containers is positioned in the portable air fryer, the first cooking volume is provided in the first cooking container and the second cooking volume is provided in the second cooking container, wherein the first cooking volume has the first heating element positioned at an upper end thereof and physically spaced from the first cooking container and the second cooking volume has a second heating element positioned at an upper end thereof and physically spaced from the second cooking container and wherein the first cooking volume has a first fan associated with the first heating element, the second cooking volume has a second fan associated with the second heating element,
   wherein, when each of the cooking containers is positioned in the chamber and when viewed from the front, the first cooking container is positioned on the right side of the chamber, the second cooking container is positioned on the left side of the chamber and a portion of a left side of the first cooking container is spaced from and directly faces a portion of a right side of the second cooking container, and
   wherein the first and second heating elements are individually controllable whereby, when the first and second cooking containers are positioned in the chamber, cooking conditions in each of the first and second cooking volumes are individually controllable and, when each of the cooking containers is absent from the chamber and the openable door is in the closed position, the chamber is operable as a unitary cooking zone.

2. The portable air fryer of claim 1 wherein each of the cooking containers is separately supported in the chamber.

3. The portable air fryer of claim 1 wherein, when each of the cooking containers is positioned in the chamber, an open volume is provided between the left side of the first cooking container and the right side of the second cooking container.

4. The portable air fryer of claim 1 wherein, when the cooking containers are removed from the chamber, the chamber defines a single contiguous volume.

5. The portable air fryer of claim 1 wherein, when each of the cooking containers is positioned in the chamber, the lower wall of each cooking container is spaced from a lower wall of the chamber.

6. The portable air fryer of claim 1 wherein the chamber has an upper wall, the first heating element is positioned below the upper wall of the chamber, the second heating element is positioned below the upper wall of the chamber and each cooking volume and a descending wall descends from the upper wall of the chamber and terminates above a lower wall of the chamber.

7. The portable air fryer of claim 6 wherein the descending wall extends to an elevation that is proximate an upper end of the sidewall of the first cooking container when the first cooking containers is positioned in the chamber.

8. The portable air fryer of claim 7 wherein the descending wall includes a rail mount.

9. The portable air fryer of claim 1 wherein the first cooking volume has a first fan positioned above the first heating element, the second cooking volume has a second fan positioned above the second heating element, a descending wall descends from an upper wall of the chamber and terminates above a lower wall of the chamber wherein, when the portable air fryer is positioned on a horizontal surface, the descending wall descends to an elevation below the first heating element.

10. The portable air fryer of claim 8 wherein the descending wall includes a rail mount.

11. A portable air fryer comprising, when positioned on a horizontal surface, a top, a bottom, a front, a rear and, when viewed from the front, a left side and an opposed right side, the front having an openable door that is moveable between a closed position and an open position and the portable air fryer having a unitary cooking zone,
   wherein, when the openable door is in the open position, a first cooking container is slidably insertable through the front of the portable air fryer into the portable air fryer and a second cooking container is slidably insertable through the front of the portable air fryer into the portable air fryer, each of the first and second cooking containers is individually slideably insertable into the portable air fryer,
   wherein each cooking container has a lower wall, sidewalls extending upwardly from the lower wall and an open top and, when each of the cooking containers is positioned in the portable air fryer, a first cooking volume is provided in the first cooking container and a second cooking volume is provided in the second cooking container whereby, when each of the first and second cooking containers is inserted into the unitary cooking zone, the first and second cooking containers subdivide the unitary cooking zone into the first and second cooking volumes,
   wherein the first cooking volume has a first heating element positioned at an upper end thereof and a first fan is positioned above the first heating element, the first heating element is physically spaced from the first cooking container the second cooking volume has a second heating element positioned at an upper end thereof and a second fan is positioned above the second heating element, the second heating element is physically spaced from the second cooking container,
   wherein, when each of the cooking containers is positioned in the portable air fryer and when viewed from the front, the first cooking container is positioned on the right side of the portable air fryer, the second cooking container is positioned on the left side of the portable air fryer and a left side of the first cooking container is spaced from a right side of the second cooking container,
   a descending wall descends from an upper wall of the portable air fryer and terminates above a lower wall of the first and second cooking volumes, the descending wall includes a rail mount wherein, when the portable air fryer is positioned on a horizontal surface, the rail mount is at an elevation below the first heating element, and
   wherein the first and second heating elements are individually controllable whereby, when each of the cooking containers is positioned in the unitary cooking zone, cooking conditions in each of the first and second cooking volumes are individually controllable and, when each of the cooking containers is absent from the unitary cooking zone and the openable door is in the closed position, the unitary cooking zone is an enlarged cooking zone.

12. The portable air fryer of claim 11 wherein, when each of the cooking containers is positioned in the portable air fryer, the rail mount is located between the left side of the first cooking container and the right side of the second cooking container.

13. The portable air fryer of claim 11 wherein each of the cooking containers is separately supported in the portable air fryer.

14. The portable air fryer of claim 11 wherein, when each of the cooking containers is positioned in the portable air fryer, an open volume is located below the lower wall of each cooking container.

15. The portable air fryer of claim 11 wherein the descending wall descends from the upper wall of the portable air fryer part way towards a lower wall of the portable air fryer.

16. The portable air fryer of claim 11 wherein the descending wall descends to an elevation proximate a lower end of the first heating element.

17. A portable air fryer comprising, when positioned on a horizontal surface, a top, a bottom, a front, a rear and, when viewed from the front, a left side and an opposed right side, the front having an openable door that is moveable between a closed position and an open position and the portable air fryer having a unitary cooking zone,
   wherein, when the openable door is in the open position, a first cooking container is slidably insertable through the front of the portable air fryer into the portable air fryer and a second cooking container is slidably insertable through the front of the portable air fryer into the portable air fryer, each of the first and second cooking containers is individually slideably insertable into the portable air fryer,
   wherein each cooking container has a lower wall, sidewalls extending upwardly from the lower wall and an open top and, when each of the cooking containers is positioned in the portable air fryer, a first cooking volume is provided in the first cooking container and a second cooking volume is provided in the second cooking container whereby, when each of the first and second cooking containers is inserted into the unitary cooking zone, the first and second cooking containers subdivide the unitary cooking zone into the first and second cooking volumes,
   wherein the first cooking volume has a first heating element positioned at an upper end thereof and a first fan is positioned above the first heating element, the first heating element is physically spaced from the first cooking container, the second cooking volume has a second heating element positioned at an upper end thereof and a second fan is positioned above the second heating element, the second heating element is physically spaced from the second cooking container,
   wherein, when each of the cooking containers is positioned in the portable air fryer and when viewed from the front, the first cooking container is positioned on the right side of the portable air fryer, the second cooking container is positioned on the left side of the portable air fryer and a left side of the first cooking container is spaced from a right side of the second cooking container,
   a descending wall descends from an upper wall of the portable air fryer and terminates above a lower wall of the first and second cooking volumes, the descending wall includes a rail mount wherein, when each of the cooking containers is positioned in the portable air fryer, the rail mount is located between the left side of the first cooking container and the right side of the second cooking container, and
   wherein the first and second heating elements are individually controllable whereby, when each of the cooking containers is positioned in the unitary cooking zone, cooking conditions in each of the first and second cooking volumes are individually controllable and, when each of the cooking containers is absent from the unitary cooking zone and the openable door is in the closed position, the unitary cooking zone is an enlarged cooking zone.

18. The portable air fryer of claim 17 wherein, when each of the cooking containers is positioned in the portable air fryer, an open volume is located below the lower wall of each cooking container.

19. The portable air fryer of claim 17 wherein, when the portable air fryer is positioned on a horizontal surface, the rail mount is at an elevation below the first and second heating elements.

20. The portable air fryer of claim 19 wherein the descending wall descends to an elevation proximate a lower end of the first heating element.

* * * * *